US012068622B2

(12) United States Patent
Fieldbinder et al.

(10) Patent No.: US 12,068,622 B2
(45) Date of Patent: Aug. 20, 2024

(54) UNIVERSAL WIRELESS CHARGING OF POWER TOOL BATTERY PACKS

(71) Applicant: MILWAUKEE ELECTRIC TOOL CORPORATION, Brookfield, WI (US)

(72) Inventors: Douglas R. Fieldbinder, Greendale, WI (US); Catherine K. Semon, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 496 days.

(21) Appl. No.: 17/488,551

(22) Filed: Sep. 29, 2021

(65) Prior Publication Data
US 2022/0102995 A1 Mar. 31, 2022

Related U.S. Application Data

(60) Provisional application No. 63/176,923, filed on Apr. 20, 2021, provisional application No. 63/084,906, filed on Sep. 29, 2020.

(51) Int. Cl.
*H02J 7/00* (2006.01)
*H02J 50/12* (2016.01)
(Continued)

(52) U.S. Cl.
CPC ........ *H02J 7/00045* (2020.01); *H02J 7/0013* (2013.01); *H02J 7/0048* (2020.01);
(Continued)

(58) Field of Classification Search
CPC .................................................. H02J 7/0045
(Continued)

(56) References Cited

U.S. PATENT DOCUMENTS 10,131,042 B2 11/2018 Mergener et al.
10,851,976 B2 12/2020 Proeber et al.
(Continued)

FOREIGN PATENT DOCUMENTS

KR 1020100054207 A 5/2010

OTHER PUBLICATIONS

International Search Report and Written Opinion for Application No. PCT/US2021/052521 dated Jan. 18, 2022 (12 pages).
Bluetti, "Bluetti EP500 & EP500Pro," <https://www.bluetti.com/pages/ep500-p> web page visited Oct. 1, 2021.

*Primary Examiner* — Edward Tso
*Assistant Examiner* — Ahmed H Omar
(74) *Attorney, Agent, or Firm* — Michael Best & Friedrich LLP

(57) ABSTRACT

Communication systems described herein may include a wireless charging device with a plurality of charging stations. The wireless charging device may communicate with a first battery pack via at least one of a wireless communication device and a first battery pack detection sensor of a first charging station. The wireless charging device may communicate with a second battery pack via at least one of the wireless communication device and a second battery pack detection sensor of a second charging station. The wireless charging device may determine that the first battery pack was manufactured by a different manufacturer than the second battery pack. The wireless charging device may communicate status information to an external device for display by the external device. The status information may include a first manufacturer of the first battery pack and a second manufacturer of the second battery pack that is different than the first manufacturer.

20 Claims, 67 Drawing Sheets

(51) Int. Cl.
*H02J 50/20* (2016.01)
*H02J 50/40* (2016.01)
*H02J 50/80* (2016.01)
*H02J 50/90* (2016.01)

(52) U.S. Cl.
CPC .............. *H02J 50/12* (2016.02); *H02J 50/20* (2016.02); *H02J 50/402* (2020.01); *H02J 50/80* (2016.02); *H02J 50/90* (2016.02)

(58) Field of Classification Search
USPC ........................................................ 320/106
See application file for complete search history.

(56) References Cited

U.S. PATENT DOCUMENTS

| | | | |
|---|---|---|---|
| 2009/0184165 A1* | 7/2009 | Bertness | H01M 10/488 235/462.01 |
| 2014/0180612 A1 | 6/2014 | Rejman et al. | |
| 2015/0028800 A1 | 1/2015 | Kim | |
| 2017/0117738 A1* | 4/2017 | Yeoh | H02J 7/00034 |
| 2017/0149266 A1 | 5/2017 | Mack | |
| 2018/0375349 A1* | 12/2018 | Bonilla | H02J 7/0045 |
| 2019/0106244 A1 | 4/2019 | Brunner et al. | |
| 2019/0267818 A1* | 8/2019 | Bonilla | H02J 7/0013 |
| 2019/0296290 A1 | 9/2019 | Hansen et al. | |
| 2019/0346122 A1 | 11/2019 | Proeber et al. | |
| 2020/0114499 A1 | 4/2020 | Vanko et al. | |
| 2020/0161899 A1 | 5/2020 | Lee et al. | |

* cited by examiner

UNIVERSAL WIRELESS CHARGING OF POWER TOOL BATTERY PACKS

RELATED APPLICATIONS

This application claims priority to U.S. Provisional Patent Application No. 63/176,923, filed on Apr. 20, 2021 and U.S. Provisional Patent Application No. 63/084,906, filed on Sep. 29, 2020, the entire contents of both of which are hereby incorporated by reference.

SUMMARY

One embodiment includes a communication system that may include a wireless charging device that may include a plurality of charging stations. The plurality of charging stations may include a first charging station including a first type of wireless charging circuitry and a first battery pack detection sensor. The plurality of charging stations may also include a second charging station including a second battery pack detection sensor and a second type of wireless charging circuitry different than the first type of wireless charging circuitry. The wireless charging device may also include a wireless communication device. The wireless charging device may also include a charger electronic processor coupled to the plurality of charging stations and to the wireless communication device. The charger electronic processor may be configured to communicate with a first battery pack via at least one of the wireless communication device and the first battery pack detection sensor. The charger electronic processor may be further configured to communicate with a second battery pack via at least one of the wireless communication device and the second battery pack detection sensor. The charger electronic processor may be further configured to determine, based on communicating with the first battery pack and the second battery pack, that the first battery pack was manufactured by a different manufacturer than the second battery pack. The charger electronic processor may be further configured to communicate first status information of the first charging station and second status information of the second charging station to an external device via the wireless communication device. The first status information may include a first manufacturer of the first battery pack, and the second status information may include a second manufacturer of the second battery pack that is different than the first manufacturer. The communication system may further include the external device. The external device may include a transceiver configured to wirelessly communicate with the wireless communication device of the wireless charging device. The external device also may include a display. The external device also may include an external device electronic processor coupled to the transceiver and the display. The external device electronic processor may be configured to receive the first status information and the second status information from the wireless charging device via the transceiver. The external device electronic processor may be configured to control the display to display the first status information and the second status information.

In some embodiments, the wireless communication device may be configured to use a first wireless communication modality, and at least one of the first battery pack detection sensor and the second battery pack detection sensor may be configured to use a second communication modality different than the first communication modality.

In some embodiments, at least one of the charger electronic processor and a battery electronic processor of the first battery pack may be configured to determine a received signal strength indication (RSSI) of at least one of (i) wireless charging of the first battery pack by the first type of wireless charging circuitry and (ii) communication between the first battery pack and the at least one of the wireless communication device and the first battery pack detection sensor. The first status information may include the RSSI, and the external device electronic processor may control the display to display the RSSI as an indication of an effectiveness of wireless power transfer from the first type of wireless charging circuitry of the first charging station to the first battery pack.

In some embodiments, at least one of the charger electronic processor, the battery electronic processor, and the external device electronic processor may be configured to determine that the RSSI is below a threshold RSSI. In response to determining that the RSSI is below the threshold RSSI, the external device electronic processor may be configured to control the display to provide an alert recommending that a user adjust a positioning of the first battery pack on the first charging station.

In some embodiments, the first status information may indicate that the first charging station is wirelessly charging the first battery pack using the first type of wireless charging circuitry.

In some embodiments, the first status information may indicate a plurality of available types of charging by the first charging station. The plurality of available types of charging may include use of the first type of wireless charging circuitry and use of a third type of wireless charging circuitry different than the first type of charging circuitry.

In some embodiments, the first status information may indicate one or more of a plurality of wireless charging modalities through which the first battery pack is configured to be wirelessly charged.

In some embodiments, the first status information may include at least one of a charge level of the first battery pack, a temperature of the first battery pack, a voltage of the first battery pack, and an energy output capacity of the first battery pack.

In some embodiments, the external device electronic processor may be configured to control the display to display a charging type selection interface configured to allow a user to select between (i) serial charging of the first battery pack and the second battery pack and (ii) simultaneous charging of the first battery pack and the second battery pack. The external device electronic processor may be configured to receive, via the display, a user input selecting an option from the charging type selection interface. The external device electronic processor may be configured to transmit, via the transceiver, the selected option to the wireless charging device. The charger electronic processor may be configured to receive, via the wireless communication device, the selected option, and control operation of the first charging station and the second charging station in accordance with the selected option.

In some embodiments, the external device electronic processor may be configured to receive, via the display, a selection of one or more battery packs to be charged. The external device electronic processor may be configured to transmit, via the transceiver, the selection of the one or more battery packs to be charged to the wireless charging device. The charger electronic processor may be configured to receive, via the wireless communication device, the selection of the one or more battery packs to be charged, and control operation of the first charging station and the second charging station in accordance with the selection of the one or more battery packs to be charged.

In some embodiments, the selection of the one or more battery packs to be charged may include a selection of a plurality of battery packs to be charged and an order in which serial charging of each of the battery packs in the plurality of battery packs occurs.

In some embodiments, the external device electronic processor may be configured to receive, via the display, a selection of a charging modality for the first charging station from among a plurality of charging modalities that are shared by the first charging station and the first battery pack. The external device electronic processor may be configured to transmit, via the transceiver, the selection of the charging modality to the wireless charging device. The charger electronic processor may be configured to receive, via the wireless communication device, the selection of the charging modality, and control operation of the first charging station to charge the first battery pack using the selected charging modality.

In some embodiments, the external device electronic processor may be configured to receive, via the display, a selection of scheduled charging parameters that may indicate (i) whether scheduled charging should occur, (ii) which charging stations should engage in the scheduled charging, and (iii) when the scheduled charging should occur. The external device electronic processor may be configured to transmit, via the transceiver, the selection of the scheduled charging parameters to the wireless charging device. The charger electronic processor may be configured to receive, via the wireless communication device, the selection of the scheduled charging parameters, and control operation of the first charging station and the second charging station in accordance with the selection of the scheduled charging parameters.

In some embodiments, the external device electronic processor may be configured to receive, via the display, a selection of eco-mode charging. The external device electronic processor may configured to transmit, via the transceiver, the selection of the eco-mode charging to the wireless charging device. The charger electronic processor may be configured to receive, via the wireless communication device, the selection of the eco-mode charging. The charger electronic processor may also be configured to control operation of the first charging station and the second charging station in accordance with the selection of the eco-mode charging by (i) monitoring power consumption of a grid to which the wireless charging device is coupled, (ii) determining that the power consumption has decreased below a threshold for a predetermined amount of time, and (iii) in response to determining that the power consumption has decreased below the threshold for the predetermined amount of time, enabling operation of at least one of the first charging station and the second charging station.

In some embodiments, the wireless charging device may be a portable power supply that may include one or more internal batteries configured to provide power to the first type of wireless charging circuitry of the first charging station and to the second type of wireless charging circuitry of the second charging station.

Another embodiment includes a communication method that may include communicating, with a charger electronic processor of a wireless charging device via at least one of a wireless communication device of the wireless charging device and a first battery pack detection sensor of the wireless charging device, with a first battery pack located on a first charging station of the wireless charging device. The first charging station may include the first battery pack detection sensor and a first type of wireless charging circuitry. The communication method may further include communicating, with the charger electronic processor via at least one of the wireless communication device and a second battery pack detection sensor of the wireless charging device, with a second battery pack located on the a second charging station of the wireless charging device. The second charging station may include the second battery pack detection sensor and a second type of wireless charging circuitry. The communication method may further include determining, with the charger electronic processor and based on communicating with the first battery pack and the second battery pack, that the first battery pack was manufactured by a different manufacturer than the second battery pack. The communication method may further include communicating, with the charger electronic processor and via the wireless communication device, first status information of the first charging station and second status information of the second charging station to an external device. The first status information may include a first manufacturer of the first battery pack, and the second status information may include a second manufacturer of the second battery pack that is different than the first manufacturer. The communication method may further include receiving, with an external device electronic processor of the external device via a transceiver of the external device, the first status information and the second status information from the wireless charging device. The communication method may further include controlling, with the external device electronic processor, a display of the external device to display the first status information and the second status information.

In some embodiments, communicating via the wireless communication device of the wireless charging device includes using a first wireless communication modality, and communicating via at least one of the first battery pack detection sensor and the second battery pack detection sensor includes using a second communication modality different than the first communication modality.

In some embodiments, the communication method may further include determining, with at least one of the charger electronic processor and a battery electronic processor of the first battery pack, a received signal strength indication (RSSI) of at least one of (i) wireless charging of the first battery pack by the first type of wireless charging circuitry and (ii) communication between the first battery pack and the at least one of the wireless communication device and the first battery pack detection sensor. The first status information may include the RSSI. Controlling the display to display the first status information may include controlling, with the external device electronic processor, the display to display the RSSI as an indication of an effectiveness of wireless power transfer from the first type of wireless charging circuitry of the first charging station to the first battery pack.

Another embodiment includes a communication system that may include a wireless charging device that may include a plurality of charging stations. The plurality of charging stations may include a first charging station including a first type of wireless charging circuitry and a first battery pack detection sensor, and a second charging station including a second battery pack detection sensor and a second type of wireless charging circuitry different than the first type of wireless charging circuitry. The wireless charging device may further include a wireless communication device. The wireless charging device may further include a charger electronic processor coupled to the plurality of charging stations and to the wireless communication device. The charger electronic processor may be configured to communicate with a first battery pack via at least one of the wireless communication device and the first battery pack detection sensor. The charger electronic processor may be further configured to communicate with a second battery pack via at least one of the wireless communication device and the second battery pack detection sensor. The charger electronic processor may be further configured to communicate first status information of the first charging station and second status information of the second charging station to an external device via the wireless communication device. The communication system may further include the external device. The external device may include a transceiver configured to wirelessly communicate with the wireless communication device of the wireless charging device. The external device may also include a display, and an external device electronic processor coupled to the transceiver and the display. The external device electronic processor may be configured to receive the first status information and the second status information from the wireless charging device via the transceiver, and control the display to display the first status information and the second status information.

In some embodiments, at least one of the charger electronic processor and the external device electronic processor may be configured to determine, based on communicating with the first battery pack and the second battery pack, that the first battery pack was manufactured by a different manufacturer than the second battery pack. The external device electronic processor may be configured to control the display to display a first manufacturer of the first battery pack and a second manufacturer of the second battery pack that is different than the first manufacturer.

Another embodiment includes a portable power supply that may include a housing, and an internal core battery located within the housing. The portable power supply may also include a wireless charging station located on the housing and including wireless charging circuitry configured to wirelessly charge a device. The portable power supply may also include a charger electronic processor located within the housing and coupled to the wireless charging circuitry and the internal core battery. The portable power supply may be configured to be coupled to an external power source to receive power from the external power source. The charger electronic processor may be configured to control the wireless charging circuitry to receive power from at least one of the internal core battery and the external power source in response to determining that the external power source is coupled to the portable power supply. The charger electronic processor may be configured to control the wireless charging circuitry to receive power from the internal core battery in response to determining that the external power source is not coupled to the portable power supply.

In some embodiments, the internal core battery is configured to be charged by the external power source.

In some embodiments, the internal core battery may be configured to provide power to the wireless charging circuitry while the internal core battery is being charged by the external power source. In some embodiments, the external power source may be configured to provide power to the wireless charging circuitry while the internal core battery is being charged by the external power source.

In some embodiments, the device being wirelessly charged by the wireless charging circuitry may include at least one of a battery pack, an external device configured to be used for wireless communication, and a device with an integrated battery.

In some embodiments, the internal core battery may include a battery configured to be irremovable from the housing unless the housing is disassembled.

In some embodiments, the housing may include a storage compartment configured to receive the device being wirelessly charged by the wireless charging circuitry. The wireless charging station may be located in the storage compartment.

In some embodiments, the portable power supply may include one or more power outlets located on the housing and configured to receive power from at least one of the internal core battery and the external power source.

In some embodiments, the portable power supply may include a light integrated into the housing and configured to illuminate a jobsite. The light may receive power from at least one of the internal core battery and the external power source.

In some embodiments, the wireless charging station may be a first wireless charging station including first wireless charging circuitry of a first type. The portable power supply may include a second wireless charging station located on the housing and including second wireless charging circuitry of a second type different than the first type.

In some embodiments, the portable power supply may be configured to couple to the external power source wirelessly via a charging pad.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Figure 1:
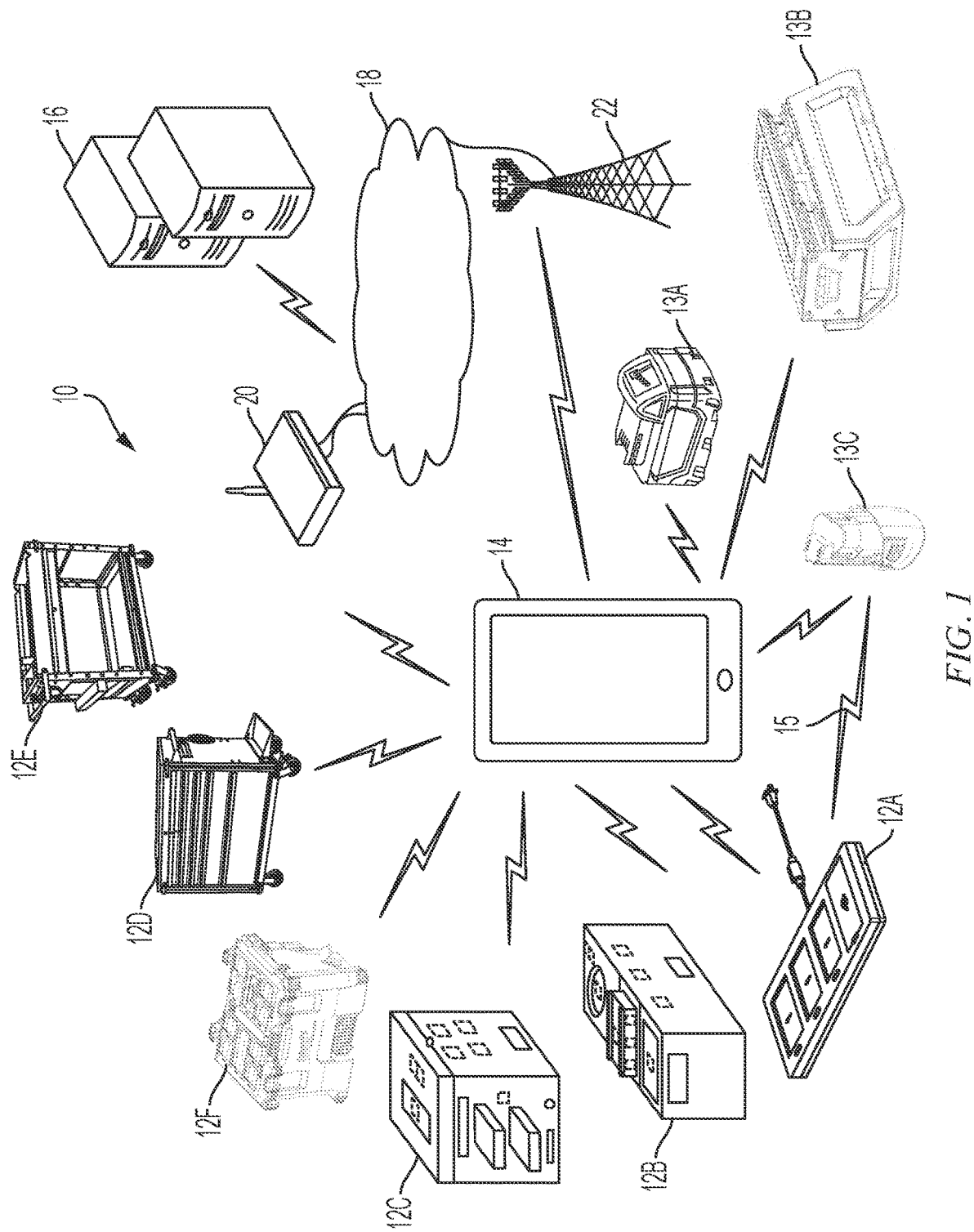
FIG. 1 illustrates a communication system, including one or more wireless charging devices and one or more devices configured to be charged by the wireless charging devices, according to embodiments described herein.

FIG. 1 illustrates a communication system 10, including one or more wireless charging devices 12A, 12B, 12C, 12D, 12E, and 12F that may be generally referred to as wireless charging devices 12. The wireless charging devices 12 may be used to wirelessly charge one or more battery packs 13A, 13B, and 13C that may be generally referred as battery packs 13. As indicated in FIG. 1, the wireless charging devices 12A-12F may have different designs than each other and/or may be integrated into different products. For example, wireless charging device 12A is shown as a wireless charging pad while wireless charging device 12F is shown as a stackable/modular tool case. As another example, the wireless charging devices 12D and 12E are shown as different types of mobile tool storage devices. Physical details of the wireless charging devices 12 are shown and described in further detail with respect to FIGS. 5 and 32-50. Regardless of the physical design of the wireless charging device 12, each wireless charging device 12 may include at least some of the components shown and described with respect to FIGS. 6A-6C.

Similar to the wireless charging devices 12, the battery packs 13A-13C may have different designs than each other and/or may be used to power different products. For example, battery pack 13A is shown as an eighteen Volt battery pack that may be configured to provide power to a stand-alone lighting device or a power tool such as a power drill, impact driver, reciprocating saw, or the like. As another example, the battery pack 13B is shown as a larger battery pack that may be configured to power equipment (e.g., a generator, a sewer drum drain cleaning machine, etc.) and/or larger tools that may be intended to replace tools typically operated by gas engines, for example, a concrete saw, a breaker tool, a cut-off saw, a core drill, and the like. The battery pack 13B is shown as an eighty Volt battery pack. As another example, the battery pack 13C is shown as a twelve Volt battery pack that may be configured to provide power to smaller power tools such as smaller power drills and the like. In some embodiments, the battery pack 13 may include other types of battery packs 13 that are not shown in FIG. 1.

For example, the battery pack 13 may include a four Volt battery pack that may be configured to provide power to smaller power tools (e.g., a power screwdriver of the like) and/or equipment (e.g., a leveling device, a head lamp lighting device, heated gloves, etc.). In some embodiments, the battery packs 13 may be battery packs produced by different manufacturers and may include different components than each other (for example, different types of battery cells, different sensors, microprocessors, etc.). Regardless of the physical design of the battery pack 13, each battery pack 13 may include at least some of the components shown and described with respect to FIG. 4A.

As shown in FIG. 1, the communication system 10 may also include an external device 14 configured to communicate via wireless or wired communication methods with the wireless charging devices 12 and the battery packs 13. The external device may also be configured to communicate with a remote server 16 via a network 18. For example, the external device 14 is configured to share charging operational data obtained from a wireless charging device 12 and/or battery pack operational data obtained from a battery pack 13 with the remote server 16 connected through the network 18. The external device 14 may also be used as intermediary for communication between a battery pack 13 and a wireless charging device 12. The remote server 16 may be used to store the charging/battery pack operational data obtained from the external device 14, provide additional functionality and services to the user, or a combination thereof. In some embodiments, storing the information on the remote server 16 allows a user to access the information from a plurality of different locations. In some embodiments, the remote server 16 collects information from various users regarding their wireless charging devices 12 and/or battery packs 13 and provides statistics or statistical measures to the user based on information obtained from the different wireless charging devices 12 and/or battery packs 13. For example, the remote server 16 may provide statistics regarding the experienced efficiency of the wireless charging device 12 and/or battery pack 13, typical usage of the wireless charging device 12 and/or battery pack 13, and other relevant characteristics and/or measures of the wireless charging device 12 and/or battery pack 13.

The network 18 may include various networking elements (routers 20, hubs, switches, cellular towers 22, wired connections, wireless connections, etc.) for connecting to, for example, the Internet, a cellular data network, a local network, or a combination thereof. In some embodiments, one or more wireless charging devices 12 and/or battery packs 13 are configured to communicate directly with the remote server 16 through an additional wireless interface or with the same wireless interface that the wireless charging device 12 and/or the battery pack 13 uses to communicate with the external device 14. In some embodiments, the wireless charging device 12 and the battery pack 13 are configured to communicate directly with each other through an additional wireless interface or with the same wireless interface that the wireless charging device 12 and the battery pack 13 use to communicate with the external device 14. This direct communication between the wireless charging device 12 and the battery pack 13 is indicated by a communication link 15 shown in FIGS. 1 and 2. While the communication link 15 is only shown between the wireless charging device 12A and the battery pack 13C, a direct communication link may exist between any charging device 12 and any battery pack 13 in some embodiments. Additionally, while lightning bolts are used in FIG. 1 to represent communication links between devices to indicate that the devices may communicate with each other, for ease of readability, lightning bolts are not shown between each pair of devices that may communicate with each other. In some embodiments, any one device of the communication system 10 may communicate directly with any other device of the communication system 10. Similarly, any one device of the communication system 10 may communicate indirectly with any other device of the communication system 10 via another device of the communication system 10 (e.g., by forming a mesh network between multiple devices and using one device such as the external device 14 to relay messages between two other devices).

The communication system 10 shown in FIG. 1 is merely an example. In some embodiments, the communication system 10 includes more or fewer devices than those shown in FIG. 1. For example, the communication system 10 includes more or fewer wireless charging devices 12 of the same or different type. As another example, the communication system 10 includes more or fewer battery packs 13 of the same or different type. As yet another example, the communication system 10 includes additional external devices 14 (e.g., associated with different users) and/or additional network components such as additional routers 20 and/or cellular towers 22).

Figure 2:
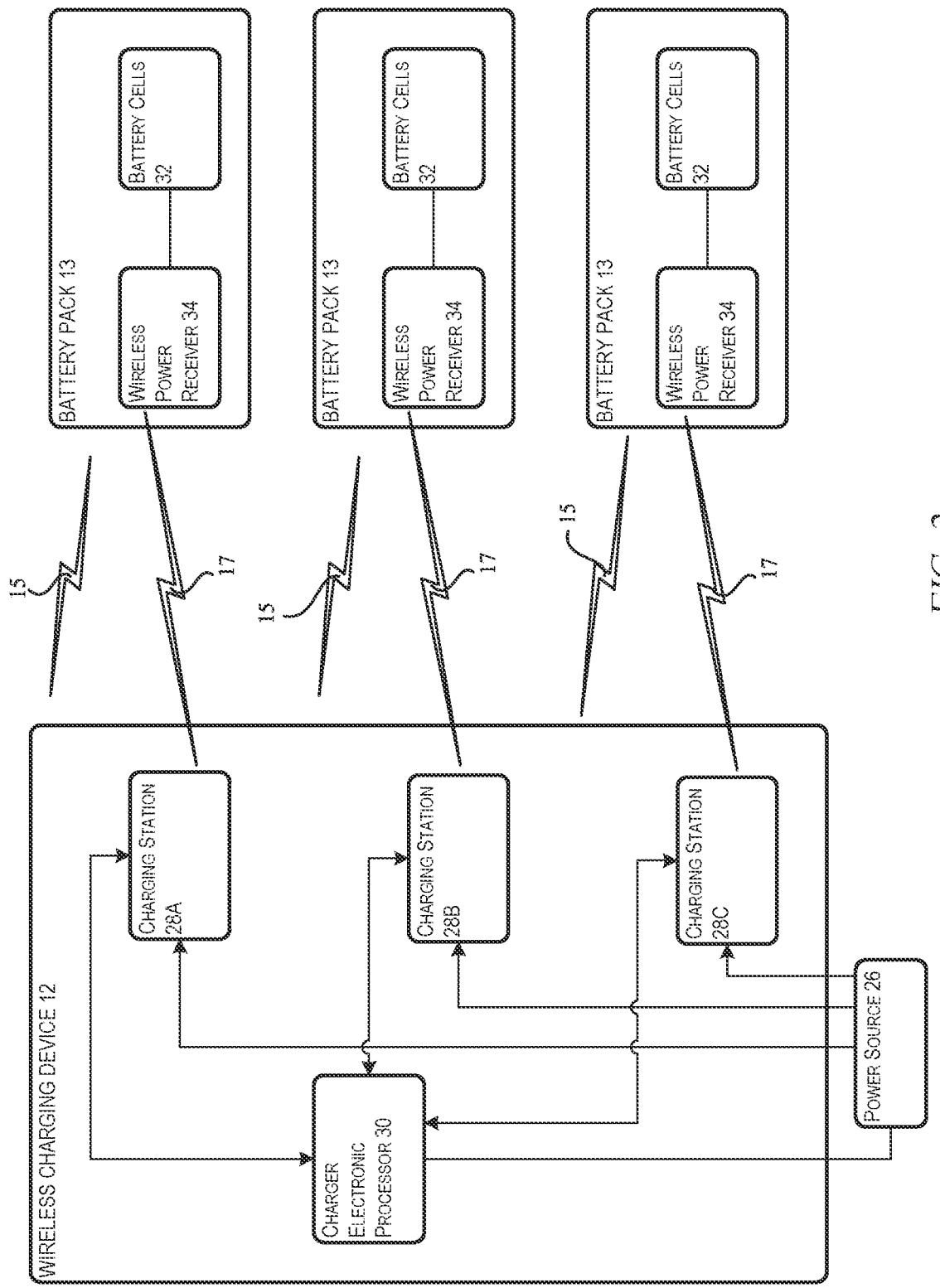
FIG. 2 illustrates a block diagram of a wireless charging device and a battery pack of the communication system shown in FIG. 1 according to one example embodiment.

FIG. 2 illustrates a block diagram of a wireless charging device 12 configured to charge a plurality of battery packs 13 using wireless and/or wired charging techniques according to one example embodiment. The wireless charging device 12 also may be configured for wired or wireless communication with the battery packs 13, as described in more detail below. As shown in FIG. 2, the wireless charging device 12 is electrically coupled to a power source 26. For example, the wireless charging device 12 includes an alternating current (AC) plug that is configured to receive AC power from the power source 26. The power source 26 may be, for example, a single AC line voltage or a universal AC line voltage. The power source 26 may also be another type of power source, such as a solar panel, a wind turbine, a battery pack, an AC grid line, or the like. In some embodiments, the wireless charging device 12 further includes a ferrite bead configured to filter noise from the power source 26. In some embodiments, the power source 26 is incorporated into the wireless charging device 12 (e.g., as an internal rechargeable battery pack, an integrated solar panel, or the like).

The wireless charging device 12 also includes one or more charging stations 28 that may each be configured to charge at least one battery pack using wireless and/or wired charging techniques. The physical design(s) of the charging stations 28 according to numerous embodiments are described in detail below with respect to FIGS. 5 and 32-50. Although FIG. 2 shows the wireless charging device 12 as including three charging stations 28, the wireless charging device 12 may include fewer or additional charging stations 28.

In some embodiments, at least one charging station 28 of the wireless charging device 12 is different than another charging station 28 of the wireless charging device 12. For example, the charging station 28A may include a first type of wireless charging circuitry that allows for inductive charging while the charging station 28B may include a second type of wireless charging circuitry that allows for capacitive charging, radio frequency (RF) charging, or magnetic resonance charging. In some embodiments, a single charging station 28C may include multiple types of wireless charging circuitry that allow for two or more of the types of wireless charging mentioned above. In some embodiments, different charging stations 28 may be specifically configured to charge certain types/sizes of battery packs 13. For example, the charging station 28A may be configured to charge high voltage battery packs such as the battery pack 13B.

As shown in FIG. 2, each charging station 28 may receive power from the power source 26. As indicated in FIG. 2, the wireless charging device 12 may include a charger electronic processor 30 configured to monitor each charging station 28 and control the power provided to each charging station 28 from the power source 26. Additional components and details of the wireless charging device 12 are explained below with respect to FIG. 3.

As shown in FIG. 2, each battery pack includes battery cells 32 and a wireless power receiver 34. In some embodiments, the wireless power receiver 34 is energized by the wireless charging circuitry included in the charging station 28. The wireless power receiver 34 may then provide power to the battery cells 32 to charge the battery cells 32. In some embodiments, one or more battery packs 13 are configured to be wirelessly charged while the battery pack 13 is coupled to a power tool. For example, a switch that allows current to flow from the battery pack 13 to a power tool may be opened to prevent current flow, and the wireless power receiver 34 may be energized by the wireless charging circuitry (e.g., wireless power transmitter) included in the charging station 28 to provide power to the battery cells 32. As is evident from the above explanation of the wireless charging device, in some embodiments, the battery packs 13 coupled to the wireless charging device 12 are different types of battery packs 13. For example, the battery packs 13 have different nominal voltages, different Ampere-hour discharge capacities, and/or a different number of battery cells. As another example, the battery packs 13 may be manufactured by different manufacturers and may have different attachment mechanisms that allow that battery packs 13 to be secured to devices (e.g., power tools) to which the battery packs 13 are configured to provide power. For example, a first battery pack 13 may have a rail system configured to slidingly engage with a first power tool. On the other hand, a second battery pack 13 may have a tower that is configured to be inserted into a second power tool from a different manufacturer than the first power tool. Alternatively, the second battery pack 13 may have a different rail system that is incompatible with the first power tool but that is compatible with a second power tool from a different manufacturer.

The block diagram of the wireless charging device 12 and the battery packs 13 shown in FIG. 2 is a simplified example block diagram. As indicated by FIGS. 3 and 4, the wireless charging device 12 and/or the battery packs 13 include additional components.

Figure 4A:
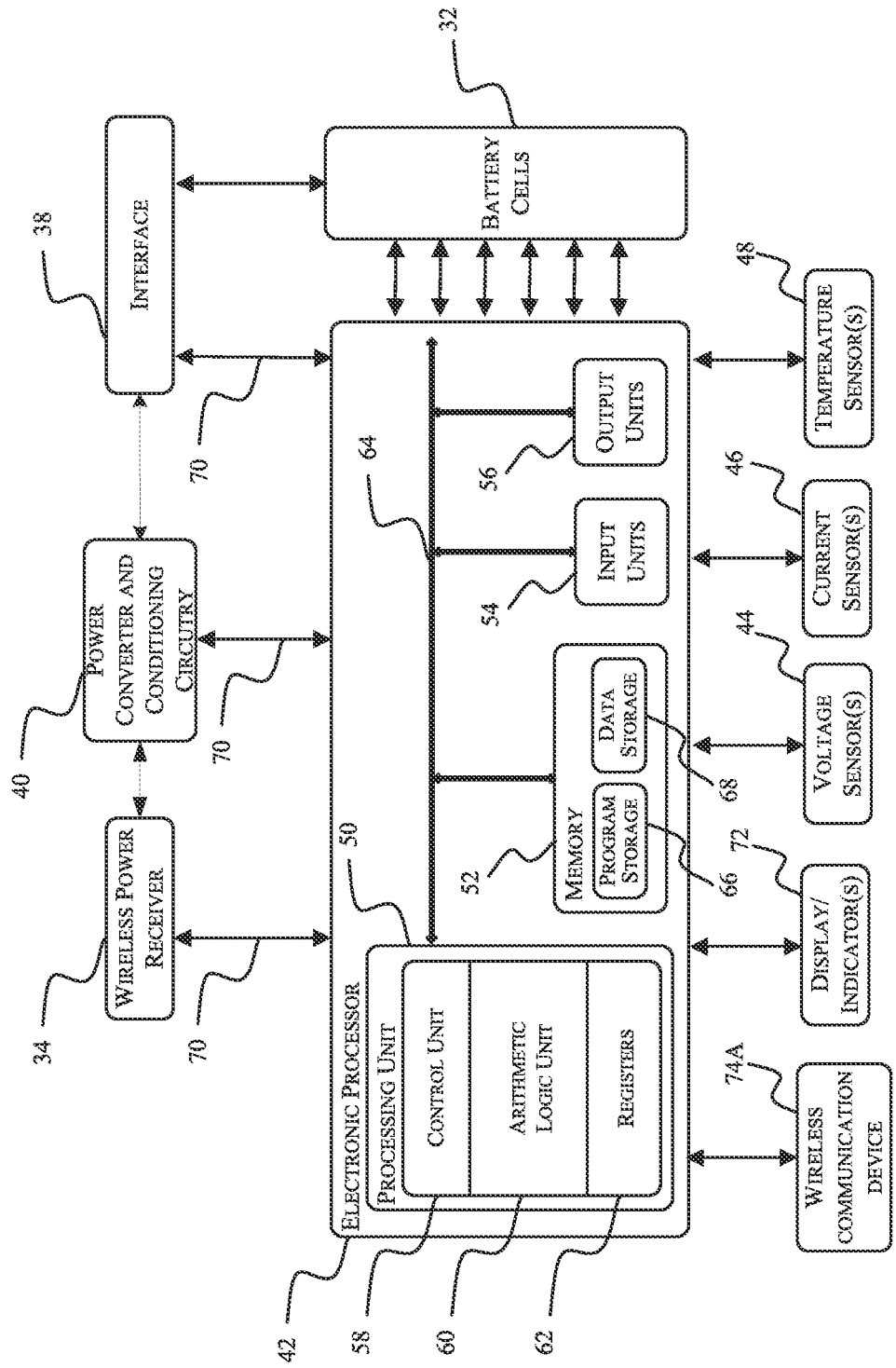
FIG. 4A illustrates a block diagram of the battery packs of FIGS. 3A-3C according to one example embodiment.
Figure 6A:
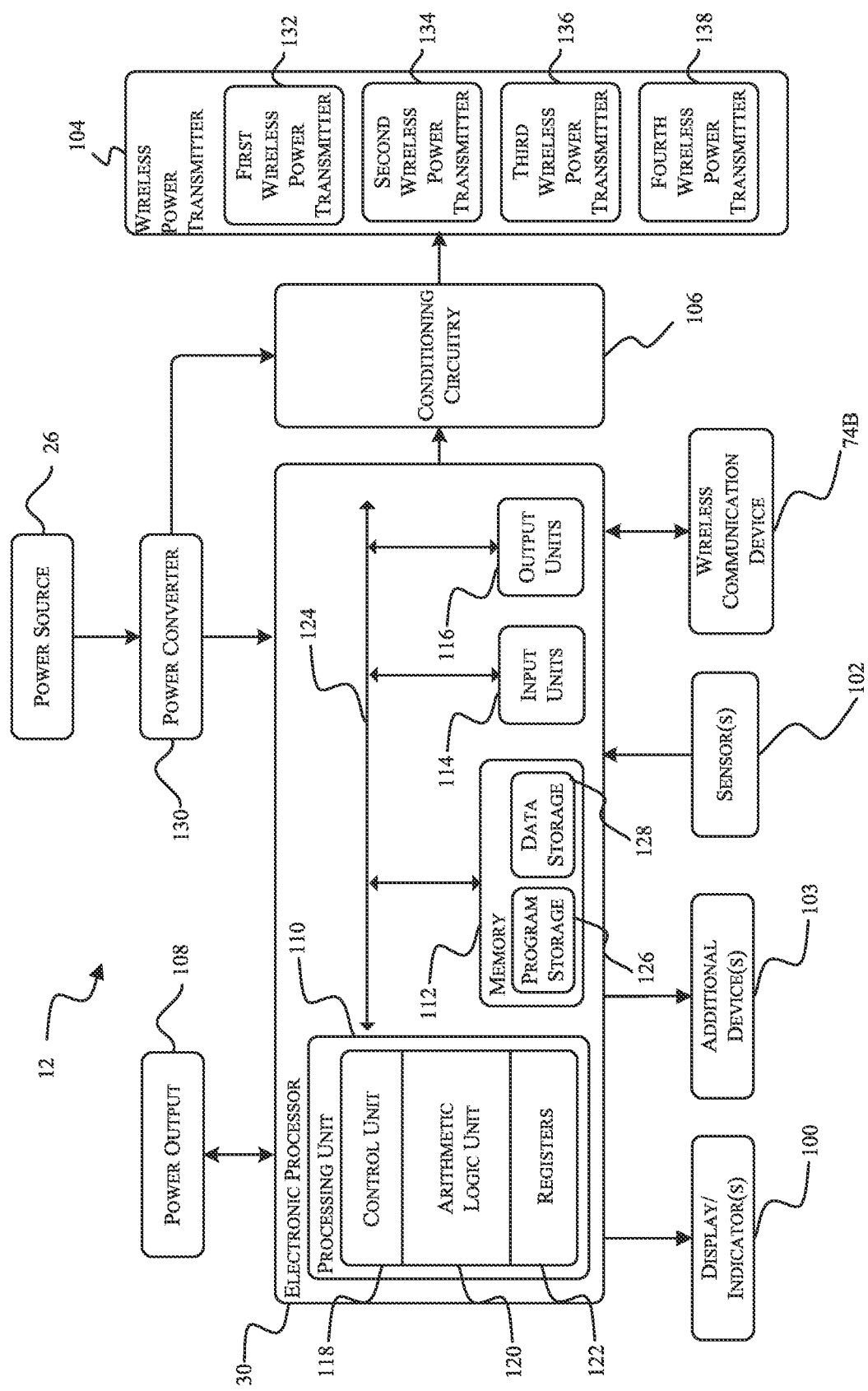
FIGS. 6A-6C illustrate block diagrams of the wireless charging device of FIG. 5 and components thereof according to one example embodiment.

As indicated by the communication links 15 shown in FIG. 2, the wireless charging device 12 may be configured to directly communicate with each of the battery packs 13 via a wired connection (e.g., through connected terminals of the battery pack 13 and the wireless charging device 12) and/or wireless connection (e.g., through a respective wireless communication device 74 of the battery pack 13 and the wireless charging device 12 as shown in FIGS. 4A and 6A). As indicated by FIG. 2, when the communication link 15 is wireless, the communication link 15 may be different than a wireless power transfer link 17 between the wireless charging device 12 and the battery packs 13. However, in some embodiments, the wireless power transfer link 17 may also be used to communicate additional information between the wireless charging device 12 and the battery pack 13.

Figure 3C:
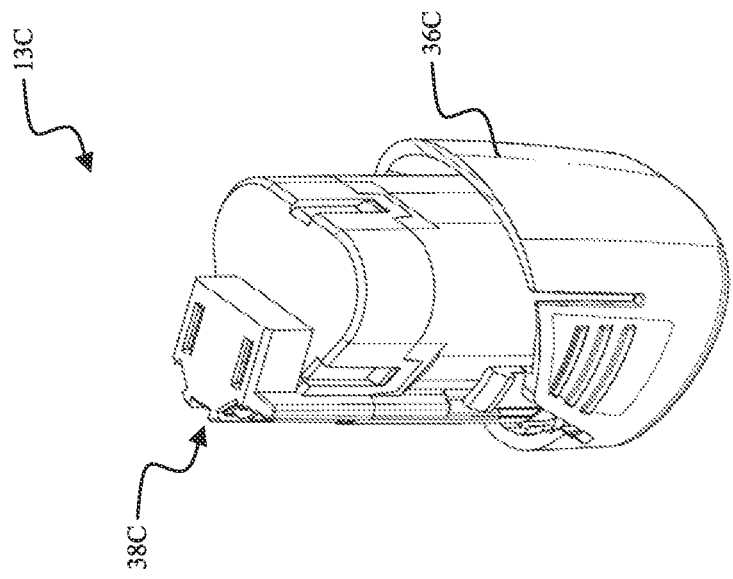
FIG. 3C illustrates yet another battery pack of the communication system shown in FIG. 1 according to one example embodiment.
Figure 3A:
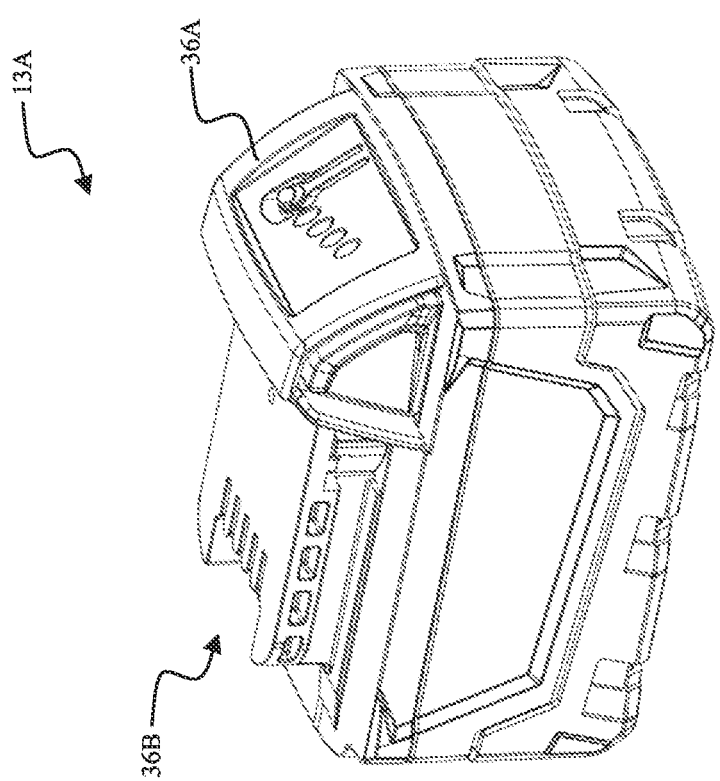
FIG. 3A illustrates a battery pack of the communication system shown in FIG. 1 according to one example embodiment.

FIG. 3A illustrates the battery pack 13A of the communication system 10 shown in FIG. 1. The battery pack 13A includes a housing 36A and an interface portion 38A for connecting the battery pack 13A to a device (e.g., a hand-held power tool, a stand-alone light, etc.).

Figure 3B:
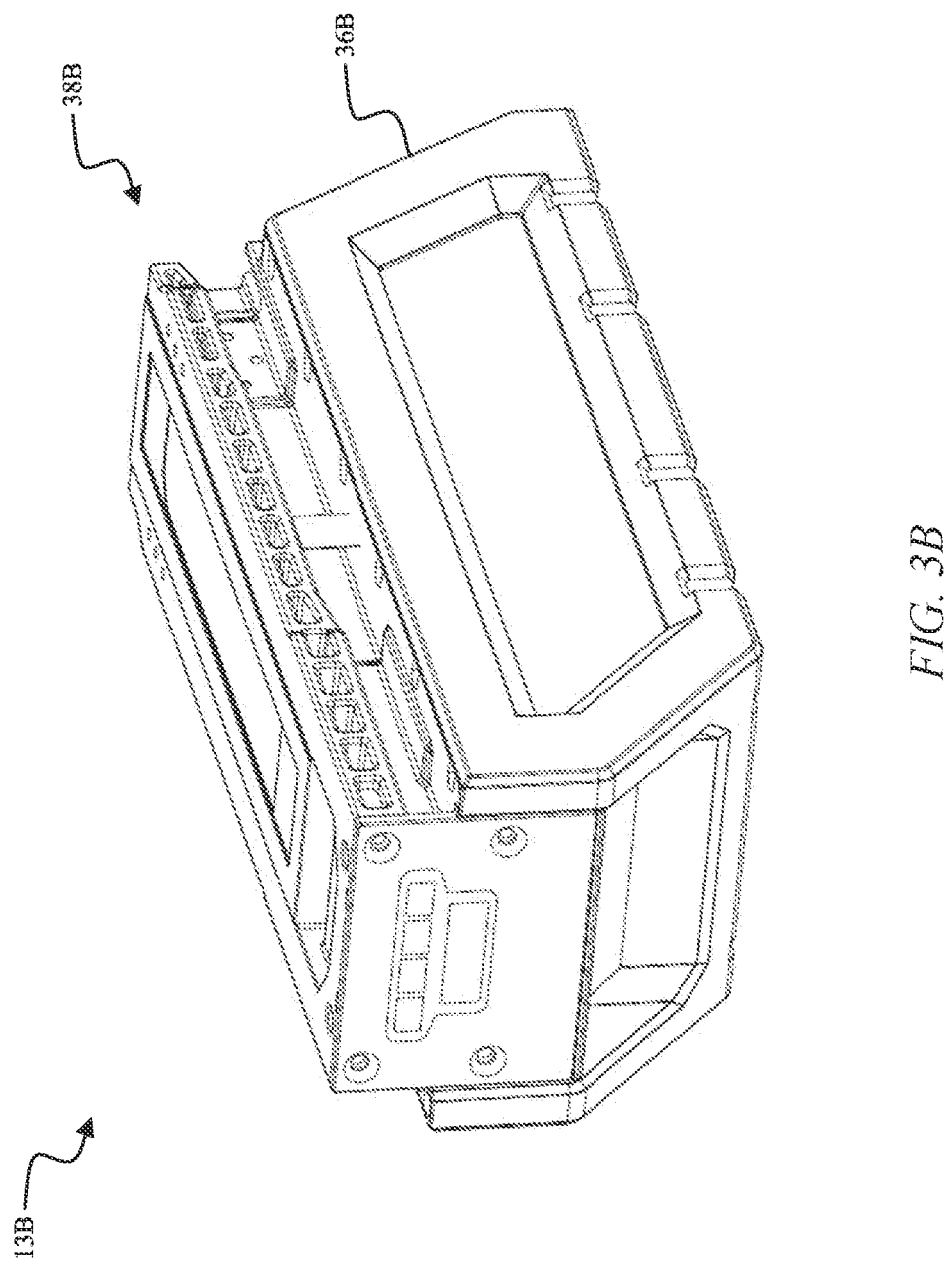
FIG. 3B illustrates another battery pack of the communication system shown in FIG. 1 according to one example embodiment.

FIG. 3B illustrates the battery pack 13B of the communication system 10 shown in FIG. 1. The battery pack 13B includes a housing 36B and an interface portion 38B for connecting the battery pack 13B to a device (e.g., a large, high current power tool, such as a concrete saw, a breaker hammer, etc.).

FIG. 3C illustrates the battery pack 13C of the communication system 10 shown in FIG. 1. The battery pack 13C includes a housing 36C and an interface portion 38C for connecting the battery pack 13C to a device (e.g., a hand-held power tool, a heated jacket, etc.).

FIG. 4A illustrates a block diagram of the battery pack 13 according to one example embodiment. The battery pack 13 may include the wireless power receiver 34 shown in FIG. 2. The wireless power receiver 34 may be configured for any one or a combination of different wireless power transfer techniques (e.g., capacitive power transfer, inductive power transfer, radio frequency (RF) power transfer, magnetic resonance power transfer, etc.). For example, the wireless power receiver 34 may include one or more conductive plates configured to align with one or more conductive plates of the wireless charging device 12 to allow for capacitive power transfer via an electric field. As another example, the wireless power receiver 34 may include a receiving coil configured to align with a transmitting coil of the wireless charging device 12 to allow for inductive and/or magnetic resonance power transfer via a magnetic field. As another example of wireless power transfer, the wireless power receiver 34 may include a receiving antenna configured to allow for RF power transfer from a transmitting antenna of the wireless charging device 12 to the battery pack 13.

The battery pack 13 further includes a controller 42 (i.e., an electronic processor 42). The electronic processor 42 is electrically and/or communicatively connected to a variety of components of the battery pack 13. For example, the illustrated electronic processor 42 is connected to one or more battery cells 32 and an interface 38 (e.g., the interface portions 38A-38C of the battery packs 13A-13C illustrated in FIGS. 3A-3C). The electronic processor 42 is also connected to one or more voltage sensors or voltage sensing circuits 44, one or more current sensors or current sensing circuits 46, and one or more temperature sensors or temperature sensing circuits 48. The electronic processor 42 includes combinations of hardware and software that are operable to, among other things, control the operation of the battery pack 13, monitor a condition of the battery pack 13, enable or disable charging of the battery pack 13, enable or disable discharging of the battery pack 13, etc.

The electronic processor 42 includes a plurality of electrical and electronic components that provide power, operational control, and protection to the components within the electronic processor 42 and/or the battery pack 13. For example, the electronic processor 42 includes, among other things, a processing unit 50 (e.g., a microprocessor, a microcontroller, or another suitable programmable device), a memory 52, input units 54, and output units 56. The processing unit 50 includes, among other things, a control unit 58, an arithmetic logic unit ("ALU") 60, and a plurality of registers 62 (shown as a group of registers in FIG. 4A), and is implemented using a known computer architecture (e.g., a modified Harvard architecture, a von Neumann architecture, etc.). The processing unit 50, the memory 54, the input units 54, and the output units 56, as well as the various modules or circuits connected to the electronic processor 42 are connected by one or more control and/or data buses (e.g., common bus 64). The control and/or data buses are shown generally in FIG. 4A for illustrative purposes. The use of one or more control and/or data buses for the interconnection between and communication among the various modules, circuits, and components would be known to a person skilled in the art in view of the embodiments described herein.

The memory 52 is a non-transitory computer readable medium and includes, for example, a program storage area 66 and a data storage area 68. The program storage area 66 and the data storage area 68 can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 50 is connected to the memory 52 and executes software instructions that are capable of being stored in a RAM of the memory 52 (e.g., during execution), a ROM of the memory 52 (e.g., on a generally permanent basis), or another non-transitory computer readable medium such as another memory or a disc. Software included in the implementation of the battery pack 13 can be stored in the memory 52 of the electronic processor 42. The software includes, for example, firmware, one or more applications, program data, filters, rules, one or more program modules, and other executable instructions. The electronic processor 42 is configured to retrieve from the memory 52 and execute, among other things, instructions related to the control processes and methods described herein. In other constructions, the electronic processor 42 includes additional, fewer, or different components.

The interface 38 includes a combination of mechanical components (e.g., rails, grooves, latches, etc.) and electrical components (e.g., one or more terminals) configured to and operable for interfacing (e.g., mechanically, electrically, and communicatively connecting) the battery pack 13 with another device (e.g., a power tool, a battery pack charger, a stand-alone lighting device, etc.). The interface 38 is also configured to communicatively connect to the electronic processor 42 via a communications line 70.

A power converter and conditioning circuitry 40 is provided between the wireless power receiver 34 and the interface 38. The charging power received through the wireless power receiver 34 is provided to the battery cells 32 through the power converter and conditioning circuitry 40 and the interface 38. The power converter and conditioning circuitry can be implemented similar to the power converter 130 and the conditioning circuitry 106 described below with respect to the wireless charging device 12. The power converter and conditioning circuitry 40 is communicatively coupled to the electronic processor 42. The electronic processor 42 controls the power converter and conditioning circuitry 40 to convert the received power from one form or one level to another form or another level and to condition the power suitable for charging the battery cells 32.

The electronic processor 42 is configured to determine whether a fault condition of the battery pack 13 is present and generate one or more control signals related to the fault condition. For example, the electronic processor 42 is configured to detect an overvoltage condition of the one or more battery cells 32, an under voltage condition of the one or more battery cells 32, an over current condition (e.g., during charging or discharging), or an over temperature condition (e.g., during charging or discharging). In some embodiments, the over current condition corresponds to a particular current (a current threshold) that is sensed for a particular amount of time (a time threshold). In some embodiments, an over current condition is detected when a current of between approximately 3 Amperes and 20 Amperes is detected for a predetermined amount of time (e.g., between 100 nano-seconds and 50 milli-seconds, or between 100 milli-seconds and 2 seconds). The amount of time and the detected current can be varied for different applications. In some embodiments, a current of between 3 Amperes and 20 A Amperes can be detected for up to 50 milli-seconds before a fault condition occurs. In other embodiments, a current of between 3 Amperes and 20 A Amperes can be detected for between 50 milli-seconds and several minutes (e.g., between 1 minute and 20 minutes) before a fault condition occurs. In some embodiments, a current of greater than 20 Amperes can be detected for between 50 milli-seconds and several minutes (e.g., between 1 minute and 20 minutes) before a fault condition occurs. In some embodiments, a current of approximately 30 Amperes can be detected for approximately 50 milli-seconds before a fault condition occurs. In some embodiments, a current of approximately 70 Amperes can be detected for approximately 100 nano-seconds before a fault condition occurs. In some embodiments, the time and current thresholds that are used vary depending on the battery pack. For example, the current thresholds for the battery pack 13C may be less than the current threshold used for the battery pack 13B, and the time thresholds for the battery pack 13C may be shorter than the time thresholds for the battery pack 13B.

As shown in in FIG. 4A, the battery pack 13 may also include a display/indicator(s) 72. The display/indicator(s) 72 are coupled to the electronic processor 42 and receive control signals from the electronic processor 42 to turn on and off or otherwise convey information based on different states of the battery pack 13. The display/indicator(s) 72 include, for example, one or more light-emitting diodes ("LEDs"), or a display screen such as a liquid crystal display (LCD) screen or an LED screen. The display screen may include a touch screen. The display/indicator(s) 72 can be configured to display conditions of, or information associated with, the battery pack 13 and/or charging of the battery pack 13. For example, the display/indicator(s) 72 can be configured to indicate a nominal voltage of the battery pack 13, a charging current being received by the battery pack 13, a state of charge of the battery pack, an age of the battery pack 13, a number of times that the battery pack 13 has been discharged, and/or other electrical and/or usage characteristics of the battery pack 13. The display/indicator(s) 72 may also include additional elements to convey information to a user through audible or tactile outputs (e.g., a speaker). The display/indicator(s) 72 may also be referred to as an output device configured to provide an output to a user.

As shown in FIG. 4A, the battery pack 13 may also include a wireless communication device 74A. In some embodiments, the wireless communication device 74A is separate from the wireless power receiver 34 and allows the battery pack 13 to communicate wirelessly with other devices such as the wireless charging device 12, the external device 14, etc. using a different wireless protocol than that used to wirelessly transfer power from the wireless charging device 12 to the wireless power receiver 34 of the battery pack 13. In other embodiments, some or all of the wireless communication explained below with respect to the wireless communication device 74A may be performed using the wireless power receiver 34 of the battery pack 13.

The wireless communication device 74A is coupled to the electronic processor 42 to allow the electronic processor 42 to bidirectionally communicate with other devices (e.g., the wireless charging device 12, the external device 14, another battery pack 13, etc.) via the wireless communication device 74A. In some embodiments, the wireless communication device 74A is coupled to the electronic processor 42 via one or more wires (and/or a ribbon cable). In other embodiments, the components and functionality of the wireless communication device 74A may be integrated into the electronic processor 42.

Figure 4B:
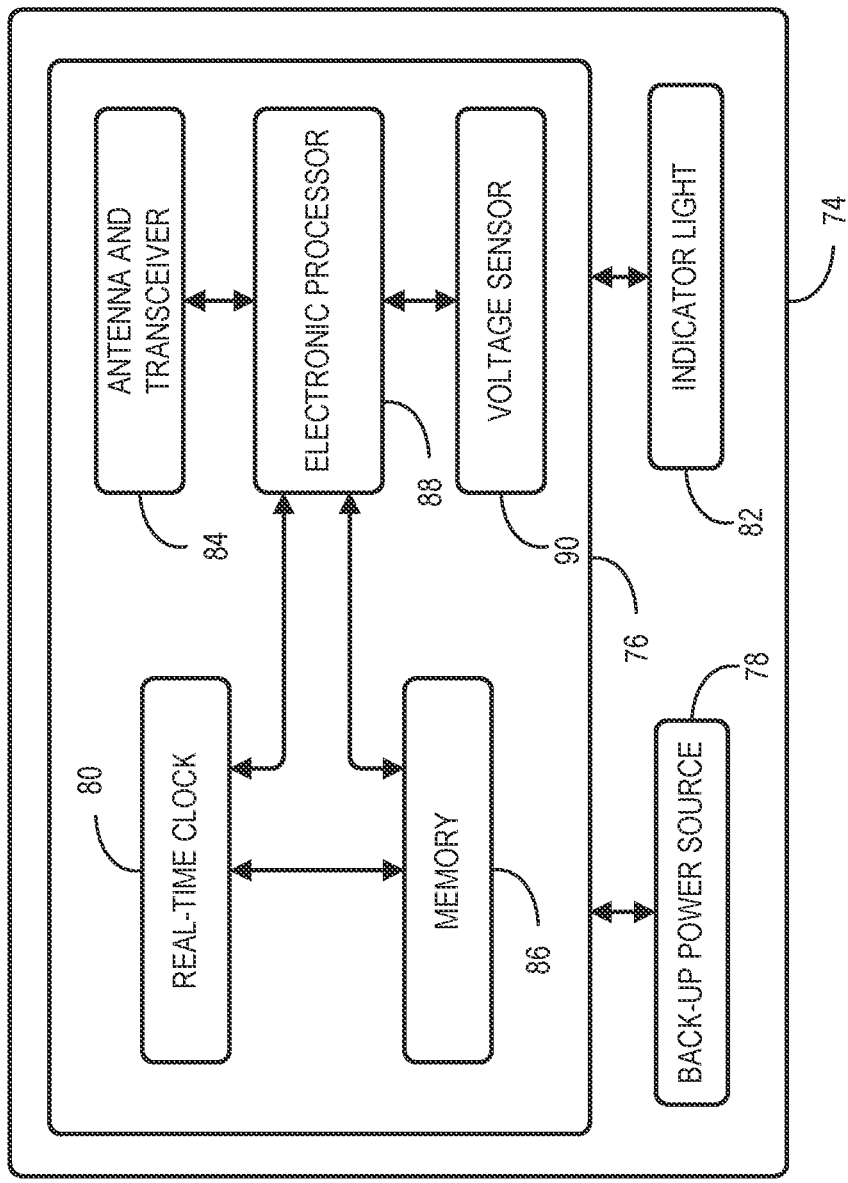
FIG. 4B illustrates a block diagram of a wireless communication device of the battery pack of FIG. 4A according to one example embodiment.

FIG. 4B illustrates a block diagram of the wireless communication device 74 according to one example embodiment. The block diagram of FIG. 4B may represent different wireless communication devices 74A and 74B (see FIG. 6A) that may be generally referred to as wireless communication devices 74. However, different wireless communication devices 74A and 74B may not be identical and may include different components than one another in some embodiments.

The wireless communication device 74 enables the electronic processor 42 of the battery pack 13 to communicate with other devices to transmit battery pack data (e.g., battery pack usage data, configuration data, maintenance data, and the like) and to receive battery pack configuration data (e.g., settings for operating the battery pack such as wireless charging settings, maximum current values, and the like) and commands to control battery pack components (e.g., turn on an indicator 72, lock/disable and unlock/enable operation and/or charging of the battery pack 13, and the like). The wireless communication device 74 also enables the electronic processor 42 of the battery pack 13 to communicate with the wireless charging device 12 to receive commands from the wireless charging device 12 as explained in greater detail herein. As shown in FIG. 4B, the wireless communication device 74 includes a wireless communication controller 76, a backup power source 78 (e.g., a coin cell battery, another type of battery cell, a capacitor, or another energy storage device), and a real-time clock (RTC) 80. In some embodiments, the RTC 80 is part of the wireless communication controller 76 as shown in FIG. 4B. In other embodiments, however, the RTC 80 is part of the battery pack 13 and is permanently connected to the electronic processor 42. In some embodiments, the wireless communication device 74 also includes an indicator light 82 (e.g., an LED that is viewable by a user).

The wireless communication controller 74 includes an antenna and radio transceiver 84, a memory 86, an electronic processor 88, and the RTC 80. The antenna and radio transceiver 84 (i.e., a wireless transceiver) operate together to send and receive wireless messages to and from other devices (e.g., the wireless charging device 12, the external device, etc.) and the electronic processor 88. The memory 86 can store instructions to be implemented by the electronic processor 88 and/or may store data related to communications between the battery pack 13 and other devices. The electronic processor 88 for the wireless communication controller 76 controls wireless communications between the battery pack 13 and other devices. For example, the electronic processor 88 associated with the wireless communication controller 76 buffers incoming and/or outgoing data, communicates with the electronic processor 42 of the battery pack 13, and determines the communication protocol and/or settings to use in wireless communications. In other words, the wireless communication controller 76 is configured to receive data from the battery pack electronic processor 42 and relay the information to other devices (e.g., the wireless charging device 12, the external device, etc.) via the antenna and transceiver 84. In a similar manner, the wireless communication controller 76 is configured to receive information (e.g., charging configuration and programming information and/or commands) from other devices via the antenna and transceiver 84 and relay the information to the battery pack electronic processor 42. In some embodiments, the memory 86 of the wireless communication controller 76 may store identification information and credential information of the battery pack 13 that allows other devices to establish a communication link with the battery pack 13.

In the illustrated embodiment, the wireless communication controller 76 is a Bluetooth® controller. The Bluetooth® controller communicates with the other devices (e.g., the wireless charging device 12, the external device 14, etc.) employing the Bluetooth® protocol. Therefore, in the illustrated embodiment, the battery pack 13 and the other devices with which the battery pack 13 communicates are within a communication range (i.e., in proximity) of each other while they exchange data. In other embodiments, the wireless communication controller 76 communicates using other protocols (e.g., Wi-Fi, cellular protocols, etc.) over a different type of wireless network. For example, the wireless communication controller 76 may be configured to communicate via Wi-Fi through a wide area network such as the Internet or a local area network, or to communicate through a piconet (e.g., using infrared or NFC communications). As another example, the wireless communication controller 76 may be configured to communicate over a cellular network. The communication via the wireless communication controller 76 may be encrypted to protect the data exchanged between the battery pack 13 and other devices from third parties. In some embodiments, the wireless communication controller 76 includes a multi-band/multi-protocol antenna. In other words, a single antenna may be used for multiple transceivers that use different communication protocols (e.g., Bluetooth®, Wi-Fi, GPS, cellular, etc.). In such embodiments, each transceiver may selectively connect to the antenna via a respective switch, power divider, or frequency dependent impedance network.

In some embodiments, the wireless communication controller 76 allows the battery pack 13 to be locked out in response to user selection on the external device 14. In other words, the external device 14 may send a command to the battery pack 13 via the wireless communication controller 76 to prevent the battery pack 14 from providing power to an attached device such as a power tool and/or prevent the battery pack 13 from receiving charging current from a charger such as the wireless charging device 12. Such a command may control the battery pack 13 to immediately lock out or to lock out at a future time. In some embodiments, the wireless communication device 76 may lock out (i.e., disable) the battery pack 13 by preventing communications between the battery pack 13 and the attached device or charger or by sending a lock command to the electronic processor 42 instructing the electronic processor 42 to refrain from providing power to an attached device and/or to refrain from receiving charging current from a charger.

The RTC 80 increments and keeps time independently of the other battery pack components. In the illustrated embodiment, the RTC 80 is powered through the wireless communication controller 76 when the wireless communication controller 76 is powered. In some embodiments, however, the RTC 80 is a separate component from the wireless communication controller 76 and may be integrated into the battery pack 13. In such embodiments, the RTC 80 may receive power from the battery cells 32. The RTC 80 may additionally or alternatively receive power from the backup power source 78 (e.g., a coin cell battery, another type of battery cell, a capacitor, or another energy storage device). Therefore, the RTC 80 keeps track of time regardless of the state of charge of the battery cells 32. When no power source is present (i.e., the battery cells 32 are depleted and the back-up power source 78 is removed or depleted), the RTC 80 stores the last valid time. When a power source is replaced (i.e., the battery cells 32 are charged and/or the backup power source 78 is replaced or recharged), the RTC 80 uses the stored time as a starting point to resume keeping time.

The starting time for the RTC 80 is set to current Greenwich Mean Time (GMT) at the factory at time of manufacture. The time is updated or synchronized whenever the wireless communication controller 76 communicates with the external device 14. Because GMT time is independent of calendar, seasons, or time schemas, using GMT time allows the battery pack 13 or the external device 108 to convert from time indicated by the RTC 80 to localized time for display to the user.

As mentioned above, the backup power source 78 also provides power to the RTC 80 to enable continuous tracking of time. In some embodiments, the backup power source 252 generally only powers the wireless communication controller 76, the indicator light 82, and the RTC 80. In other embodiments, the backup power source 78 also provides power to low-power elements such as, for example, the display/indicator(s) 72 and the like. In some embodiments, the backup power source 78 also provides power to the battery pack electronic processor 42 to allow the battery pack electronic processor 42 to communicate with other devices when the battery cells 32 are depleted. In some embodiments, the wireless communication controller 76 includes a voltage sensor 90 (see FIG. 4B) coupled to the backup power source 78. The wireless communication controller 76 uses the voltage sensor 90 to determine the state of charge of the backup power source 78. The wireless communication controller 76 may include the state of charge of the backup power source 78 in an identification message that is periodically broadcasted to other devices from the battery pack 13. Upon receipt of the identification signal from the battery pack 13 by the external device 14, the user can then be alerted by the external device 14 when the state of charge of the backup power source 78 is low.

In the illustrated embodiment, the backup power source 78 includes a coin cell battery. The coin cell battery is merely an example power source. In some embodiments, the backup power source 78 may be another type of battery cell, a capacitor, or another energy storage device. The coin cell battery provides sufficient power to allow the wireless communication controller 76 to broadcast at least minimal identification information. In the illustrated embodiment, the coin cell battery can run for several years by allowing the battery pack 13 to only "broadcast" or "advertise" once every few seconds when operating the advertisement state. However, as noted above, in some embodiments, the backup power source 78 provides power to the battery pack electronic processor 42 to allow the battery pack electronic processor 42 to communicate with other devices when the battery cells 32 are depleted.

In some embodiments, the coin cell battery is a primary (i.e., non-rechargeable) backup battery. In other embodiments, the backup power source 78 includes a secondary (rechargeable) backup battery cell or a capacitor. In such embodiments, the battery cells 32 may provide charging power to recharge the secondary backup battery cell or the capacitor. For example, the battery pack 13 may include charging circuitry to charge the backup power source 78. The rechargeable cell and capacitor may be sized to provide power for several days or weeks before needing to recharge.

In some embodiments, the wireless communication device 74 includes more or fewer components than those shown in FIG. 4B. For example, the wireless communication device 74 may include an accelerometer, a gyroscope, and/or a Global Navigation Satellite System (GNSS) receiver. In some embodiments, the wireless communication device 74 is located within the housing 36 of the battery pack 13 and is installed within the housing 36 of the battery pack 13 at the time of manufacturing. In other embodiments, the wireless communication device 74 is configured to be optionally secured to an outside of the housing 36 of the battery pack 13 by an end user after manufacturing and purchase of the battery pack 13. For example, the wireless communication device 74 may be a radio frequency identification (RFID) tag. In this example, the RFID tag may be configured to wirelessly communicate with the battery pack electronic processor 42 or may not be configured to communicate with the battery pack electronic processor 42. In some embodiments, the RFID tag may be located inside the battery pack 13 (e.g., installed during manufacturing of the battery pack 13) or may be located on an outside of the housing 36 of the battery pack 13. As another example of the wireless communication device 74 including additional components, in some embodiments, the wireless communication device 74 includes a positioning device (e.g., a global positioning system (GPS) receiver) that allows the location of the device in which the GPS receiver is located to be tracked.

In some embodiments, the battery pack 13 includes more or fewer components than those shown in FIG. 4A. For example, the battery pack 13 may include a fan that may be controlled by the electronic processor 42 to increase air flow to attempt to cool the battery cells 32 in response to the electronic processor 42 detecting a temperature of the battery cells 32 above a temperature threshold. The fan may be operated at multiple speed settings. The electronic processor 42 may select a speed setting corresponding to the temperature of the battery cells 32. In some embodiments, the speed of the fan may be based on the type or manufacturer of the battery pack 32 and/or the type of wireless charging being used. In some embodiments, the battery pack 13 may deactivate charging in response to the electronic processor 42 detecting a temperature of the battery cells 32 above a high-temperature threshold or below a low-temperature threshold. A charge FET provided in the current path between the wireless power receiver 34 and the battery cells 32 may be controlled by the electronic processor 42 to prevent charging of the battery cells. In some embodiments, the battery pack 13 is configured to be wirelessly charged while the battery pack 13 is coupled to a power tool or load device. For example, a discharge FET provided in the current path between the battery pack 13 and a power tool or load device may be opened to prevent current flow while the charge FET is closed to allow the wireless power receiver 34 to provide power to the battery cells 32 that is wirelessly received from the wireless charging circuitry (e.g., wireless power transmitter) included in the charging station 28 of the wireless charging device 12. In other words, instead of placing the battery pack 13 by itself in/on the wireless charging device 12, a power tool or load device coupled to the battery pack 13 may be placed in/on the wireless charging station 12 and the battery pack 13 may still be wirelessly charged when coupled to the power tool or load device (via the wireless power receiver(s) 34 of the battery pack 13). As an example, when a battery pack 13 (e.g., a four Volt battery pack) coupled to a load device, such as an electronic level, a head lamp lighting device, heated gloves, or the like, is to be recharged, the entire load device including the battery pack 13 (e.g., with the battery pack 13 included within the load device) may be placed in/on the wireless charging device 12 for wireless charging of the battery pack 13. As a further example, the entire load device including the battery pack 13 may be placed on a charging pad or in a dock (e.g., a contour of a charging stations 28A-28D) of the wireless charging device 12. In some embodiments, the power tool or load device to which the battery pack 13 is coupled may include a wireless power receiver 34 to receive wireless power from the wireless charging device 12 and provide charging current to the battery pack 13 via terminals/contacts connecting the battery pack 13 to the power tool or load device (e.g., see FIGS. 58-59 and corresponding explanation below).

Figure 5:
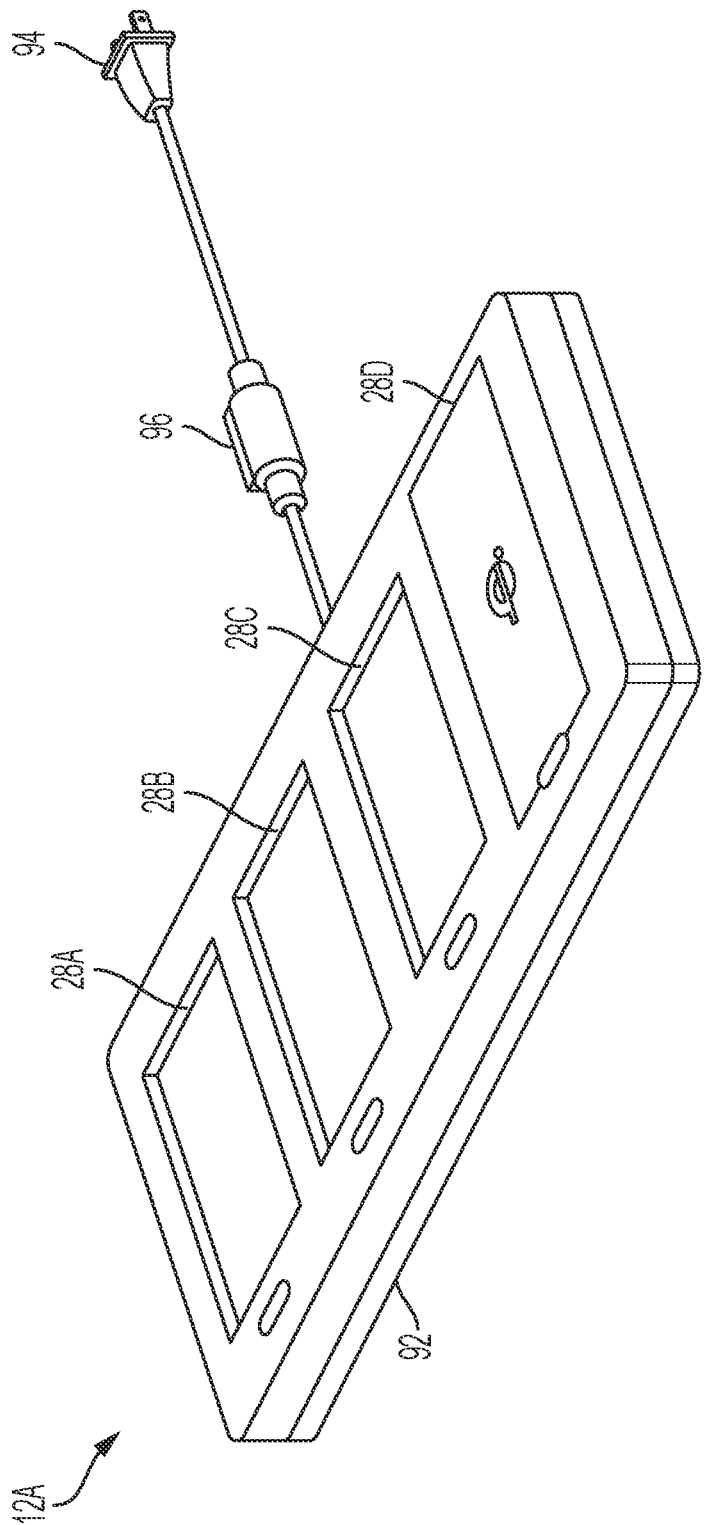
FIG. 5 illustrates a wireless charging device of the communication system of FIG. 1 according to one example embodiment.

FIG. 5 illustrates the wireless charging device 12A of the communication system 10 of FIG. 1 according to a first example embodiment. The wireless charging device 12A includes a charger housing 92, a plurality of charging stations 28A-28D, and an alternating current (AC) plug 94. The plurality of charging stations 28A-28D are each configured to receive a battery pack, such as the battery pack 13 (e.g., a power tool battery pack). In some embodiments, the wireless charging device 12A includes one or more contours. For example, the wireless charging device 12A illustrated in FIG. 5 includes three contours associated with charging stations 28A-28C. The charging station 28D may be configured to charge Qi-compatible devices, such as mobile phones, tablets, and the like. In other embodiments, the charging station 28D may include a similar contour as charging stations 28A-28C and may function in a similar manner as charging stations 28A-28C. The AC plug 120 is configured to receive AC power from a power source 26 (shown in FIG. 2). The power source 26 may be, for example, a single AC line voltage or a universal AC line voltage. The power source 26 may also be another type of power source, such as a solar panel, a wind turbine, a battery pack, an AC grid line, or the like. In some embodiments, the wireless charging device 12A further includes a ferrite bead 96 configured to filter noise from the power source 26. While FIG. 5 shows the wireless charging device 12A as including four charging stations 28A-28D, in other embodiments, the wireless charging device 12A may include fewer or additional charging stations 28.

In some embodiments, the wireless charging device 12 is integrated into a stationary or mobile toolbox, workbox, job box, storage unit, or the like (e.g., see wireless charging devices 12B-12F of FIG. 1). For example, the wireless charging device 12 may be integrated within a toolbox such that tool battery packs are wirelessly charged when placed within the toolbox. Additional details of the physical design of the wireless charging device 12 according to different embodiments are shown and explained below with respect to FIGS. 32-50. As noted previously herein, regardless of the physical design of the wireless charging device 12, each wireless charging device 12 may include at least some of the components shown and described with respect to FIGS. 6A-6C.

FIG. 6A illustrates a block diagram of the wireless charging device 12 according to one example embodiment. The wireless charging device 12 includes many similar components as the battery pack 13 shown in FIG. 4A. The wireless charging device 12 includes a charger controller 30 (i.e.,
electronic processor 30). The electronic processor 30 is electrically and/or communicatively connected to a variety of components of the wireless charging device 12. For example, the illustrated electronic processor 30 is connected to display/indicator(s) 100, one or more sensors 102, one or more additional devices 103, a wireless communication device 74B, a wireless power transmitter 104, the power source 26, conditioning circuitry 106, and a power output 108 (e.g., a 12V DC output, a USB power output, etc.).

The charger electronic processor 30 includes a plurality of electrical and electronic components that provide power, operational control, and protection to the components within the charger electronic processor 30 and/or the wireless charging device 12. For example, the electronic processor 30 includes, among other things, a processing unit 110 (e.g., a microprocessor, an electronic processor, an electronic controller, a microcontroller, or another suitable programmable device), a memory 112, input units 114, and output units 116. The processing unit 110 includes, among other things, a control unit 118, an arithmetic logic unit ("ALU") 120, and a plurality of registers 122 (shown as a group of registers in FIG. 6A), and is implemented using a known computer architecture (e.g., a modified Harvard architecture, a von Neumann architecture, etc.). The processing unit 110, the memory 112, the input units 114, and the output units 116, as well as the various components connected to the electronic processor 30 are connected by one or more control and/or data buses (e.g., common bus 124). The control and/or data buses are shown generally in FIG. 6A for illustrative purposes. The use of one or more control and/or data buses for the interconnection between and communication among the various components would be known to a person skilled in the art in view of the embodiments described herein.

The memory 112 may be similar to the memory 52 described previously herein with respect to the block diagram of the battery pack 13 shown in FIG. 4A and may include a program storage area 126 and a data storage area 128. The processing unit 110 is connected to the memory 112 and executes software instruction that are capable of being stored in a RAM of the memory 112 (e.g., during execution), a ROM of the memory 112 (e.g., on a generally permanent basis), or another non-transitory computer readable medium such as another memory or a disc. Software included in the implementation of the wireless charging device 12 can be stored in the memory 112 of the electronic processor 30. The software includes, for example, firmware, one or more applications, program data, filters, rules, one or more program modules, and other executable instructions. The electronic processor 30 is configured to retrieve from the memory 112 and execute, among other things, instructions related to the control processes and methods described herein. In other embodiments, the electronic processor 30 includes additional, fewer, or different components.

Power received from the power source 26 is converted into a specific type of power usable by the wireless charging device 12 via a power converter 130. For example, the power source 26 may be an AC power source and the power converter 130 may be a AC/DC converter that converts the AC power into DC power usable by a wireless power transmitter 104 embodied by an RF antenna. As another example, the power source 26 may be a DC power source and the power converter 130 may be a DC/DC converter such as a buck-boost converter that converts the received DC power into DC power usable by a wireless power transmitter 104 embodied by an RF antenna. As yet another example, the power source 26 may be a DC power source and the power converter 130 may be a DC/AC converter that converts the DC power into AC power usable by a wireless power transmitter 104 embodied by an inductive coil. In some embodiments, the power converter 130 may in any one or more of multiple types of power converters configured to convert received power from the power source 26 into a usable type of power for the electronic processor 30 and/or the wireless power transmitter 104.

The electronic processor 30 drives the wireless power transmitter 104 with power through the conditioning circuitry 106. In some embodiments, the conditioning circuitry 106 includes an impedance matching network and/or other circuitry to condition received power from the power converter 130 into a form usable by the wireless power transmitter 104. The impedance matching network can be used to control the impedance associated with the wireless power transmitter 104, and control DC power provided to the wireless power transmitter 104. For example, the impedance matching network may include a plurality of electrical components, such as resistors, inductors, and capacitors used to set an impedance. In some embodiments, the conditioning circuitry 106 and the AC/DC converter 130 are connected via a power amplifier.

The wireless power transmitter 104 may include a first wireless power transmitter 132, a second wireless power transmitter 134, a third wireless power transmitter 136, and a fourth wireless power transmitter 138. The first wireless power transmitter 132 may align with the charging station 28A, the second wireless power transmitter 134 may align with the charging station 28B, the third wireless power transmitter 136 may align with the charging station 28C, and the fourth wireless power transmitter 138 may align with the charging station 28D. Each wireless power transmitter 132, 134, 136, 138 may be independently controllable by the charger electronic processor 30 through the conditioning circuitry 106 (e.g., to ensure maximum wireless power transfer). For example, the electronic processor 30 may associate the first wireless power transmitter 132 with a first impedance, the second wireless power transmitter 134 with a second impedance, the third wireless power transmitter 136 with a third impedance, and the fourth wireless power transmitter 138 with a fourth impedance. In some embodiments, each wireless power transmitter 132, 134, 136, 138 has their own conditioning circuitry 106 that may include an impedance matching network, for example. As noted above with respect to the charging stations 28, in some embodiments, the wireless power transmitter 104 includes more or fewer wireless power transmitter 132, 134, 136, 138 than those shown in FIG. 6A.

The wireless power transmitter 104 may be configured for capacitive power transfer, inductive power transfer, radio frequency (RF) power transfer, magnetic resonance power transfer, etc. For example, the wireless power transmitter 104 may include one or more conductive plates configured to align with one or more conductive plates of the wireless power receiver 34 of a battery pack 13 for capacitive power transfer via an electric field. As another example, the wireless power transmitter 104 may include a transmitting coil configured to align with a receiving coil of the wireless power receiver 34 of the battery pack 13 to allow for inductive and/or magnetic resonance power transfer via a magnetic field. As another example of inductive power transfer, the wireless power transmitter 104 may include a receiving antenna configured to allow for RF power transfer to wireless power receiver 34 of the battery pack 13.

Additionally, different individual wireless power transmitters 132, 134, 136, 138 may each be configured for one or more types of wireless power transfer. For example, the first wireless power transmitter 132 may include a conductive plate configured for capacitive power transfer while the second wireless power transmitter 134 may include an inductive coil configured for inductive power transfer. As another example, the third wireless power transmitter 136 may include a conductive plate, an inductive coil, and an RF antenna in order to be configured for any one of capacitive power transfer, inductive power transfer, and RF power transfer, respectively. In some embodiments, one or more single charging stations 28 may each include a plurality of wireless power transmitters 132, 134, 136, 138 to allow the charging station 28 to be capable of wirelessly transferring power in different manners as explained above. The electronic processor 30 and the memory 112 may be programmed to store information regarding which types of wireless power transfer each wireless power transmitter 132, 134, 136, 138 and/or charging station 28 is capable of performing. In some embodiments, the different types of wireless charging capabilities provided by the wireless charging device 12 allow the wireless charging device 12 to charge different types of battery packs 13 such as battery packs manufactured by different manufacturers, as described in greater detail herein. Similarly, as described in further detail below, the wireless communication device 74 included in the devices 12, 13, 14, 176 may include different transceivers and/or antennas to allow the devices 12, 13, 14, 176 to communicate with different devices 12, 13, 14, 176 that may be manufactured by different manufacturers and may use different communication protocols.

In some embodiments, multiple wireless power transmitters 104 of the same or different type of wireless transfer technology may simultaneously charge two or more different battery packs 13 placed on the wireless charging device 12. In some embodiments, the wireless charging device 12 may include a simultaneous charging mode as described immediately above and a serial charging mode in which multiple battery packs 13 are charged in a serial manner one at a time. In some embodiments, multiple wireless power transmitters 104 of the same or different type of wireless transfer technology may simultaneously charge a single battery pack 13. In such embodiments, different wireless power transmitters 104 may be located on opposite sides of a charging station 28. For example, a conductive plate for capacitive charging may be located on one side of the charging station 28 while an inductive coil for inductive charging may be located on an opposite side of the charging station 28. The battery pack 13 may have wireless power receivers 34 located on corresponding opposite sides of the housing 36 to align with each of the wireless power transmitters 104.

When configured for capacitive power transfer, the wireless power transmitter 104 may be constructed as a first electrostatic plate that works with the wireless power receiver 34 of the battery pack 13, constructed as a second electrostatic plate, to form a pair of electrostatic plates that act as a capacitor. When provided with power and configured for capacitive power transfer, the wireless power transmitter 104 creates an electric field transmitted through the air medium between the wireless power transmitter 104 and the wireless power receiver 34. This electric field induces an alternating voltage on the wireless power receiver 34 (e.g., the second electrostatic plate). This alternating voltage causes an alternating current to flow in the wireless power receiver 34, which can be conditioned/converted by appropriate circuitry (included in the wireless power receiver 34 or otherwise included in the battery pack 13) in order to charge the battery cells 32. For example, the wireless power receiver 34 may convert the AC current induced by the wireless power transmitter 104 into DC current to charge the battery cells 32.

When configured for inductive power transfer, the wireless power transmitter 104 and the wireless power receiver 34 may each be constructed as a conductor wrapped into a coil shape or form (e.g., inductive coil). When provided with power and configured for inductive power transfer, the wireless power transmitter 104 is provided with an AC current that creates a cyclically changing magnetic field as the current cyclically changes (due to the cyclical nature of an AC signal). The changing magnetic field is transmitted through the air medium surrounding the wireless power transmitter 104. The wireless power receiver 34 of the battery pack 13 receives the changing magnetic field generated by the wireless power transmitter 104. The changing magnetic field generated by the wireless power transmitter 104 induces an AC signal in the wireless power receiver 34 of the battery pack 13, which may then be rectified to a DC signal that is used to charge the one or more battery cell(s) 32. In some embodiments, the inductive coil is formed by a coil trace on a printed circuit board (PCB), forming a PCB trace antenna. In some embodiments, the inductive coil or another wireless power transfer device 34, 104 includes a laser direct structuring (LDS) antenna that is built into the housing of the wireless charging device 12 and/or battery pack 13. For example, molding a wireless charging antenna into a plastic housing may save space inside the housing and decrease an air gap between the wireless power transfer devices 34, 104, which may increase wireless charging efficiency. However, the wireless power transmitter 104 may be any device or antenna capable of wireless power transfer when used in conjunction with the wireless power receiver 34.

In both of the above wireless charging embodiments, the conditioning circuitry 106 of the wireless charging device 12 may include an impedance matching network 106 that forms a complex impedance that may be characterized over a range of frequencies. The complex impedance may be represented in a vector form having both magnitude and angular displacement components. By varying the geometries of the wireless power transmitter structure or the components used within the impedance matching network 106, the characteristics of the complex impedance can be well defined. By then associating the characteristics of the complex impedance with a specific battery pack 13, the battery pack 13 under charge can be identified by the wireless charging device 12 prior to charging. The battery pack identification allows for the determination of ideal or customized charging parameters for the battery pack 13 (e.g., to maximize wireless power transfer). Additionally or alternatively, one or more battery packs 13 placed on the wireless charging device 12 may be identified using other techniques, such as (i) wireless communication between at least two of the battery pack 13, the wireless charging device 12, and the external device 14 using a wireless communication protocol separate from the wireless charging protocol (e.g., via wireless communication devices 74 of different devices), or (ii) recognition using one or more of the battery pack detection sensors 144 of FIG. 6B, as explained in further detail below.

While the power source 26 is described as an AC power source, in other embodiments, the power source 26 may additionally or alternatively include a built-in power source. For example, the built-in power source may include an internal battery. In other embodiments, the wireless charging device 12 may include a self-contained power generator such as a solar panel, a built-in generator that can be cranked by hand or by an electric motor (e.g., a motor of a power tool), and a built-in propane-powered generator. In some embodiments, the wireless charging device 12 includes an energy harvesting antenna (e.g., similar to the wireless power receiver 34 of the battery pack 13) that receives wireless power from the power source 26 (e.g., a separate device that has a wireless power transmitter similar to the wireless power transmitter 104 of the wireless charging device 12). For example, the separate device may include the charging pad 6205 of FIG. 62.

Figures 6B, 6C:
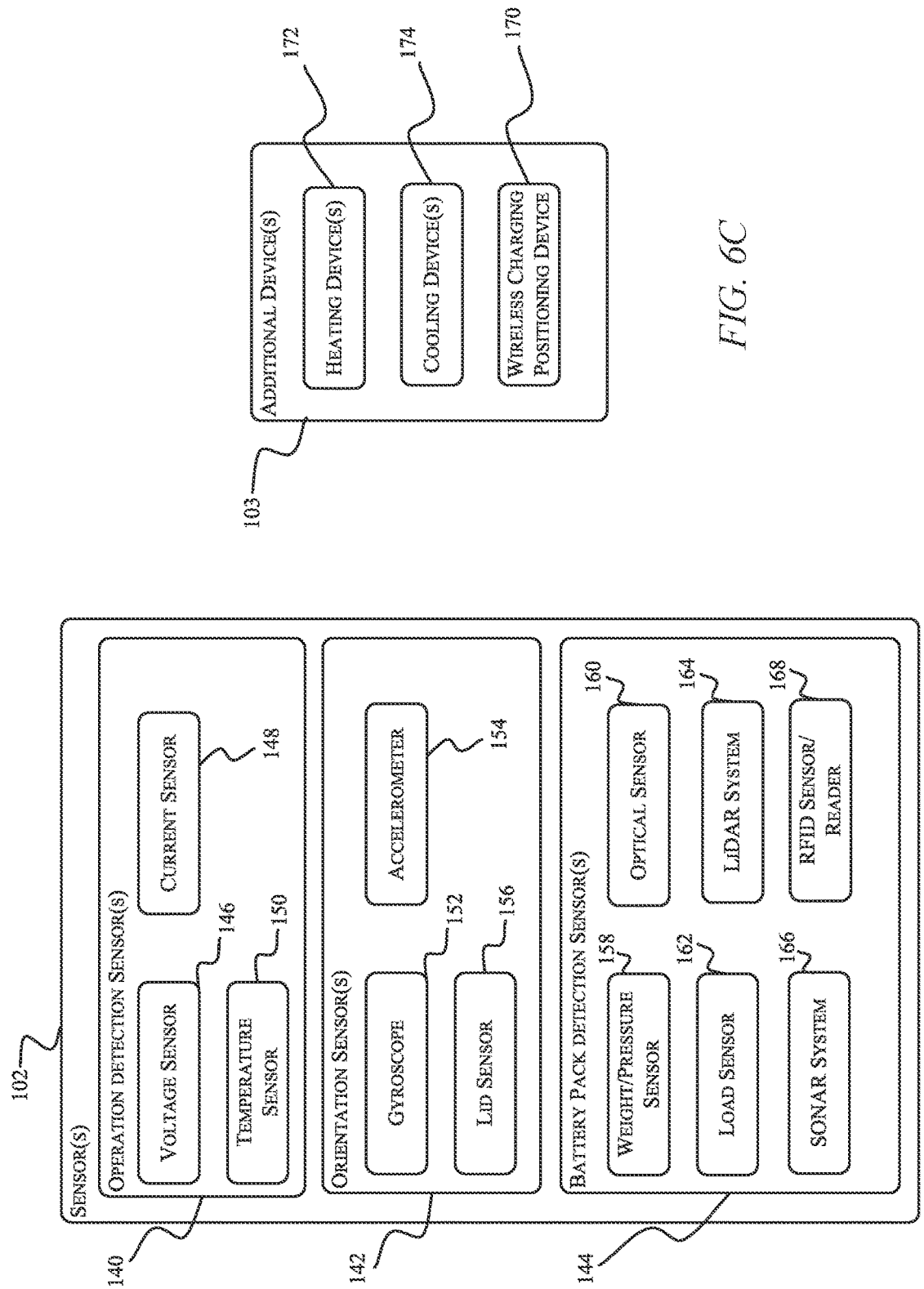

As shown in FIG. 6B, the one or more sensors 102 may include any one or a combination of operation detection sensor(s) 140, orientation sensor(s) 142, and battery pack detection sensor(s) 144. The one or more sensor(s) 102 transmit signals to the electronic processor 30 that are indicative of one or more characteristics of the wireless charging device 12 and/or the battery pack(s) 13 placed on the wireless charging device 12. In some embodiments, one or more of the sensors included in on category of sensors 140, 142, 144 may be used as sensors in another category of sensors 140, 142, 144. For example, a magnetometer included in the wireless charging device 12 may be used for determine an orientation of the wireless charging device 12 and/or may be used to detect the presence of a battery pack 13 in/on the wireless charging device 12. Similarly, other devices included in the wireless charging device 12 may be used as one or more of the sensors 140, 142, 144 in some embodiments. For example, short-range communication circuitry (e.g., near field communication circuitry) included in the wireless communication device 74B may be used to detect the presence of a battery pack 13 in/on the wireless charging device 12.

The operation detection sensor(s) 140 may include, for example, a voltage sensor 146, a current sensor 148, a temperature sensor 150, and/or the like. These sensors 146, 148, and 150 may be similar to the like-named sensing circuits 44, 46, and 48 described previously herein with respect to the battery pack 13. The voltage sensor 146 may transmit voltage signals to the electronic processor 30 indicative of a voltage provided by the AC/DC converter 130, a voltage provided by the wireless power transmitter 104, and/or a voltage provided by each of the first wireless power transmitter 132, the second wireless power transmitter 134, the third wireless power transmitter 136, and the fourth wireless power transmitter 138. The voltage signals may be used by the electronic processor 30 to determine overvoltage conditions within the wireless charging device 12. The current sensor 148 may transmit current signals to the electronic processor 30 indicative of a current provided to the wireless power transmitter 104, a current provided to the first wireless power transmitter 132, a current provided to the second wireless power transmitter 134, a current provided to the third wireless power transmitter 136, and/or a current provided to the fourth wireless power transmitter 138. The temperature sensor 150 may transmit temperature signals to the electronic processor 30 indicative of a temperature of the wireless charging device 12 and/or the battery pack(s) 13 placed on the wireless charging device 12.

As shown in FIG. 6B, the orientation sensor(s) 142 may include, for example, a gyroscope 152, accelerometer 154, magnetometer, and/or the like. The orientation sensor(s) 142 may be used to determine the orientation of the wireless charging device 12 and/or one or more of its components (e.g., a lid, see wireless charging device 12F in FIGS. 33-35). In embodiments where the wireless charging device 12 is integrated into a toolbox or other case with a lid, the wireless charging device 12 may include a lid sensor 156 coupled to the electronic processor 30 to allow the electronic processor 30 to determine a current state of the lid as well as when the lid is opened or closed. For example, the lid sensor 156 may include a Hall sensor or a reed switch that detects the presence or absence of a magnet installed on the lid and configured to be detected by the lid sensor 156 when the lid is closed. In some embodiments, the electronic processor 30 scans/senses an interior of an enclosure of wireless charging device 12 to detect battery packs 13 in response to receiving signal from the lid sensor 156 indicating that the lid of the enclosure has been opened and/or closed. In some embodiments, the wireless charging device 12 may be configured to periodically scan/sense for the presence of battery packs 13 on/in the wireless charging device 12 at predetermined time intervals.

Also as shown in FIG. 6B, the battery pack detection sensor(s) 144 may include, for example, a weight/pressure sensor 158, an optical sensor 160, a load sensor 162, and the like. The battery pack detection sensor(s) 144 transmit signals to the electronic processor 30 to allow the electronic processor 30 to determine whether one or more battery packs 13 are present on charging stations 28 and to determine a location and orientation of each battery pack 13 on each charging station 28. The weight/pressure sensor 158 may transmit weight/pressure signals to the electronic processor 30 indicative of a weight/pressure of one or more battery packs 13 that are respectively placed on each charging station 28. The optical sensor 160 may include a camera (e.g., an infrared camera, a visual spectrum camera, or the like) configured to transmit signals to the electronic processor 30 indicative of a visual appearance of one or more battery packs 13 that are respectively placed on each charging station 28. In some embodiments, the infrared camera may provide an indication of a heat source (e.g., a battery pack) that has been placed or in a wireless charging device 12. In some embodiments, the optical sensor 160 include a bar code scanner, a Quick Response (QR) code reader, or the like configured to read a bar code, a QR code, or the like included on the battery pack 13. Based on the reading of the bar code, QR code, or the like on the battery pack 13, the wireless charging device 12 may be configured to identify the battery pack 13 and/or related characteristics (e.g., charging parameters, nominal voltage, manufacturer, etc.). In some embodiments, the load sensor 162 includes a magnetic switch and/or the wireless power transmitter 104 to detect the presence of a battery pack 13 placed on a charging station. In some embodiments, the battery pack detection sensor(s) 144 additionally or alternatively include a light detection and ranging (LiDAR) system 164, a sound navigation ranging (SONAR) system 166, and a radio frequency identification (RFID) sensor/reader 168. In some embodiments, the RFID sensor/reader 166 may be included in the wireless communication device 74B as explained previously herein.

The sensors 102 shown in FIG. 6B are merely examples. The wireless charging device 12 may include any combination of the sensors 102 shown in FIG. 6B as well as additional sensors 102. For example, the wireless charging device 102 may include a positioning device (e.g., a global positioning system (GPS) receiver) to determine a location of the wireless charging device 12.

In some embodiments, the wireless charging device 12 may include multiple sensors of the same type. For example, the wireless charging device 12 may include multiple RFID sensors/readers to allow the electronic processor 30 to perform triangulation with respect to RFID signals received from a battery pack 13 on a charging station 28 to determine a location of the battery pack 13. For example, using a received signal strength indication (RSSI) of RFID signals received from the battery pack 13 by each of multiple RFID sensors/readers, the electronic processor 30 may be able to determine on which charging station 28 the battery pack 13 is located using triangulation techniques. Similar triangulation techniques may be used by a wireless charging device 12 that includes multiple wireless power transmitters 132, 134, 136, 138 in different positions within the wireless charging device 12. For example, in embodiments where the wireless charging device 12 is configured to communicate with the battery pack 13, the wireless charging device 12 may serially activate different wireless power transmitters 132, 134, 136, 138 and receive information from the battery pack 13 indicative of the RSSI during each activation to determine which wireless power transmitter 132, 134, 136, 138 to use in order to wirelessly charge the battery pack 13. The wireless charging device 12 may then use the wireless power transmitter 132, 134, 136, 138 that resulted in the RSSI for the battery pack 13 to wirelessly charge the battery pack 13.

The display/indicator(s) 100 may be referred to as output devices and are also connected to the electronic processor 30. The display/indicators 100 receive control signals from the electronic processor 30 to turn on and off or otherwise convey information based on different states of the wireless charging device 12. The indicators 245 include, for example, one or more light-emitting diodes (LEDs), or a display screen such as a liquid crystal display (LCD) screen or an LED screen. The display screen may include a touch screen. In some embodiments, the wireless charging device 12 may include a main display screen configured to display information about multiple charging stations 28. In some embodiments, the wireless charging device 12 may additionally or alternatively include multiple display screens and/or indicators that are each individually associated with a charging station 28.

The display/indicator(s) 100 can be configured to display conditions of, or information associated with, battery packs coupled to the wireless charging device 12, such as battery packs 13 illustrated in FIGS. 3A-3C. For example, the display/indicator(s) 100 can display information relating to the charging state of each battery pack 13, such as the charging or battery pack capacity, input power, output power, charge time, etc. The display/indicator(s) 100 may also display information relating to a fault condition, or other abnormality, of one or more charging stations 28 of the wireless charging device 12 or of the wireless charging device 12 in general. In addition to or in place of visual indicators, the display/indicator(s) may also include other output devices such as a speaker or a tactile feedback mechanism to convey information to a user through audible or tactile outputs.

Figure 32:
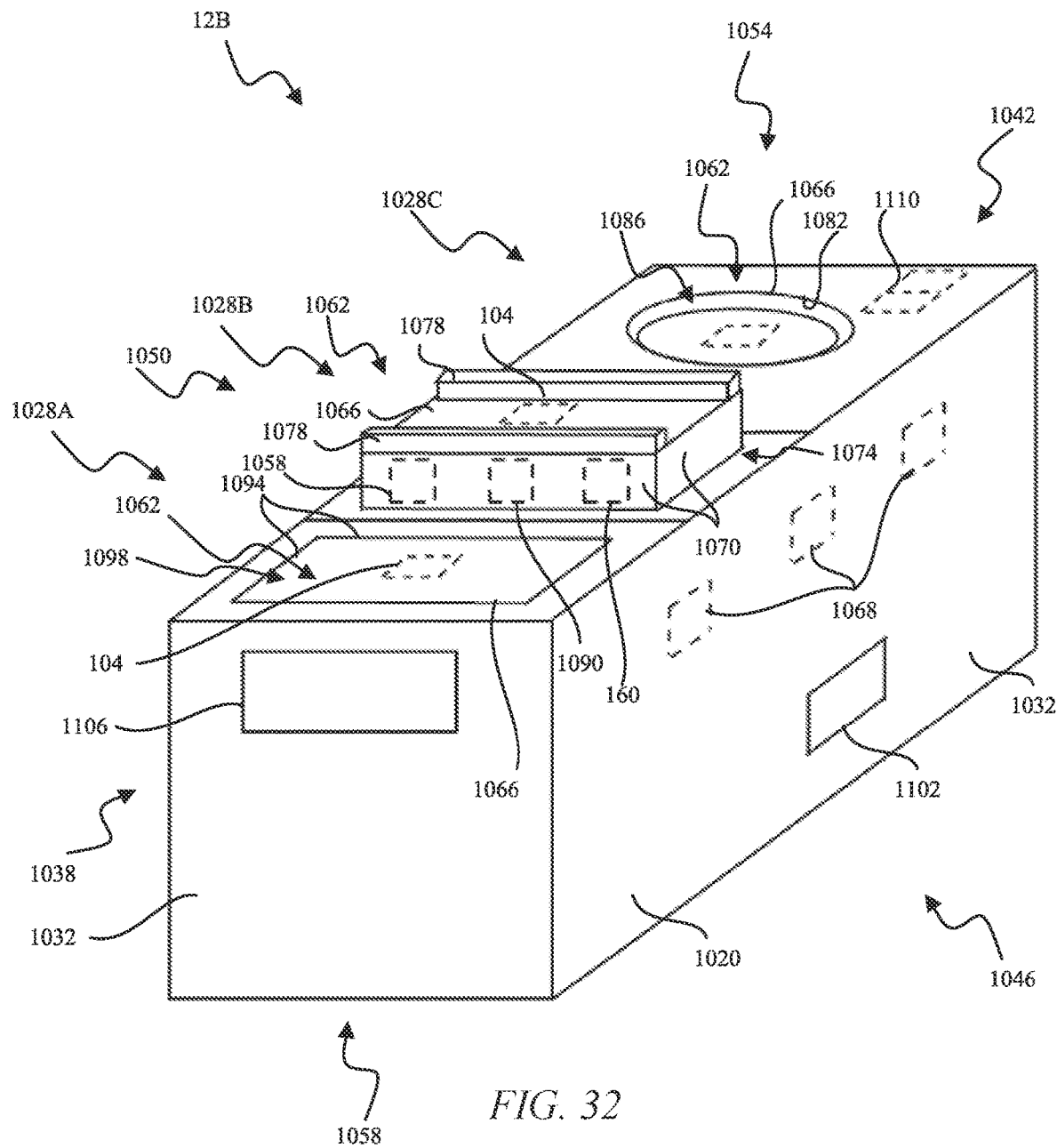
FIG. 32 is a perspective view of another wireless charging device of the communication system of FIG. 1 according to one example embodiment.

While FIG. 6A illustrates the wireless power transmitter 104 for wireless charging, the wireless charging device 12 may additionally or alternatively include an interface (e.g., rails and/or recesses as shown in FIG. 32) configured to mechanically engage a battery pack 13 to provide charging current to the battery pack 13. In some embodiments, such charging ports include a combination of mechanical components and electrical components configured to and operable for interfacing (e.g., mechanically, electrically, and communicatively connecting) a battery pack 13 with the wireless charging device 12. For example, the charging ports are configured to receive power from the power source 26 via power lines between the power source 26 and the charging ports. In some embodiments, the wireless charging device 12 includes multiple different charging ports to mechanically and electrically engage battery packs 13 of different types and of different manufacturers.

The charger electronic processor 30 may utilize the wireless communication device 74B to communicate with devices external to/separate from the wireless charging device 12, such as the battery pack 13 and/or the external device 14. For example, the battery pack 13 may transmit charging parameters to the charger electronic processor 30. As another example, the wireless charging device 12 may communicate with the battery pack 13 to determine an identification of the battery pack 13. The wireless charging device 12 may then communicate the identification of the battery pack 13 to the external device 14 to allow the external device 14 to retrieve charging parameters of the battery pack 13 from the server 16. The external device 14 may then communicate the charging parameters of the battery pack 13 to the wireless charging device 12 (e.g., a type of wireless charging supported by the battery pack 13, a maximum charging current of the battery pack 13, a state of charge of the battery pack 13, etc.). As another example, the wireless charging device 12 may transmit information regarding the charging status of each battery pack 13 coupled to the wireless charging device 12 to the external device 14.

As more specific examples of wireless communication between the wireless charging device 12 and other devices, the wireless charging device 12 can monitor, log, and/or communicate various charging parameters that can be used for confirmation of correct charging performance, detection of a malfunction of the charger, and determination of a need or desire for service. The various charging parameters detected, determined, and/or captured by the charger electronic processor 30 and output to the external device 14 can include input power provided to the wireless charging device 12, a charging time (e.g., time it takes the wireless charging device 12 to charge a battery pack 13), a number of battery pack(s) 13 received by the wireless charging device 12, a type of each battery pack 13 received by the wireless charging device 12, a charging capacity of each battery pack 13 received by the wireless charging device 12, a charging state of each battery pack 13 received by the wireless charging device 12, a total number of charging cycles performed by wireless charging device 12, a number of remaining service cycles (i.e., a number of charging cycles before the wireless charging device 12 should be serviced, repaired, or replaced), a number of transmissions sent to the external device 14, a number of transmissions received from the external device 14, a number of errors generated in the transmissions sent to the external device 14, a number of errors generated in the transmissions received from the external device 14, a code violation resulting in a master control unit (MCU) reset, a short in the power circuitry (e.g., a metal-oxide-semiconductor field-effect transistor [MOSFET] short), a hot thermal overload condition (i.e., a prolonged electric current exceeding a fullloaded threshold that can lead to excessive heating and deterioration of the winding insulation until an electrical fault occurs), a cold thermal overload (i.e., a cyclic or in-rush electric current exceeding a zero load threshold that can also lead to excessive heating and deterioration of the winding insulation until an electrical fault occurs), a nonmaskable interrupt (NMI) hardware MCU Reset (e.g., of the charger electronic processor 30), etc.

As indicated by the reference number 74B of the wireless communication device 74B included in the wireless charging device 12, the wireless communication device 74B may include any of the components described previously herein and/or may perform similar functionality as described previously herein with respect to the wireless communication device 74 of FIG. 4B.

As indicated in FIG. 6A, the wireless charging device 12 may include additional device(s) 103 that are coupled to and controlled by the electronic processor 30. For example, as shown in FIG. 6C, the additional device(s) 103 may include one or more wireless charging positioning devices 170 that are controlled by the electronic processor 30 to re-orient charging components (e.g., the wireless power transmitter 104) with respect to a battery pack 13 and/or to re-orient the battery pack 13 with respect to the charging components. The wireless charging positioning device(s) 170 may include one or more vibration motors (e.g., vibration motor 2100 in FIG. 35) configured to vibrate to re-orient a battery pack 13 until the battery pack 13 is positioned in a more suitable position for wireless charging (e.g., more directly aligning the wireless power transmitter 104 with the wireless power receiver 34). The wireless charging positioning device(s) 170 may additionally or alternatively include one or more motors that are individually coupled to the wireless power transmitters 132, 134, 136, and/or 138 to re-orient the wireless power transmitters 132, 134, 136, and/or 138 such that the wireless power transmitters 132, 134, 136, and/or 138 are positioned in a more suitable position for wireless charging of the battery pack 13. For example, the wireless charging positioning device 170 may include a gird that moves (e.g., changes elevation, slides, pivots, etc.) to attempt to force the battery pack 13 into a battery receptacle/charging station 28 of the wireless charging device 12. In some embodiments, the wireless charging positioning device(s) 170 is a passive device that is not coupled to or controlled by the electronic processor 30. For example, the wireless charging positioning device(s) 170 may be one or more magnets configured to impart magnetic forces to align the battery pack 13 on a charging station 28 using corresponding magnets or metal portions of the battery pack 13. In further embodiments, the battery pack 13 is supported upon a movable portion of an enclosure of the wireless charging device 12 relative to a stationary wireless power transmitter 104.

The wireless charging positioning device(s) 170 may additionally or alternatively be configured as a small adjustment mechanism to adjust a position of the battery pack 13 into a desired position. The wireless charging positioning device(s) 170 may include the one or more vibration motors configured to vibrate to re-orient a battery pack 13 into the desired position. In other embodiments, the wireless charging positioning device(s) 170 includes a profiled member (e.g., central V-shaped member) movable (e.g., lifting or lowering) relative to a battery pack 13 for adjusting the position of the battery pack 13 into the desired position. In yet further embodiments, the wireless charging positioning device(s) 170 includes an adjustment member (e.g., grid) movable (e.g., configured to change in elevation, slidable, pivotable) relative to one or more battery packs 13 for adjusting the one or more battery packs 13 into the desired position. The desired position may be defined as the position in which the battery pack 13 is completely mechanically engaged to the interface of the respective charging station (e.g., the battery pack 13 is seated within a battery receptacle).

Also as shown in FIG. 6C, the additional device(s) 103 included in the wireless charging device 12 may include a heating device(s) 172 and/or a cooling device(s) 174. The heating device(s) 172 may include one or more resistors, inductors, or other electrical component configured to generate heat to, for example, heat a cold battery pack 13 before charging the cold battery pack 13. The cooling device(s) 174 may include one or more fans that may be controlled by the electronic processor 30 to increase air flow to attempt to cool one or more components of the wireless charging device 12 and/or the battery pack(s) 13. In some embodiments, the wireless charging device 12 include more or fewer components than those shown in FIGS. 6A-6C.

Figure 7B:
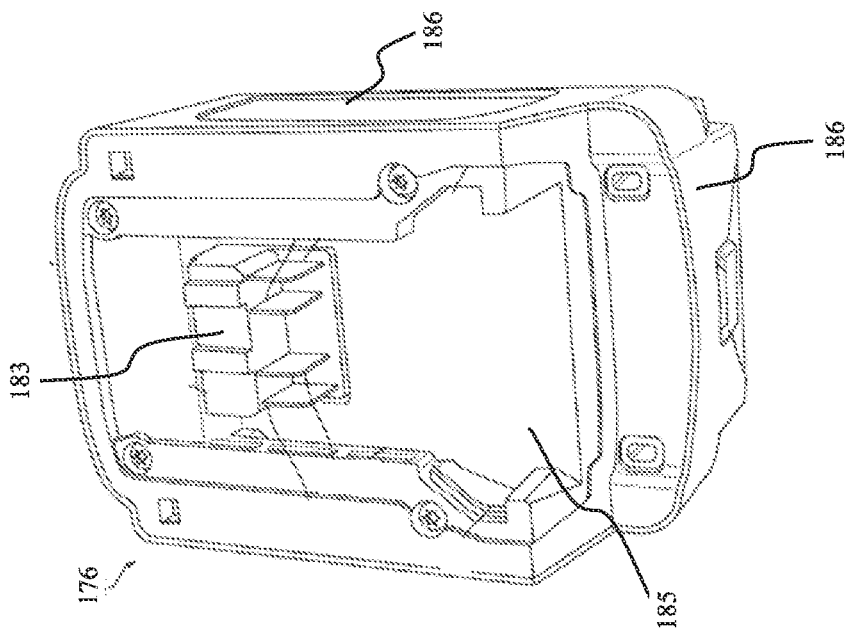
FIGS. 7A and 7B illustrate a wireless adapter configured to couple to a battery pack and/or a wireless charging device according to one example embodiment.
Figure 7A:
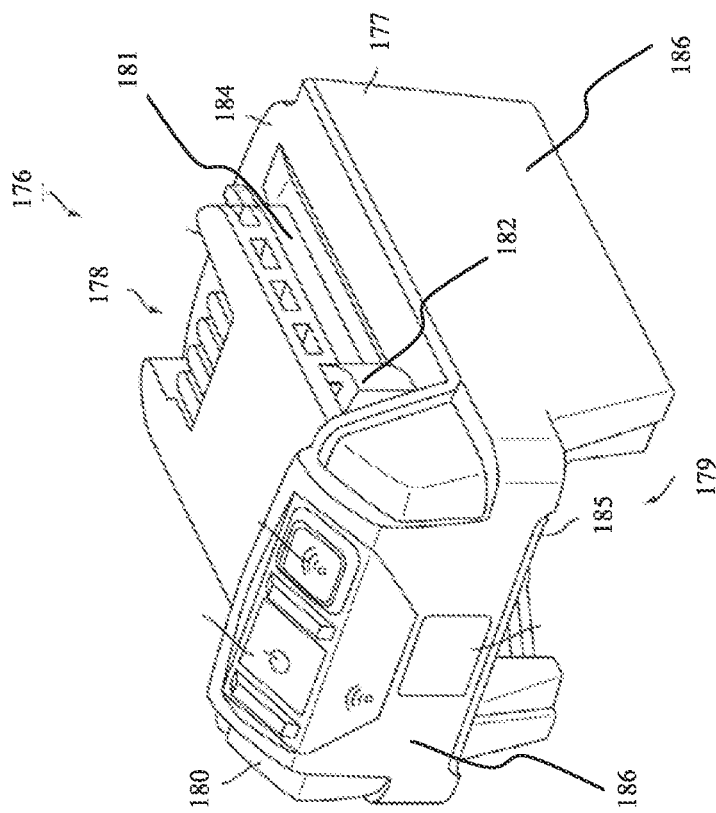

FIGS. 7A and 7B illustrate a wireless adapter 176 according to one example embodiment. The wireless adapter 176 may include at least some of the features disclosed in any of the embodiments of U.S. patent application Ser. No. 15/030,756, filed Apr. 20, 2016, now U.S. Pat. No. 10,131,042, which is hereby incorporated by reference. The wireless adapter 176 may include one or more wireless charging components included in the battery pack 13. The wireless adapter 176 may be configured to couple to a battery pack 13 that is not configured for wireless charging in order to allow the battery pack 13 to be wirelessly charged by the wireless charging device 12. FIG. 7A is a top-front perspective view of the wireless adapter 176. FIG. 7B is a bottom-front perspective view of the wireless adapter 176.

The wireless adapter 176 may be configured to couple to both a power tool and a battery pack 13 that may not include wireless charging capabilities. In some embodiments, the wireless adapter 176 is also configured to mechanically and/or electrically couple to the wireless charging device 12. For example, the wireless adapter 176 may be configured to merely electrically couple to the wireless charging device 12 using one of the power transfer techniques described previously herein. As another example, the wireless adapter 176 may be configured to mechanically couple, for example to a rail system of a charging station 28 of the wireless charging device 12. In general, the wireless adapter 176 creates a communication path between battery pack 13, the wireless charging device 12, and other power tool devices and the external device 14. In some embodiments, the wireless adapter 176 may export information from the battery pack 13 and import information into the battery pack 13. The wireless adapter 176, for example, obtains and exports identification information of the battery pack 13, charging parameters of the battery pack 13, a state of charge of the battery pack 13, maximum current and/or voltage limits, etc. The wireless adapter 176 may provide this information to the wireless charging device 12.

As shown in FIGS. 7A and 7B, the wireless adapter 176 includes a housing 177, a charger-side receiving portion 178, and a battery-side receiving portion 179, and a latching mechanism 180. The housing 177 includes a top side 184, a bottom side 185, and sidewalls 186 connecting the top side 184 and the bottom side 185. As shown in FIG. 7A, the charger-side receiving portion 178 is located on the top side 184 of the housing 177, while the battery-side receiving portion 179 is located on the bottom side 185 of the housing 177. The battery-side receiving portion 179 (which is shown in more detail in FIG. 7B) is configured to releasably couple to the battery pack 13. For example, the battery-side receiving portion 179 includes terminal block 183 with terminals configured to physically engage with the terminals of the battery pack 13. The battery-side receiving portion 179 may include similar coupling elements as a power tool to which the battery pack 13 is configured to couple in order to secure the wireless adapter 176 to the battery pack 13.

In some embodiments, the terminal block 183 includes one or more movable terminals that are configured to be user modifiable to accommodate different types of battery packs 13. For example, the terminals of the terminal block 183 may be modified to mechanically, electrically, and/or communicatively couple to battery packs 13 of different sizes and/or battery packs manufactured by different manufacturers. In some embodiments, one or more terminals may be folded toward the bottom side 185 of the wireless adapter 176 such that the folded terminal does not couple with the battery pack 13. In some embodiments, one or more terminals may be slidable between one or more different positions to vary the distance between adjacent terminals.

The charger-side receiving portion 178 is configured to couple to the wireless charging device 12. FIG. 7A illustrates a rail system 181 including tabs 182 configured to physically secure the wireless adapter 176 to the wireless charging device 12. To detach the wireless adapter 176 from the wireless charging device 12, the tabs 182 may move inward in response to actuation of the latching mechanism 180. However, in other embodiments, the charger-side receiving portion 178 may not include the rail system 181, tabs 182, and latching mechanism 180. In such embodiments, the wireless adapter 176 may merely electrically couple to the wireless charging device 12 via wireless charging circuitry shown in FIG. 8 and explained previously herein with respect to the wireless charging device 12 and/or the battery pack 13.

While the wireless adapter 176 is explained as a separate device configured to be coupled to the battery pack 13 and to the wireless charging device 12, in some embodiments, the adapter is built into the wireless charging device 12 (e.g., as a wired charging port). In some embodiments, the wireless adapter 176 is a modular unit that includes at least some of the charger components included in the wireless charging device 12 as shown in the block diagram of FIGS. 6A-6C. In other words, the wireless adapter 176 may perform the same or similar functions as the wireless charging device 12 described previously herein. In such embodiments, the battery-side receiving portion 179 may mechanically couple to the battery pack 13 but may communicate with the battery pack 13 and charge the battery pack 13 wirelessly without physically electrically coupling with battery pack 13, for example, via terminals.

In some embodiments, the wireless adapter 176 is shaped differently than the wireless adapter 176 shown in FIGS. 7A and 7B. For example, the wireless adapter 176 may partially, substantially, or fully enclose the battery pack 13 upon coupling with the battery pack 13.

Figure 8:
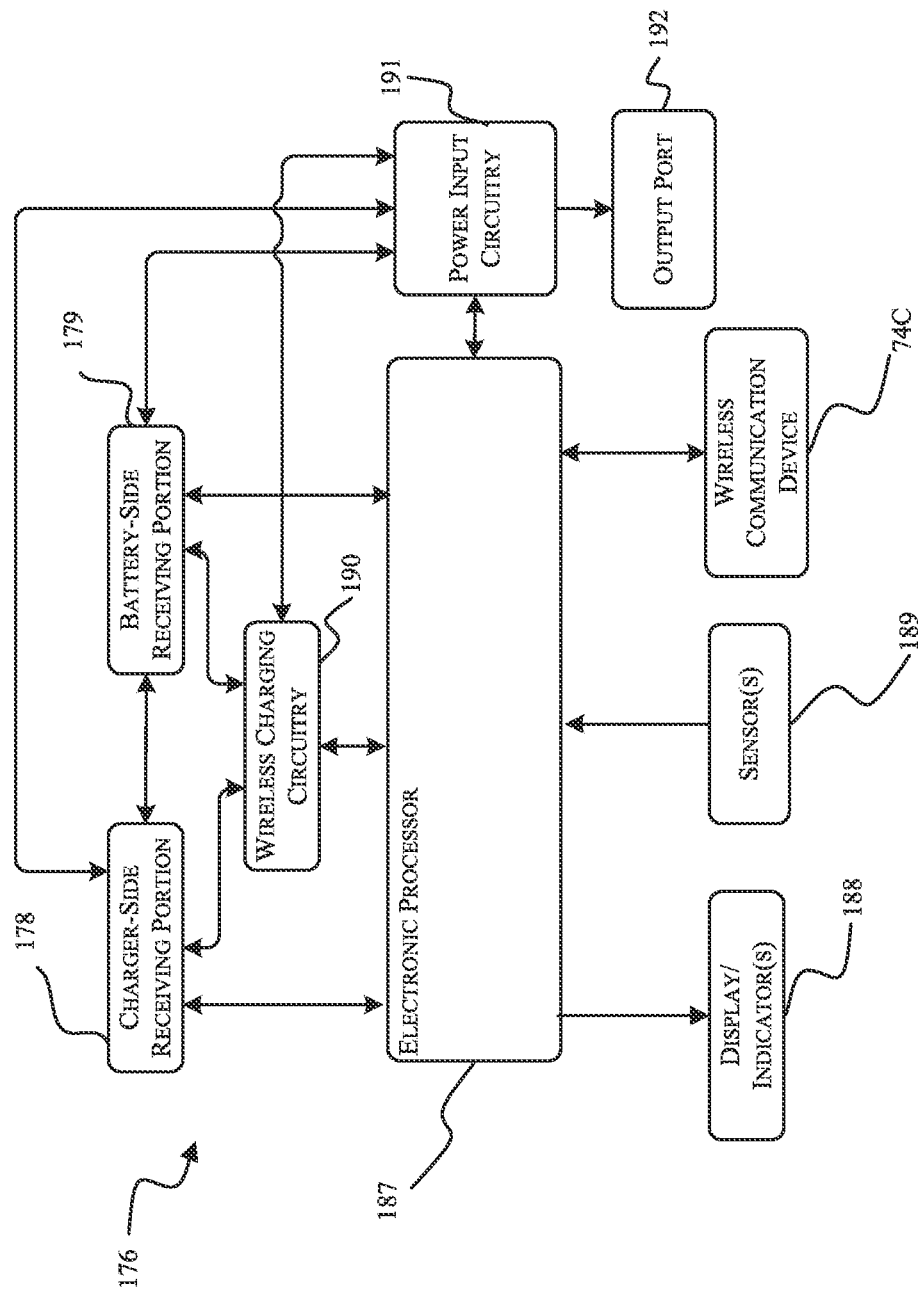
FIG. 8 illustrates a block diagram of the wireless adapter of FIGS. 7A and 7B according to one example embodiment.

FIG. 8 illustrates a block diagram of the wireless adapter 176 according to one example embodiment. In some embodiments, the wireless adapter 176 includes any combination of components included in the battery pack 13 as shown in FIG. 4A and/or included in the wireless charging device 12 shown in FIG. 6A-6C. In other words, the wireless adapter 176 may have additional or fewer components than those shown in FIG. 8.

As shown in FIG. 8, the wireless adapter 176 includes an adapter controller 187 (i.e., electronic processor 187). The electronic processor 187 is electrically and/or communicatively connected to a variety of components of the wireless adapter 176. For example, the illustrated electronic processor 187 is connected to display/indicator(s) 188, one or more sensors 189, a wireless communication device 74C, wireless charging circuitry 190, and power input circuitry 191. The wireless adapter 176 may also include one or more output ports 192 (e.g., a 12V DC output, a USB power output, etc.) coupled to the power input circuitry 191. Although not shown in FIG. 8, the electronic processor 187 may include the same or similar components as the electronic processor 42 of the battery pack 13 or the electronic processor 30 of the wireless charging device 12. Additionally, the components shown in FIG. 8 may be the same as or similar to like-named components included in the battery pack 13 and/or wireless charging device 12 explained previously here (e.g., the display/indicator(s) 188, the sensor(s) 189, and the wireless communication device 74C). The explanation of these same or similar components (and related additional components that are described as being included in some embodiments) will not be repeated for the sake of brevity but applies to the like-named components shown in FIG. 8 (e.g., the electronic processor 187).

As previously indicated, the wireless adapter 176 may perform similar wireless charging functions as one or both of the wireless charging device 12 and the battery pack 13 that is configured to be wirelessly charged by the wireless charging device 12. Accordingly, the wireless charging circuitry 190 included in the wireless adapter 176 may include one or both of the wireless power receiver 34 of the battery pack 13 as explained previously herein and the wireless power transmitter 104 of the wireless charging device 12 as explained previously herein. The wireless charging circuitry 190 may be coupled to one or both of the charger-side receiving portion 178 and the battery-side receiving portion 179 to allow the battery pack 13 to be wirelessly charged by the wireless adapter 176 itself or by the wireless charging device 12 via the wireless adapter 176. The wireless charging circuitry may additionally include any power converter and conditioning circuitry disclosed previously herein with respect to the battery 13 and/or the wireless charging device 12 to allow for wireless power transfer.

In some embodiments, the wireless adapter 176 includes multiple wireless power receivers 34. Multiple wireless power receivers 34 may increase power transfer from the wireless charging device 12 to the battery pack 13 via the wireless adapter 176. In some embodiments, each of the multiple wireless power receivers 34 is of a different type such that the battery pack 13 may be wireless charged using any one of multiple wireless charging techniques via the wireless adapter 176. In some embodiments, wireless power receivers 34 are positioned adjacent or inside different walls/surfaces of the wireless adapter 176 to allow the wireless adapter 176 (and thereby the battery pack 13 when connected to the adapter 1736) to wirelessly receive power from the wireless charging device 12 from one or more different directions. For example, two or more wireless power receivers 34 may be positioned adjacent or inside the top side 184 of the wireless adapter 176, the bottom side 185 of the wireless adapter 176, and/or any of the four sidewalls 186 of the wireless adapter 176. In further embodiments, each of the top side 184, the bottom side 185, and the four sidewalls 186 includes at least one wireless power receiver 34 such that the wireless adapter 176 (and thereby the battery pack 13) can receive power in all directions.

In some embodiments, the wireless charging circuitry 190 is included in an insertable device configured to be received by the housing 177 of the wireless adapter 176 and electrically coupled to the electronic processor 187 and other electrical components of the wireless adapter 176 upon insertion of the insertable device. For example, different insertable devices may include different types of wireless power transmitters 104 and wireless power receivers 34 (e.g., a conductive plate, an inductive coil, a RF antenna, etc.) to allow the wireless adapter 176 to be selectively usable for different types of wireless charging. In some embodiments, the wireless adapter 176 includes one or more slots configured to selectively receive one or more of the insertable devices. In further embodiments, the wireless adapter 176 may include one or more cavities configured to receive the insertable device, in which the cavities(s) may be selectively closed.

The power input circuitry 191 is configured to receive electrical power from the battery pack 13 via the terminals of the battery-side receiving portion 179 and/or the wireless charging circuitry 190, the wireless charging device 12 via the terminals of the charger-side receiving portion 178 and/or the wireless charging circuitry 190, an integrated power source (e.g., a 9V battery), or a combination thereof. The power input circuitry 191 is also configured to condition the received power into usable power for the various components of the wireless adapter 176. Conditioning the power may include, for example, reducing the electrical power received by the power input circuitry 191 into the appropriate voltage and/or current parameters, or filtering the power received by the power input circuitry 191. The power input circuitry 191 communicates with the electronic processor 187 to determine the power parameters necessary for the electronic processor 187 and ensure that the power provided by the power input circuitry 191 meets the necessary power parameters of the electronic processor 187 and of the other electronic components of the wireless adapter 176 and/or of the battery 13 to which the wireless adapter 176 is coupled.

As indicated by the reference number 74C of the wireless communication device 74C included in the wireless adapter 176, the wireless communication device 74C may include any of the components described previously herein and/or may perform similar functionality as described previously herein with respect to the wireless communication device 74 of FIG. 4B. In other words, the wireless communication device 74C allows the wireless adapter 176 to exchange similar data as that described above with similar devices as those described above with respect to the wireless communication devices 74A and 74B.

In some embodiments, the electronic processor 187 of the wireless adapter 176 is configured to communicate with the electronic processor 42 of the battery pack 13 to which the wireless adapter 176 is connected, for example, via a communication terminal of the battery-side receiving portion 179 and/or via wireless communication via the wireless communication device 74C. The electronic processor 187 of the wireless adapter 176 may request discharge current such that the battery pack 13 closes a discharge switch (i.e., field-effect transistor (FET)). However, the wireless adapter 176 may then provide charging current to the battery cells 32 via the battery-side receiving portion 179 and discharge switch. In this manner, the battery pack 13 may be programmed to provide discharge current but may instead receive charging current. In this implementation, the wireless adapter 176 and/or the wireless charging device 12 may monitor charging parameters (e.g., battery current, voltage, individual and pack state of charge, etc.) to control the charging operation and cease charging when one or more thresholds of the charging parameter are met.

In some embodiments, the wireless adapter 176 allows the battery pack 13 to receive a trickle charge through a body diode and open MOSFET. For example, even though a discharge switch (e.g., MOSFET) may be open to prevent the battery pack 13 from being charged or discharged, the wireless charging device 12 may provide a trickle charge through a body diode of the battery pack 13 to allow the battery cells 32 to be charged.

In some embodiments, the output port 192 provides power from the battery pack 13 to other devices such as heated clothing, a phone charger, etc. In some embodiments, the output port 192 includes a wireless power transmitter 104 to wirelessly transmit power to a device equipped with a wireless power receiver 34.

In some embodiments, the wireless adapter 176 is electrically, mechanically, and/or communicatively couplable to toolboxes and/or other enclosures (e.g., the enclosure 5020 of wireless charging device 12F in FIGS. 40-48) to relay data and/or transmit/receive charging power to/from other battery packs 13 located within proximate the toolboxes and/or other enclosures.

Figure 58:
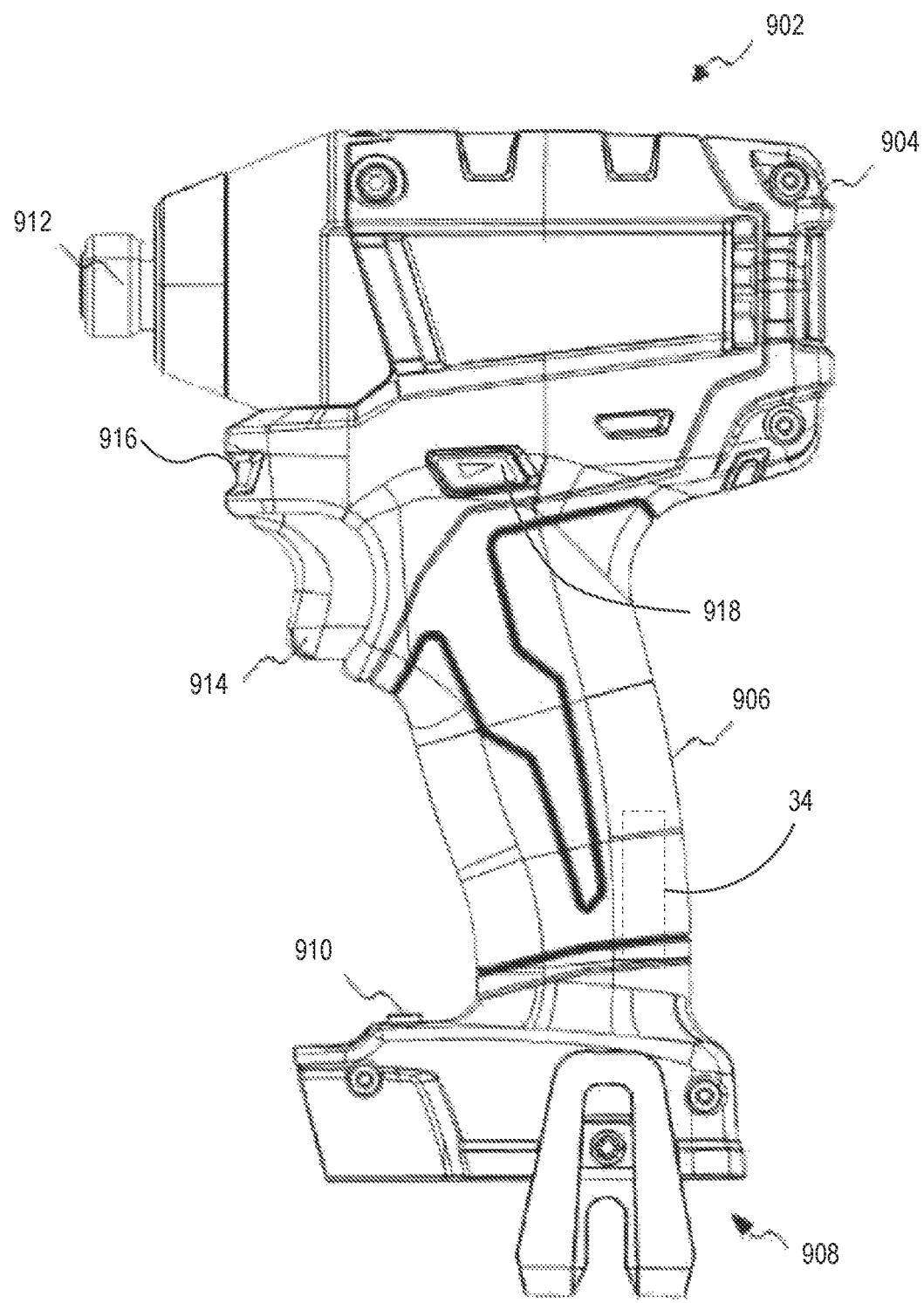
FIG. 58 illustrates an example power tool included in the communication system of FIG. 1 and that may be powered by the battery pack shown in FIG. 3A.

In some embodiments, a power tool 902 and/or load device configured to receive power from the battery pack 13 includes similar components and performs similar functions as the wireless adapter 176 with respect to wireless charging of the battery pack 13. FIG. 58 illustrates an example power tool 902 as an impact driver (herein power tool 902). The power tool 902 is representative of various types of power tools 902 and/or load devices that operate within system 10 and that may be coupled to and receive power from the battery pack 13. Accordingly, although the power tool 902 is shown as an impact driver, the description with respect to the power tool 902 is similarly applicable to other types of power tools 902 and load devices (e.g., free-standing work lights, electronic leveling devices, head lamp lighting devices, heated gloves, and the like).

Figure 59:
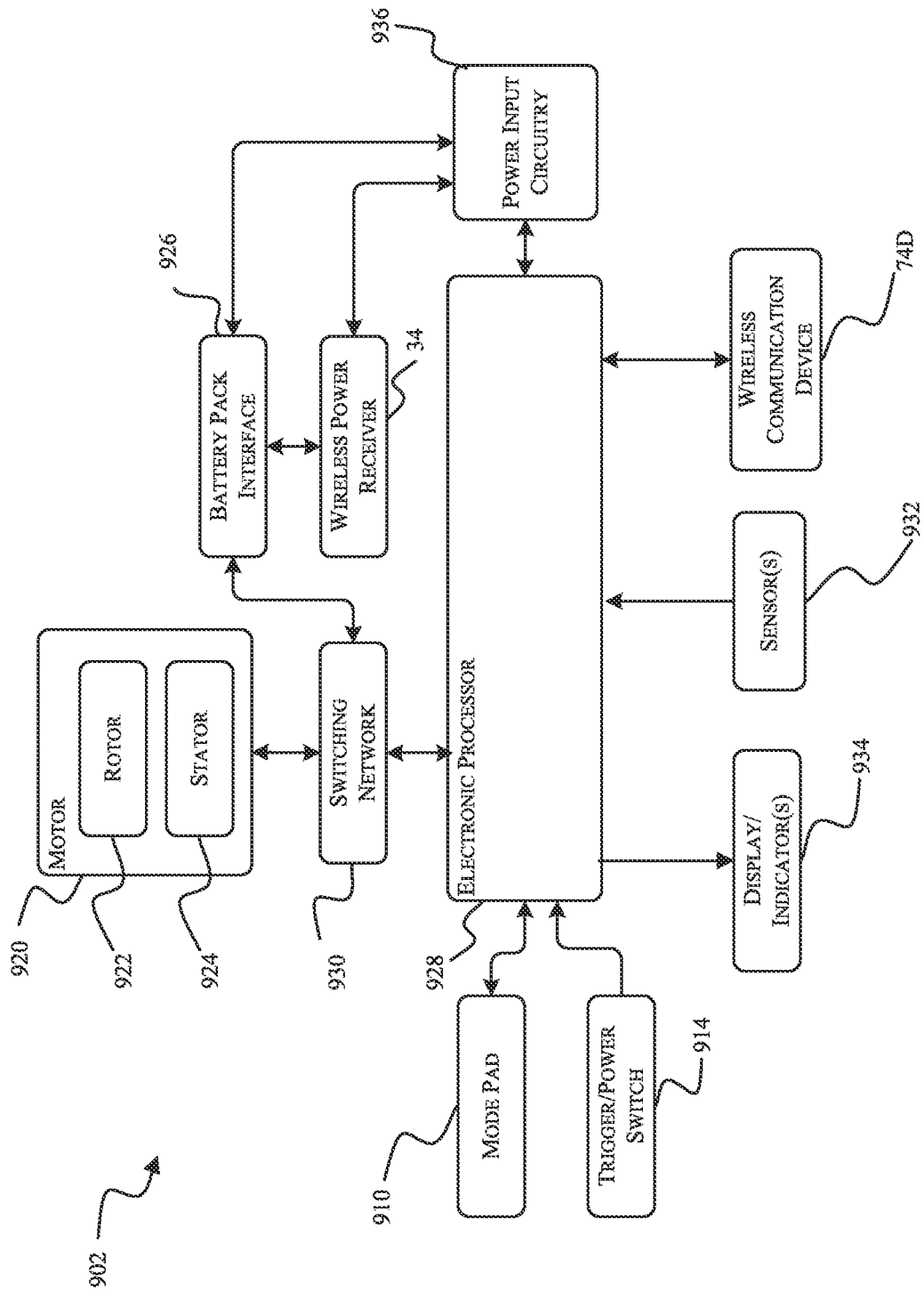
FIG. 59 illustrates a block diagram of the power tool of FIG. 58 according to some example embodiments.

As shown in FIG. 58, the power tool 902 includes an upper main body 904, a handle 906, a battery pack receiving portion 908, mode pad 910, an output drive device or mechanism 912, a trigger 914 (i.e., a power switch 914 as shown in FIG. 59), a work light 916, and forward/reverse selector 918. The power tool 902 further includes a motor 920 within the main body 904 of the housing and having a rotor 922 and a stator 924 (see FIG. 59). The rotor 922 is coupled to a motor shaft arranged to produce an output outside of the housing via the output drive device or mechanism 912. The housing of the power tool 902 (e.g., the main body 904 and the handle 906) are composed of a durable and light-weight plastic material. The drive device 912 is composed of a metal (e.g., steel). The drive device 912 on the power tool 902 is a socket. However, each power tool 902 may have a different drive device 912 specifically designed for the task (or primary function) associated with the power tool 902. For example, the drive device 912 for a power drill may include a bit driver, while the drive device 912 for a pipe cutter may include a blade. Some power tools 902 and/or load devices may not have a drive device 912 or motor 920 (e.g., a light device may include a light that provides illumination of an area as its primary function rather than having a drive device 912 that is moved by a motor 920). The battery pack receiving portion 908 is configured to receive and couple to the battery pack 13 that provides power to the power tool 902. The battery pack receiving portion 908 includes a battery pack interface 926 that includes a connecting structure to engage a mechanism that secures the battery pack 13 and a terminal block to electrically connect the battery pack 13 to the power tool 902. The mode pad 910 allows a user to select a mode of the power tool 902 and indicates to the user the currently selected mode of the power tool 902.

FIG. 59 illustrates a block diagram of the power tool 902 according to one example embodiment. As shown in FIG. 59, the power tool 104 includes the motor 920 that includes the rotor 922 and the stator 924. The motor 920 actuates the drive device 912 and allows the drive device 912 to perform a particular task. The battery pack 13 couples to the power tool 902 via a battery pack interface 926 and provides electrical power to energize the motor 920. The trigger/power switch 914 is connected to a power tool electronic processor 928 to provide an input indicative of a user actuating the trigger/power switch 914 to control a switching network 930 to allow power to be provided to the motor 920 from the battery pack 13.

As shown in FIG. 59, the power tool 902 also includes the switching network 930, sensor(s) 932, display/indicator(s) 934, power input circuitry 936, a wireless communication device 74D, and a wireless power receiver 34. The components of the power tool 902 shown in FIG. 59 may be similar to like-named components described previously herein with respect to other devices (e.g., the electronic processor 928, the power input circuitry 934, the wireless power receiver 34, the wireless communication device 74D, the sensor(s) 932, the display/indicator(s) 934). For the sake of brevity, only additional and/or different features of these components will be described with respect to the power tool 902, but it should be understood that the previous description of these like-named components applies to the components of the power tool 902.

The battery pack interface 926 includes a combination of mechanical (e.g., the battery pack receiving portion 908 including battery support structure) and electrical components (e.g., terminals) configured to and operable for interfacing (e.g., mechanically, electrically, and communicatively connecting) the power tool 902 with the battery pack 13. The battery pack interface 926 transmits the power received from the battery pack 13 to the power input circuitry 936. The power input circuitry 936 includes combinations of active and passive components (e.g., voltage step-down controllers, voltage converters, rectifiers, filters, etc.) to regulate or control the power received through the battery pack interface 926 and provided to the wireless communication device 74D and the electronic processor 928.

The switching network 930 enables the electronic processor 928 to control the operation of the motor 920. Generally, when the trigger/power switch 914 is depressed/activated, electrical current is supplied from the battery pack interface 926 to the motor 920, via the switching network 930. When the trigger/power switch 914 is not depressed/activated, electrical current is not supplied from the battery pack interface 926 to the motor 920. In response to the electronic processor 928 receiving an activation signal from the trigger/power switch 914, the electronic processor 928 activates the switching network 930 to provide power to the motor 920. The switching network 930 controls the amount of current available to the motor 920 and thereby controls the speed and torque output of the motor 920. The switching network 930 may include several field effect transistors (FETs), bipolar transistors, or other types of electrical switches, such as six FETs in a bridge arrangement. The electronic processor 928, in some embodiments, drives successive switching elements of the switching network 930 with respective pulse width modulation (PWM) signals to alternately drive stator coils of the stator 924, thus inducing rotation of the rotor 922.

The sensors 932 are coupled to the electronic processor 928 and communicate to the electronic processor 928 various signals indicative of different parameters of the power tool 902 or the motor 920. The sensors 932 include, for example, one or more current sensors, one or more voltage sensors, one or more temperature sensors, one or more speed sensors, one or more Hall Effect sensors, etc. For example, the speed of the motor 920 can be determined using a plurality of Hall Effect sensors to sense the rotational position of the motor 920. In some embodiments, the electronic processor 928 controls the switching network 930 in response to signals received from the sensors 932. For example, when the electronic processor 928 determines that the speed of the motor 920 is increasing too rapidly based on information received from the sensors 932, the electronic processor 928 may adapt or modify the active switches or switching sequence within the switching network 930 to reduce the speed of the motor 920. Data obtained via the sensors 932 may be saved in the electronic processor 928 as tool usage data. As explained above, the sensors 932 may also include similar sensors as those described above with respect to other devices in the system 10.

The display/indicators 934 are also coupled to the electronic processor 928 and receive control signals from the electronic processor 928 to turn on and off or otherwise convey information based on different states of the power tool 902. For example, the indicators 220 are configured to indicate measured electrical characteristics of the power tool 104, the status of the power tool 104, etc. The indicators 220 may also include elements to convey information to a user through audible or tactile outputs.

The electronic processor 928 may include a memory as described previously herein with respect to the electronic processors of other devices included in the system 10. The electronic processor 928 may be configured to store power tool device information on the memory. The power tool device information stored on the memory of the electronic processor 928 may include power tool device identification information (e.g., including a unique identifier of the power tool 902) that is periodically broadcast via the wireless communication device 74D and also power tool device operational information including information regarding the usage of the power tool 902, information regarding the maintenance of the power tool 902, power tool device trigger event information, parameter information to operate the power tool 902 in a particular mode, and other information relevant to operating or maintaining the power tool 902.

The electronic processor 928 also includes a data connection (e.g., a communication channel) to couple to the wireless communication device 74D which may be located on a same or different printed circuit board as the electronic processor 928 within the housing of the power tool 902. In some embodiments, the data connection includes one or more wires (and/or a ribbon cable) that are connected from the electronic processor 928 to the wireless communication device 74D. Via the wireless communication device 74D, the electronic processor 928 is configured to communicate with the external device 14, the battery pack 13, the wireless charging device 12, and/or other devices included in the system 10 as described previously with respect to the wireless communication devices 74 of other devices. For example, the power tool 902 may be configured to communicate with one or more of the devices in the system 10 to be used for wireless power transfer to the battery pack 13 to which the power tool 902 is coupled. For example, some battery packs 13 may not include a wireless power receiver 34. However, the power tool 902 may include a wireless power receiver 34 configured to be energized by the wireless power transmitter 104 of the wireless charging device 12. The wireless power receiver 34 of the power tool 902 may then provide charging current to the battery pack 13 coupled to the power tool 902 via the battery pack interface 926. In other words, the power tool 902 may perform a similar wireless charging function as the wireless adapter 176 in some embodiments. In some embodiments, the power input circuitry 936 may condition/convert power received by the wireless power receiver 34 before providing charging current to the battery pack 13 via the battery pack interface 926.

In some embodiments, the power tool 902 may include multiple wireless power receivers 34 that are each configured to receive wireless power using the same or a different wireless charging modality (e.g., wireless capacitive charging, wireless inductive charging, wireless RF charging, etc.). As shown in FIG. 58, in some embodiments, the wireless power receiver(s) 34 may be located in the handle 906 of the power tool 902. Locating the wireless power receiver(s) 34 in the handle 906 may allow the wireless charging device 12 to be designed to included one or more universal wireless charging cradles configured to receive the handle 906. In some embodiments, the handles 906 of power tools 902 of different manufacturers may be approximately the same size and/or shape. Additionally, many power tools 902 include handles 906. Accordingly, the universal wireless charging cradle may be designed to conveniently receive any one of multiple power tools 902 (e.g., of the same or different manufacturers) that include similar handles 906. As described above, once received on the universal wireless charging cradle, the power tool 902 may wirelessly communicate with the wireless charging station 12 and/or the battery pack 13 to initiate wireless charging of the battery pack 13 from the wireless charging station 12 via the wireless power receiver(s) 34 included in the power tool 902.

While the wireless power receiver(s) is described as and shown as being located in the handle 206 of the power tool 902, the wireless power receiver(s) 34 may alternatively or additionally be located in other locations of the power tool 902 (e.g., in other locations within the handle 906 and/or in other locations such as the battery pack receiving portion 908, the main body 904, and/or the like). Generally, the power tool 902 may be capable of including similar wireless charging embodiments and alternatives as described above with respect to the wireless adapter 176.

Although the above example embodiment with respect to the power tool 902 describes the battery pack 13 as not including its own wireless power receiver 34, in some embodiments, the battery pack 13 may also include its own wireless power receiver(s) 34 as described previously herein. In such embodiments, wireless charging of the battery pack 13 may occur via the wireless power receiver(s) 34 of the battery pack and/or via the wireless power receiver(s) 34 of the power tool 902. Specific charging configurations (e.g., which wireless power receiver(s) 34 of which devices 13, 176, 902 will be used for wireless charging) may be initialized via wireless communication between the wireless charging device 12, the battery pack 13, the power tool 902, and/or other devices of the system 10.

Similar to the block diagrams of other devices of the system 10 described previously herein, the power tool 902 or load device may include fewer or additional components arranged in different manners than those shown in FIG. 59. For example, some load devices may not include the motor 920 as mentioned previously herein.

Although the battery pack 13 is described and shown above as being removably connected to the power tool 902 and/or load device, in some embodiments, the battery pack 13 may not be removable from the power tool 902 and/or load device. In other words, the power tool 902 and/or load device may have a built-in battery pack 13 that is configured to permanently installed within a housing of the power tool 902 and/or load device (e.g., a flashlight, test equipment, electronic leveling/layout devices, and the like). In such embodiments, the non-removable battery packs 13 included in such power tools 902 and/or load devices may be wirelessly charged by the wireless charging device 12 by placing the entire power tool 902 and/or load device on/in the wireless charging device 12. In some embodiments, a portable power source may include a non-removable battery bank that may be referred to as the battery pack 13 and may include similar components as the battery pack 13 described previously herein. In some embodiments, the portable power source may be placed on/in the wireless charging device 12 to wirelessly charge the non-removable battery bank. In some embodiments, the portable power source may include wheels for ease of transportation. In such embodiments, the portable power source may be rolled onto or over the wireless charging device 12 to wirelessly charge the non-removable battery bank.

Figure 9:
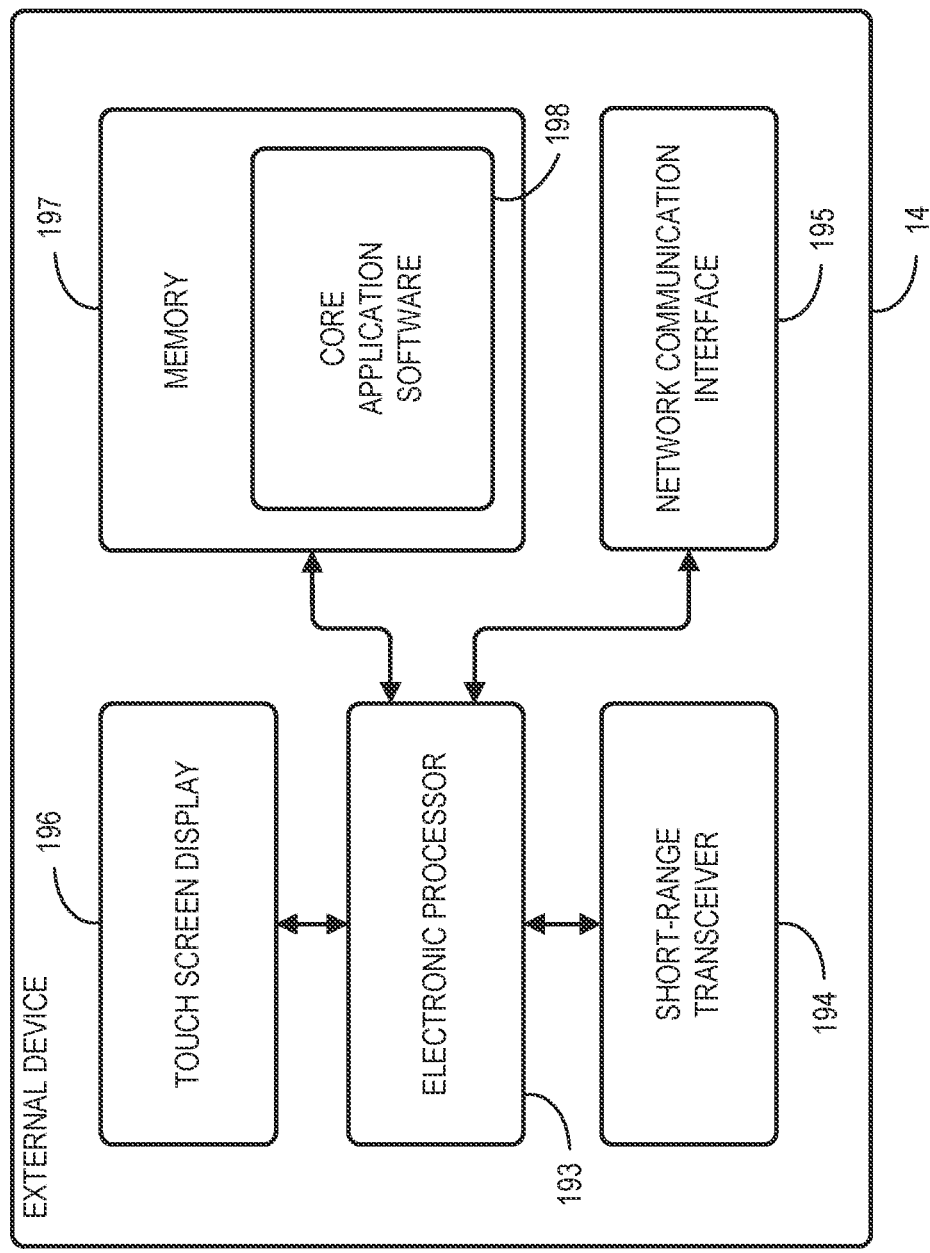
FIG. 9 illustrates a block diagram of an external device of FIG. 1 according to a first example embodiment.

FIG. 9 illustrates a block diagram of the external device 14 according to one example embodiment. The external device 14 may be, for example, a smart phone (as illustrated), a laptop computer, a tablet computer, a personal digital assistant (PDA), or another electronic device capable of communicating wirelessly with the other devices shown in FIG. 1 and providing a user interface. The external device 14 generates the user interface and allows a user to access and interact with information relating to battery packs 13 and/or wireless charging devices 12. The external device 14 can receive user inputs to determine operational parameters, enable or disable features, and the like. The user interface of the external device 14 provides an easy-to-use interface for the user to control, customize, and monitor operation of battery packs 13 and wireless charging devices 12.

As shown in FIG. 9, in some embodiments, the external device 14 includes an external device electronic processor 193, a short-range transceiver 194, a network communication interface 195, a touch screen display 196, and a memory 197. The external device electronic processor 193 is coupled to the short-range transceiver 194, the network communication interface 195, the touch screen display 196, and the memory 197. In some embodiments, the electronic processor 193 and the memory 197 may include similar components and perform similar functions as the like-named components of the other devices 12, 13, 176 explained previously herein. The short-range transceiver 194 (i.e., a wireless transceiver), which may include or is coupled to an antenna (not shown), is configured to communicate with a compatible transceiver and antenna of the wireless communication device 74 within the devices 12, 13, 176, 902 explained previously herein. The short-range transceiver 194 can also communicate with other electronic devices. The network communication interface 195 (i.e., another wireless transceiver that may be referred to as a long-range transceiver) communicates with the network 18 to enable communication with a remote server 16. The network communication interface 195 may include circuitry that enables the external device 14 to communicate with the network 18. In some embodiments, the network 18 may be an Internet network, a cellular network, another network, or a combination thereof. As noted previously herein, in some embodiments, the wireless communication device 74 of the devices 12, 13, 176, 902 may include the network communication interface 195 to communicate directly with the remote server 16 rather than communicating with the remote server 16 via the external device 14.

The memory 197 of the external device 14 also stores core application software 198. The external device electronic processor 193 accesses and executes the core application software 198 in memory 197 to launch a control application that receives inputs from the user for the configuration and operation of the battery packs 13, the wireless charging devices 12, and the like. The core application software 198 may receive user login information and a password (for example, via user inputs on the touch screen display 196) to associate the external device 14 with a particular user. The short-range transceiver 194 of the external device 14 is compatible with a transceiver of the wireless communication devices 74. The short-range transceiver 194 may include, for example, a Bluetooth® communication controller. The short-range transceiver 194 allows the external device 14 to communicate with the wireless communication devices 74. The external device 14, therefore, grants the user access to data related to the devices 12, 13, 176, 902 that include wireless communication devices 74, and provides a user interface such that the user can interact with an electronic processor 30, 42, 187, 928 of the devices 12, 13, 176, 902. While FIG. 9 illustrates a touch screen display 196, other types of displays may be additionally or alternatively included in the external device 14.

FIGS. 10 through 27 describe the different charging modalities used with respect to direct wireless charging between the wireless charging device 12A and the battery pack 13. However, it should be noted that these figures and the accompanying descriptions are equally applicable to other wireless charging devices 12, including wireless charging devices 12B-12D and/or the wireless adapter 176.

Figure 10:
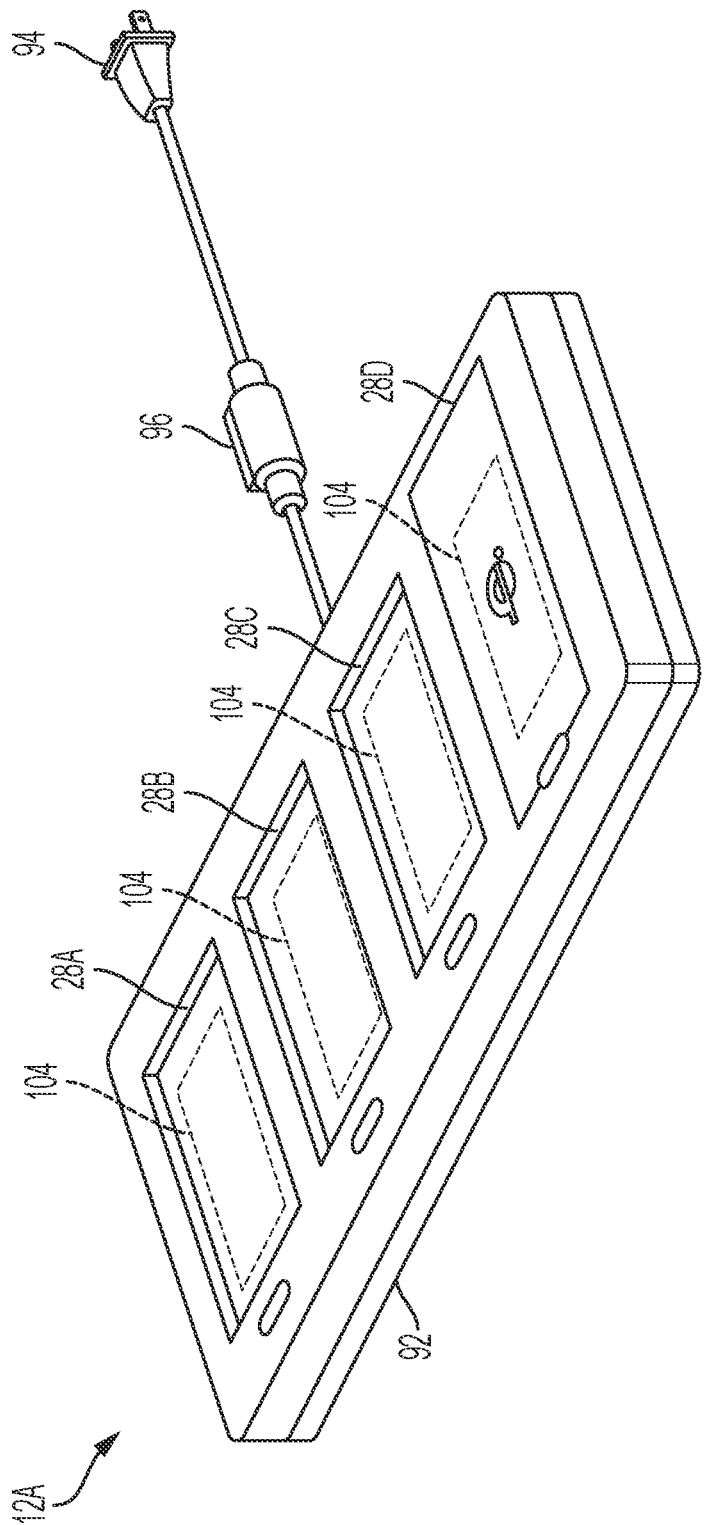
FIG. 10 illustrates a wireless charging device of FIG. 1 including a wireless power transmitter according to one example embodiment.

Referring to FIG. 10, a wireless power transmitter 104 may be provided in each of the charging stations 28A-28D. As described above, each wireless power transmitter 104 may include one or more of a transmitting coil, transmitting capacitive plates, transmitting antenna, and the like for providing different types of wireless power transfer (e.g., capacitive power transfer, inductive power transfer, radio frequency (RF) power transfer, magnetic resonance power transfer, etc.). In some embodiments, multiple wireless power transmitters 104 may be provided in each charging station 28A-28D to allow for two or more of the types of wireless power transfer mentioned above. An indication or marking may be provided on the charging station 28 to inform a user of the type(s) of wireless charging supported by the charging station 28.

Figure 11:
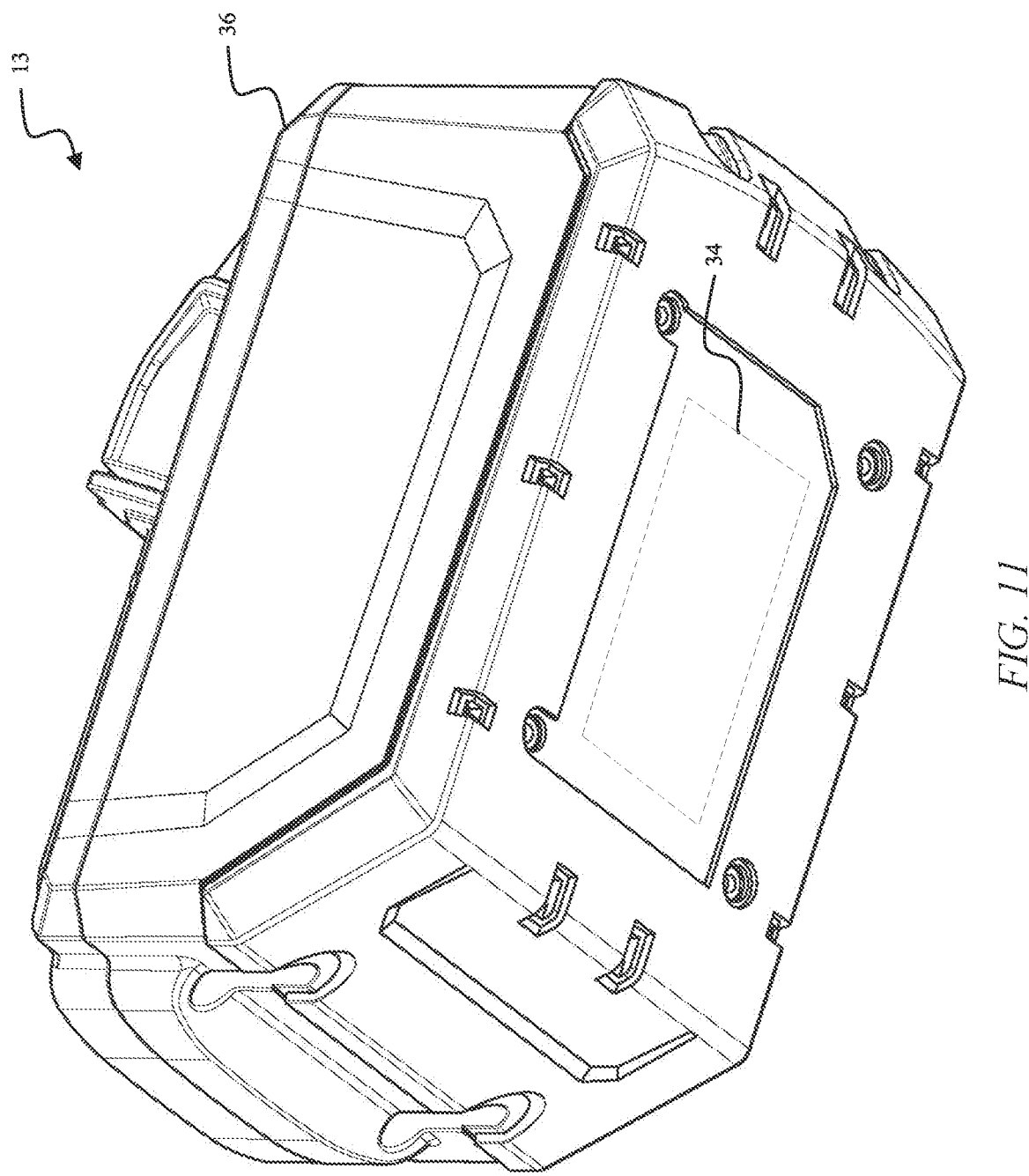
FIG. 11 illustrates a battery pack of FIG. 1 including a wireless power receiver according to one example embodiment.

Referring to FIG. 11, a wireless power receiver 34 is provided in, for example, a bottom portion of the housing 36 of a battery pack 13. The wireless power receiver 34 may be provided in other portions of the battery pack 13. To charge the battery pack 13, the user may place the battery pack 13 such that the wireless power receiver 34 aligns with the wireless power transmitter 104 of the corresponding charging station 28.

Figure 12:
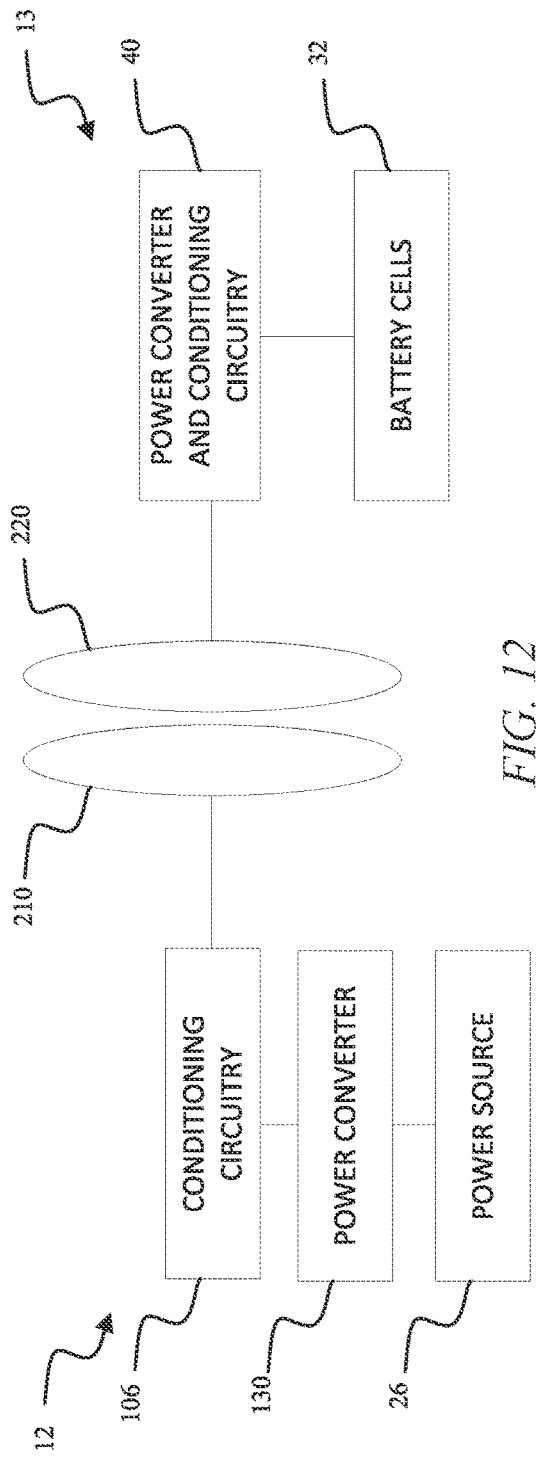
FIG. 12 is a block diagram illustrating inductive charging between a wireless charging device and a battery pack of FIG. 1 according to one example embodiment.

FIG. 12 illustrates wireless charging using inductive power transfer between the wireless charging device 12 and a battery pack 13 according to one example embodiment. In the example illustrated, the wireless power transmitter 104 is implemented as a transmitting coil 210 and the wireless power receiver 34 is implemented as a receiving coil 212. The wireless charging device 12 includes the transmitting coil 210 coupled to the power source 26 through the power converter 130 and conditioning circuitry 106. The battery pack 13 includes the receiving coil 212 coupled to the battery cells 32 through the power converter and conditioning circuitry 40.

Figure 13A:
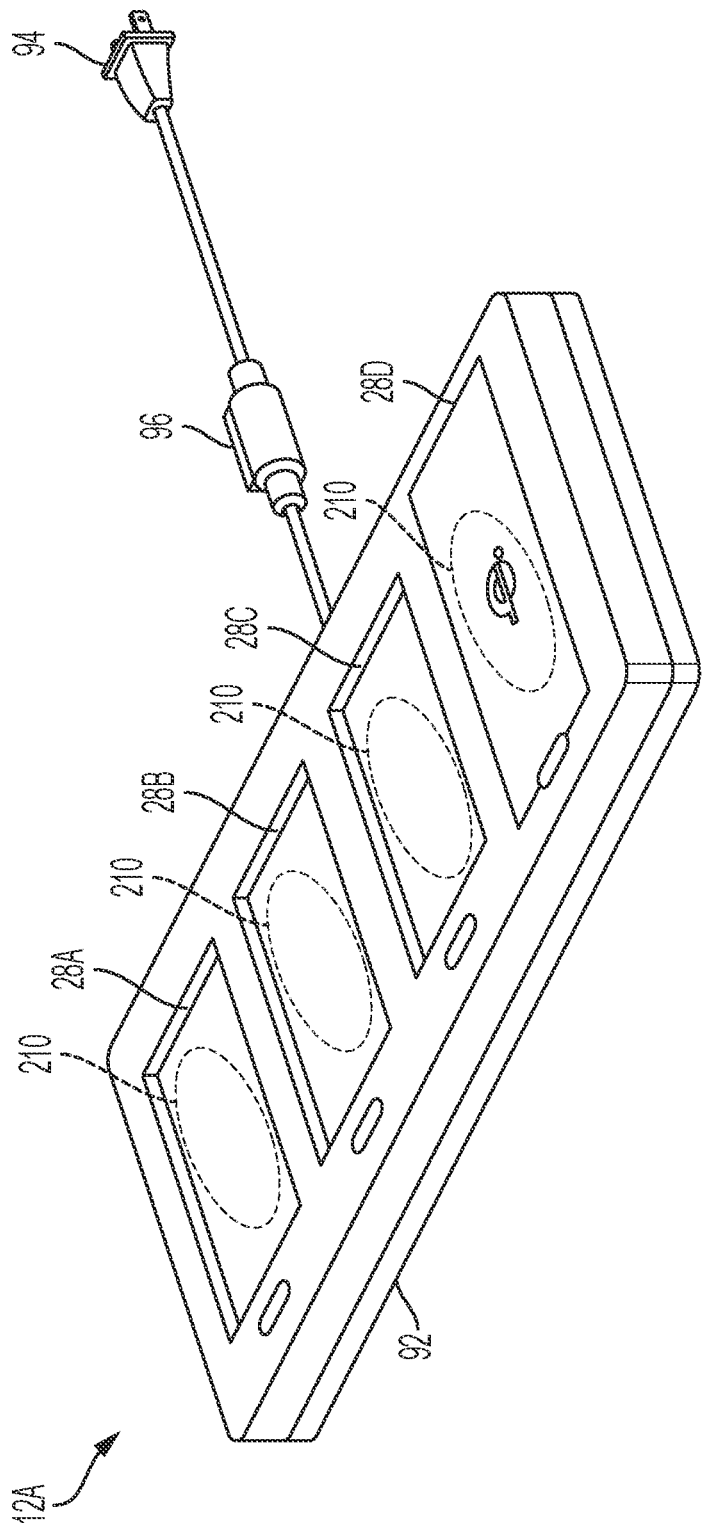
FIGS. 13A-13B illustrate positioning of inductive charging elements of FIG. 12 in a wireless charging device and a battery pack of FIG. 1 according to one example embodiment.
Figure 13B:
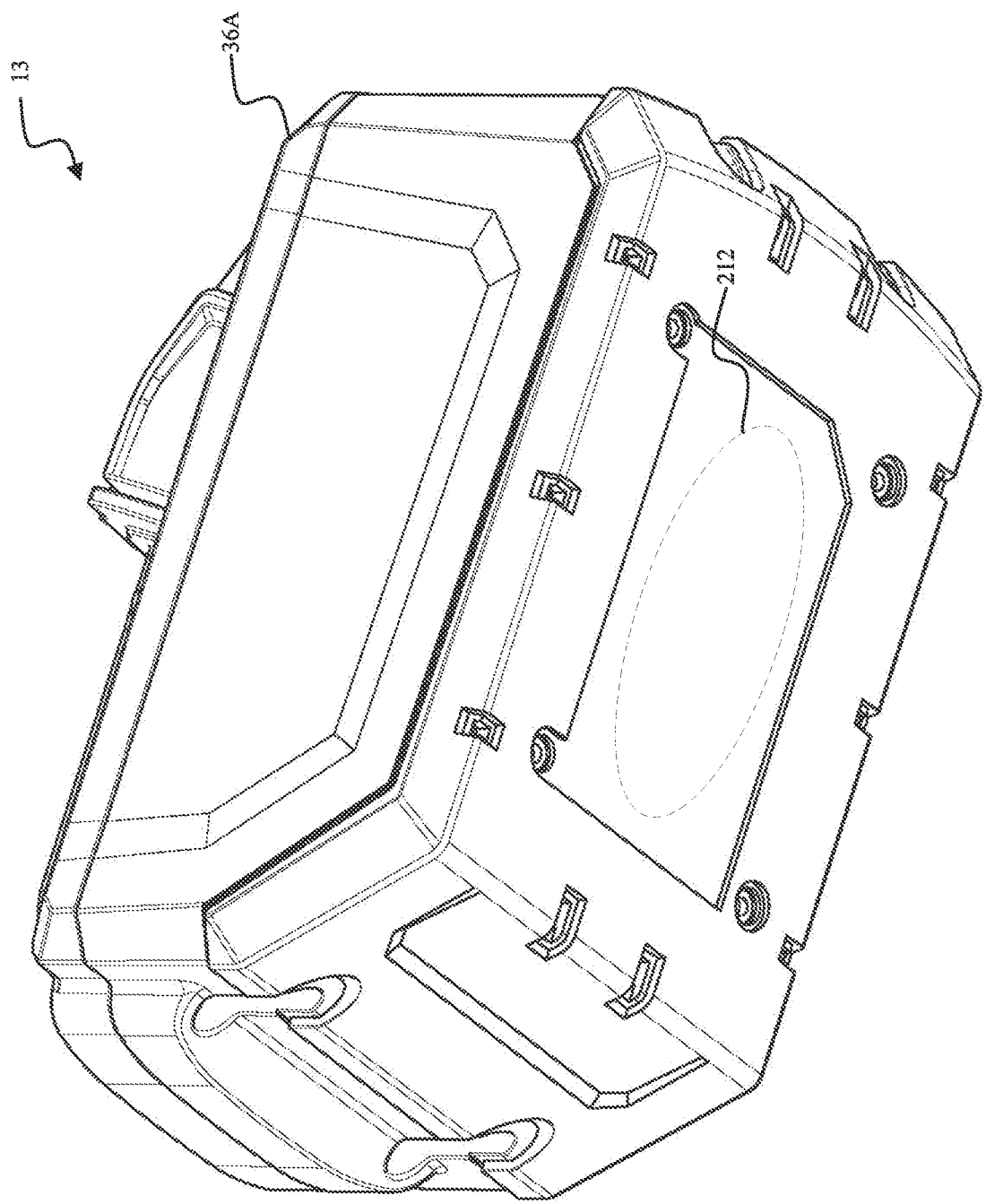

As shown in FIG. 13A, the transmitting coil 210 is provided in the charging station 28. The transmitting coil 210 may be overmolded into the housing portion of the charging station 28. For example, the transmitting coil 210 may be embedded in the plastic housing of the charging station 28. Similarly, as shown in FIG. 13B, the receiving coil 212 is provided in the bottom portion of the housing 36 of the battery pack 13. The receiving coil 212 may be overmolded into the bottom portion of the housing 36 of the battery pack 13. For example, the receiving coil 212 may be embedded in the bottom portion of the plastic housing of the battery pack 13.

In some embodiments, alignment features may be provided on the charging station 28 and the battery pack 12. For example, a recess (e.g., recess 1082 in FIG. 32) may be provided in the charging station 28 that receives a corresponding projection provided in the housing 36 of the battery pack 13. In another example, the alignment features include rails (e.g., rails 1078 in FIG. 1) and/or slots provided on the wireless charging device 12 (e.g., the charging station 28) for coupling with rails and/or slots on the battery pack 13. Efficiency of the inductive charging is reduced when the transmitting coil 210 is not aligned with the receiving coil 212. The alignment features facilitate the alignment of the transmitting coil 210 and the receiving coil 212 to increase the efficiency of power transfer between the transmitting coil 210 and the receiving coil 212.

Referring back to FIG. 12, the power converter 130 receives AC power from the power source 26 and may use a step-up or step-down transformer to convert the AC power from a first level to a second level that is suitable for charging the battery pack 13. The AC power at the second level is provided to the transmitting coil 210. In some embodiments, the power converter 130 may receive DC power and convert the DC power to an AC power before providing the AC power to the transmitting coil 210. In some embodiments, the power converter 130 may change the frequency, phase, and/or magnitude of the AC power as desired for providing charging power to the transmitting coil 210.

The power converter 130 is controlled by the charger electronic processor 30 to provide the alternating current to the transmitting coil 210. The alternating current through the transmitting coil 210 creates an oscillating magnetic field around the transmitting coil 210. The oscillating magnetic field induces an alternating electromotive force that creates an alternating current in the receiving coil 212. The receiving coil 212 provides the alternative current to the power converter and conditioning circuitry 40. In one example, the power converter and conditioning circuitry 40 converts the AC power received from the receiving coil 212 into a DC power, which is provided to the battery cells 32 for charging the battery cells. The battery electronic processor 42 controls the power converter and conditioning circuitry 40 to convert the AC power to DC power. The power converter and conditioning circuitry 40 may include a rectifier to convert the AC power from the receiving coil 212 to a DC power output provided to the battery cells 32.

Figure 14:
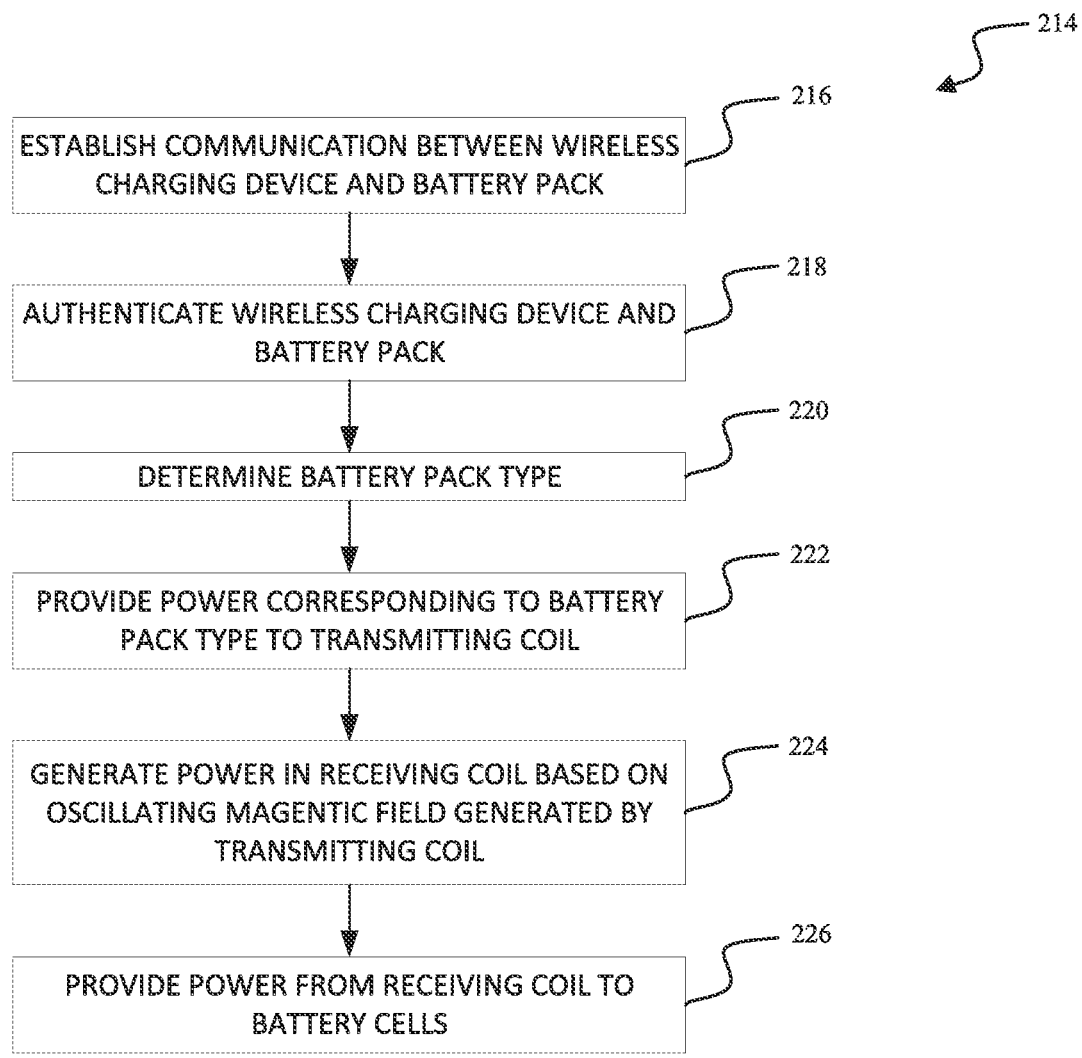
FIG. 14 is a flowchart of a method for inductive charging of a battery pack of FIG. 1 according to one example embodiment.

FIG. 14 is a flowchart illustrating one example method 214 for inductive charging the battery pack 13. In the example illustrated, the method 214 includes establishing communication between the wireless charging device 12 and the battery pack 13 (at block 216). The connection may be initiated by either the wireless charging device 12 or the battery pack 13. In one example, the charger electronic processor 98 determines that the battery pack 13 is placed on a charging station 28 and initiates communication with the battery pack 13. The communication may be established in an off-band system independent of the wireless power transmission, for example, in a Bluetooth® system. In some embodiments, the communication may be established in an in-band system using the wireless power transmission components, that is, the wireless power transmitter 104 and the wireless power receiver 34. Information may be exchanged between the wireless charging device 12 and the battery 13 by varying the frequency, phase, and/or magnitude of the current provided to the transmitting coil 210 and the receiving coil 212.

The method 214 includes authenticating the wireless charging device 12 and the battery pack 13 (at block 218). The wireless charging device 12 and the battery pack 13 may exchange authentication information, for example, an identification/serial number, key encrypted random number, and the like. In some embodiments, the authentication may be performed in a public key and/or a common key system.

The method 214 also includes determining, using the charger electronic processor 98, a battery pack type of the battery pack 13 (at block 220). The battery pack type may include information about, for example, a nominal voltage of the battery pack, a manufacturer of the battery pack, number of cells in the battery pack, a wireless power transfer system used in the battery pack, and the like. The wireless charging device 12 may store a lookup table including a mapping between identification information of a battery pack 13 and the corresponding battery pack type. The charger electronic processor 98 determines the battery pack type based on the identification information received from the battery pack 13. In some embodiments, the identification information from the battery pack 13 is stored in the memory 52 of the battery pack 13. In other embodiments, the identification information from the battery pack 13 is stored in an attachable communication device (e.g., an RFID tag) that is secured to the battery pack 13 after manufacturing and/or purchasing of the battery pack 13. The battery pack 13 may include an RFID sensor/reader 168 to receive the identification information from the RFID tag of the battery pack 13. For example, in conjunction with attaching an RFID tag to the battery pack 13, the user may program the wireless charging device 12 such that wireless charging device 12 recognizes the detects a specific battery pack 13 in response to receiving identification information of the RFID tag located on the battery pack 13. Such programming of the wireless charging device 12 may be completed via the display 100 of the wireless charging device 12 or may be completed using another device (e.g., the external device 14, the server 16, etc.) and may be communicated to the wireless charging device 12 via the wireless communication device 74B. In some embodiments, the wireless charging device 12 attempts to communicate with the battery pack 13 using multiple communication protocols if the wireless charging device 12 is unable to communicate with the battery pack 13 using a first communication protocol. In doing so, the wireless charging device 12 may keep track of the each type of communication protocol for which a communication link was unable to be established for use in identifying the manufacturer of the battery pack 13. For example, if a battery pack 13 of Manufacturer A is known communicate via Bluetooth® communication but a Bluetooth® communication link between the wireless charging device 12 and the battery pack 13 is unable to be established, the wireless charging device 12 may determine that the battery pack is not manufactured by Manufacturer A. As indicated by the above example, being equipped to communicate using any one of multiple communication protocols may allow the wireless charging device 12 to communicate with battery packs 13 from different manufacturers. In other embodiments, a number of manufacturers may configure their battery packs 13 to communicate using a universal charger communication protocol such that battery packs 13 from different manufacturers may communicate with wireless charging devices 12 from other manufacturers to allow for charging of the battery packs 13.

While the battery pack identification information is described above as being received from the battery pack 13 itself, in some embodiments, the external device 14 and/or the server 16 may be used to facilitate transfer of information such as battery pack identification information between the wireless charging device 12 and the battery pack 13. For example, the external device 14 may be configured to communicate with each of the devices 12 and 13 but the devices may not be configured to communicate directly with each other. As another example, the external device 14 may be used to authenticate communication between the devices 12 and 13 by providing communication protocol and/or keying information to both devices 12 and 13.

In some embodiments, the charger electronic processor 98 may use other methods to determine the type of the battery pack 13 instead of or in addition to use of the identification information. For example, the charger electronic processor 98 may use the weight/pressure sensor 158, the optical sensor 160, the LIDAR system 164, the SONAR system 166, and/or another battery pack detection sensor 144 to detect shape, size, color and/or weight of the battery pack 13. The charger electronic processor 98 determines the battery pack type based on the detected shape, physical size, color and/or weight (e.g., using a look-up table or other stored information that maps the shape, size, color, and/or weight to different types of battery packs 13). For example, battery packs 13 by different manufacturers are typically made of different and distinct colors. The optical sensor 160 may be used to determine the color of the battery pack 13 to determine the battery pack manufacturer. Additionally, the shape, weight, and/or physical size of the battery pack 13 may be indicative of the nominal voltage and/or capacity of the battery pack 13. Accordingly, by determining the shape, weight, and/or physical size of the battery pack 13, the weight/pressure sensor, the LIDAR system 164, and/or the SONAR system 166 may be used to determine the nominal voltage and number of cells in the battery pack (e.g., using a look-up table or the like). Battery packs 13 by different manufacturers may also include distinct rail systems for attachment to a corresponding power tool, charger, or other device (e.g., a lighting device). The charger electronic processor 98 may determine the battery pack type based on detecting the rail system of the battery pack 13 using one or more of the battery pack detection sensors 144 (e.g., the optical sensor 160, the LiDAR system 164, the SONAR system 166, and/or the like.

The method 214 includes providing power corresponding to the battery pack type to the transmitting coil 210 (at block 222). Each battery pack type may have different charging requirements. For example, the heavy duty battery pack 13B may be charged at a higher voltage and higher current than other battery packs 13A, 13C. Additionally, battery packs 13 manufactured by different entities may be charged at different voltages and/or currents. The charger electronic processor 98 controls the power converter 130 to provide power to the transmitting coil 210 corresponding to the battery pack type identified by the charger electronic processor 98. The charger electronic processor 98 controls the power converter 130 to provide alternating current to the transmitting coil 210 at a certain frequency, phase, and/or magnitude corresponding to the battery pack type.

The method 214 includes generating power in the receiving coil 212 based on an oscillating magnetic field generated by the transmitting coil 210 (at block 224). The alternating current flowing through the transmitting coil 210 generates an oscillating magnetic field. The oscillating magnetic field generates an alternating current in the receiving coil 212. The amount of current generated in the receiving coil 212 depends on the distance, alignment, and/or size differential between the transmitting coil 210 and the receiving coil 212. As discussed above, efficiency can be improved by providing alignment features on the wireless charging device 12 and the battery pack 13.

The method 214 includes providing the power from the receiving coil 212 to the battery cells 32 (at block 226). The battery electronic processor 42 controls the power converter and conditioning circuitry 40 to convert the alternating current generated in the receiving coil 212 to direct current. The power converter and conditioning circuitry 40 may include, for example, a rectifier to convert the alternating current to direct current. The direct current is then provided to the battery cells 32 to charge the battery cells. It should be understood that the order of the blocks illustrated in FIG. 14 could vary and some blocks may not be performed. For example, blocks 216 and 218 may not be performed and the charging may commence without authentication.

Figure 15:
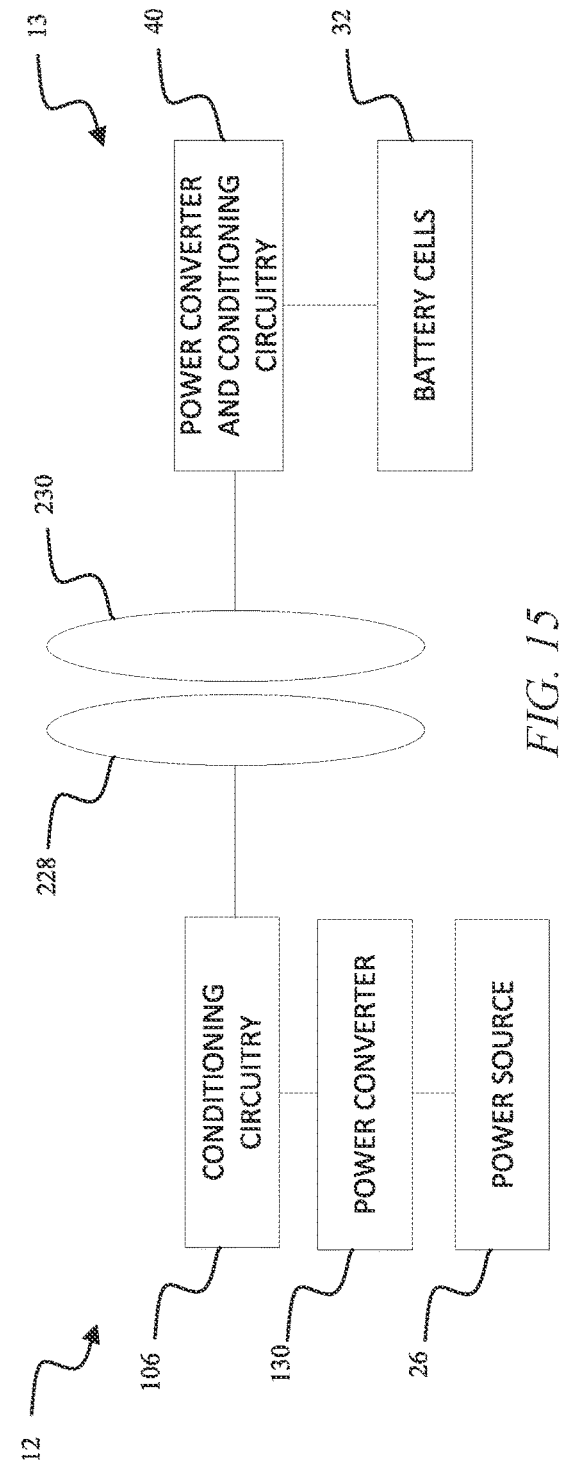
FIG. 15 is a block diagram illustrating magnetic resonance charging between a wireless charging device and a battery pack of FIG. 1 according to one example embodiment.

FIG. 15 illustrates the wireless charging using magnetic resonance power transfer between the wireless charging device 12 and a battery pack 13 according to one example embodiment. In the example illustrated, the wireless power transmitter 104 is implemented as a magnetic resonance transmitting coil 228 and the wireless power receiver 34 is implemented as a magnetic resonance receiving coil 230. The wireless charging device 12 includes the magnetic resonance transmitting coil 228 coupled to the power source 26 through the power converter 130 and the conditioning circuitry 106. The battery pack 13 includes the magnetic resonance receiving coil 230 coupled to the battery cells 32 through the power converter and conditioning circuitry 40.

Figure 16A:
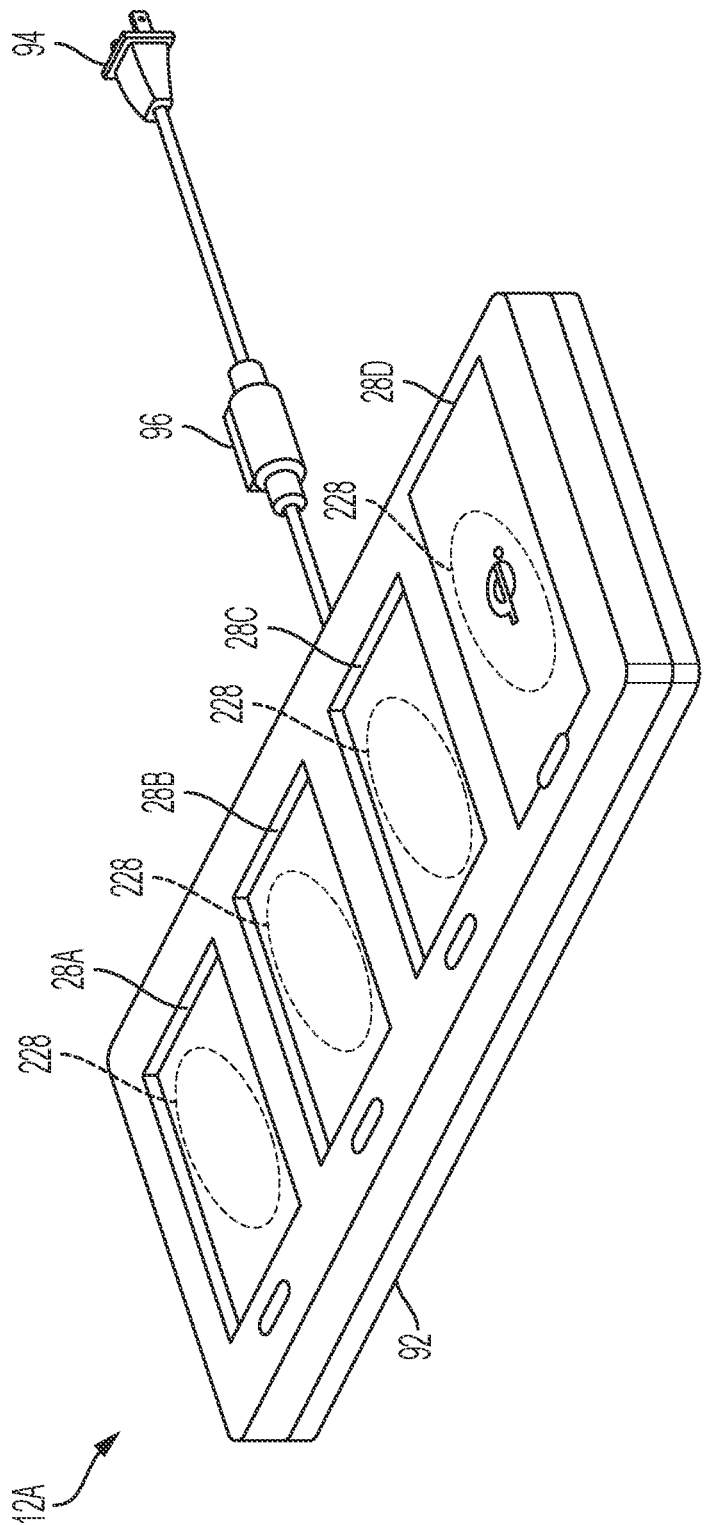
FIG. 16A-16B illustrate positioning of magnetic resonance charging elements of FIG. 15 in a wireless charging device and a battery pack of FIG. 1 according to one example embodiment.
Figure 16B:
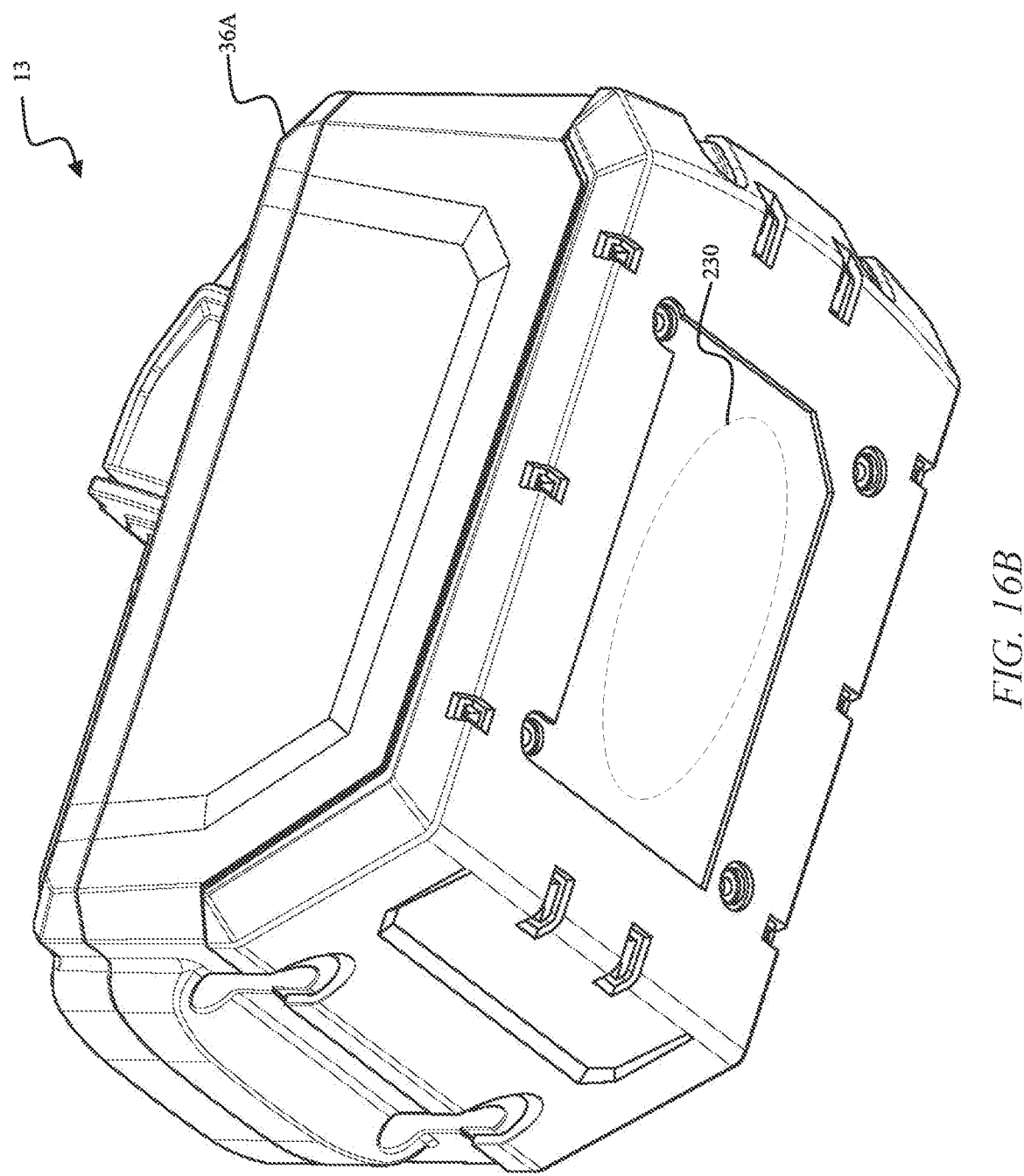

As shown in FIG. 16A, the magnetic resonance transmitting coil 228 is provided in the charging station 28. The magnetic resonance transmitting coil 228 may be overmolded into the housing portion of the charging station 28. For example, the magnetic resonance transmitting coil 228 may be embedded in the plastic housing of the charging station 28. Similarly, as shown in FIG. 16B, the magnetic resonance receiving coil 230 is provided in the bottom portion of the housing 36 of the battery pack 13. The magnetic resonance receiving coil 230 may be overmolded into the bottom portion of the housing 36 of the battery pack 13. For example, the magnetic resonance receiving coil 230 may be embedded in the bottom portion of the plastic housing of the battery pack 13.

Compared to inductive power transfer, alignment between the magnetic resonance transmitting coil 228 and the magnetic resonance receiving coil 230 does not improve the efficiency of the power transfer. Accordingly, alignment features need not be added when magnetic resonance charging is used such that the magnetic resonance transmitting coil 228 and the magnetic resonance receiving coil 230 can be loosely coupled. In some embodiments, to improve magnetic resonance power transfer additional clearance between the charging station 28 and the battery pack 13 may be provided. Typically, magnetic resonance power transfer is more efficient when the magnetic resonance transmitting coil 228 and the magnetic resonance receiving coil 230 are loosely coupled.

Referring back to FIG. 15, the power converter 130 receives AC power from the power source 26 and may use a step-up or step-down transformer to convert the AC power from a first level to a second level that is suitable for charging the battery pack 13. The AC power at the second level is provided to the magnetic resonance transmitting coil 228. The AC power is provided to the magnetic resonance transmitting coil 228 at a resonance frequency of the magnetic resonance receiving 230. In some embodiments, the power converter 130 may receive a DC power and convert the DC power to an AC power before providing the AC power to the magnetic resonance transmitting coil 228. In some embodiments, the power converter 130 may change the frequency, phase, and/or magnitude of the AC power as desired for providing charging power to the magnetic resonance transmitting coil 230.

The power converter 130 is controlled by the charger electronic processor 30 to provide the alternating current to the magnetic resonance transmitting coil 228. The alternating current through the magnetic resonance transmitting coil 228 creates a magnetic field around the magnetic resonance transmitting coil 228. The magnetic field causes the magnetic resonance receiving coil 230 to resonate generating an alternating current in the magnetic resonance receiving coil 230. The magnetic resonance receiving coil 230 provides the alternative current to the power converter and conditioning circuitry 40. In one example, the power converter and conditioning circuitry 40 converts the AC power received from the magnetic resonance receiving coil 230 into a DC power, which is provided to the battery cells 32 for charging the battery cells. The battery electronic processor 42 controls the power converter and conditioning circuitry 40 to convert the AC power to DC power. The power converter and conditioning circuitry 40 may include a rectifier to convert the AC power from the magnetic resonance receiving coil 230 to a DC power output provided to the battery cells 32.

Figure 17:
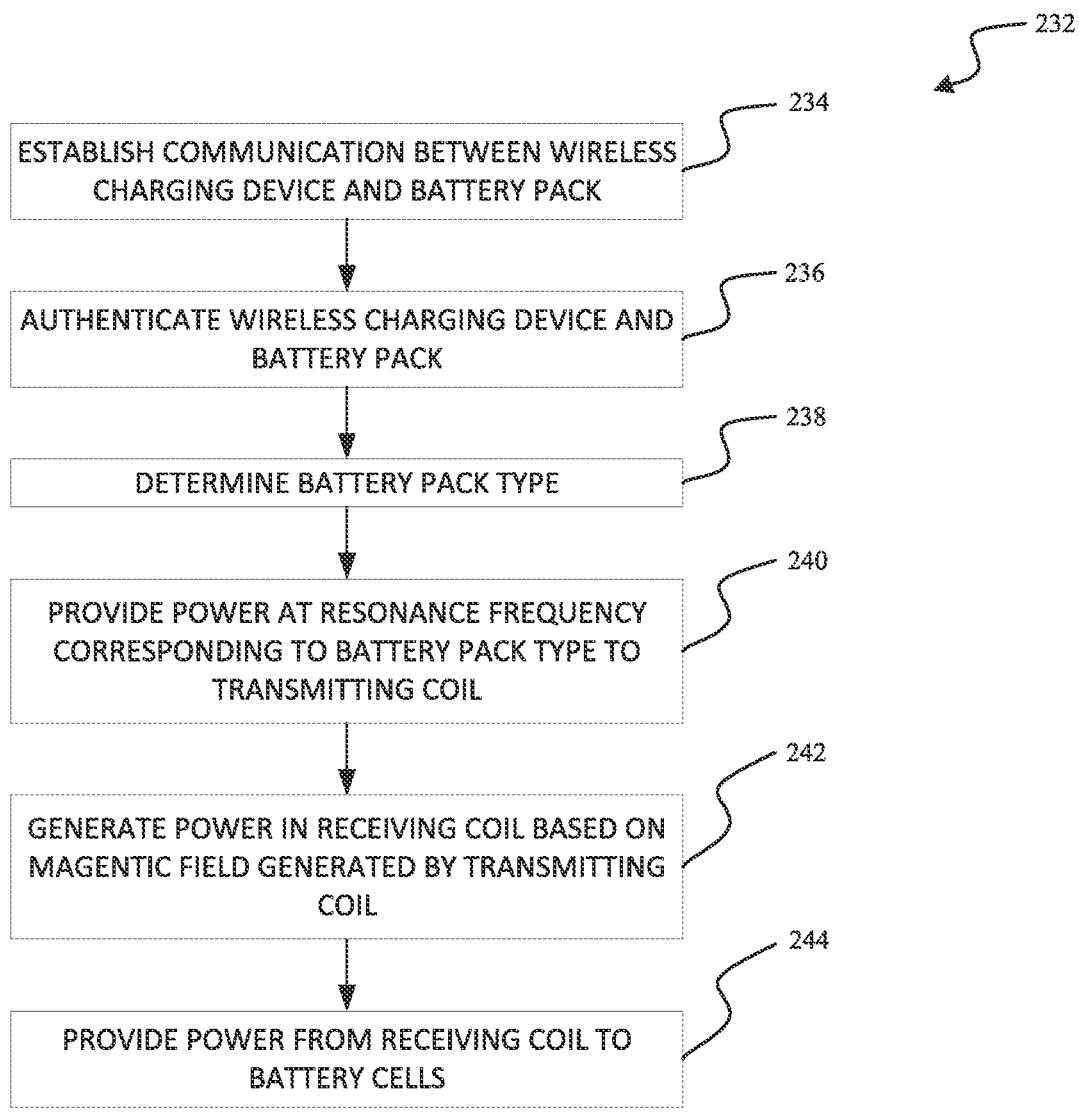
FIG. 17 is a flowchart of a method for magnetic resonance charging of a battery pack of FIG. 1 according to one example embodiment.

FIG. 17 is a flowchart illustrating one example method 232 for magnetic resonance charging of the battery pack 13. In the example illustrated, the method 232 includes blocks 234, 236, 238 that are similar to the block 216, 218, 220 of the method 214. Specifically, blocks 234, 236, 238 are directed to establishing communication between the wireless charging device 12 and the battery pack 13, authenticating the wireless charging device 12 and the battery pack 13, and determining the battery pack type of the battery pack 13 as described above.

The method 232 includes providing power at a resonance frequency corresponding to the battery pack type to the magnetic resonance transmitting coil 228 (at block 240). Each battery pack type may have different magnetic resonance receiving coils 230 that resonate at different frequencies. For example, battery packs 13 manufactured by different entities may be may have different magnetic resonance receiving coils 230 that resonate at different frequencies particular to the manufacturer. The charger electronic processor 98 controls the power converter 130 to provide power at the resonance frequency to the magnetic resonance transmitting coil 228 corresponding to the battery pack type identified by the charger electronic processor 98. The charger electronic processor 98 controls the power converter 130 to provide alternating current to the transmitting coil 210 at a certain frequency, phase, and/or magnitude corresponding to the battery pack type.

The method 232 includes generating power in the magnetic resonance receiving coil 230 based on a magnetic field generated by the magnetic resonance transmitting coil 228 (at block 242). The alternating current flowing through the magnetic resonance transmitting coil 238 generates a magnetic field. The magnetic field causes the magnetic resonance receiving coil 230 to resonate and correspondingly generate an alternating current in the magnetic resonance receiving coil 230.

The method 232 includes providing the power from the magnetic resonance receiving coil 230 to the battery cells 32 (at block 244). The battery electronic processor 42 controls the power converter and conditioning circuitry 40 to convert the alternating current generated in the magnetic resonance receiving coil 230 to direct current. The power converter and conditioning circuitry 40 may include, for example, a rectifier to convert the alternating current to direct current. The direct current is then provided to the battery cells 32 to charge the battery cells. It should be understood that the order of the blocks illustrated in FIG. 17 could vary and some blocks may not be performed. For example, blocks 234 and 236 may not be performed and the charging may commence without authentication.

Figure 18:
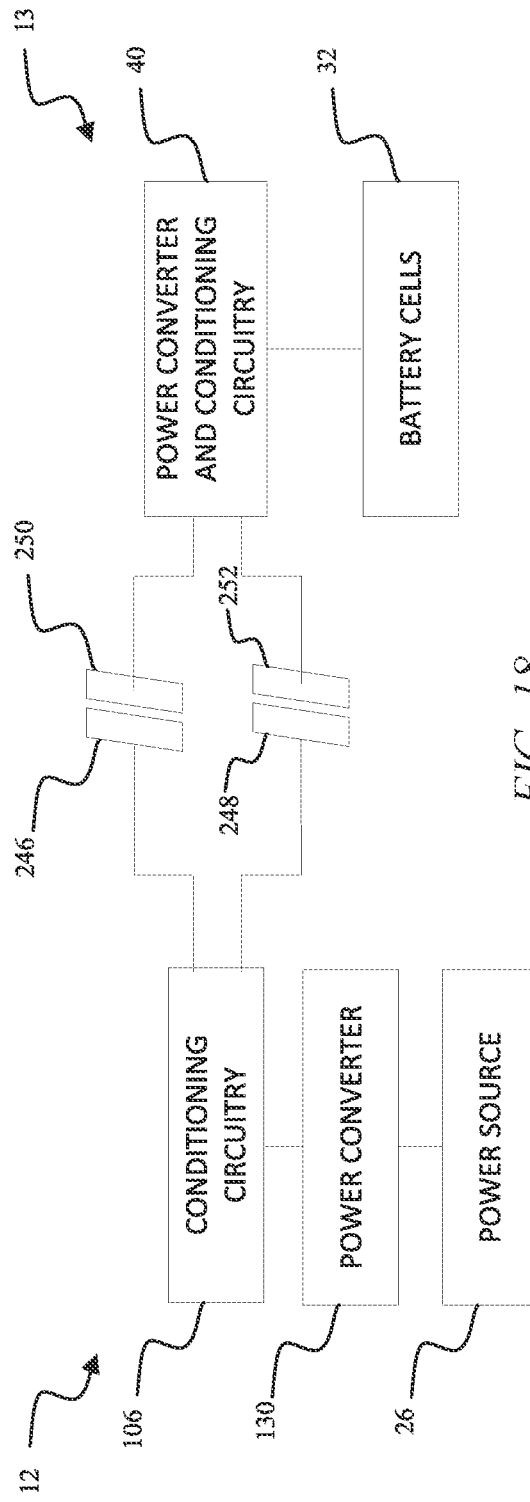
FIG. 18 is a block diagram illustrating capacitive charging between a wireless charging device and a battery pack of FIG. 1 according to one example embodiment.

FIG. 18 illustrates the wireless charging using capacitive power transfer between the wireless charging device 12 and a battery pack 13 according to one example embodiment. In the example illustrated, the wireless power transmitter 104 is implemented as capacitive plates, specifically, a positive transmitting capacitive plate 246 and a negative transmitting capacitive plate 248. The wireless power receiver 34 is implemented as capacitive plates, specifically, a positive receiving capacitive plate 250 and a negative receiving capacitive plate 252. The wireless charging device 12 includes the transmitting capacitive plates 246, 248 coupled to the power source 26 through the power converter 130 and the conditioning circuitry 106. The battery pack 13 includes the receiving capacitive plates 250, 252 coupled to the battery cells 32 through the power converter and conditioning circuitry 40.

Figure 19A:
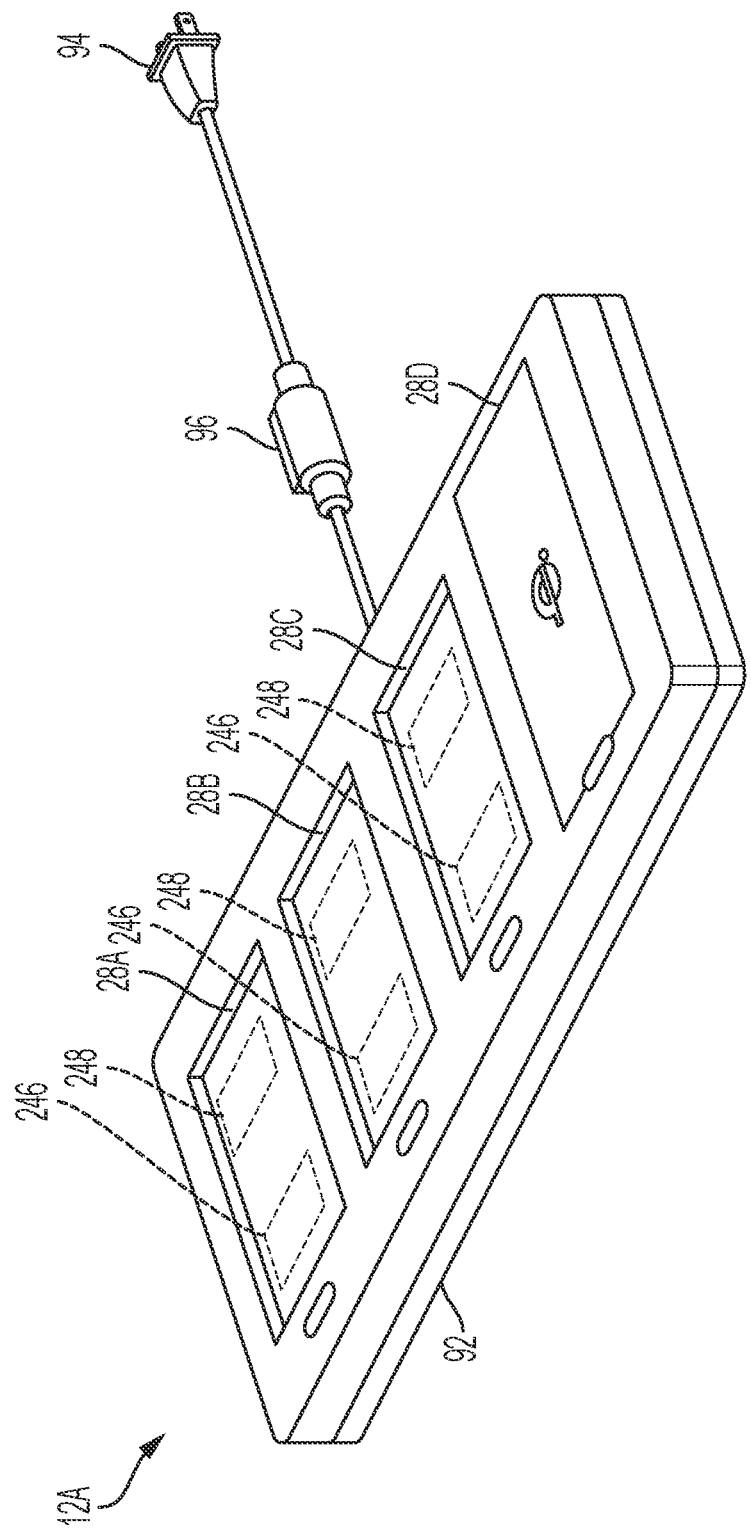
FIG. 19A-19B illustrates positioning of capacitive charging elements of FIG. 18 in a wireless charging device and a battery pack of FIG. 1 according to one example embodiment.
Figure 19B:
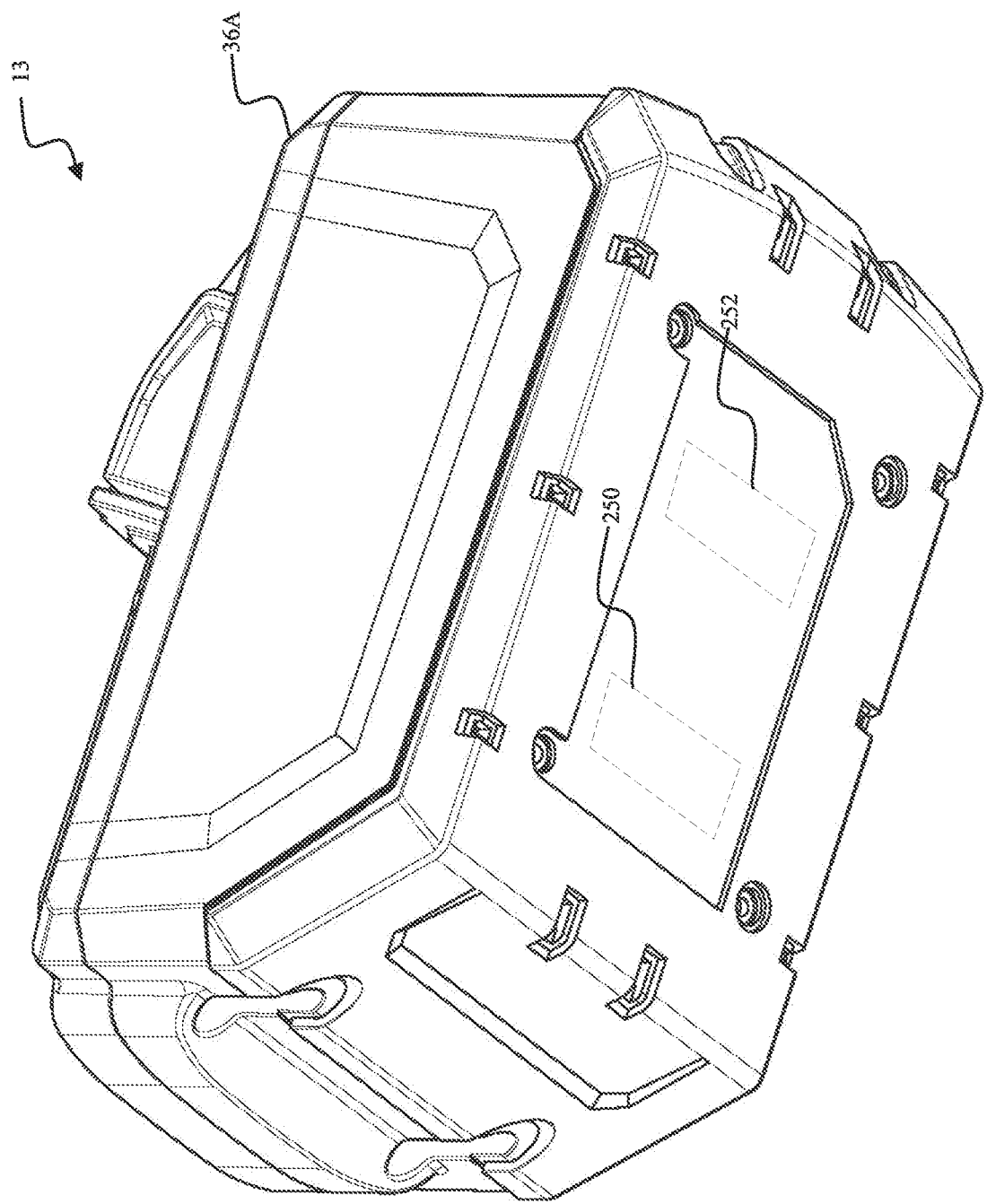

As shown in FIG. 19A, the transmitting capacitive plates 246, 248 are provided in the charging station 28. The transmitting capacitive plates 246, 248 may be overmolded into the housing portion of the charging station 28. For example, the transmitting capacitive plates 246, 248 may be embedded in the plastic housing of the charging station 28. Similarly, as shown in FIG. 19B, the receiving capacitive plates 250, 252 is provided in the bottom portion of the housing 36 of the battery pack 13. The receiving capacitive plates 250, 252 may be overmolded into the bottom portion of the housing 36 of the battery pack 13. For example, the receiving capacitive plates 250, 252 may be embedded in the bottom portion of the plastic housing of the battery pack 13.

In some embodiments, alignment features may be provided on the charging station 28 and the battery pack 12. For example, a recess may be provided in the charging station 28 that receives a corresponding projection provided in the housing 36 of the battery pack 13. Efficiency of the capacitive charging may be reduced when the transmitting capacitive plates 246, 248 is not aligned with the receiving capacitive plates 250, 252. The alignment features help in the alignment of the transmitting capacitive plates 246, 248 and the receiving capacitive plates 250, 252 to increase the efficiency of power transfer between the transmitting capacitive plates 246, 248 and the receiving capacitive plates 250, 252.

Referring back to FIG. 18, the power converter 130 receives AC power from the power source 26 and may use a step-up or step-down transformer to convert the AC power from a first level to a second level that is suitable for charging the battery pack 13. The AC power at the second level is provided to the transmitting capacitive plates 246, 248. In some embodiments, the power converter 130 may receive a DC power and convert the DC power to an AC power before providing the AC power to the transmitting capacitive plates 246, 248. In some embodiments, the power converter 130 may change the frequency, phase, and/or magnitude of the AC power as desired for providing charging power to the transmitting capacitive plates 246, 248.

The power converter 130 is controlled by the charger electronic processor 30 to provide the alternating current to the transmitting capacitive plates 246, 248. The alternating current provided to the transmitting capacitive plates 246, 248 creates an electric field around the transmitting capacitive plates 246, 248. The electric field induces an alternating electromotive force that creates an alternating current in the receiving capacitive plates 250, 252. The receiving capacitive plates 250, 252 provides the alternative current to the power converter and conditioning circuitry 40. In one example, the power converter and conditioning circuitry 40 converts the AC power received from the receiving capacitive plates 250, 252 into a DC power, which is provided to the battery cells 32 for charging the battery cells. The battery electronic processor 42 controls the power converter and conditioning circuitry 40 to convert the AC power to DC power. The power converter and conditioning circuitry 40 may include a rectifier to convert the AC power from the receiving capacitive plates 250, 252 to a DC power output provided to the battery cells 32.

Figure 20:
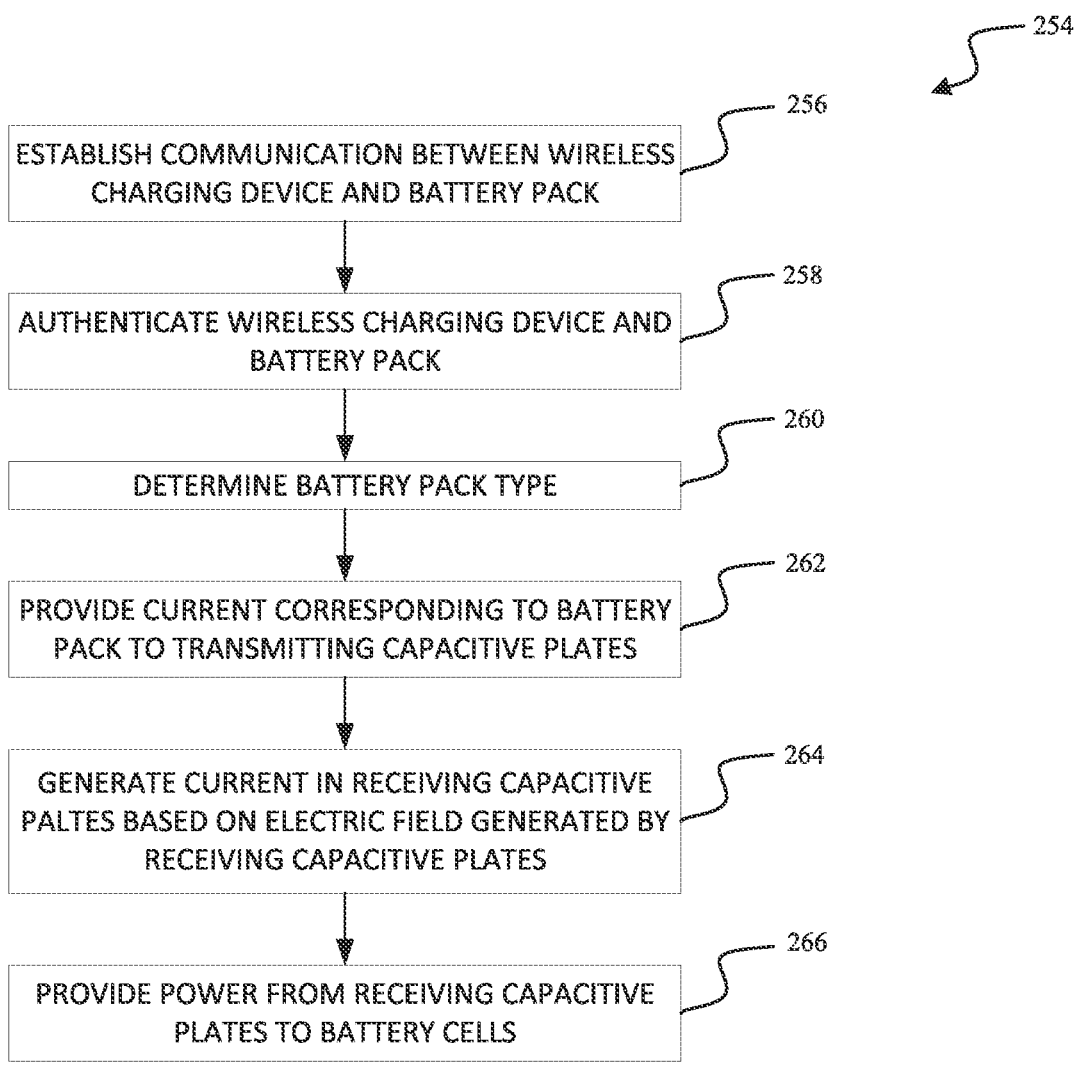
FIG. 20 is a flowchart of a method for capacitive charging of a battery pack of FIG. 1 according to one example embodiment.

FIG. 20 is a flowchart illustrating one example method 254 for capacitive charging of the battery pack 13. In the example illustrated, the method 254 includes blocks 256, 258, 260 that are similar to the block 216, 218, 220 of the method 214. Specifically, blocks 256, 258, 260 are directed to establishing communication between the wireless charging device 12 and the battery pack 13, authenticating the wireless charging device 12 and the battery pack 13, and determining the battery pack type of the battery pack 13 as described above.

The method 254 includes providing current corresponding to the battery pack type to the transmitting capacitive plates 246, 248 (at block 262). Each battery pack type may have different charging requirements. For example, the heavy duty battery pack 13B may be charged at a higher voltage and higher current than other battery packs 13A, 13C. Additionally, battery packs 13 manufactured by different entities may be charged at different voltages and/or currents. The charger electronic processor 98 controls the power converter 130 to provide current to the transmitting capacitive plates 246, 248 corresponding to the battery pack type identified by the charger electronic processor 98. The charger electronic processor 98 controls the power converter 130 to provide alternating current to the transmitting capacitive plates 246, 248 at a certain frequency, phase, and/or magnitude corresponding to the battery pack type.

The method 254 includes generating current in the receiving capacitive plates 250, 252 based on an electric field generated by the transmitting capacitive plates 246, 248 (at block 264). The alternating current flowing to the transmitting capacitive plates 246, 248 generates an electric field. The electric field generates an alternating current in the receiving capacitive plates 250, 252. The amount of current generated in the receiving capacitive plates 250, 252 depends on the distance, alignment, and/or size differential between the transmitting capacitive plates 246, 248 and the receiving capacitive plates 250, 252. As discussed above, efficiency can be improved by providing alignment features on the wireless charging device 12 and the battery pack 13.

The method 254 includes providing the power from the receiving capacitive plates 250, 252 to the battery cells 32 (at block 266). The battery electronic processor 42 controls the power converter and conditioning circuitry 40 to convert the alternating current generated in the receiving capacitive plates 250, 252 to direct current. The power converter and conditioning circuitry 40 may include, for example, a rectifier to convert the alternating current to direct current. The direct current is then provided to the battery cells 32 to charge the battery cells. It should be understood that the order of the blocks illustrated in FIG. 20 could vary and some blocks may not be performed. For example, blocks 256 and 258 may not be performed and the charging may commence without authentication.

Figure 21:
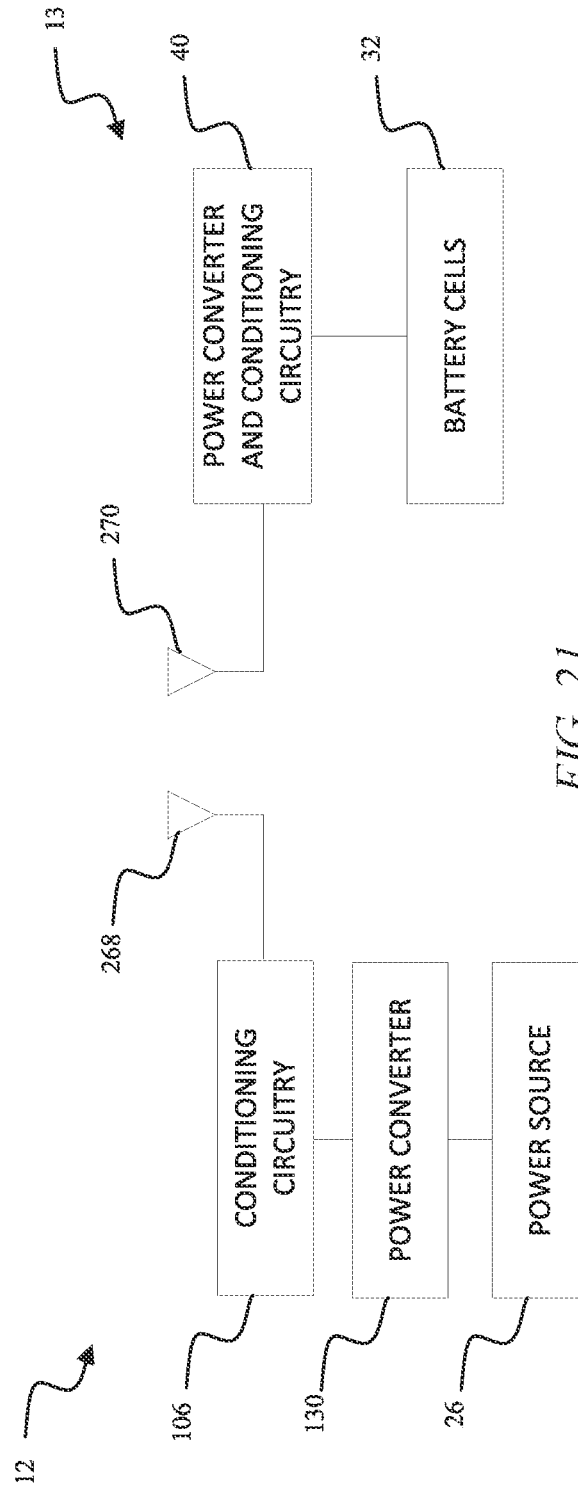
FIG. 21 is a block diagram illustrating radio frequency (RF) charging between a wireless charging device and a battery pack of FIG. 1 according to one example embodiment.

FIG. 21 illustrates the wireless charging using radio frequency (RF) power transfer between the wireless charging device 12 and a battery pack 13 according to one example embodiment. In the example illustrated, the wireless power transmitter 104 is implemented as a transmitting antenna 268 and the wireless power receiver 34 is implemented as a receiving antenna 270. The wireless charging device 12 includes the transmitting antenna 268 coupled to the power source 26 through the conditioning circuitry 106 and the power converter 130. The battery pack 13 includes the receiving antenna 270 coupled to the battery cells 32 through the power converter and conditioning circuitry 40.

Figure 22A:
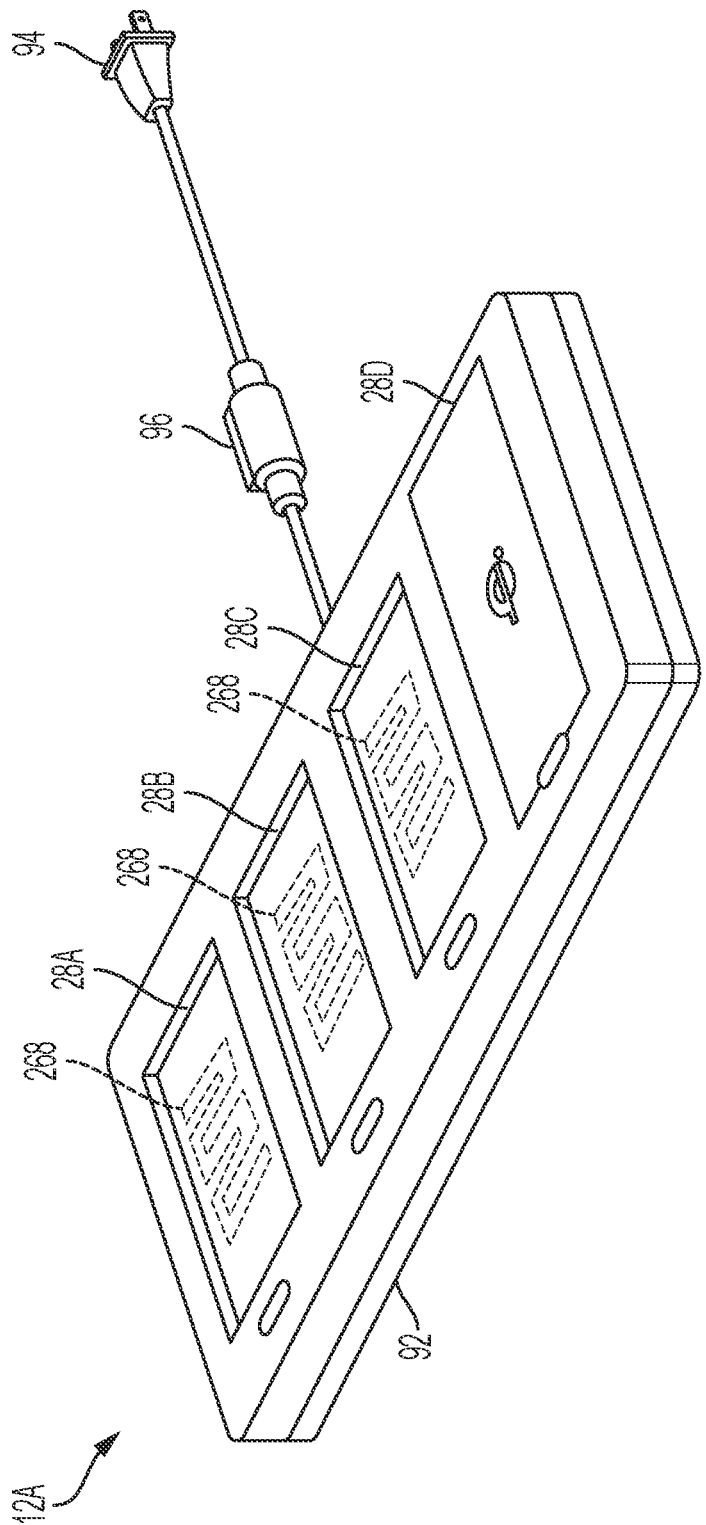
FIG. 22A-22B illustrate positioning of RF charging elements of FIG. 21 in a wireless charging device and a battery pack of FIG. 1 according to one example embodiment.
Figure 22B:
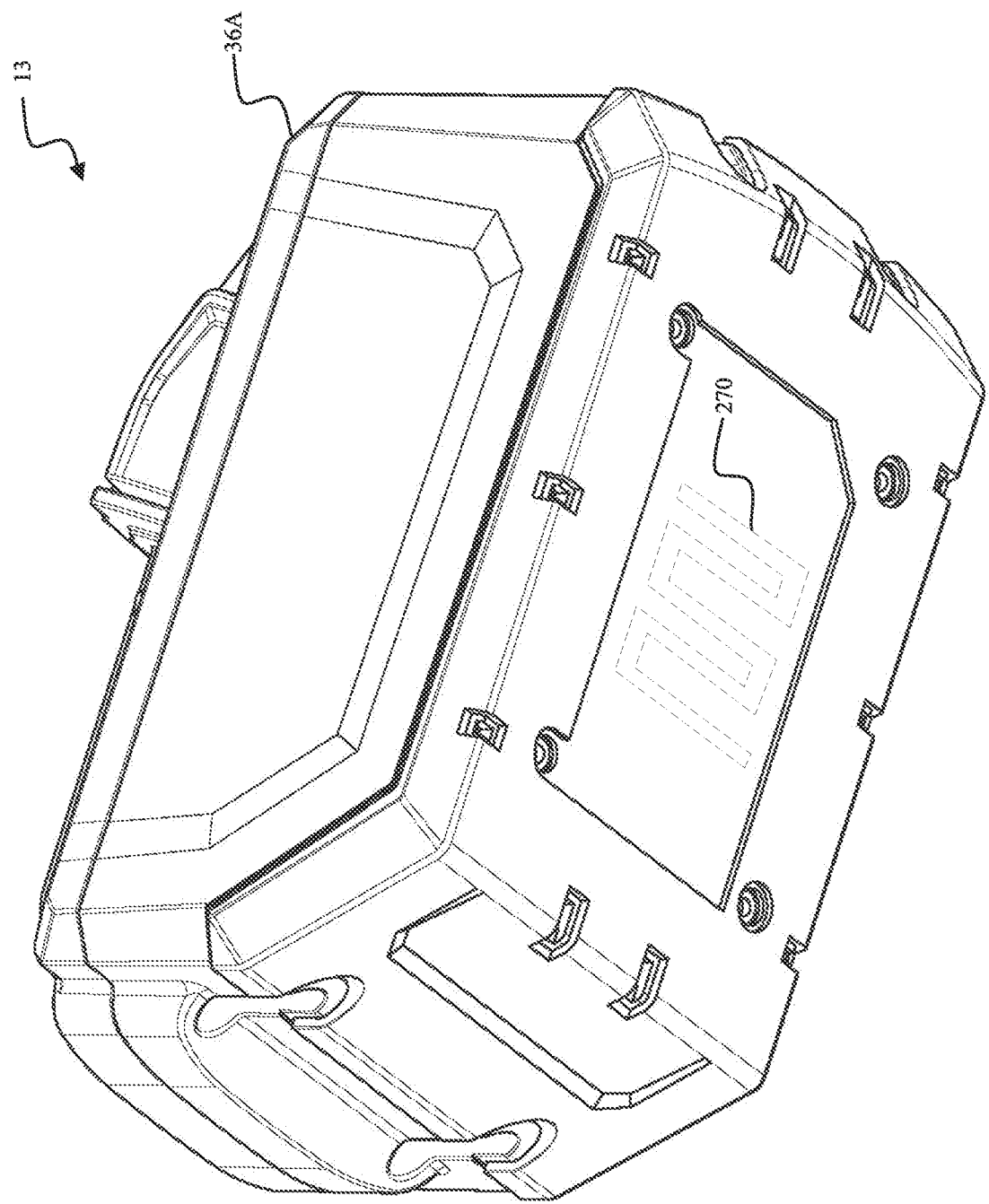

As shown in FIG. 22A, the transmitting antenna 268 is provided in the charging station 28. The transmitting antenna 268 may be provided at any location of the wireless charging device 12 including being overmolded into the housing portion of the charging station 28. Similarly, as shown in FIG. 22B, the receiving antenna 270 may be provided at any location of the battery pack 13 including being overmolded into the housing 36 of the battery pack 13. For example, the receiving antenna 270 may be embedded in the bottom portion of the plastic housing of the battery pack 13.

RF power transfer is a far-field power transfer technique that does not need the transmitting antenna 268 and the receiving antenna 270 to be aligned. Additionally, the battery pack 13 can be placed away from the wireless charging device 12 and still be charged by the wireless charging device.

Referring back to FIG. 21, the power converter 130 receives AC power from the power source 26 and may use a step-up or step-down transformer to convert the AC power from a first level to a second level that is suitable for charging the battery pack 13. The conditioning circuitry 106 conditions the AC power to match the frequency for wireless power transmission and to match the impedance of the wireless power transmission network. For example, the conditioning circuitry 106 may convert the power to microwave radio frequency for transmission by the transmitting antenna 268. In some embodiments, the power converter 130 may receive a DC power and convert the DC power to an AC power before providing the AC power to the transmitting coil 210. In some embodiments, the power converter 130 may change the frequency, phase, and/or magnitude of the AC power as desired for providing charging power to the transmitting antenna 268.

The power converter 130 and the conditioning circuitry 106 are controlled by the charger electronic processor 30 to provide the RF signals to the transmitting antenna 268. The RF signals are transmitted by the transmitting antenna 268 and received by the receiving antenna 270. The receiving antenna 270 is implemented as, for example, a rectifying antenna. The receiving antenna 270 receives the RF signals transmitted by the transmitting antenna 268 and converts the RF signals into direct current power. The direct current power can then be conditioned by the power converter and conditioning circuitry 40 and provided to the battery cells 32 for charging. The battery electronic processor 42 controls the receiving antenna 270 and the power converter and conditioning circuitry 40 to convert the RF signals to DC power.

Figure 23:
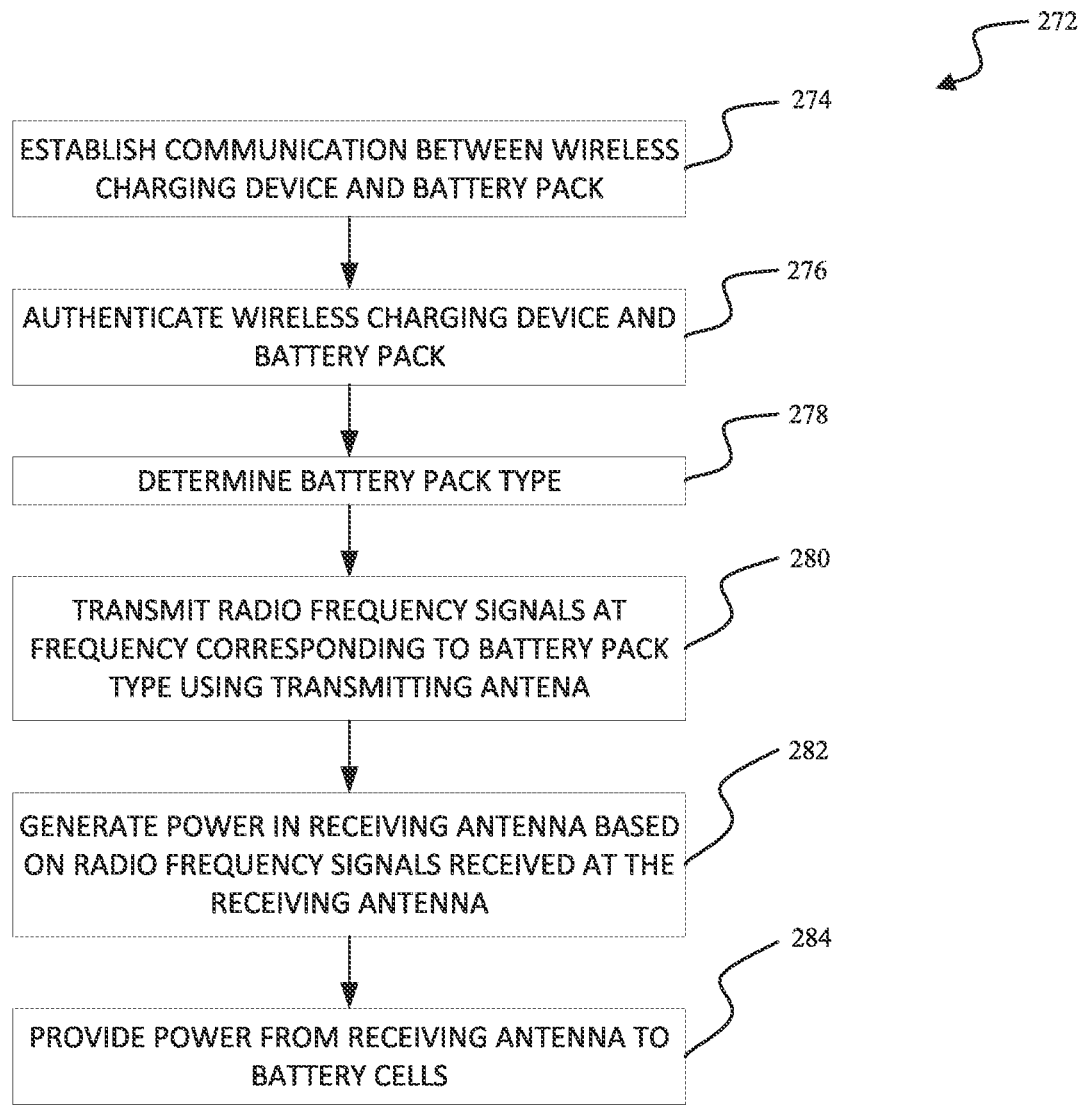
FIG. 23 is a flowchart of a method for RF charging of a battery pack of FIG. 1 according to one example embodiment.

FIG. 23 is a flowchart illustrating one example method 272 for RF charging of the battery pack 13. In the example illustrated, the method 272 includes blocks 274, 276, 278 that are similar to the block 216, 218, 220 of the method 214. Specifically, blocks 274, 276, 278 are directed to establishing communication between the wireless charging device 12 and the battery pack 13, authenticating the wireless charging device 12 and the battery pack 13, and determining the battery pack type of the battery pack 13 as described above.

The method 272 includes transmitting radio frequency signals at a frequency corresponding to the battery pack type using the transmitting antenna 268 (at block 280). Each battery pack type may have different charging requirements. For example, the heavy duty battery pack 13B may be charged at a higher voltage and higher current than other battery packs 13A, 13C. Additionally, battery packs 13 manufactured by different entities may be charged with RF signals tuned to different frequencies. The charger electronic processor 98 controls the power converter 130 and the conditioning circuitry 106 to provide RF signals corresponding to the battery pack type identified by the charger electronic processor 98.

The method 272 includes generating power in the receiving antenna 270 based on the RF signals received at the receiving antenna 270 (at block 282). As discussed above, the receiving antenna 270 may be implemented as a rectenna (that is, a rectifying antenna). The receiving antenna 270 converts the RF signals into DC power that is provided to the conditioning circuitry. In some embodiments, the conditioning circuitry 106 of the wireless charging device 12 and the power converter and conditioning circuitry 40 include impedance matching circuits that tune the respective antennas 268, 270 to maximize power transfer. The charger electronic processor 98 and the battery pack electronic processor 42 may coordinate impedance matching using off-band communication between the wireless charging device 12 and the battery pack 13.

The method 272 includes providing the power from the receiving antenna 270 to the battery cells 32 (at block 284). The power converter and conditioning circuitry 40 may include a boost or buck circuit to convert the DC power to a suitable level for charging the battery cells 32. The battery electronic processor 42 controls the power converter and conditioning circuitry 40 to convert DC power from a first level to a second level that is suitable for charging the battery cells 32. It should be understood that the order of the blocks illustrated in FIG. 23 could vary and some blocks may not be performed. For example, blocks 274 and 276 may not be performed and the charging may commence without authentication.

Figure 24:
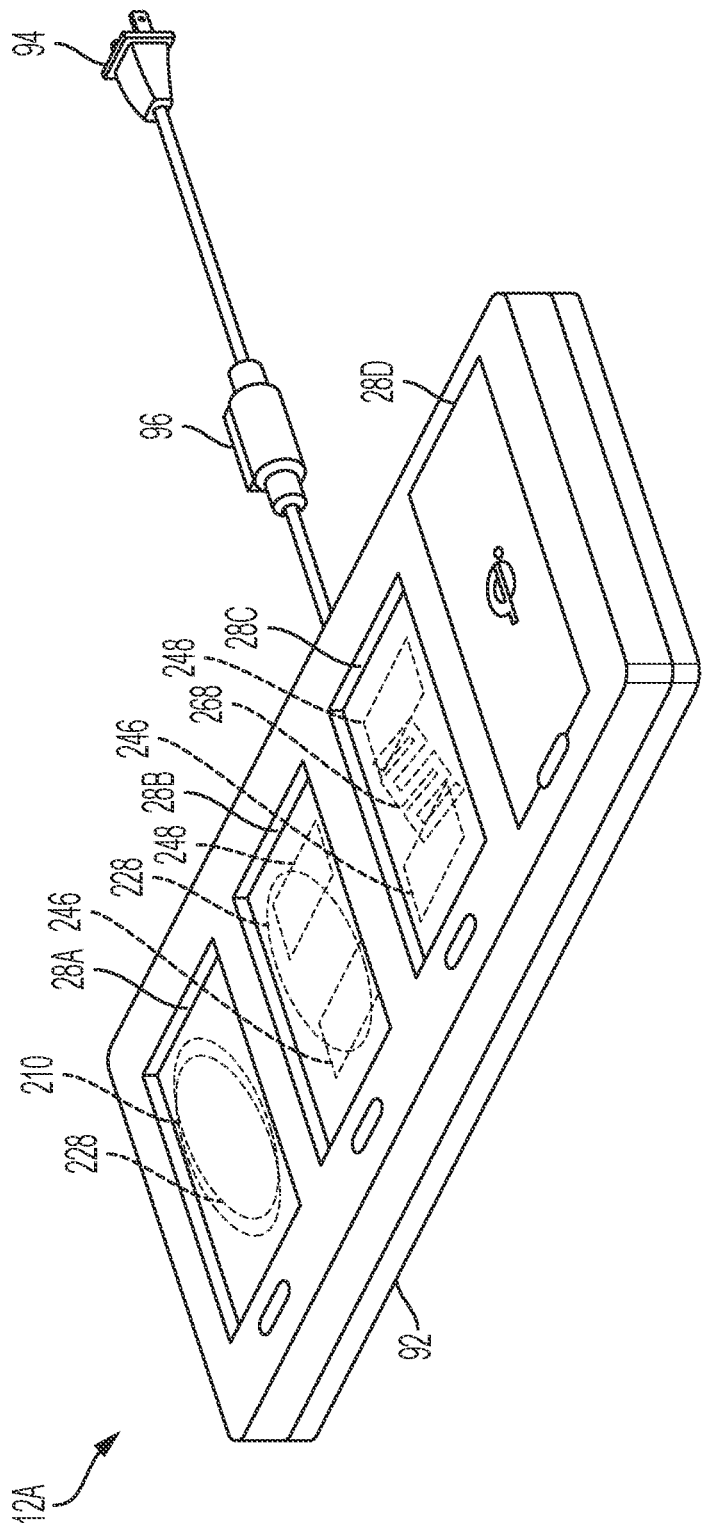
FIG. 24 illustrates a wireless charging device of FIG. 1 including a plurality of charging modalities according to one example embodiment.

In some embodiments, as shown in FIG. 24, wireless charging device 12 may charge battery packs 12 using more than one charging modality. Additionally, each charging station 28 may include more than one charging modality. In the example illustrated, the first charging station 28A can charge a battery pack 13 using both inductive charging via transmitting coil 210 and magnetic resonance charging using magnetic resonance transmitting coil 228. In some embodiments, the same transmitting coil can be used for both inductive charging and magnetic resonance charging by changing the parameters of the AC current provided to the transmitting coil. The second charging station 28B can charge a battery pack 13 using both inductive charging via transmitting coil 210 and capacitive charging via transmitting capacitive plates 246, 248. Alternatively or in addition to the transmitting coil 210, the second charging station 28B may also include a magnetic resonance transmitting coil 210 to charge using magnetic resonance transmitting coil 228. The third charging station 28C can charge a battery pack 13 using both capacitive charging via transmitting capacitive plates 246, 248 and RF charging via transmitting antenna 268. As such, the wireless charging device 12 and the charging stations 28 may perform both near-field (for example, inductive charging, magnetic resonance charging, and capacitive charging) and far-field (for example, RF charging) wireless power transfer for charging the battery packs 13. The wireless charging device 12 and the charging stations 28 may include any combination of the different charging modalities described above. FIG. 24 illustrates only an example of some of the possible combinations.

As explained previously herein, the charging station 28D may be configured to charge Qi-compatible devices, such as mobile phones, tablets, and the like. In some embodiments, other charging stations 28A, 28B, and/or 28C may also be configured to charge external devices 14 such as mobile phones, tablets, and the like. Accordingly, the wireless charging device 12 may be configured to charge one or more battery packs and one or more external devices 14 (with an integrated battery) simultaneously or at different times using a combination of the different charging modalities described above. For example, see smart phone 8174 of FIG. 60. Similarly, the wireless charging device 12 may also be configured to charge batteries inserted or integrated into another device (e.g., a lighting device, an adapter/converter, etc.) when the device is placed on one of the charging stations 28. For example, one or more batteries may be integrated into a head lamp, a flashlight, or another lighting device. When the head lamp, flashlight, or another lighting device is placed on one of the charging stations 28, the wireless charging device 12 may be configured to charge the one or more batteries integrated into the head lamp, flashlight, or other device. For example, see floodlight 8172 of FIG. 60 that includes an internal battery(ies) that may be wirelessly charged by the wireless charging devices 12 disclosed herein. In some embodiments, the floodlight 8172 also includes a universal serial bus (USB) port configured to receive a USB cable connected to a power supply that can also be used to charge the internal battery(ies) of the floodlight 8172.

When a battery pack 13, an external device 14, or other device with an internal battery is received at the wireless charging device 12, the wireless charging device 12 may perform the blocks 216, 218, 220 of method 214 of FIG. 14 to authenticate and determine the type of device to be charged (e.g., the battery pack type of the battery pack 13). The wireless charging device 12 can then select one or more from the different charging modalities (that is, inductive charging, magnetic resonance charging, capacitive charging, and RF charging) to charge the battery pack 13, external device 14, or other device with an internal battery based on the type of device (e.g., battery pack type) that has been placed on the wireless charging device 12. The selection by the wireless charging device 12 may be automatic without user intervention once the type of device/battery pack type is detected. The wireless charging device 12 may perform the corresponding blocks in methods 214, 232, 254, and 272 to charge the battery pack/device based on the selected one or more charging modalities.

For the sake of improved readability, this disclosure refers to charging the "battery pack" 13 and identifying a "battery pack type" of the battery pack 13 that has been placed on/in the wireless charging device 12. However, it should be understood that descriptions included herein with respect to the "battery pack" 13 also apply to external devices 14 and other devices with an internal battery(ies) that may be charged by the wireless charging device 12. Similarly, it should be understood that descriptions included herein with respect to the "battery pack type" of different types of battery packs also apply to different general types of devices that may be charged by the wireless charging devices 12 (e.g., battery packs 13, external devices 14, and other devices with an internal battery(ies)). For example, the wireless charging device 12 may be configured to identify a battery pack 13A to be charged using a first wireless charging modality and may be configured to identify an external device 14 (e.g., a smart phone 8174 of FIGS. 60 and 61B) to be charged using a second wireless charging modality different from the first wireless charging modality. Continuing this example, the wireless charging device 12 may be configured to identify a third device with an internal battery(ies) (e.g., a lighting device such as the floodlight 8172 of FIG. 60) and charge the third device using the first wireless charging modality, the second wireless charging modality, or a third wireless charging modality different than the first and second wireless charging modalities.

Figure 25A:
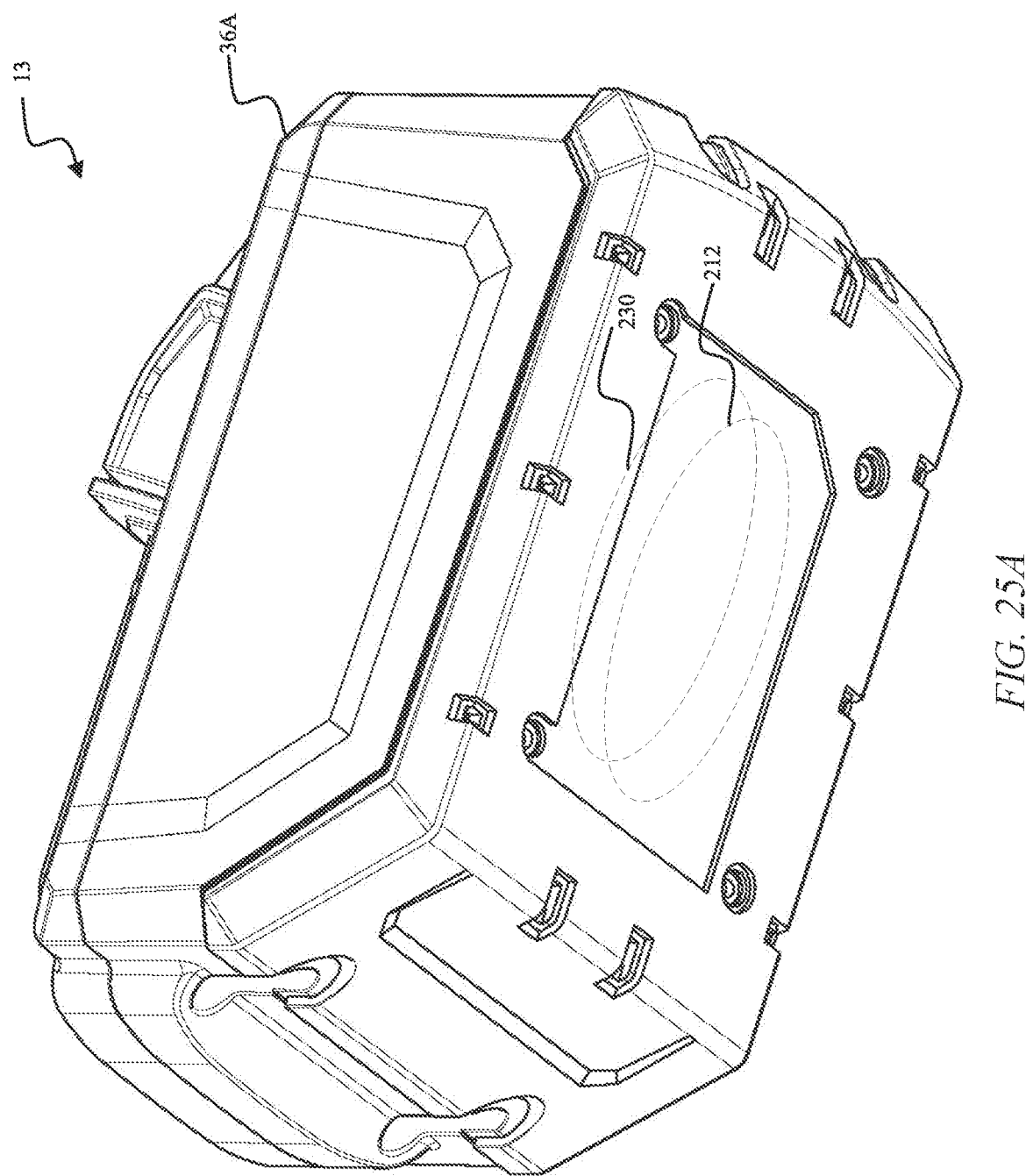
FIG. 25A-25C illustrate a battery pack of FIG. 1 including a plurality of charging modalities according to one example embodiment.
Figure 25B:
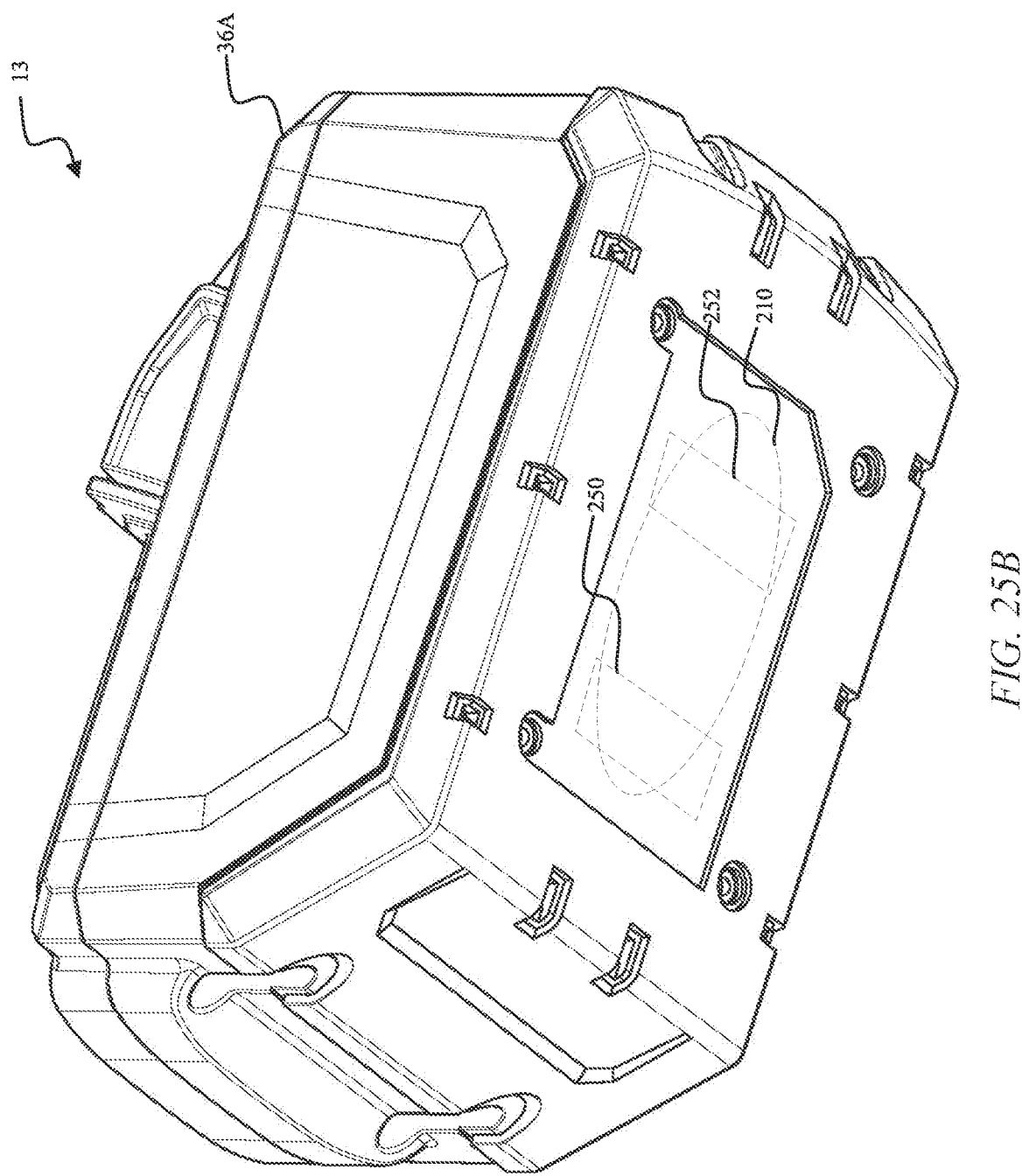
Figure 25C:
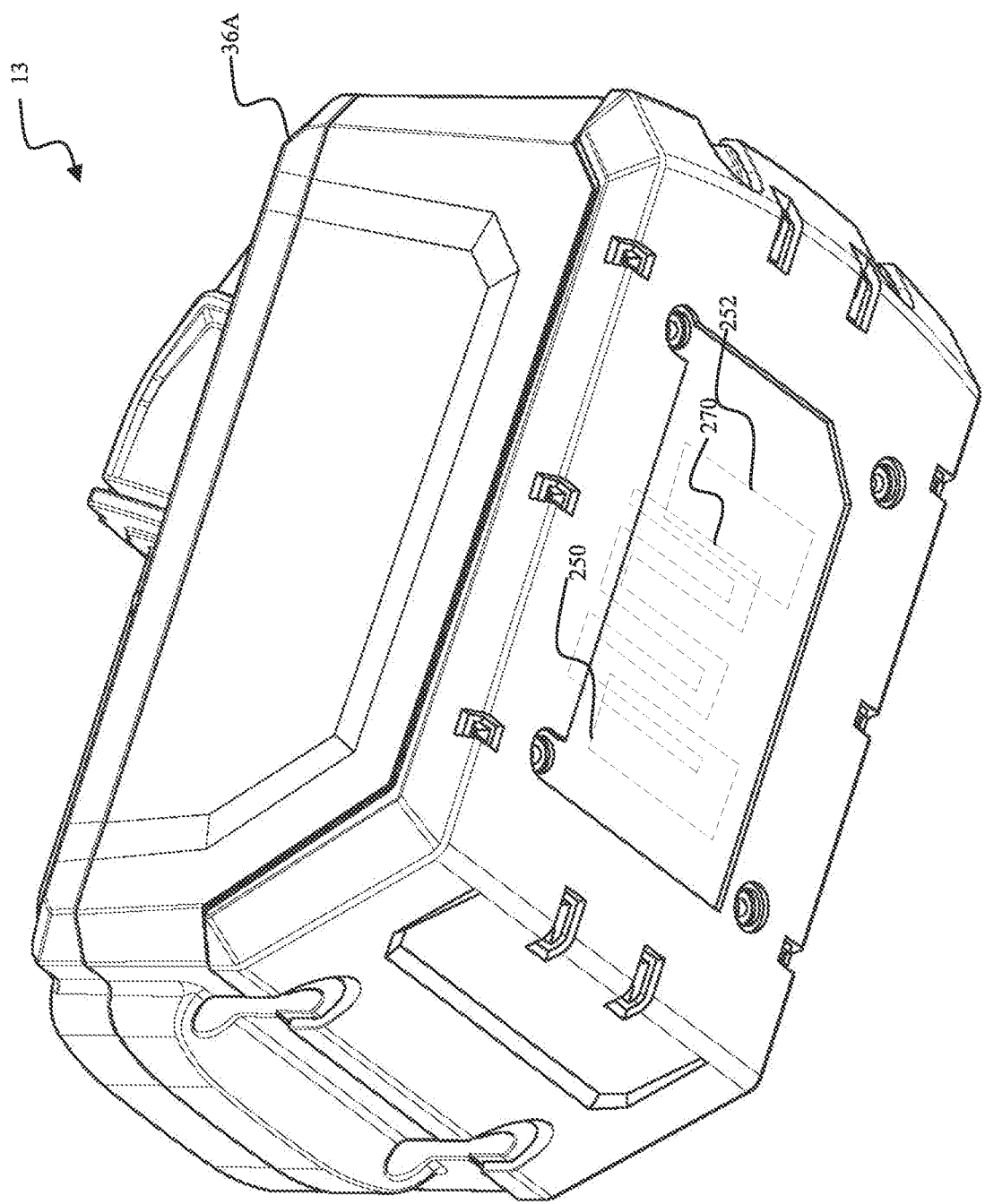

With reference to FIGS. 25A-25C, the battery pack 13 may be charged using more than one charging modality. In the example illustrated in FIG. 25A, the battery pack 13 can be charged by the wireless charging device 12 using both inductive charging via receiving coil 222 and magnetic resonance charging using magnetic resonance receiving coil 230. In some embodiments, the same receiving coil can be used for both inductive charging and magnetic resonance charging. In the example illustrated in FIG. 25B, the battery pack 13 can be charged by the wireless charging device 12 using both inductive charging via receiving coil 222 and capacitive charging using receiving capacitive plates 250, 252. Alternatively or in addition to the receiving coil 230, the second charging station 28B may also include a magnetic resonance receiving coil 230 to charge using magnetic resonance receiving coil 230. In the example illustrated in FIG. 25C, the battery pack 13 can be charged by the wireless charging device 12 using both capacitive charging using receiving capacitive plates 250, 252 and RF charging using receiving antenna 270. The battery pack 13 may include any combination of the different charging modalities described above. FIGS. 25A-25C illustrates only an example of some of the possible combinations.

In some embodiments, the wireless charging device 12 can charge a battery pack 13 using multiple charging modalities simultaneously. When the wireless charging device 12 detects the battery pack type of the battery pack 13, the charger electronic processor 98 may determine the charging modalities supported by the battery pack 13. The wireless charging device 12 may then charge the battery pack 13 using all or some of the charging modalities supported by the battery pack 13 to increase power transfer. For example, the wireless charging device 12 may charge the battery pack 13 using a first charging modality (for example, inductive charging) and a second charging modality (for example, capacitive charging). The power output by the wireless charging device 12 may be divided between the first charging modality and the second charging modality to improve efficiency.

In some embodiments, the wireless charging device 12 may automatically select the wireless charging modality selected based on the proximity and/or orientation of the battery pack 13 to optimize power transfer. For example, the wireless charging device 12 may select one or more of inductive charging and capacitive charging when the battery pack 13 is aligned with the charging station 28 of the wireless charging device 12. The wireless charging device 12 may select one or more of magnetic resonance charging and RF charging when the battery pack 13 is loosely coupled or is remote from the charging station 28. As discussed above, the wireless charging device 12 may determine the positioning and orientation of the battery pack 13 using the sensors 102.

Figure 26:
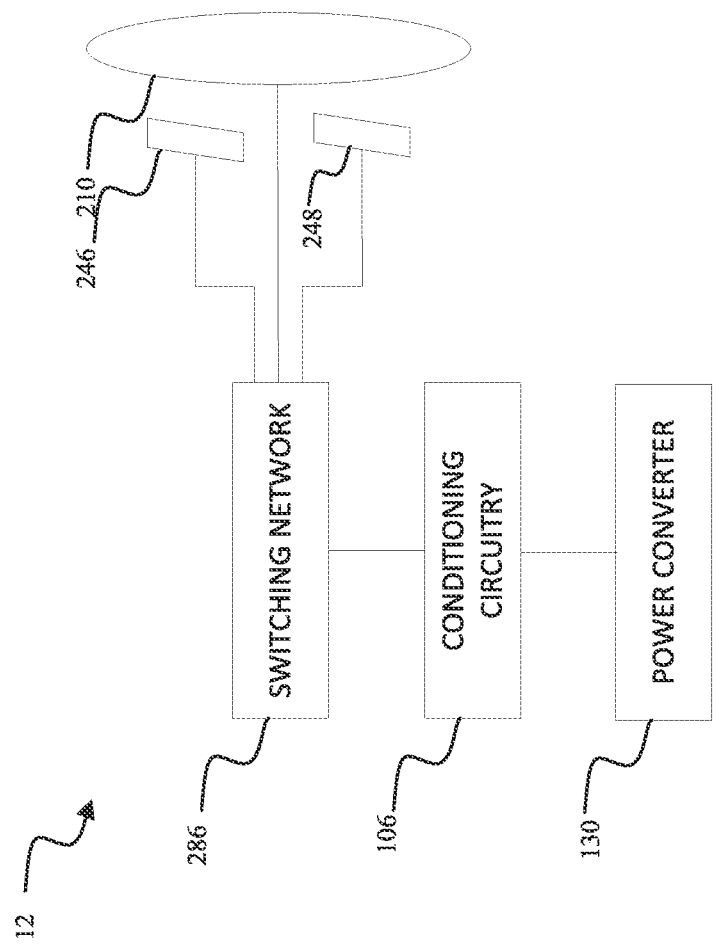
FIG. 26 illustrates a switching network of a wireless charging device of FIG. 1 according to one example embodiment.

In some embodiments, a switching network may be used to switch between the different charging modalities. FIG. 26 illustrates an example of a wireless charging device 12 that can switch between different charging modalities. In the example illustrated, the wireless charging device 12 includes a switching network 286 coupled between the conditioning circuitry 106 and a first charging modality (for example, a transmitting coil 210) and a second charging modality (for example, transmitting capacitive plates 246, 248). The switching network 286 includes a plurality of switches the selectively connect one or both of the first charging modality and the second charging modality to the power source 26 through the power converter 130 and the conditioning circuitry 106. In some embodiments, the switching network 286 may be included in the conditioning circuitry. The switching network 286 is controlled by the charger electronic processor 98 to selectively connect one or both of the first charging modality and the second charging modality to the conditioning circuitry 106. In some embodiments, the charger electronic processor 98 selects the first charging modality and/or the second charging modality for charging the battery pack 13 using the switching network 286 based on the determined battery pack type. The charging modality is therefore automatically switched without user intervention based on the determined battery pack type.

Figure 27:
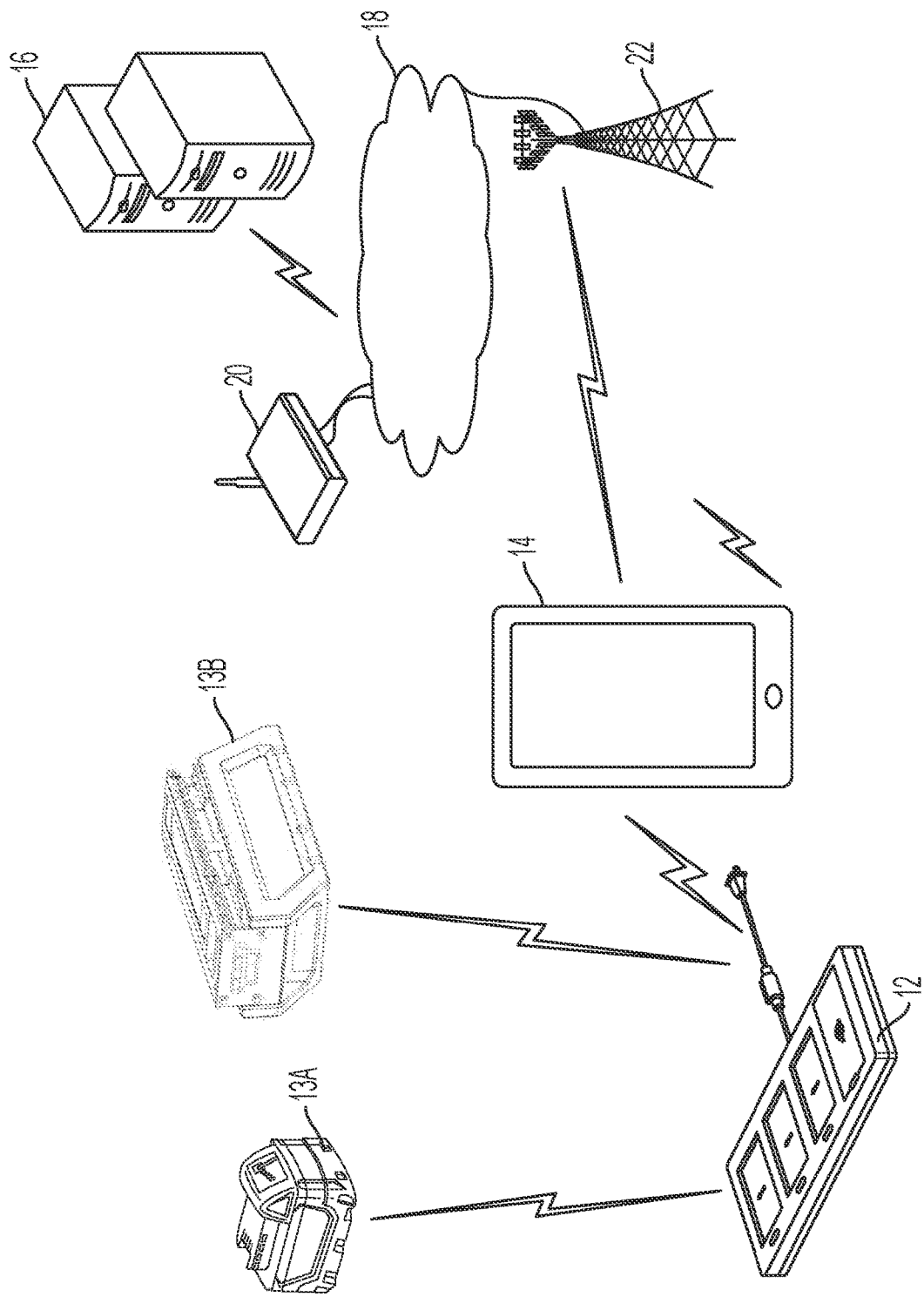
FIG. 27 is a block diagram illustrating exemplary communication capabilities of a wireless charging device of FIG. 1 according to one example embodiment.

Referring to FIG. 27, the wireless charging device 12 is capable of communicating with different battery packs 13A, 13B by different manufacturers and the external device 14. The wireless device 12 can also communicate with the remote server 16 either directly or through the external device 14. As discussed above, the wireless charging device includes a wireless communication device 74B that facilitates wireless communication with the various devices illustrated in FIG. 27. In one example, the wireless charging device 12 communicates with the battery pack 13A by a first manufacturer using a first communication protocol and communicates with the battery pack 13B by a second manufacturer using a second communication protocol. The wireless charging device 12 may determine which communication protocol to use based on an input or based on detecting the type and/or manufacturer of the battery packs 13A, 13B.

In some embodiments, the wireless charging device determines the charge status of different battery packs 13 and prioritizes charging based on the charge status of the battery packs 13 and/or current availability of the charger. In some embodiments, the wireless charging device 12 draws current from a first battery pack 13 to charge a second battery pack 13.

In some embodiments, the wireless charging device 12 communicates with the remote server 16 to access different databases of different manufacturers. The wireless charging device 12 may access a database in the remote server 16 to determine a type of the battery pack or a manufacturer of the battery pack based on the identification information (for example, an SKU number) received from the battery pack 13. The wireless charging device 12 may also access a database in the remote server 16 to determine the communication protocol and/or charging modality to use based on identifying the battery pack type of the battery pack 13.

In some embodiments, the wireless charging device 12 controls charging of the battery pack 13 based on a temperature of the battery pack 13. The wireless charging device 12 may determine a temperature of the battery pack 13 using, for example, the temperature sensor 150. The charger electronic processor 98 determines whether the temperature of the battery pack 13 is below a low-temperature threshold. When the temperature of the battery pack 13 is below a low-temperature threshold, the battery pack 13 may not accept any charging current. The charger electronic processor 98 prevents charging of the battery pack 13 when the temperature of the battery pack 13 is below a low-temperature threshold.

In some embodiments, the wireless charging device 12 may heat the battery pack 13 to bring the battery pack 13 above the low-temperature threshold and commence charging. The wireless charging device 12 may heat the battery cells 32 by discharging the battery cells 32. Discharging the battery cells 32 generates heat that may be sufficient to increase the temperature of the battery pack 13 above the low-temperature threshold. When the temperature of the battery pack 13 increases above the low-temperature threshold, the wireless charging device 12 may stop discharging the battery cells 32 and commence charging the battery pack 12 using the charging modalities as described above. In some embodiments, the wireless charging device 12 heats the battery pack 12 using the heating device 172. The heating device 172 includes, for example, a resistive heating element and/or an inductive heating element. The battery heating function may be automatically activated without user intervention when the charger electronic processor determines that the temperature of the battery pack 13 increases above the low-temperature threshold.

FIGS. 28-31 illustrate example screenshots of a user interface that may be displayed on any one or a combination of the displays 72, 100, 188, 196 of the battery pack 13, the wireless charging station 12, the wireless adapter 176, and the external device 14. As explained previously herein, the display 72, 100, 188, 196 may be a touch screen interface configured to receive user inputs to set or adjust wireless charging parameters as explained herein. In other embodiments, the device 13, 12, 176, 14 may include a separate input device (e.g., a keypad, keyboard, buttons, dials, mouse, etc.) configured to receive user inputs to set or adjust wireless charging parameters shown on the graphical user interfaces (GUIs) shown in FIGS. 28-31.

The below screenshots shown in FIGS. 28-31 are explained as being displayed on the display 196 of the external device 14. However, it should be understood that the screenshots and details explained below may be similarly shown on any of the displays 72, 100, 188 of other devices 13, 12, 176 of the communication system 10 of FIG. 1. Additionally, the remote server 16 may include a display configured to display a graphical user interface (GUI) similar to the screenshots described below and shown in FIGS. 28-31.

Figure 28:
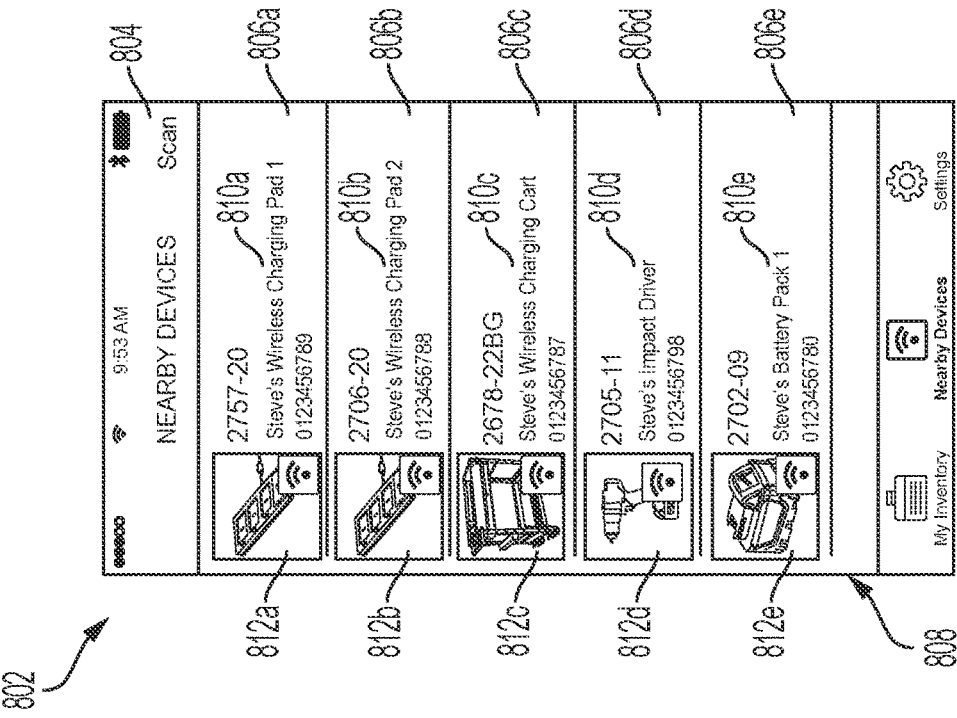

FIG. 28 illustrates a nearby devices screen 802 of a GUI on the display 196 of the external device 14. The nearby devices screen 802 is used to identify and communicatively pair with devices 12, 13, 176, and/or other devices (e.g., power tool devices) within wireless communication range of the external device 14. For instance, in response to a user selecting the "scan" input 804, the external device 14 scans a radio wave communication spectrum used by the devices 12, 13, 14, 176 to identify devices 12, 13, 176 within range that are advertising (e.g., periodically broadcasting their identification information that includes their unique identifier). The identified devices 12, 13, 176 that are advertising are then listed on the nearby devices screen 802. As shown in FIG. 28, in response to a scan, five devices that are advertising (advertising devices 806a-e) are listed in an identified device list 808. In some embodiments, the "scan" input 804 is not present or does not need to be pressed to cause the external device 14 to identify devices 12, 13, 176 within range that are advertising. Rather, the external device 14 may be configured to periodically scan for such devices or may be configured to be constantly capable of receiving identification information from such devices 12, 13, 176 when the devices 12, 13, 176 are within communication range of the external device. In some embodiments, when a device 12, 13, 176 is already communicatively paired with a different external device 14, the device 12, 13, 176 is not advertising and, as such, is not listed in the identified device list 808 even though the device 12, 13, 176 may be nearby (within wireless communication range of) the external device 14.

Identification information received from the advertising devices 806 may be used by the external device 14 to identify the device type of each advertising device 806. For example, a table of device types may be included in the memory 197 of the external device 14. The table may be indexable by the identification information received from the advertising devices 806, allowing the external device 14 to display the device type information 810 as shown in FIG. 28 (e.g., a part/serial number, an image 812 of the type of device, or other associated information of the device). In some embodiments, the device type information 810 includes a user-selected nickname or tag for the devices 806.

In some embodiments, identification information received from advertising device 806 is used to obtain further information about the device, when available. For instance, the identification information is sent to the server 16 and used as an index or search term for a database of device information that is stored in the server 16. For instance, the database may store and respond to the external device 14 with a device nickname (included in device type information 810), an icon (i.e., an image 812 of the type of device), and other device identifiers. As shown in the nearby devices screen 802, the advertising devices 806 include device type information 810 including the device nickname, the part/serial number, and the icon 812. In some instances, the advertising devices 806 provide some or all of the device type information 810 listed to the external device 14, rather than the external device 14 obtaining the device type information 810 from the server 16. In some instances, the external device 14 includes a cache of device information stored in the memory 197 for devices 12, 13, 176 previously paired with by the external device 14, and which is indexable by the received identification information from advertising devices 806. The cached device information may include the icon and other device type information 810.

In some embodiments, the external device 14 sends the identification information received from advertising devices 806 to the server 16 to allow the server 16 to determine whether the user associated with the external device 14 has permission to communicate with one or more of the advertising devices 806. In some embodiments, the external device 14 may not display nearby devices on the nearby devices screen 802 unless the server 16 indicates that the user associated with the external device 14 has permission to communicate with the advertising device 806. In other embodiments, the external device 14 may display all nearby advertising devices 806 for which identification information was received on the nearby devices screen 802 but may only allow the external device 14 to communicatively pair with advertising devices 806 that the server 16 has indicated that the user associated with the external device 14 has permission with which to communicate.

In some embodiments, the user may sort/filter the devices 806 shown in the identified device list 808 based on a type of device 806. For example, the user may provide a user input indicating the only wireless charging devices 12 should be shown or that only battery packs 13 should be shown.

From the nearby devices screen 802, the user can select one of the advertising devices 806 from the identified tool list 808 to communicatively pair with the selected advertising device 806. Each type of advertising device 806 with which the external device 108 can communicate may include an associated device graphical user interface stored in the memory 197 of the external device 14 or retrieved from the server 16 by the external device 14. Once a communicative pairing occurs between the external device 14 and an advertising device 806, the core application software 198 of the memory 197 of the external device 14 obtains the applicable device interface for the type of advertising device 806 that is paired with the external device 14. The touch screen display 196 then displays the applicable device interface. A device interface includes one or more screens enabling a user to obtain device operational data, configure one or more settings of the device 12, 13, 176, or both. For example, the external device 14 may allow the user to set charging parameters of a wireless charging device 12 as described in further detail below. The external device 14 may also allow the user to enable/disable charging of one or more charging station 28 of the wireless charging device 12 and/or of a battery pack 13. While some screens and options of a device interface are common to multiple interfaces of different types of advertising devices 806, generally, each device interface includes screens and options particular to the associated type of advertising device 806. The external device 14 and touch screen display 196 provide a user the ability to map additional functionality and configurations to the devices 12, 13, 176 to change the operation of the devices 12, 13, 176. Thus, in effect, the external device 14 provides an extended user interface for the devices 12, 13, 176 providing further customization and configuration of the devices 12, 13, 176. However, as noted previously herein, the GUIs shown in FIGS. 28-31 may be additionally or alternatively displayed on one or more of the displays 72, 100, 188 of the devices 12, 13, 176. Examples further explaining aspects and benefits of the extended user interface are found below.

Figure 29:
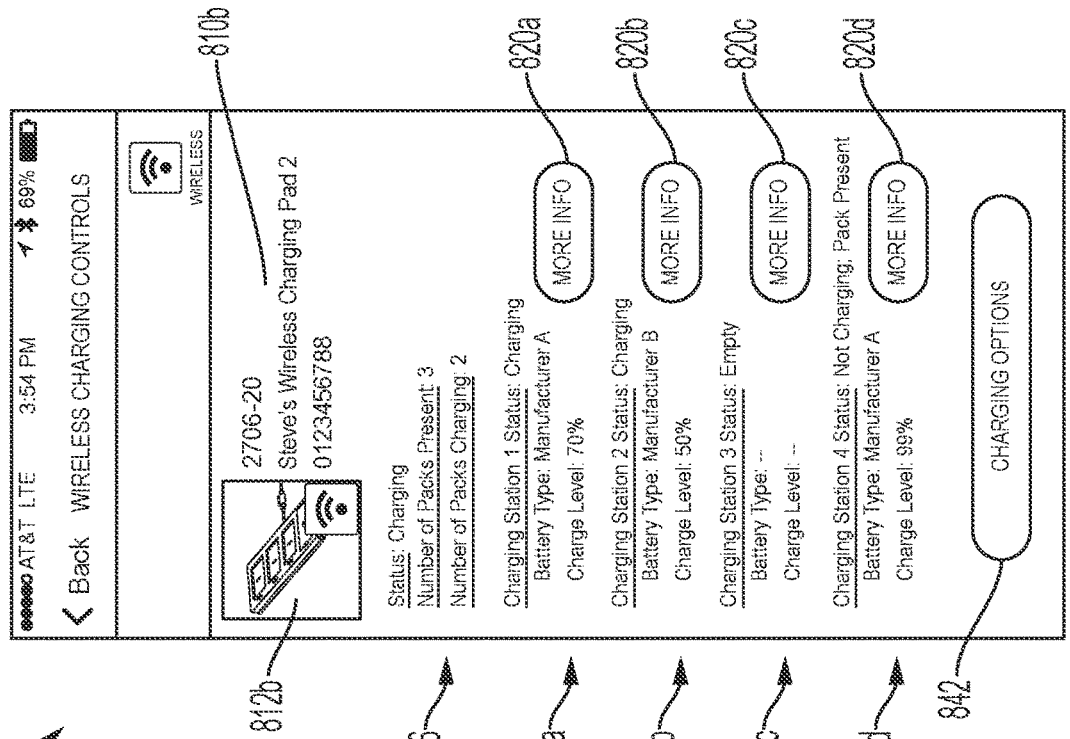
FIGS. 28-31 illustrate user interfaces or screens that may be displayed on a display of one or more of the devices of the communication system of FIG. 1 according to some example embodiments.

FIG. 29 illustrates a control screen 814 that provides a device interface for the wireless charging device 806b, for example, in response to receiving a user input selecting the wireless charging device 806b on the nearby devices screen 802. For example, the external device 14 and the wireless charging device 806b may be paired with each other in response to the wireless charging device 806b being selected on the nearby devices screen 806b (assuming that the user of the external device 14 has permission to communicatively pair with the wireless charging device 806b as explained previously herein). As shown in FIG. 29, the control screen 814 may include an icon 812b of the wireless charging device 806b. The control screen 814 may also include the device type information 810b associated with the wireless charging device 806b.

As indicated by FIG. 29, the control screen 814 allows the user to view numerous settings of the wireless charging device 806b and control numerous features of the wireless charging device 806b. For example, the control screen 814 include general status information 816 of the wireless charging device 806b that may include an overall status (e.g., charging or not charging), a number of battery packs 13 present on the wireless charging device 12, a number of battery packs 13 currently being charged by the wireless charging device 12, etc. The control screen 814 may also include status information for each charging station 28 of the wireless charging device 12 (i.e., charging station status information 818a-818d). In some embodiments, the charging station status information 818 may include an overall charging status (e.g., charging or not charging), whether a battery pack 13 is present on the charging station 28, a battery type of a battery pack 13 present on the charging station 28 (e.g., a manufacturer of the battery pack 13, a size/voltage/capacity of the battery pack 13, etc.), a charge level of the battery pack 13, etc. The information shown on the control screen 814 is merely an example. In other embodiments, additional information or less information may be displayed on the control screen 814.

Figure 30:
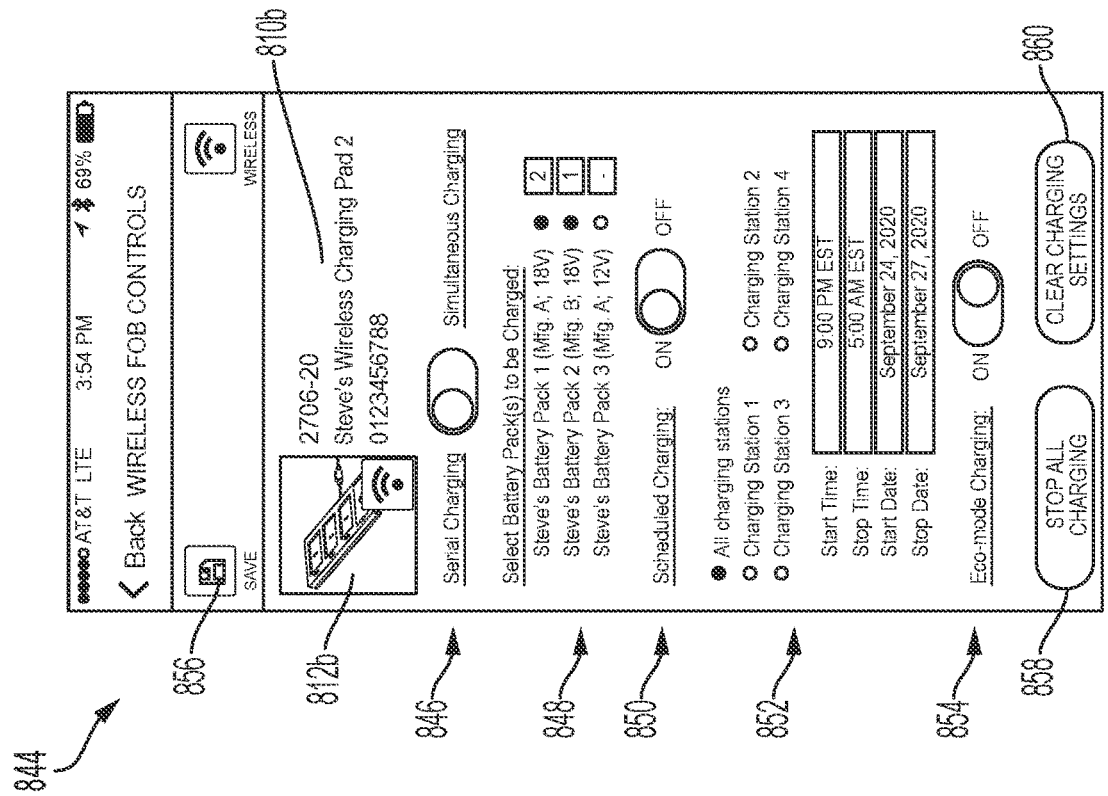

In some embodiments, the control screen 814 includes an additional information button 820a-820d associated with each charging station 28 (labeled "MORE INFO" in FIG. 29). In response to receiving a user input selecting the additional information button 820, the external device 14 may display a control screen 822 shown in FIG. 30 that provides a more detailed interface with respect to the selected charging station 28 and the battery pack 13 currently coupled with the charging station 28. As shown in FIG. 30, the control screen 822 include more specific device type information 824 that may still include the device type information 810b associated with the wireless charging device 806b. However, the more specific device type information 824 may also specify a selected charging station 28 (e.g., charging station 1) based on the selection of the additional information button 820a on the control screen 814. Additionally, an icon 826 may be updated to show a specific part/component of the wireless charging device 12 (i.e., the selected charging station 28). Furthermore, the control screen 822 may include second device type information 828 of the battery pack 13 that is coupled to the selected charging station 28 of the wireless charging device 806b. The control screen 822 may also include a second icon 830 that illustrates a type of the battery pack 13 that is coupled to the selected charging station 28.

Although separate icons 826 and 830 are shown in FIG. 30, in some embodiments where the wireless charging device 12 includes a camera, the camera may take a image/video of the battery pack 13 coupled to the charging station 28, and display the image in addition to or in place of the icons 826 and 830. In some embodiments, the image may include at least a portion of the charging station 28 and at least a portion of the battery pack 13 coupled with the charging station 28. The image may allow the user to notice that the battery pack 13 is not positioned properly or in an optimal position to engage in wireless power transfer with the charging station 28. In some embodiments, a real-time video of the battery pack 13 on/in the wireless charging device 12 may be displayed on the control screen 822. In some embodiments, the image/video may be taken by an infrared camera in the infrared spectrum or a visual spectrum camera in the visual spectrum.

As shown in FIG. 30, the control screen 822 may include charging station status information 832 and more detailed battery pack status information 834. For example, the charging station status information 832 may include a charging status of the charging station 28 (e.g., charging or not charging), a type of charging that is currently being performed by the charging station 28, an estimated time until the battery pack 30 is fully charged, an effectiveness of wireless power transfer, and a list of the available types of charging that the charging station 28 is capable of performing. Examples of battery pack status information 834 include a charging status of the charging station 28 (e.g., charging or not charging), a charge level of the battery pack 13, a temperature of the battery pack 13, a manufacturer of the battery pack 13, a size/voltage/capacity of the battery pack 13, and a list of the available types of wireless charging modalities supported by the battery pack 13.

In some embodiments, the wireless charging device 12 and/or the battery pack 13 receives values for one or more of the above-noted characteristics (e.g., temperature, charge level, etc.) and displays the related status information and/or transmits the related status information to the external device 14 for display. In some embodiments, the status information is included in identification information of the wireless charging device 12 and/or battery pack 13 (e.g., supported wireless charging modalities, manufacturer of the battery pack, size/voltage/capacity, etc.) that is provided to the external device 14 and/or retrieved/stored by the external device 14 in response to receiving identification information from the wireless charging device 12 and/or battery pack 13 (e.g., supported wireless charging modalities, manufacturer of the battery pack, size/voltage/capacity, etc.).

In some embodiments, the wireless charging device 12 and/or the battery pack 13 calculates values for one or more of the above-noted characteristics (e.g., estimated time to fully charge, effectiveness of wireless power transfer, etc.) and displays the related status information and/or transmits the related status information to the external device 14 for display. In some embodiments, the external device 14 may calculate a value included in the status information based on monitored values received from the wireless charging device 12 and/or the battery pack 13 and/or based on known/stored characteristics of the wireless charging device 12 and/or the battery pack 13. For example, the device 12, 13, 14 may determine a received signal strength indication (RSSI) of the wireless charging and/or communication between the battery pack 13 and the wireless charging device 12. The RSSI may be compared to one or more thresholds to determine whether the RSSI is high, medium, or low, for example. The RSSI level may then be displayed as an indication of the effectiveness of wireless power transfer from the wireless charging device 12 to the battery pack 13. As another example, the device 12, 13, 14 may determine a current charge level of the battery pack 13 and a maximum charge level of the battery pack 13 to determine an estimated amount of time to fully charge the battery pack 13. For example, the device 12, 13, 14 and/or the server 16 may store charging profiles of the battery pack 13 that may indicate an estimated amount of time remaining to fully charge the battery pack given a current charge level of the battery pack 13 and an age of the battery pack 13.

In some embodiments, the control screen 822 may provide an alert to the user indicating that an effectiveness of the wireless power transfer is low (e.g., below a threshold RSSI) and may recommend that the user adjust the positioning of the battery pack 13 on the charging station 28. Additionally or alternatively, in response to determining that an effectiveness of the wireless power transfer is low (e.g., below a threshold RSSI), the electronic processor 30 of the wireless charging device 12 may control one or more wireless charging positioning devices 170 to be actuated to attempt to re-position the battery pack 13 with respect to the wireless power transmitter 132 of the charging station 28.

In some embodiments, the display 72, 100, 188, 196 of one or more of the devices 12, 13, 176, 14 may display an alert to the user to indicate when a battery pack 13 has been fully charged. In some embodiments, such an alert may include illuminating an LED and/or providing a "charging complete" message on the display 12, 13, 176, 14. In some embodiments, the alert include a push notification on the external device 14. In some embodiments, one or more of the devices 12, 13, 176, 14 may provide full charge alert via another output device (e.g., a speaker) to prompt the user to check for a visual alert/notification of which battery pack 13 has completed charging. Additionally, the display 72, 100, 188, 196 of one or more of the devices 12, 13, 176, 14 may provide an alert to the user in response to a charging state of a battery pack 13 on/in the wireless charging device 12 otherwise changing (e.g., in response to charging being interrupted, in response to charging parameters changing, etc.). The display 72, 100, 188, 196 of one or more of the devices 12, 13, 176, 14 may also provide an alert to the user in response to one of the devices 12, 13, 176, 14 determining that a monitored battery pack or charging parameter is outside of a predetermined range (e.g., high temperature, a battery pack 13 is failing accept charging current, a detected battery pack 13 is unable to communicate with the wireless charging device 12, etc.). In some embodiments, one or more of the devices 12, 13, 176, 14 provides an alert in response to the wireless charging device 12 determining that insufficient power is available to complete a charging operation of one or more battery packs 13. In some embodiments, any visual alert provided by the devices 12, 13, 176, 14 may additionally or alternatively be provided as an audible alert via, for example, a speaker and/or as a haptic alert via, for example, a vibration motor.

In some embodiments, the display 72, 100, 188, 196 of one or more of the devices 12, 13, 176, 14 may turn on or update when a battery pack 13 is located in/on the wireless charging device 12. For example, in response to the wireless charging device 12 detecting the presence of a battery pack 13 or detecting the a battery pack 13 has been removed from the wireless charging device 12, the display 72, 100, 188, 196 of one or more of the devices 12, 13, 176, 14 may turn on or provide an alert to a user indicative of the detected action.

The information shown on the control screen 822 is merely an example. In other embodiments, additional information or less information may be displayed on the control screen 822. For example, the control screen 822 may display additional battery health information and/or wireless charging station health information related to historical use of these devices. Additionally, maintenance information for one or both of these types of devices 12, 13 may be displayed or provided to the user in the form of an alert/notification. For example, the control screen 822 may indicate that one or more of the devices 12, 13 should be taken to a service center for maintenance or should be replaced. In some embodiments, this health information, historical information, and/or maintenance information may be retrieved by one or more of the devices 12, 13, 14 from the server 16. Additionally, usage information of the devices 12, 13, 14 may be provided to the server 16 to allow the server to keep track of this information and push notification to one or more of the devices 12, 13, 14 as appropriate. In some embodiments, at least some of the information shown on the control screen 822 may be included on the control screen 814, for example, as part of status information 816, 818.

As another example of additional battery pack status information that may be displayed on the control screen 822, an orientation of the battery pack 13 may be displayed. For example, the wireless charging device 12 may analyze images or other data received from battery pack detection sensors 144 to determine an orientation of the battery pack 13 on/in the wireless charging device 12. For example, the control screen 822 may indicate that the battery pack 13 is placed in an incorrect orientation (e.g., upside-down, sideways, etc.) such that optimal wireless charging may not be occurring. Similarly, the control screen 822 may indicate that a wireless power receiver 34 of the battery pack 13 is not optimally aligned with a wireless power transmitter 104 of the wireless charging device 12 (e.g., based on RSSI and/or analysis of data provided by battery pack detection sensor(s) 144).

While the control screen 822 of FIG. 30 was previously described as being displayed in response to actuation of the additional information button 820a on the control screen 814 of FIG. 29, in some embodiments, the control screen 822 may also be displayed in response to receiving a user input on the nearby devices screen 802 indicating a user selection of the device 812e (i.e., Steve's Battery Pack 1). In other words, the control screen 822 may be a control screen for a specific battery pack 13 and for a specific charging station 28 on/in which the battery pack 13 is located.

The control screen 822 of FIG. 30 is associated with charging station 1 of the wireless charging device 806b and with the battery pack 806e shown in the nearby devices screen 802. However, similar control screens may be displayed for other charging stations 28 of the same or different wireless charging devices 12 and for other battery packs 13 depending on user input received by the external device 14 and/or wireless charging station 12. Additionally or alternatively, separate control screens 822 for each charging station 28 of the wireless charging device 12 may be displayed on separate displays 100 associated with each charging station 28 and located on the wireless charging device 12. Additionally or alternatively, each charging station 28 may include an indicator (e.g., one or more LEDs) that indicates charging status, completion of charging, the type of battery pack 13 placed in/on the charging station 28, and/or a type of wireless charging being performed.

In some embodiments, the control screen 822 also include a "request battery identification" button 836. In response to receiving a user input actuating the button 836, the external device 14 may transmit an instruction to the wireless charging device 806b and/or the battery pack 806e to cause the battery pack 806e, the charging station 1, or both to provide an output to identify themselves. For example, the instruction may cause the battery pack 806e to control an LED to flash to allow the user to identify the battery pack 806e on/within the wireless charging device 806b. As another example, the instruction may cause the wireless charging device 806b to control an LED associated with and located near the charging station 1 to flash to allow the user to identify the battery pack 806e on the charging station 1.

In some embodiments, instead of a single "request battery identification" button 836 that identifies a user-selected battery pack 13/charging station 28, the control screen 822 includes a plurality of battery pack identification buttons that allow the user to identify any one of a plurality of battery packs 13 based on a selected characteristic. For example, in response to one of the additional buttons being actuated by a user, the external device 14 may transmit a request to the wireless charging device 806b to identify a battery pack 13 with the highest charge level, a battery pack 13 with the lowest charge level, a battery pack 13 with the highest temperature, a battery pack 13 with the lowest temperature, and/or the like. The wireless charging device 12 may perform the identification as requested and control an LED associated with and located near the charging station 28 coupled to the identified battery pack 13 to flash to allow the user to identify the identified battery pack 13. Additionally or alternatively, the wireless charging station 12 transmits a request to the identified battery pack 13 requesting that the identified battery pack 13 control an LED to flash to allow the user to identify the identified battery pack 13.

In some embodiments, the control screen 822 also includes a "stop charging" button 838. In response to receiving a user input actuating the "stop charging" button 840, the wireless charging device 806b may stop charging the battery pack 806e. The status information 832, 834 on the control screen 822 may be updated to indicate that charging of the battery pack 806e has been stopped.

On the other hand, the control screen 822 also may include a "prioritize charging" button 840. In response to receiving a user input actuating the "prioritize charging" button 840, the wireless charging device 806b may stop charging any other battery packs 13 on/in the wireless charging device 806b and solely charge the battery pack 806e. Accordingly, the wireless charging device 806b may be able to transfer more power to the battery pack 806e in the prioritized charging mode than when multiple battery packs 13 are simultaneously charged by the wireless charging device 806b.

In either of the above examples related to the buttons 838 and 840, when the control screen 822 is displayed on the external device 14, the external device 14 may send instructions to the wireless charging device 806b that correspond to the user selection of the button 838, 840. In embodiments where the control screen 822 is displayed on the wireless charging device 806b, the wireless charging device 806b may directly receive the user input and perform the corresponding action.

Figure 31:
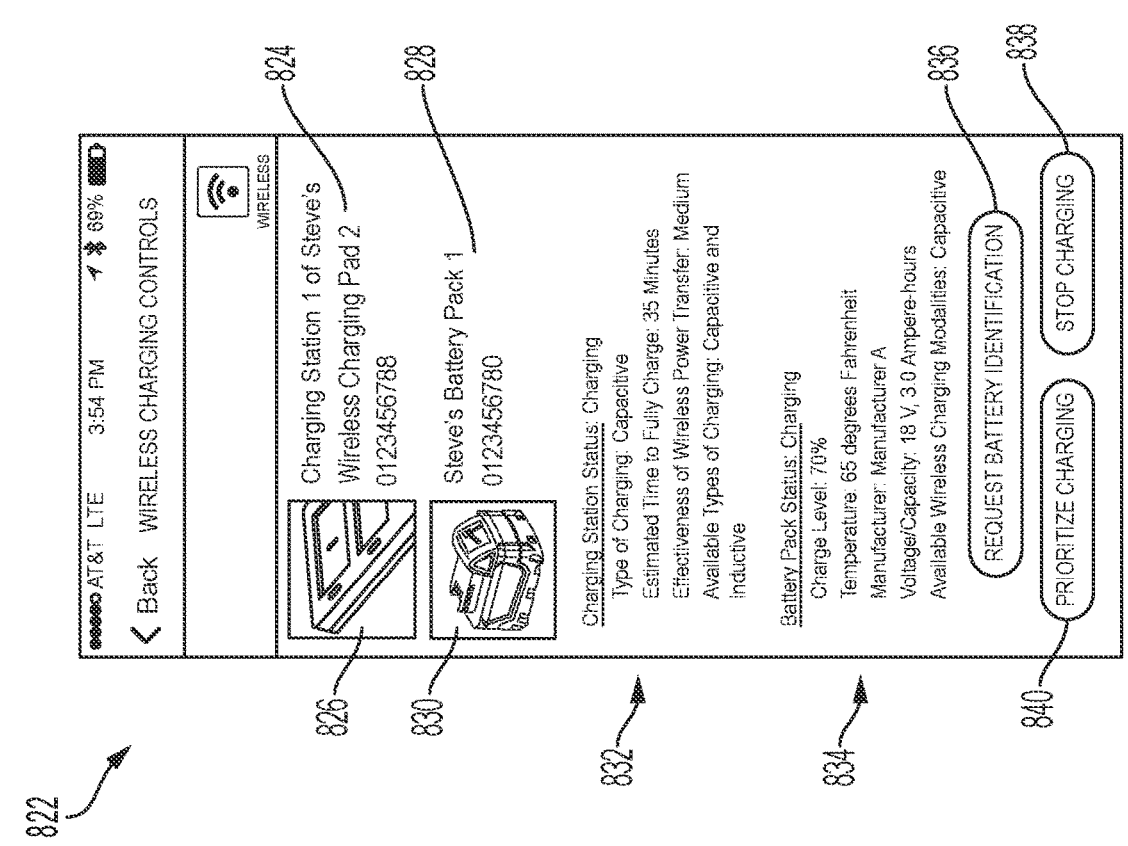

Returning to the control screen 814 of FIG. 29, the control screen 814 may include a "charging options" button 842 that allows the user to further customize charging options of the wireless charging device 806b. FIG. 31 illustrates a charging options control screen 844 that may be displayed in response to the "charging options" button 842 being actuated by a user. Although the "charging options" button 842 is only shown on the control screen 814, the button 842 may be located on other control screens as well (e.g., on the control screen 822 of FIG. 30).

As shown in FIG. 31, the charging options control screen 844 may include the same device information 810b and icon 812b as the control screen 814. In some embodiments, the charging options control screen 844 additionally includes a charging type selection toggle 846 that allows the user to select whether battery packs on/in the wireless charging device 12 are charged serially (i.e., one at a time) or simultaneously. The control screen 844 also includes a battery pack selection area 848 that allows the user to select which battery packs 13 on/in the wireless charging device 12 should be charged. For example, in FIG. 31, the top two radio buttons are selected indicating that Steve's Battery Packs 1 and 2 should be charged. However, the bottom radio button is not selected indicating that Steve's Battery Pack 3 should not be charged. If serial charging is selected as shown in FIG. 31, textboxes included in the battery pack selection area 848 allow the user to select an order in which the serial charging occurs. In the example shown in FIG. 31, Steve's Battery Pack is ranked as "1" and is therefore the first battery pack 13 to be charged by the wireless charging device 12. In other embodiments, the wireless charging device 12 may be configured to prioritize charging of the battery packs 13 based on a charge level of each battery pack 13. For example, the wireless charging device 12 may prioritize charging of the battery pack 13 with the lowest charge level or the battery pack 13 with the fastest estimated time to reach a fully charged state.

Although not shown in FIG. 31, in some embodiments, the control screen 844 (and/or the control screen 822) may include an additional selectable feature that allows the user to select which type of charging modality (e.g., contact charging versus wireless charging, wireless capacitive charging versus wireless inductive charging versus wireless RF charging, etc.) is used by each charging station 28 and/or wireless charging device 12. In some embodiments, this additional selectable feature may only display charging modality options that are shared by the battery pack 13 and the charging station 28 on/in which the battery pack 13 is located. Such shared charging modalities may be determined via communication between two or more of the devices 12, 13, 14, 176 as described previously herein.

As shown in FIG. 31, the control screen 844 may also include a scheduled charging selection toggle 850. When the toggle 850 is in the "on" position, scheduled charging is enabled and scheduled charging parameters 852 are adjustable by the user. On the other hand, when the toggle 850 is in the "off" position, the scheduled charging parameters 852 may be displayed greyed out and may not be adjustable by the user. The scheduled charging parameters 852 allow the user to select which charging stations 28 should participate in scheduled charging and when the scheduled charging should occur (e.g., a time range and date range). In some embodiments, scheduled charging automatically occurs within the date/time ranges set by the user and automatically stops when the date/time ranges have expired. In some embodiments, during scheduled charging, the wireless charging device 12 operates according to the selections made with respect to user the toggle 846 and the selection area 848.

As an alternative to scheduled charging, the control screen 844 may include an eco-mode charging toggle 854. When the eco-mode charging toggle 854 is in the "on" position, the wireless charging device 12 may charge the battery packs 13 according to a predetermined schedule configured to estimate off-peak power consumption hours, for example. In some embodiments, when in eco-mode, the wireless charging device 12 is configured to monitor power consumption (e.g., of a local grid to which the wireless charging device 12 is coupled or of a larger grid based on communication received from the external device 14 and/or the server 16). In response to determining that monitored power consumption has decreased below a threshold for a predetermined amount of time, the wireless charging device 12 may determine that the current time corresponds to off-peak hours and may begin charging the battery packs 13 until power consumption on the grid increases above the threshold. In some embodiments, when eco-mode charging is enabled, the scheduled charging is automatically disabled.

After the user has entered the charging parameters/settings as desired on the control screen 844, the user may press the "save" button 856 to save the charging parameters/settings. In embodiments where the control screen 844 is displayed on the external device 14, the external device 14 may transmit the charging parameters/settings to the wireless charging device 12 to be implemented and saved by the wireless charging device 12. In embodiments where the control screen 844 is displayed on the wireless charging device 12, the wireless charging device 12 may implement and save the charging parameters in the memory 112.

In some embodiments, the control screen 844 includes a "stop all charging" button 858. In response to actuation of the button 858, the wireless charging device 12 may cease charging all battery packs 13 until another user input is received instructing the wireless charging device 12 to restart charging. For example, in response to the button 858 being actuated, the control screen 844 may update the button 858 to be a "restart charging" button that re-enables charging upon being actuated by the user. In some embodiments, the control screen 844 includes a "clear charging settings" button 860. In response to actuation of the button 860, the control screen resets the charging parameters/settings 846, 848, 850, 852, 854 to default values.

Although user-selectable charging parameters/settings are shown on control screen 844 of FIG. 31, in some embodiments, at least some of the parameters/settings may be displayed and adjusted on the control screen 822 associated with individual battery packs 13 and charging stations 28. Additionally, other charging parameters/settings may be adjusted such as user-selectable charging power provided to a single battery pack 13. For example, the user may be able to indicate how quickly one or more battery packs 13 should be charged (e.g., similar to prioritizing a battery pack 13 for charging via the button 840 or ranking the battery packs 13 for charging via the selection area 848 of FIG. 31. Additionally, each control screen 822 for each battery pack 13 may include user-selectable scheduling parameters that may allow the user to individually schedule different battery packs 13 to be charged at different times. Such scheduling of different battery packs 13 to be charged at different times may be particularly useful if different power tools/devices powered by the different battery packs 13 are planned to be used at different times.

As noted previously herein, a wireless charging device 12 includes one or more charging stations 28 that may each be configured to charge one or more battery packs of the same or different type simultaneously or in series. In particular, a wireless charging device 12 may include a housing or frame configured to carry or otherwise support, directly or indirectly, or define one or more charging stations 28. In some embodiments, the charging stations 28 may be positioned at least partially within an interior portion of the housing. In other embodiments, the charging stations 28 may be positioned outside of the housing.

FIG. 32 illustrates an example embodiment of a wireless charging device 12B of the communication system 10 of FIG. 1. The wireless charging device 12B includes a housing 1020 having one or more outer walls 1032 and a plurality of charging stations 1028 supported and/or defined by the outer walls 1032. In the illustrated embodiment, the housing 1020 has a generally rectangular outer profile such that the outer walls 1032 define a forward side 1038, a rear side 1042 opposite the forward side 1038, a first lateral side 1046, a second lateral side 1050 opposite the first lateral side 1046, a top side 1054, and a bottom side 1058 opposite the top side 1054. In other embodiments, the housing 1020 may exhibit profiles other than rectangular shaped profiles, such as triangular, hexagonal, circular, L-shaped, T-shaped, or any other profile suitable for supporting the charging stations 28, and may have fewer or more sides.

In the illustrated embodiment, the housing 1020 defines an interior cavity configured to receive electrical components (e.g., printed circuit board, charging elements, etc.). Each charging station 1028 may be supported and defined by an outer wall 1032, such that the charging station 1028 is at least partially positioned within the interior cavity of the housing 1020. In the illustrated embodiment, three charging stations 1028A-1028C are positioned adjacent each other at or near the top side 1054 of the wireless charging device 12B. In other embodiments, the wireless charging device 12B may include one or more charging stations 1028A-1028C positioned at or near any of the sides (e.g., forward side 1038, first lateral side 1046, etc.). In particular, one or more of the charging stations 1028A-1028C may be spaced from and/or located remotely from the remaining charging stations 1028A-1028C (i.e., the first lateral side 1046 separates one of the charging stations 1028A-1028C from another of the charging stations 1028A-1028C). Each charging station 1028A-1028C is configured to charge at least one battery pack 13 (e.g., such as battery packs 13A-13C illustrated in FIGS. 3A-3C). In some embodiments, at least one of the charging station(s) 1028A-1028C may be configured to simultaneously charge two or more battery packs 13.

Additionally, in some embodiments, one or more of the charging stations 28 includes an interface, an exemplary embodiment of which is described further herein, having one or more mechanical components (e.g., rails, recesses) and/or electrical components configured to and operable for interfacing (e.g., mechanically, electrically, and communicatively connecting) the respective charging station 28 with a battery pack 13. The interface of one or more of the charging stations 28 may be configured to support one or more of the different types of battery packs 13 (e.g., batteries produced by different manufacturers and/or having different shapes or different wireless charging modalities). Furthermore, the interface may further include the charging components (e.g., wireless power transmitter 104) positioned within, on, proximate, or otherwise supported by the interface.

For example, each charging station 1028A-1028C of the wireless charging device of FIG. 32 includes an interface 1062 having a guiding structure 1066 for locating a battery pack 13 on or partially within the respective charging station 1028A-1028C. The guiding structure 1066 may include one or more recesses 1082, projections 1070 extending from the walls 1032, or any other structure suitable for locating the battery pack 13.

More specifically, as shown in FIG. 32, the charging station 1028A, for example, includes a contour configured to accommodate a wide variety of battery packs 13 having different shapes such that the charging station 1028A may be referred to as a "universal charging station." The charging station 1028B includes a plurality of projections 1070 extending from the top side 1054. The projections 1070 form a platform 1074 upon which the battery pack 13 may be positioned. In particular, the projections 1070 may form a rectangular-shaped platform 1074 to receive a battery pack 13 (e.g., battery pack 13A, FIG. 3A) having a complementary rectangular shaped interface portion. In addition, the platform 1074 includes first and second rails 1078 spaced apart on the platform 1074. Each rail 1078 is configured to mechanically engage rails of the battery pack 13 (e.g., battery packs 13A, 13B, FIGS. 3A-3B, respectively) for locating and retaining the battery pack 13 on the charging station 1028B. In addition, the charging station 1028C includes a recess 1082 defined by the top side 1054 to form a receptacle 1086 for receiving a portion of a battery pack 13. In particular, as shown in FIG. 32, the charging station 1028C may include a circular-shaped recess 1082 to receive a battery pack 13 (e.g., battery pack 13C, FIG. 3C) having a complementary circular shaped interface portion. However, it will be appreciated that the charging stations 1028B and 1028C are not limited to receiving battery packs 13 having complementary shaped interface portions, but may also receive battery packs 13 having interface portions with other shapes.

In other embodiments, the guiding structure 1066 includes one or more magnetic elements 1090 to locate the battery pack 13 relative to the charging station(s) 1028A-1028C. The magnetic element(s) 1090 may be positioned on or within the housing 1020/guiding structure 1066. For example, the wireless charging device of FIG. 32 may include the magnetic element 1090 positioned within the platform 1074 of the charging station 1028B on the top side 1054. The magnetic element 1090 is configured to exert a magnetic force on the battery pack 13 for maintaining the battery pack 13 in a position relative to the housing 1020, and in particular to the respective charging station 1028B. Accordingly, the guiding structure 1066 may be referred to as a battery locating receptacle. In other embodiments, the guiding structure 1066 may be configured to have two or more battery locating receptacles.

The guiding structure 1066 locates the respective battery pack 13 at a predetermined location on the housing 1020. More specifically, the guiding structure 1066 can locate the respective battery pack 13 at a predetermined distance from the charging components (e.g., wireless power transmitters 104) of the wireless charging device 12B. In addition, the guiding structure 1066 can orient the respective battery pack 13 relative to the charging components. In some embodiments, the guiding structure 1066 is configured to align the respective battery pack 13 relative to a select portion of the charging station 1028A-1028C/wireless charging device 12B, and/or the charging components (e.g., wireless power transmitters 104) of the wireless charging device 12B. The term "align" may be defined as the wireless power transmitter(s) 104 is positioned along the same axis or otherwise in the same plane as the wireless power receiver(s) 34 of the battery pack 13.

One or more of the charging stations 1028A-1028C may further include display markers 1094 (e.g., design lines) positioned on one or more of the walls 1032 of the housing 1020. For example, in the illustrated embodiment, the charging station 1028A includes the display markers 1094 positioned on the top side 1054 to indicate a charging area 1098 in which the battery pack 13 may be positioned by the user. The illustrated charging area 1098 has a rectangular shape, but may, in other embodiments have other shapes such as circular, triangular, etc.

The charging station interface 1062 further includes the charging components (e.g., wireless power transmitter 104) positioned within or proximate to the interface 1062. For example, each of the charging stations 1028A, 1028C includes the wireless power transmitter 104 positioned within the housing 1020, and the charging station 1028B includes the wireless power transmitter 104 positioned within the platform 1074 of the charging station 1028B. In other embodiments, the wireless power transmitter 104 is positioned at predetermined locations on/within the housing 1020, and two or more of the charging stations 1028A-1028C may receive power from multiple of the wireless power transmitter 104 that are positioned proximate the respective charging station 1028A-1028C.

With continued reference to FIG. 32, the wireless charging device 12b also includes a power supply input 1102 for electrically connecting the power source 26 to each charging station 1028A-1028C. The power supply input 1102 may be an AC port (e.g., to connect to an AC plug), a DC port (e.g., to connect to an external source such as a vehicle, solar panel, generator etc.), or any other power source supported for supplying power to the wireless charging device 12 as discussed above. The power supply input 1102 may further be a power source receptacle configured to receive a battery pack (i.e., such that the power source 26 is a "built-in" power source).

Furthermore, in some embodiments, a wireless charging device 12 includes one or more of the sensors 102, an exemplary embodiment of which is described further herein positioned within, on, or otherwise supported by the housing.

For example, as shown in FIG. 32, the wireless charging device 12B further includes the plurality of sensors 102 supported by the housing 1020. More specifically, each sensor 102 may be positioned on and/or within the housing 1020. Each sensor 102 is operable to detect one or more characteristics of the wireless charging device 12B and/or the battery pack(s) 13 as discussed above. The sensors 102 are connected to the electronic processor 30 of the wireless charging device 12B.

In the illustrated embodiment, the wireless charging device 12B includes the optical sensor 160 configured to detect a type of battery pack 13 (i.e., the battery pack manufacturer and/or brand of the battery pack 13, the type of wireless charging, and/or other information related to the battery pack 13). More specifically, the optical sensor 160 is configured to detect a color of the battery pack 13 to identify the manufacturer and/or brand of the battery pack 13. In addition, the optical sensor 160 may be configured to detect a shape of the battery pack 13 to identify the manufacturer and/or brand of the battery pack 13.

The wireless charging device 12B further includes the weight/pressure sensor 158 for detecting a presence of the battery pack 13 relative to the wireless charging device 12B. The illustrated weight/pressure sensor 158 is positioned within the platform 1074 of the charging station 1028B. In other embodiments, the weight/pressure sensor 158 is positioned within the housing 1020 adjacent the charging station(s) 1028A-1028C. The wireless charging device 12B may also include a proximity sensor in combination with or alternative to the weight/pressure sensor 158. The proximity/weight/pressure sensor(s) 158 may be further configured to detect a position of the battery pack 13 relative to the wireless charging device 12B. More specifically, the proximity/weight/pressure sensor(s) 158 may be configured to detect when the battery pack 13 is received in the respective charging station 1028A-1028C. In addition, the proximity/weight/pressure sensor(s) 158 may be configured to detect an orientation and/or alignment of the battery pack 13 relative to the respective charging station 1028A-1028C and indicate the battery pack's 13 position to the electronic processor 30. Furthermore, the electronic processor 30 may be further configured to receive signals representative of the battery pack's 13 presence and/or also the battery pack's 13 position at a predetermined, regular interval (e.g., every minute).

The wireless charging device 12B also includes three RFID sensor/readers 168 for detecting the type of battery pack 13. The RFID sensor/readers 168 may be further used by the wireless charging device 12B to determine a position of the battery pack 13 relative to one of the charging stations 1028A-1028C and/or the housing 1020. In other words, the RFID sensor/readers 168 may be configured to triangulate the battery pack 13's position relative to one of the charging stations 1028A-1028C and/or the housing 1020.

Still further, in some embodiments, a wireless charging device 12 includes one or more of the display/indicator(s) 100, an exemplary embodiment of which is described further herein positioned within, on, or otherwise supported by the housing.

For example, as shown in FIG. 32, the display/indicator(s) 100 of the wireless charging device 12B includes a first indicator 1106 and a second indicator 1110 supported by the housing 1020. In the illustrated embodiment, the first indicator 1106 is positioned on the forward side 1038 adjacent the charging station 1028A. The second indicator 1110 is positioned near the charging station 1028C. In other embodiments, the wireless charging device 12B may include one or more displays/indicators 100 positioned on one or more of the sides (e.g., top side 1054, first lateral side 1046, etc.), and positioned adjacent to or spaced away from the charging stations 1028A-1028C. The display/indicator(s) 100 are electrically connected to the wireless charging device electronic processor 30.

The first indicator 1106 is a display screen. The second indicator 1110 is two light members (e.g., LEDs). The second indicator 1110 is configured to indicate a status of charge (e.g., charging, charging completed, etc.) of one or more of the battery packs 13 when connected to the wireless charging device 12B. In some embodiments, the wireless charging device 12B includes one display screen positioned adjacent each charging station 1028A-1028C, and one light member positioned adjacent each charging station 1028A-1028C. In further other embodiments, the display/indicator(s) 100 are integrated with one or more of the charging stations 12B.

Figure 33:
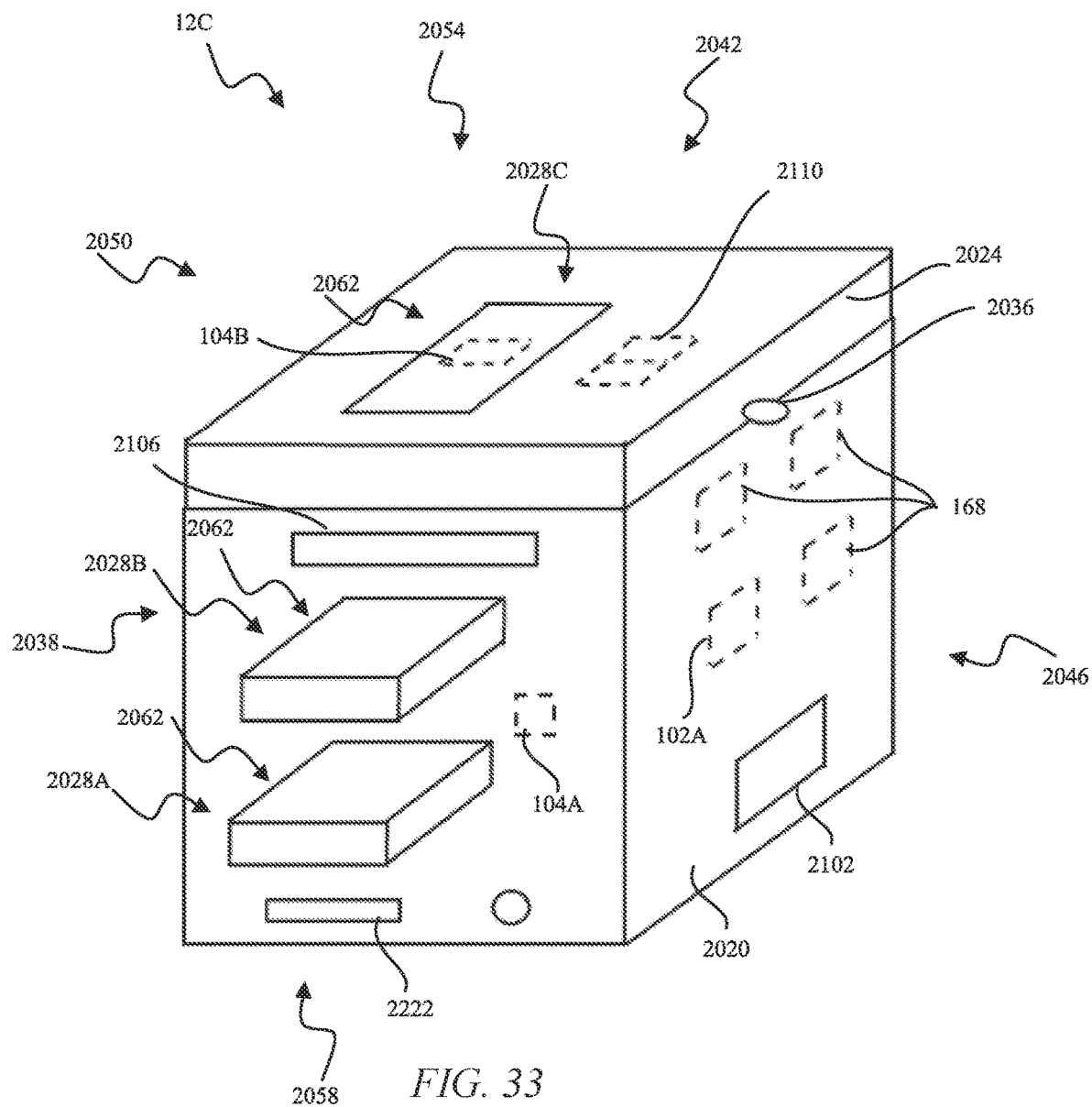
FIG. 33 is a perspective view of yet another wireless charging device of the communication system of FIG. 1 according to one example embodiment.
Figure 34:
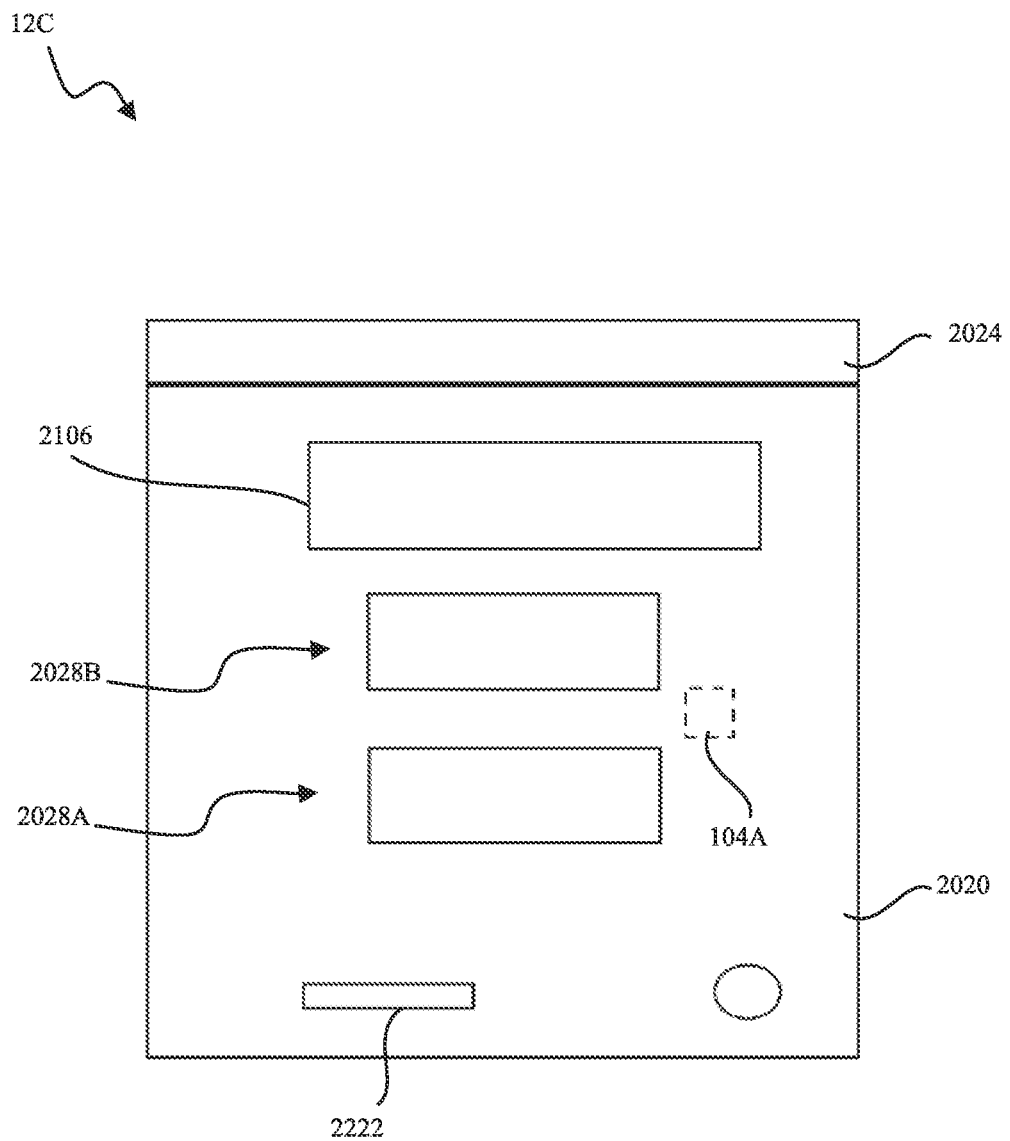
FIG. 34 is a front view of the wireless charging device of FIG. 33, illustrating a housing and a lid movably coupled to the housing.
Figure 35:
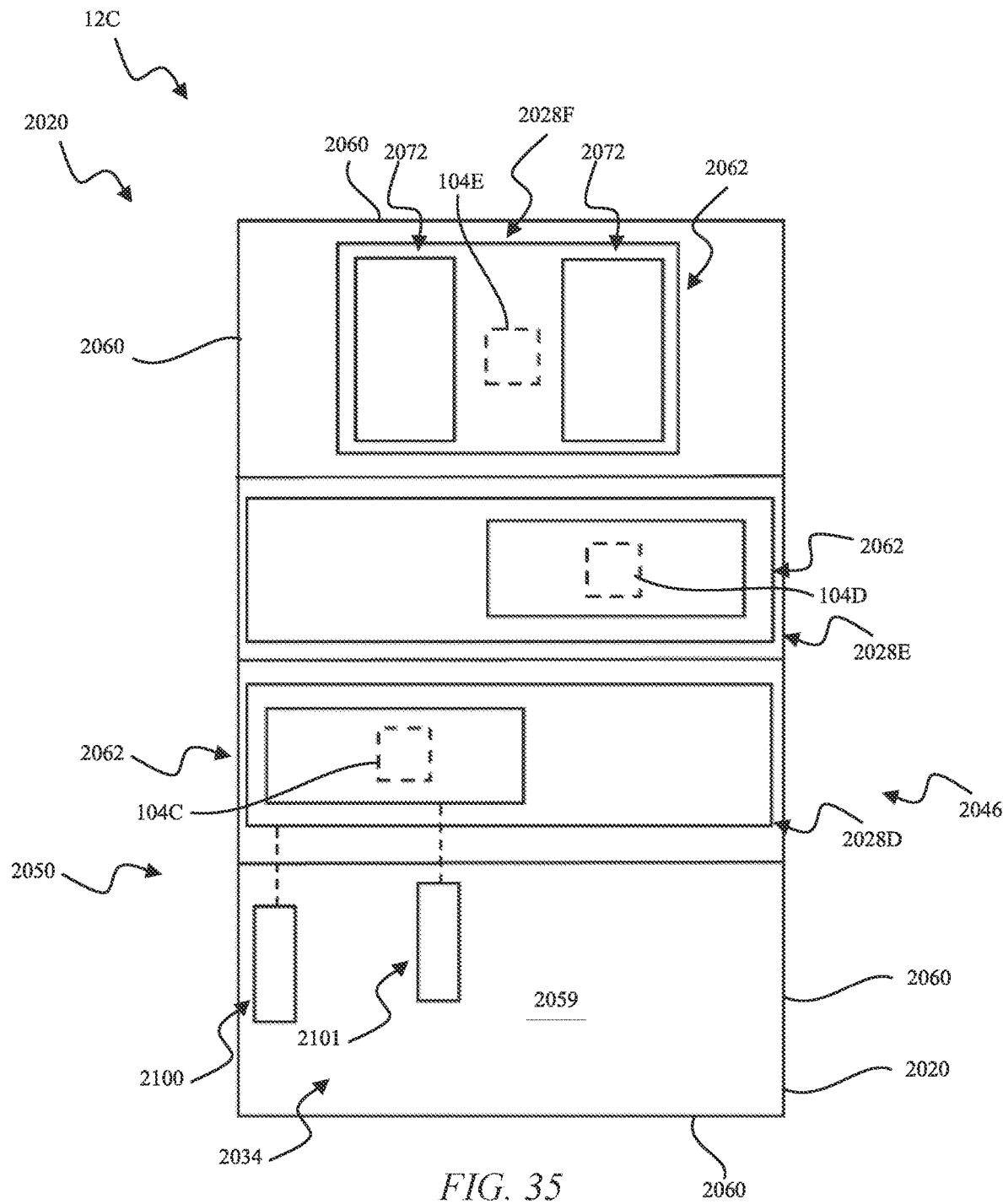
FIG. 35 is a top view of the housing of FIG. 34, illustrating a first example of an interior cavity of the wireless charging device.

FIGS. 33-35 illustrate an example embodiment of a wireless charging device 12C (e.g., tool box). The wireless charging device 12C includes a housing 2020, a lid 2024 movably coupled to the housing 2020, and a plurality of charging stations 2028A-2028F. The housing 2020 includes a plurality of walls 2032 defining an interior cavity 2034 (FIG. 35). The lid 1024 is movable relative to the housing 2020 between a closed position (FIG. 33) and an open position. When the lid 2024 is in the closed position, the housing 2020 and the lid 2024 enclose the interior cavity 2034. The wireless charging device 12C may further include a latching mechanism 2036 for securing the lid 2024 in the closed position. When the lid 2024 is in the open position, the interior cavity 2034 is configured to receive one or more elements (e.g., tools, power tools, fasteners, battery packs 13, etc.). As such, the interior cavity 2034 may be referred to as a storage cavity such that the wireless charging device 12C may be referred to as a tool box or other storage container. The housing 2020 and the lid 2024 are configured to form an enclosure.

The illustrated wireless charging device 12C has a generally rectangular outer profile. The wireless charging device 12C has a plurality of sides including a forward side 2038, a rear side 2042 opposite the forward side 2038, a first lateral side 2046, a second lateral side 2050 opposite the first lateral side 2046, a top side 2054, and a bottom side 2058 opposite the top side 2054. In other embodiments, the wireless charging device 12C may exhibit shapes other than rectangular shaped profiles such as, hexagonal, L-shaped, T-shaped, or any other profile suitable for supporting the charging station 28, and may have fewer or more sides.

The housing 2020 and/or the lid 2024 of the wireless charging device 12C supports the plurality of charging stations 2028A-2028F. In the illustrated embodiment, the wireless charging device 12C includes two charging stations 2028A-2028B positioned on the forward side 2038 of the housing 2020, and a third charging station 2028C positioned on the lid 2024 on the top side 2054. In other embodiments, the wireless charging device 12C may include one or more charging stations 2028A-2028G positioned on any of the sides (e.g., forward side, first lateral side, etc.) and supported by the housing 2020 or the lid 2024. Each charging station 2028A-2028G is configured to charge one or more battery packs 13 (e.g., such as battery packs 13A-C illustrated in FIGS. 3A-3C).

With particular reference to FIG. 35, the wireless charging device 12C further includes multiple charging stations 2028A-2028G positioned within the interior cavity 2034. The illustrated wireless charging device 12C includes three interior charging stations 2028D-2028F supported by a bottom surface 2059 of the housing 2020. One or more of the charging stations 2028A-2028G may be positioned near or spaced away from each other. In other embodiments, the charging stations(s) 2028A-2028G may be supported intermediate the bottom surface 2059 and the lid 2024, and/or may be further supported by a side wall 2060 of the housing 2020. The charging stations may be oriented in the same direction or different direction.

Figure 37:
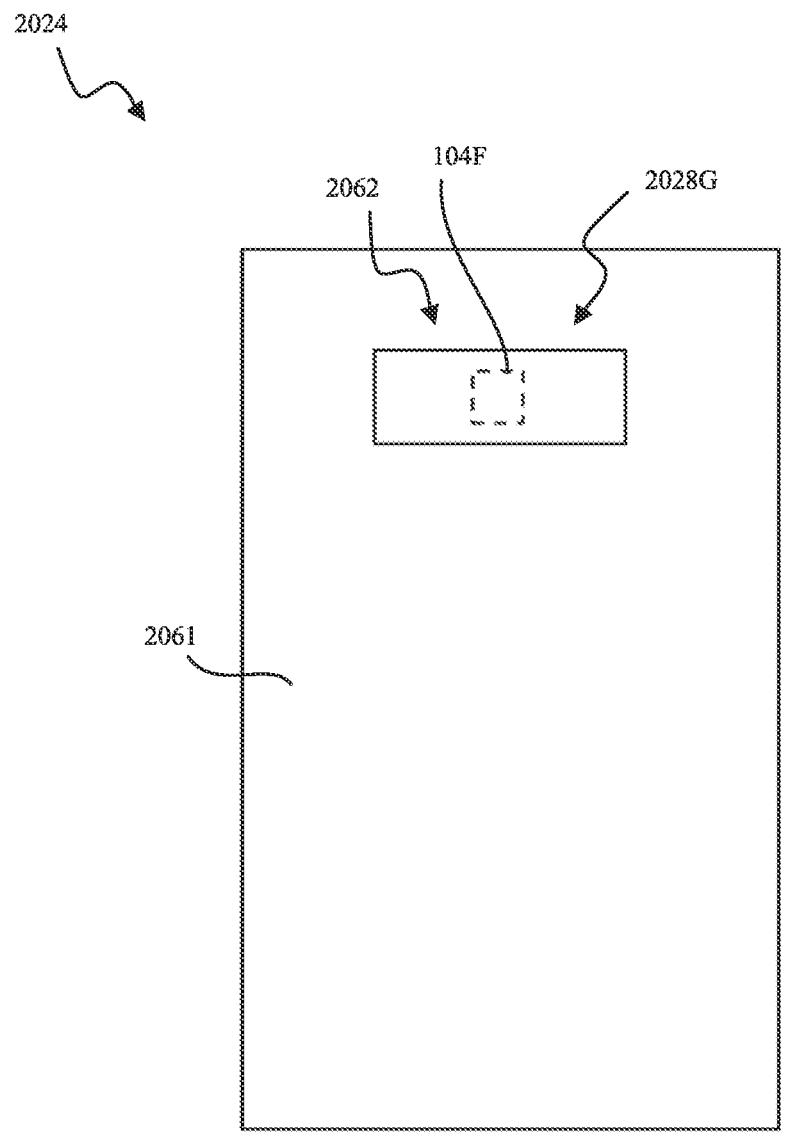
FIG. 37 is a bottom view of the lid of FIG. 34.

FIG. 37 illustrates an interior side of the lid 2024. The illustrated lid 2024 includes another charging station 2028G positioned on an inner surface 2061 of the lid 2024. In other embodiments, the lid 2024 may include two or more charging stations 2028. Accordingly, the illustrated wireless charging device 12C includes seven charging stations 2028A-2028G positioned on the housing 2020 and the lid 2024 of the wireless charging device 12C.

The charging stations 2028A-2028G may include the same or similar interface 2062 as the charging stations 1028A-1028C of FIG. 32 and, accordingly, the discussion of the interface 2062, including the guiding structure 2066, of the charging stations 1028A-1028C above similarly applies to the charging stations 2028A-2028G and is not re-stated. In addition, the lid 2024 may include the interface 2062 (e.g., rails or other mechanical connector) for retaining the battery pack 13 to the interior surface 2061 of the lid.

Furthermore, with particular reference to FIG. 35, the interior charging station 2028F includes two battery charging ports 2072. Each charging port 2072 is configured to support the same or different types of charging components (e.g., coil, plate, or any other charging component suitable for supporting wireless charging). Still further, the charging ports 2072 may be configured such that the orientation of each battery pack 13 received in the respective charging port 2072 is opposite to each other (i.e., the orientation of the battery packs 13 are inverted relative to the each other).

With reference to FIGS. 33 and 35, the wireless charging device 12C includes a plurality of wireless power transmitters 104A-F. For example, the housing 2020 includes a first wireless power transmitter 104A located proximate the charging stations 2028A, 2028B on the forward side 2038, a second wireless power transmitter 104B on the lid 2024, third, fourth, and fifth wireless power transmitters 104C-104E respectively, proximate the charging stations 2028D-2028F positioned within the interior cavity 2034, and also a sixth wireless power transmitter 104F on the interior surface 2061 of the lid 2024. Still further, in the illustrated embodiment, the charging stations 2028A, 2028B includes a common wireless power transmitter 104A for charging each charging station 2028, 2028B. Similarly, the charging station 2028F (FIG. 5) includes the two charging ports 2072 and the common wireless power transmitter 104E is configured to be shared between the two charging ports 2072.

The common wireless power transmitter 104A, 104E may be configured to simultaneously charge two or more battery packs 13 when the battery packs 13 are wirelessly connected to the respective charging stations 2028A, 2028B, 2028F. Alternatively, the common wireless power transmitter 104A, 104E may be operable in a first mode in which the two or more battery packs 13 are simultaneously charged, and a second mode in which the two or more battery packs 13 are configured to be charged in series.

Furthermore, in some embodiments, the housing 2020 includes a stack, array, matrix, or other arrangement of charging ports 2072 supported by the housing 2020/lid 2024, and or positioned within the interior cavity 2034. One or more wireless power transmitters 104 are shared between the charging ports 2072. Alternatively, each charging ports 2072 includes a built-in wireless power transmitter 104. In other embodiments, the housing 2020 includes a stack, array, matrix, or other arrangement of wireless power transmitters 104. A position of the wireless power transmitters 104 may be adjustable (e.g., multiple slots for selectively receiving the wireless power transmitters 104).

Still further, in some embodiments, the charging station(s) 2028A-2028G is a universal charging station in which the wireless power transmitter 104 is integral with or built-in the universal charging station. In further embodiments, each interior surface of the walls 2032 forming the housing 2020, and also an interior surface 2061 of the lid 2024 includes the wireless power transmitter 104 (FIG. 37). As such, the wireless power transmitters 104 may be shared between charging stations 2028A-2028G such that multiple wireless power transmitters 104 may be used to charge a battery pack 13.

The wireless charging device 12C can include one or more of the additional devices 103 such as the wireless charging positioning device(s) 170. In the illustrated embodiment, the wireless charging positioning device 170 is a vibration motor 2100 configured to vibrate to re-orient a battery pack 13 relative to the charging station 2028D. In addition, the wireless charging device 12C further includes an actuator 2101 to re-orient the wireless power transmitters 104 to accommodate a position and/or orientation of the battery pack 13. For example, as shown in FIG. 35, the housing 2020 includes the actuator 2101 operatively coupled to a surface supporting the wireless power transmitter 104C of the charging station 2028D. The actuator 2101 is configured to move the wireless power transmitter 104C of the charging station 2028D. In other embodiments, the wireless power transmitter 104C is supported on a mechanical arm or linkage that is movable relative to the housing 2020. In further other embodiments, the housing 2020 of the wireless charging device 12C includes adjustable wall members movably coupled to the housing 2020. The actuator 2101 is operatively coupled to one or more adjustable wall members for moving the wireless power transmitter of the one or more wall members toward a battery pack 13.

Additionally and/or alternatively, one or more of the charging stations 2028A-2028G (i.e., charging port(s) 2072 of the charging station 2028A-2028G) is movable with respect to the respective wireless power transmitter 104. For example, the charging station 2028G positioned on the lid 2024 moves with the movement of the lid 2024. As such, the charging station 2028G on the lid 2024 may move closer to or farther from the wireless power transmitters 104 of the housing 2020. In other embodiments, the one or more charging stations 2028A-2028G may move in response to user actuation of an actuator (e.g., lever, or other control component).

Figure 36:
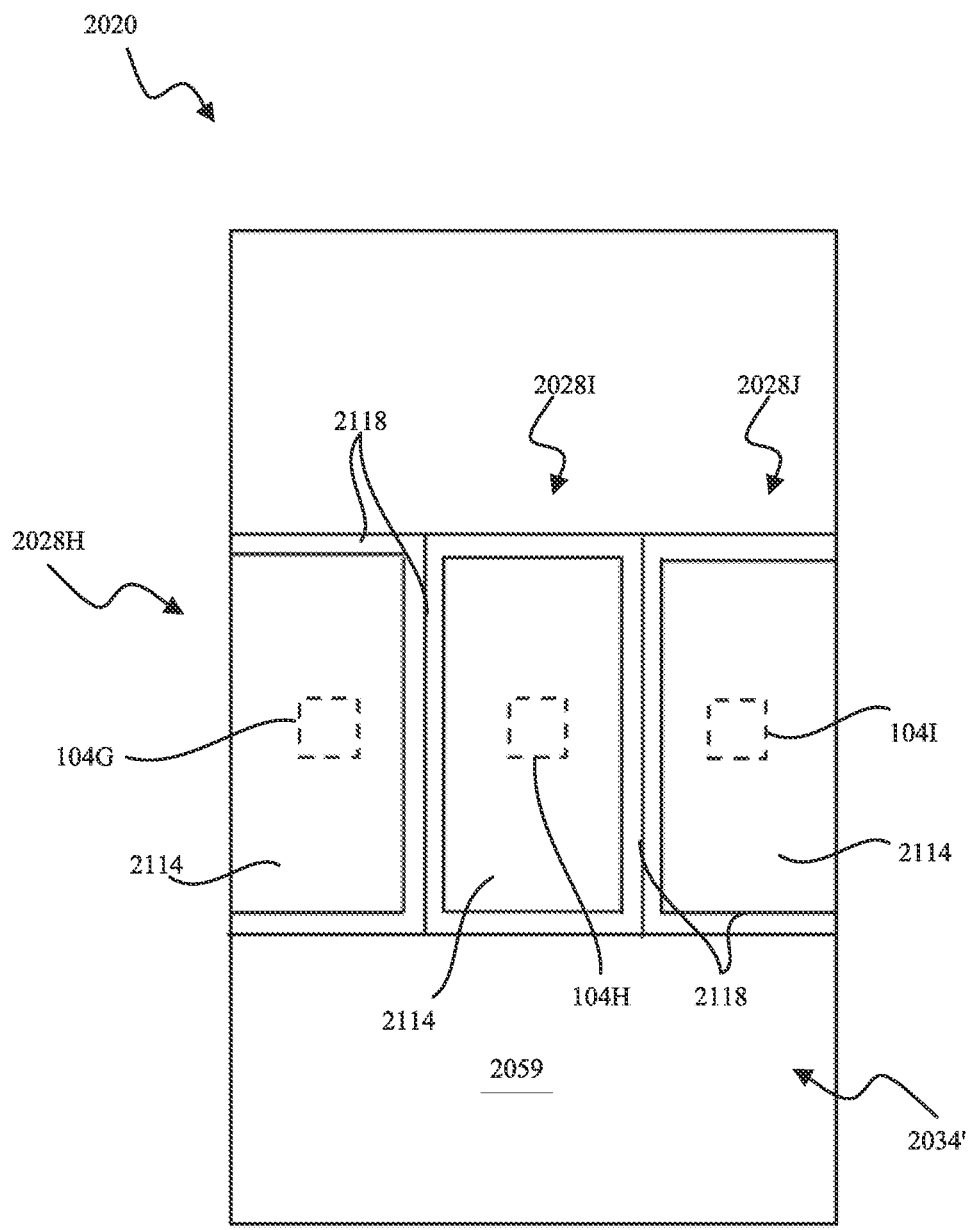
FIG. 36 is a top view of the housing of FIG. 34, illustrating a second example of an interior cavity of the wireless charging device.

FIG. 36 illustrates another example embodiment of the interior cavity 2034' of the housing 2020. In particular, the wireless charging device 12C of FIG. 36 includes a plurality of tray members 2114 removably receivable within the interior cavity 2034'. In the illustrated embodiment, the housing 2020 includes three tray members 2114, but may alternatively include one or more tray members 2114. Each tray member 2114 may form one or more charging stations 2028H-2028J. In addition, a divider member 2118 may be positioned between adjacent tray members 2114. The divider members 2118 may also be removable from the interior cavity 2034'.

The tray members 2114 and/or the divider members 2118 may include one or more of the wireless power transmitters 104G-104I. The wireless power transmitters 104G-104I may be built-in or otherwise integral with the tray member 2114/divider member 2118. In other embodiments, the tray members 2114/divider members 2118 may include one or more slots for selectively receiving the wireless power transmitter 104G-104I. The housing 2020 includes electrical connections (e.g., electrical wires, electrical contacts, or any other electrical connector suitable for providing electrical connection) for electrically connecting the tray member 2114/divider member 2118 (and thereby the wireless power transmitter 104G-104I of the respective tray member 2114/divider member 2118) to the wireless charging station 2028H-2028J.

Each of the tray members 2114 and the divider members 2118 may be secured at any location within the interior cavity 2034'. Each of the tray members 2114 and the divider members 2118 may be removably couplable to any of the walls 2032 of the housing 2020. Furthermore, one or more of the tray members 2114 may be movably coupled such that the respective tray member 2114 is pivotable, slidable, or otherwise movable relative to the housing 2020. The tray members 2114 may further be stackable relative to each other within the interior cavity 2034'.

With reference to FIG. 33, the wireless charging device 12C also includes a power supply input 2102 for electrically connecting the power supply 26 to each charging station 2028A-2028G. The power supply input 2102 may be an AC port (e.g., to connect to an AC plug), a DC port (e.g., to connect to an external source such as a battery pack 13, a vehicle, solar panel, generator etc.), as discussed above. The power supply input 2102 may further be a battery receptacle configured to receive a battery pack (i.e., such that the power supply is a "built-in" power supply).

Still further, the wireless charging device 12C may include a self-contained power generator. For example, the self-contained power generator may include one or more of a solar panels on a top side 2054, lateral sides 2046, 2050, forward side 2038, and rear side 2042 of the wireless charging device 12C, a built-in generator that can be cranked by hand, a built-in generator that can be cranked by an electric motor (e.g., a motor of a power tool), a propane-powered generator or propane connection, etc.

In yet still other embodiments, the wireless charging device 12C includes electrical terminals 2222 for connection with other wireless charging device modules 12C. As such, the wireless charging device 12C may be configured as modular, as further discussed below. As such, two or more wireless charging device modules 12C may connect together to receive power from a single source (a battery pack, AC plug, generator, etc.).

The wireless charging device 12C includes sensors 102 having the same or similar structure as the sensors 102 of FIG. 32 and, accordingly, the discussion of the sensors 102 above similarly applies to the sensors 102 of the wireless charging stations 2028A-2028G and is not re-stated. Furthermore, the wireless charging device 12C may further include one or more sensors positioned within the interior cavity 2034. The one or more sensors 102 may include any one, multiple, or combination of the sensors 102 discussed above. The sensors 102 may be configured to detect the contents received within the interior cavity 2034. For example, the sensors 102 may include a camera 102A to determine whether a battery pack 13 is positioned within the interior cavity 2034. In particular, the camera 102A is configured to take images of the interior cavity 2034. In addition, each sensor 102 may include one or more transmitters/receivers for detecting the contents. Furthermore, the sensors 102 may be used to determine the type of battery pack 13 positioned within the interior cavity 2034. For example, the images of the camera 102A may be used to determine the type of battery pack 13. Still further, the sensors 102 may be configured to determine a position and/or orientation of the contents received within the interior cavity 2034. For example, the sensors 102 may include multiple RFID sensors 168 to determine and/or triangulate the position/orientation of the battery pack 13 positioned within the interior cavity 2034.

In further other embodiments, the sensors 102 may include the operation detection sensor(s) 140 that is configured to detect a charging current output of each wireless power transmitter 104 for determining a level of power of each wireless power transmitter 104.

The sensors 102 positioned within the interior cavity 2034 are connected to the wireless charging device electronic processor 30. The electronic processor 30 is operable to control the sensors 102 to scan the interior cavity 2034 (e.g., at predetermined time intervals) for detecting of any battery packs 13 received within the internal cavity 2034. In addition, the wireless charging device electronic processor 30 may use the scan of the interior cavity 2034 to determine the level of power of each wireless power transmitter 104 for a respective battery pack 13, and control the wireless power transmitters 104 such that the wireless power transmitter 104 outputting the most power to the battery pack 13 is selected to charge the battery pack 13.

The electronic processor 30 may be configured to control charging operation of each battery pack 13 independent of or based on a position of the lid 2024. For example, the wireless charging device 12C may be configured to determine (i.e., by sensing via one or more sensors 102) whether a battery pack 13 is positioned within the interior cavity 2034 after the lid 2024 is moved to the open position. If a battery pack 13 is determined to be positioned within the interior cavity 2034, the electronic processor 30 may initiate charging of the battery pack 13. In addition, the wireless charging device 12C may be configured to charge the battery pack 13 wirelessly connected to any one of the exterior or interior charging stations 2028A-2028G regardless of whether the lid is in the closed position or the open position. More specifically, if a battery pack 13 is wirelessly connected to the charging station 2028C supported on the lid 2024, the wireless charging device 12C is configured to continue charging of the battery pack 13 even if the lid is moved from the closed position to the open position.

The wireless charging device 12C also includes the display/indicator(s) 100 supported by the housing 2020 and/or lid 2024. In the illustrated embodiment, the wireless charging device 12C includes a first indicator 2106 positioned on the forward side 2038 adjacent the charging station 2028A. In addition, the wireless charging device 12C further includes a second indicator 2110 positioned near the charging station 2028C positioned on the lid 2024. In other embodiments, the wireless charging device 12C may include one or more displays/indicators positioned on the housing 2020 or the lid 2024 on one or more of the sides (e.g., top side, first lateral side, etc.), and positioned adjacent to or spaced away from the charging stations 2028A-2028C. The display/indicator(s) 100 are electrically connected to the wireless charging device electronic processor 30.

The first indicator 2106 is a display screen. The display screen is configured to display a charging status of the battery pack 13 that is wirelessly connected to the adjacent charging station 2028A, and also the one or more of the battery packs 13 that are wirelessly connected to the exterior charging stations 2028A-2028C and/or the interior charging stations 2028D-2028G. The display screen is a touch screen in which a user can select one of the battery packs 13, and the touch screen is then operable to display information related to the selected battery pack 13 (e.g., battery manufacture, type of wireless charging, etc.). The second indicator 2110 is two light members (e.g., LEDs). The second indicator 2110 is configured to indicate a status of charge (e.g., charging, charging completed, etc.) of one or more of the battery packs 13 when connected to the wireless charging device 12C. In some embodiments, the wireless charging device 12C includes one display for displaying information related to each charging station 2028A-2028G, and a light member positioned adjacent each charging station 2028A-2028G.

Figure 38:
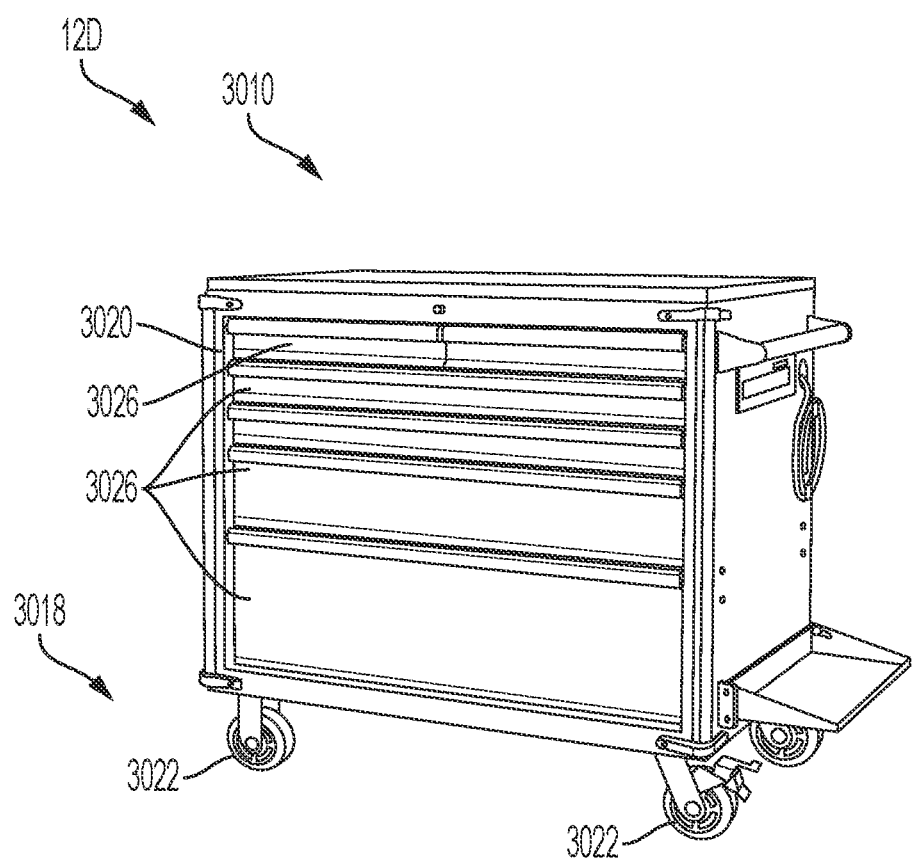
FIG. 38 is a perspective view of yet another wireless charging device of the communication system of FIG. 1 according to one example embodiment.

FIG. 38 illustrates the wireless charging device 12D of the communication system 10 of FIG. 32 according to another example embodiment in which the wireless charging device 12D includes a mobile tool storage device 3010 that can include the same or similar structure as the wireless charging devices 12B, 12C described above in FIGS. 32-37. More specifically, the wireless charging device 12D includes a base assembly 3018 and a housing 3020 supported by the base assembly 3018. The base assembly 3018 includes a plurality of wheels 3022 extending from a bottom surface thereof. The housing 3020 further includes a plurality of storage members 3026 (e.g., shelves, drawers, etc.) that may be movably coupled (e.g., slidable) to the housing 3020. One or more of the charging stations 28 of the wireless charging device 12D may be positioned exterior to the housing 3020 (e.g., such as on a top surface), for example, for charging battery packs supported on the housing, and/or within or otherwise integrated with one or more of the storage members 3026, for example, for charging battery packs 13 carried in the storage members.

Figure 39:
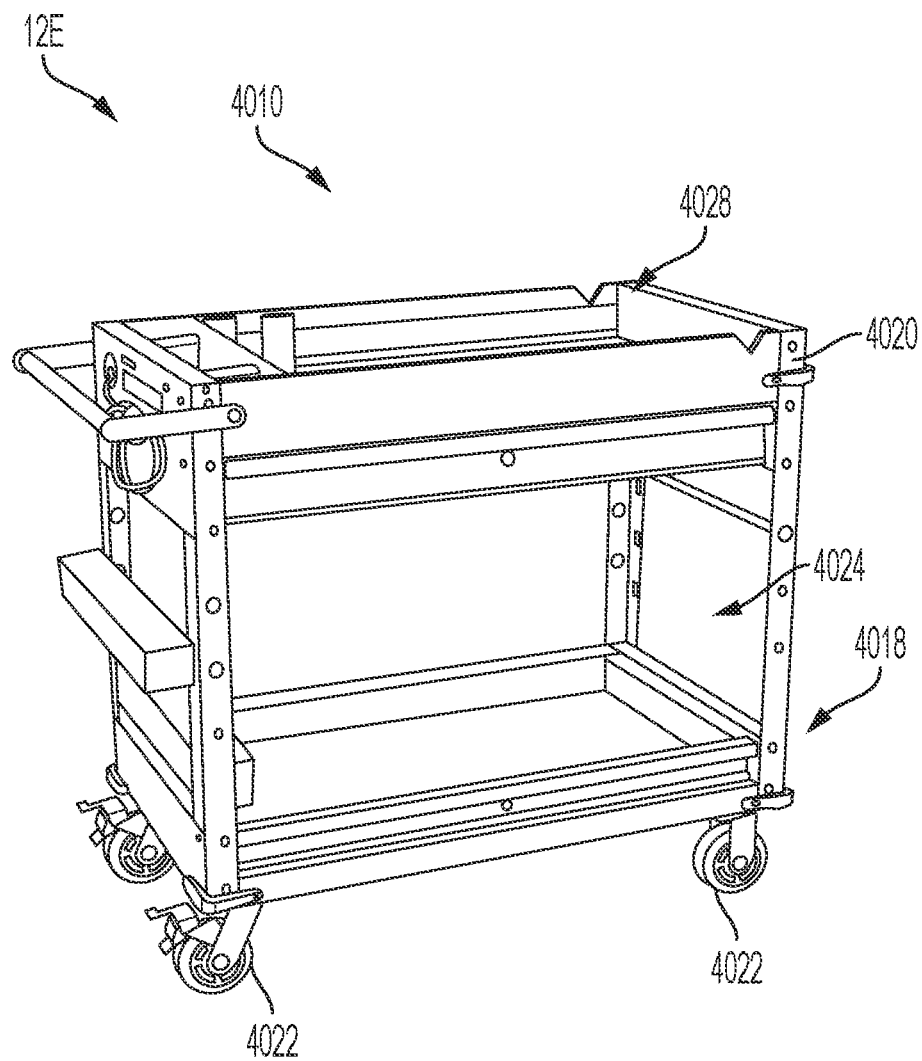
FIG. 39 is a perspective view of yet another wireless charging device of the communication system of FIG. 1 according to one example embodiment.
Figure 40:
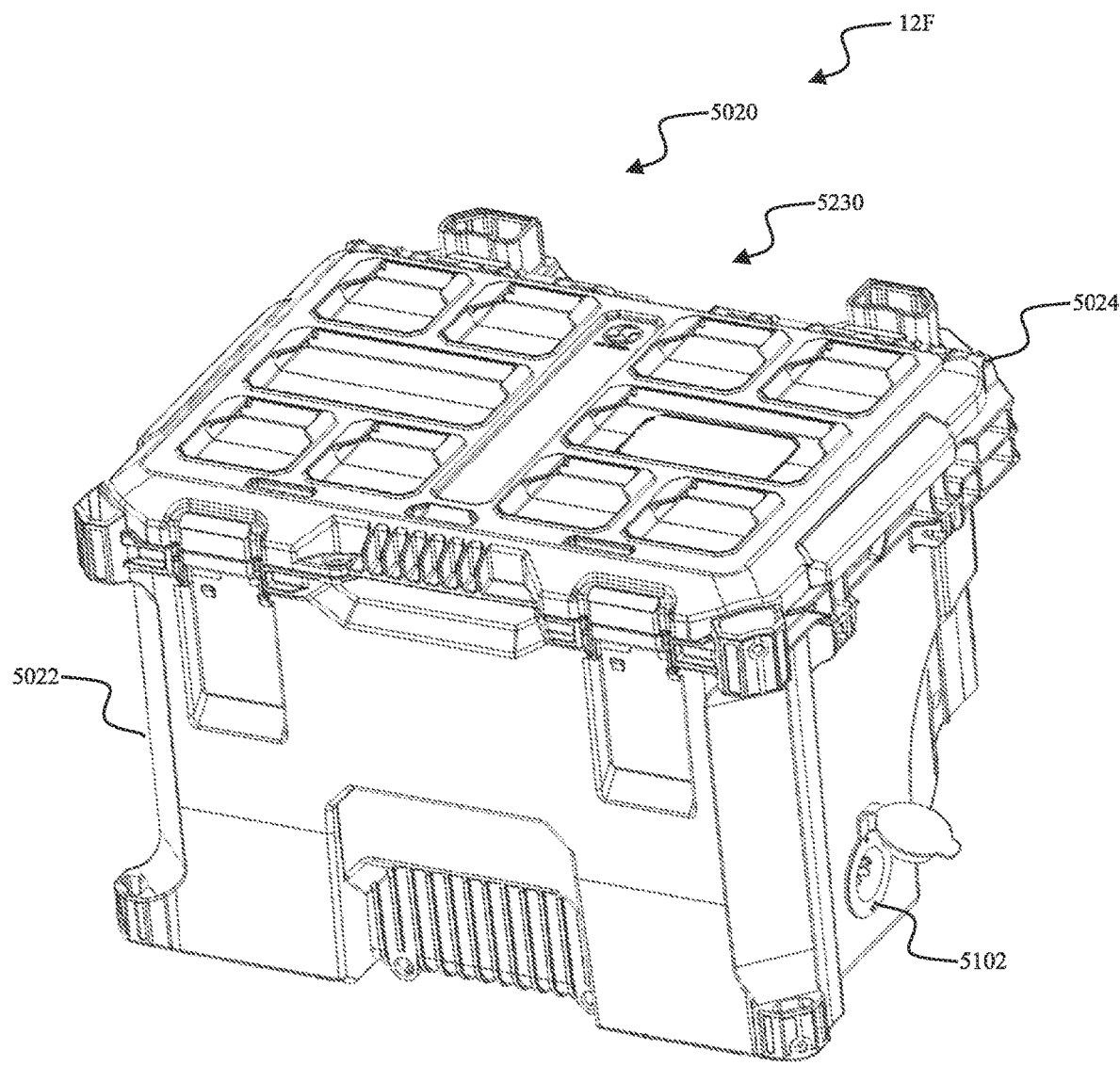
FIG. 40 is a perspective view of yet another wireless charging device of the communication system of FIG. 1 according to one example embodiment, illustrating a lower housing member and an upper housing member.
Figure 41:
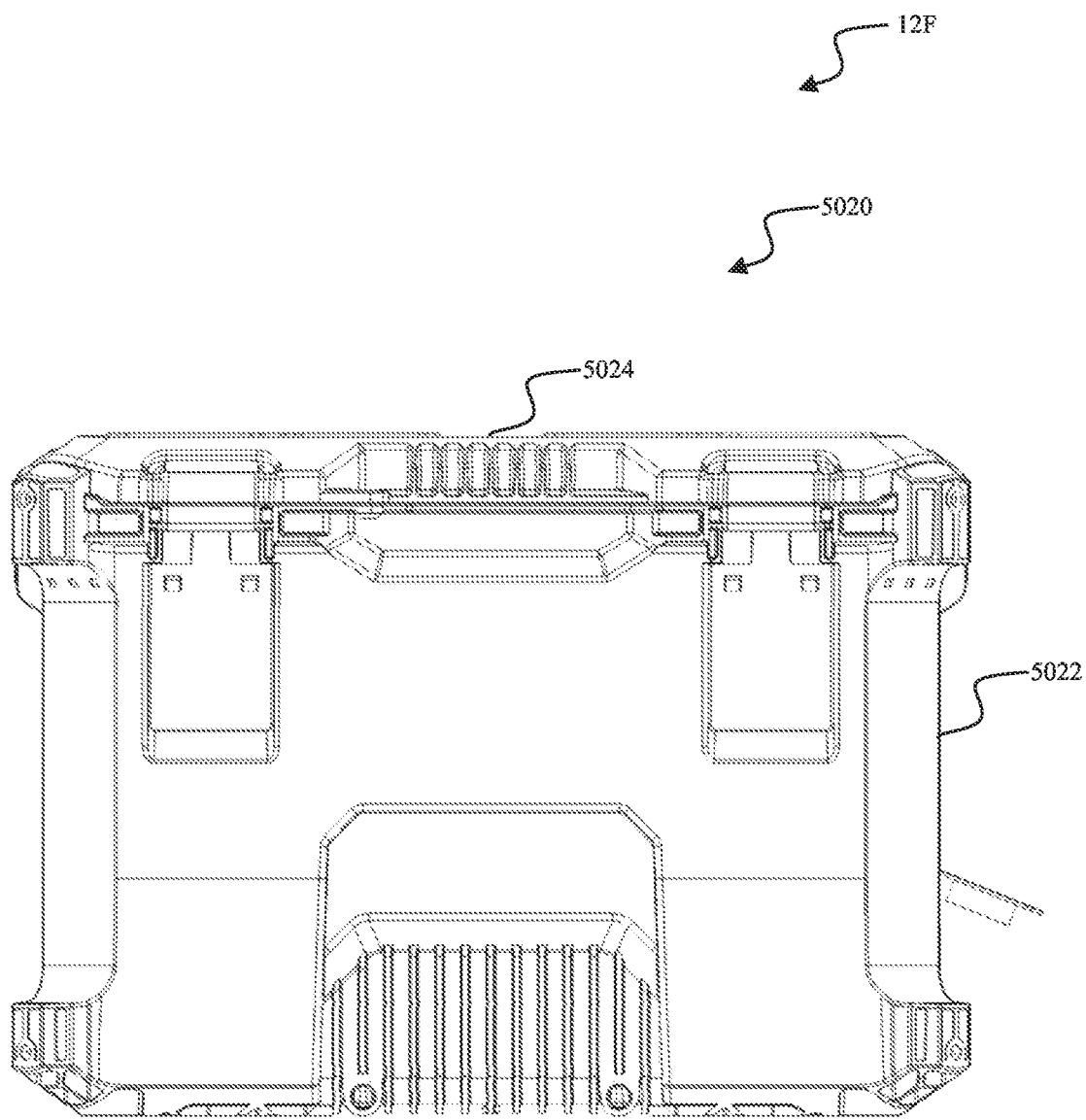
FIG. 41 is a front view of the wireless charging device of FIG. 41.
Figure 42:
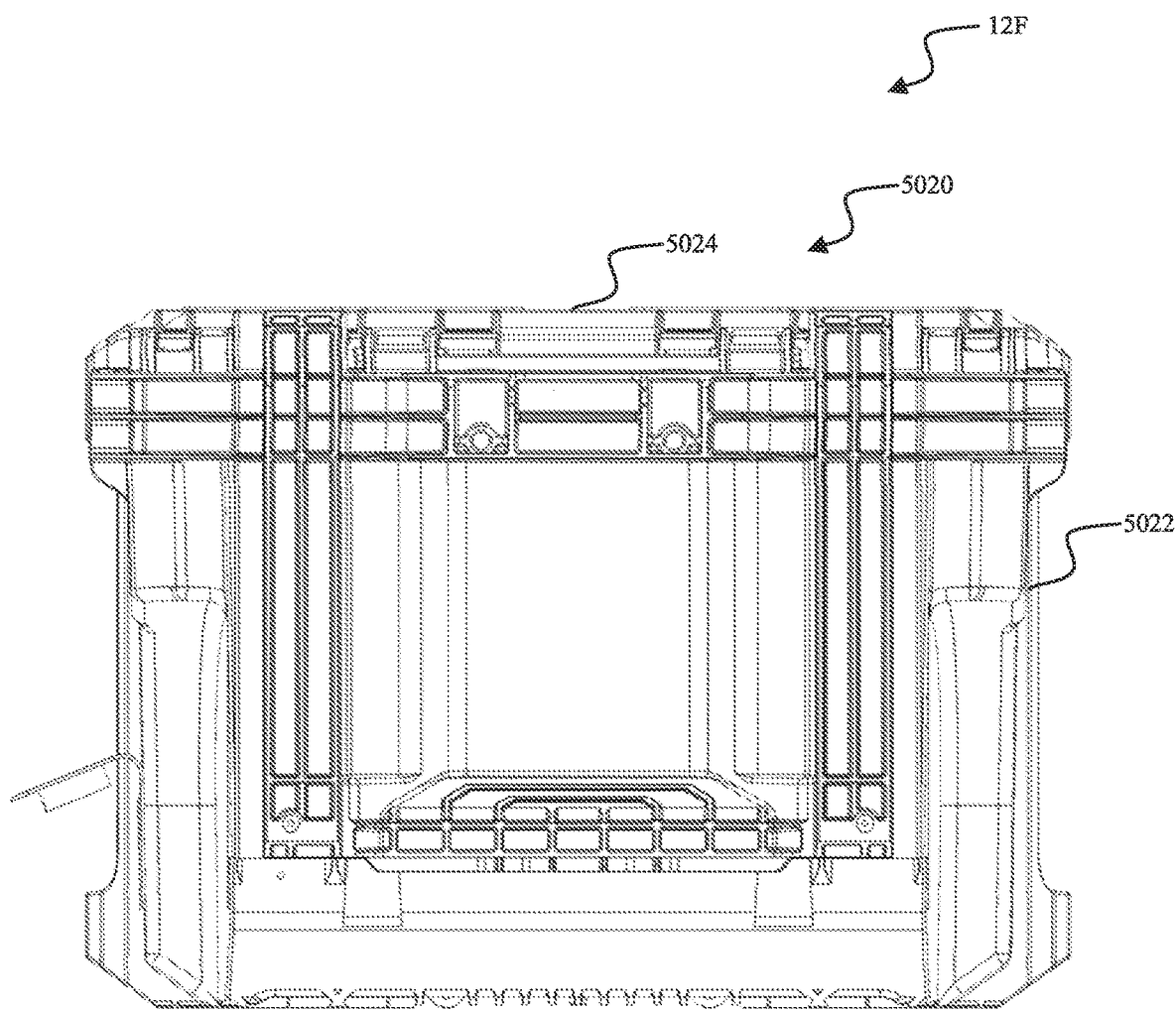
FIG. 42 is a rear view of the wireless charging device of FIG. 41.

FIG. 39 illustrates the wireless charging device 12E of the communication system 10 of FIG. 32 according to another example embodiment in which the wireless charging device 12E includes a another mobile tool storage device 4010 that can include the same or similar structure as the wireless charging devices 12B, 12C described above in FIGS. 32-37. More specifically, the wireless charging device 12E includes a base assembly 4018 and a housing 4020 supported by the base assembly 4018. The base assembly 4018 includes a plurality of wheels 4022 extending from a bottom surface thereof. The housing 4020 further includes a first storage compartment 4024 and a second storage compartment 4028. The first storage compartment 4024 is supported proximate a bottom of the housing 4020 and the second storage compartment 4028 is positioned proximate a top of the housing 4020. In other embodiments, the mobile tool storage device 4010 may include one or more storage compartments at any position relative to the housing 4020. One or more of the charging stations 28 of the wireless charging device 12E may be positioned within or otherwise integrated with the first storage compartment 2024, the second storage compartment 4028, or a combination of the two, for example, for charging battery packs 13 carried in the first storage compartment 2024 and/or the second storage compartment 4028.

FIGS. 40-48 illustrate the wireless charging device 12F of the communication system 10 of FIG. 32 according to another example embodiment. The wireless charging device includes a temperature controlled enclosure 5020 that includes a lower housing portion 5022 and an upper housing portion 5024. In some embodiments, the upper housing portion 5024 is pivotable about one or more hinges such that the interior of the temperature controlled enclosure 5020 can be accessed without completely removing the upper housing portion 5024. The upper housing portion 5024 is configured to engage the lower housing portion 5022 to create a substantially air- and water-tight seal. Such a seal between the lower housing portion 5022 and the upper housing portion 5024 aides in preventing air inside the temperature controlled enclosure 5020 from being affected by air outside of the temperature controlled enclosure 5020.

The temperature controlled enclosure 5020 also includes a power input terminal 5102. In some embodiments, the power input terminal 5102 is an AC power input terminal. In other embodiments, the power input terminal 5102 is a DC power input terminal or includes a battery receptacle for receiving one or more battery packs. The upper housing portion 5024 includes an interface 5230 that is configured to allow the temperature controlled enclosure 5020 to physically engage or mate with one or more additional devices that have a complimentary interfaces.

Figure 43:
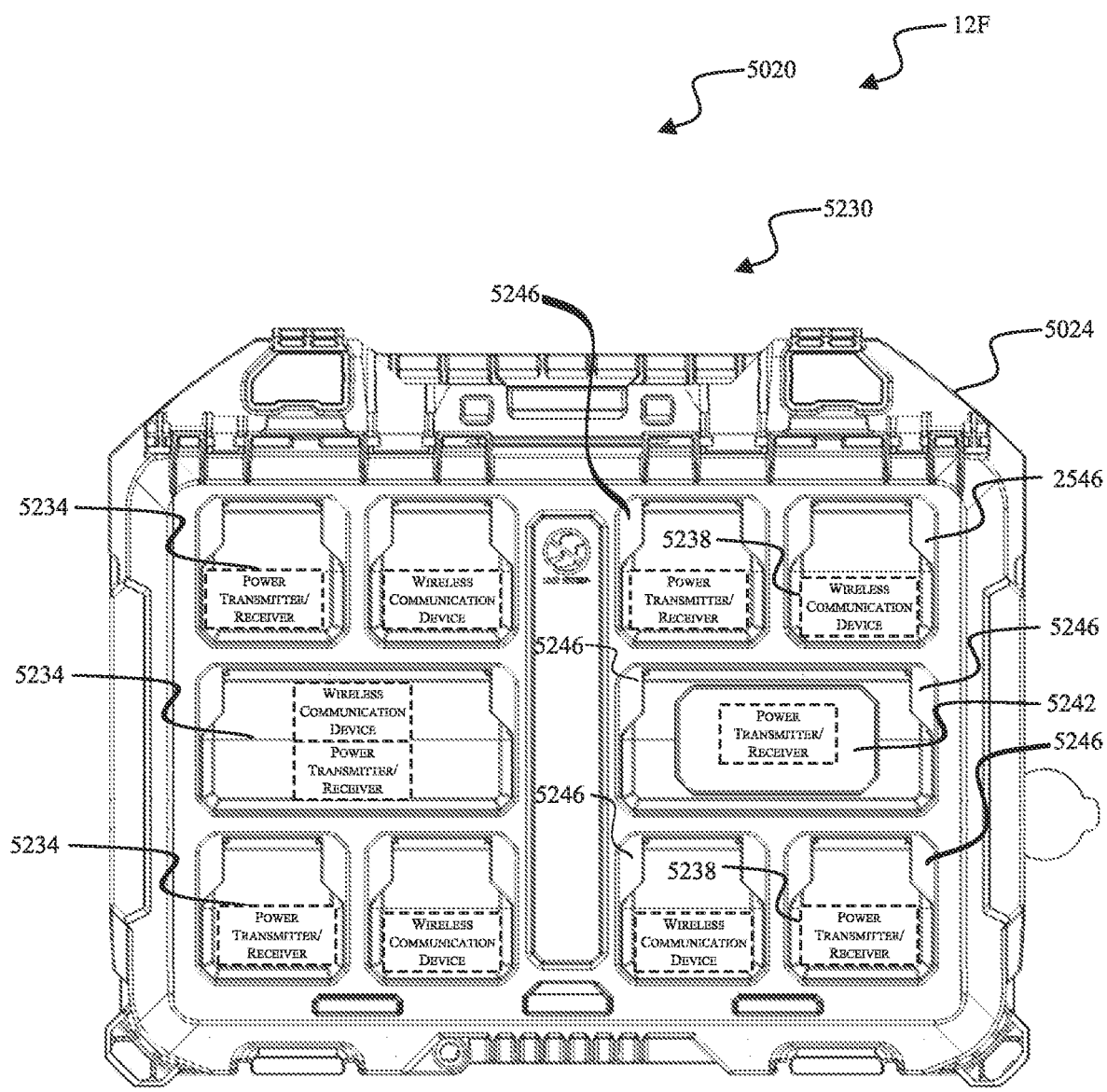
FIG. 43 is a top view of the wireless charging device of FIG. 41.
Figure 44:
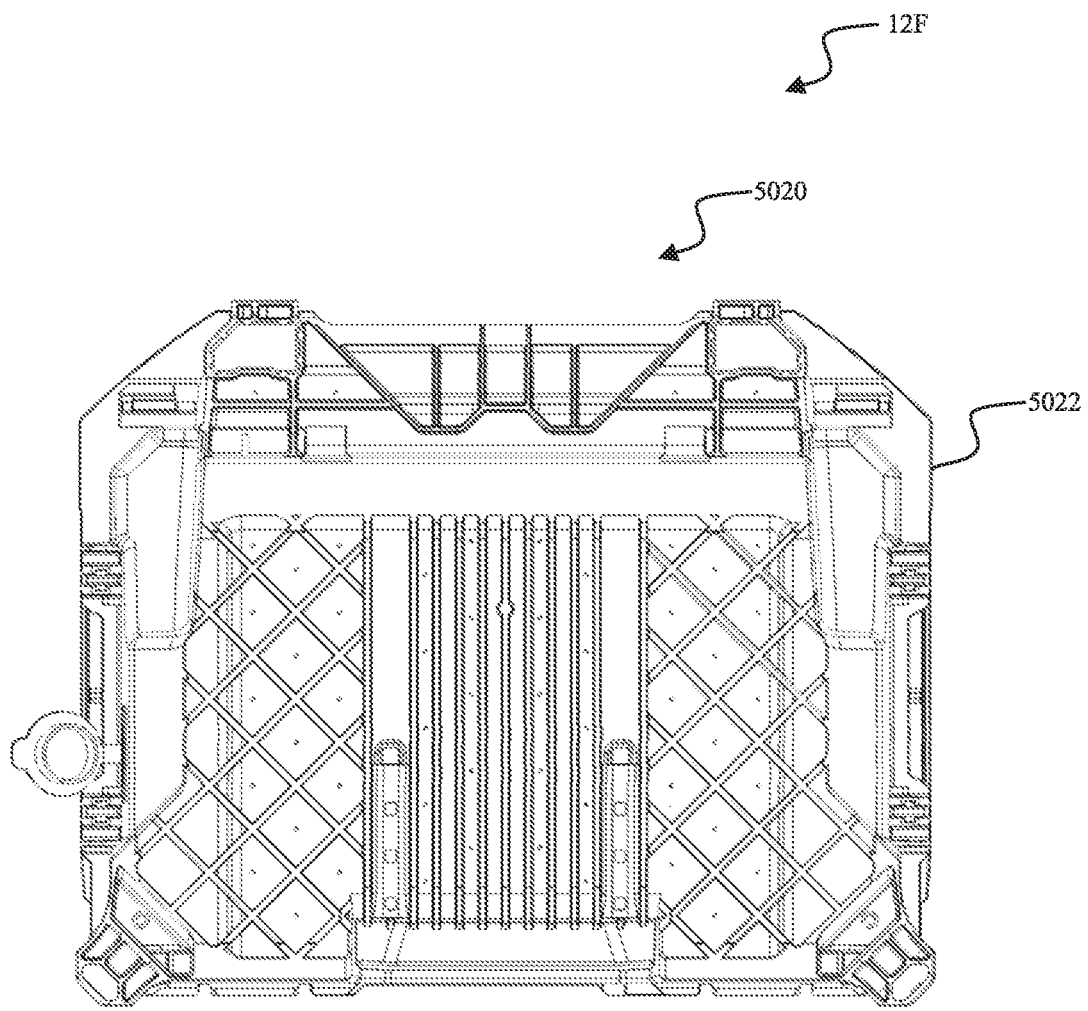
FIG. 44 is a bottom view of the wireless charging device of FIG. 41.
Figure 45:
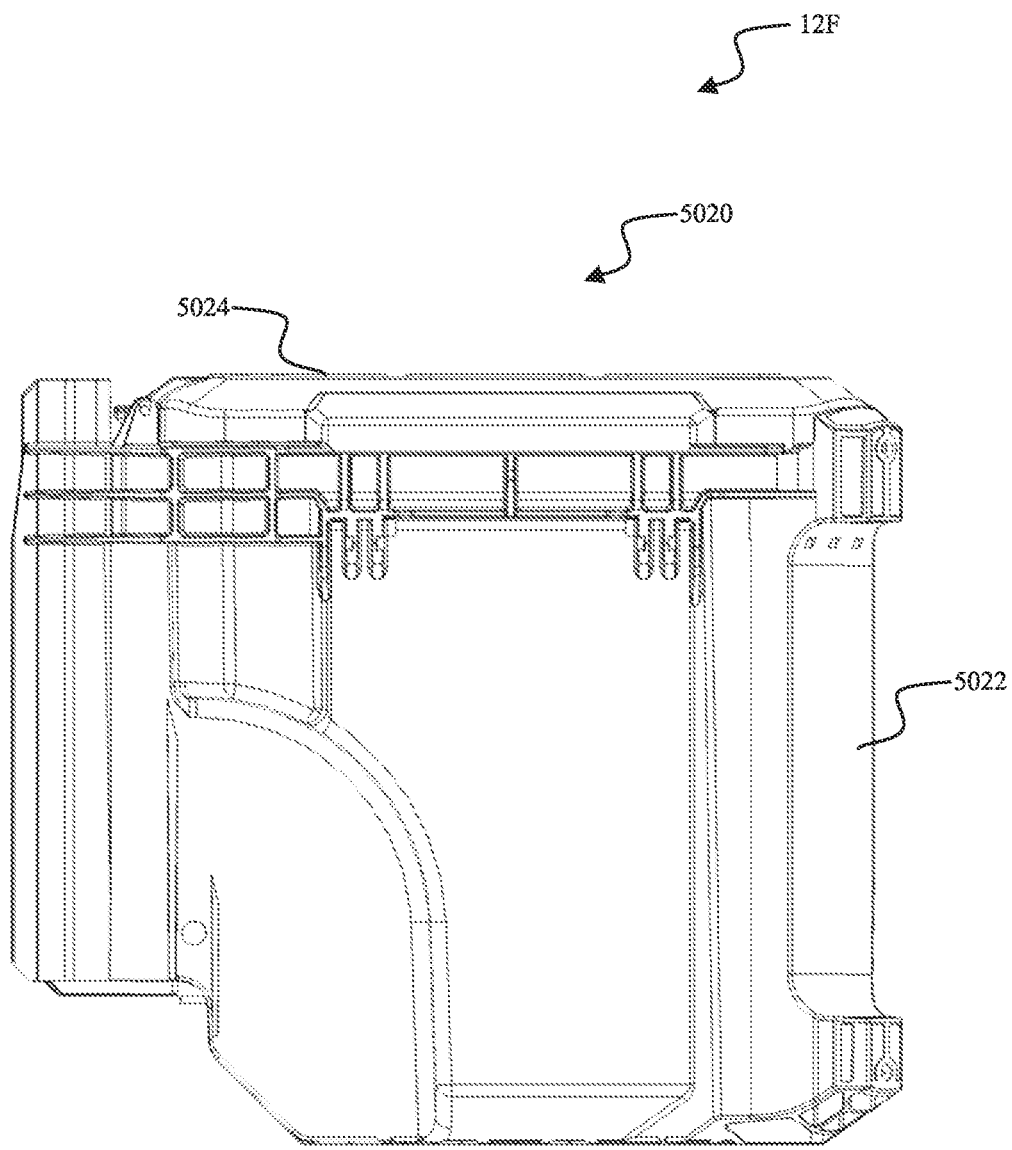
FIG. 45 is a first side view of the wireless charging device of FIG. 41.
Figure 46:
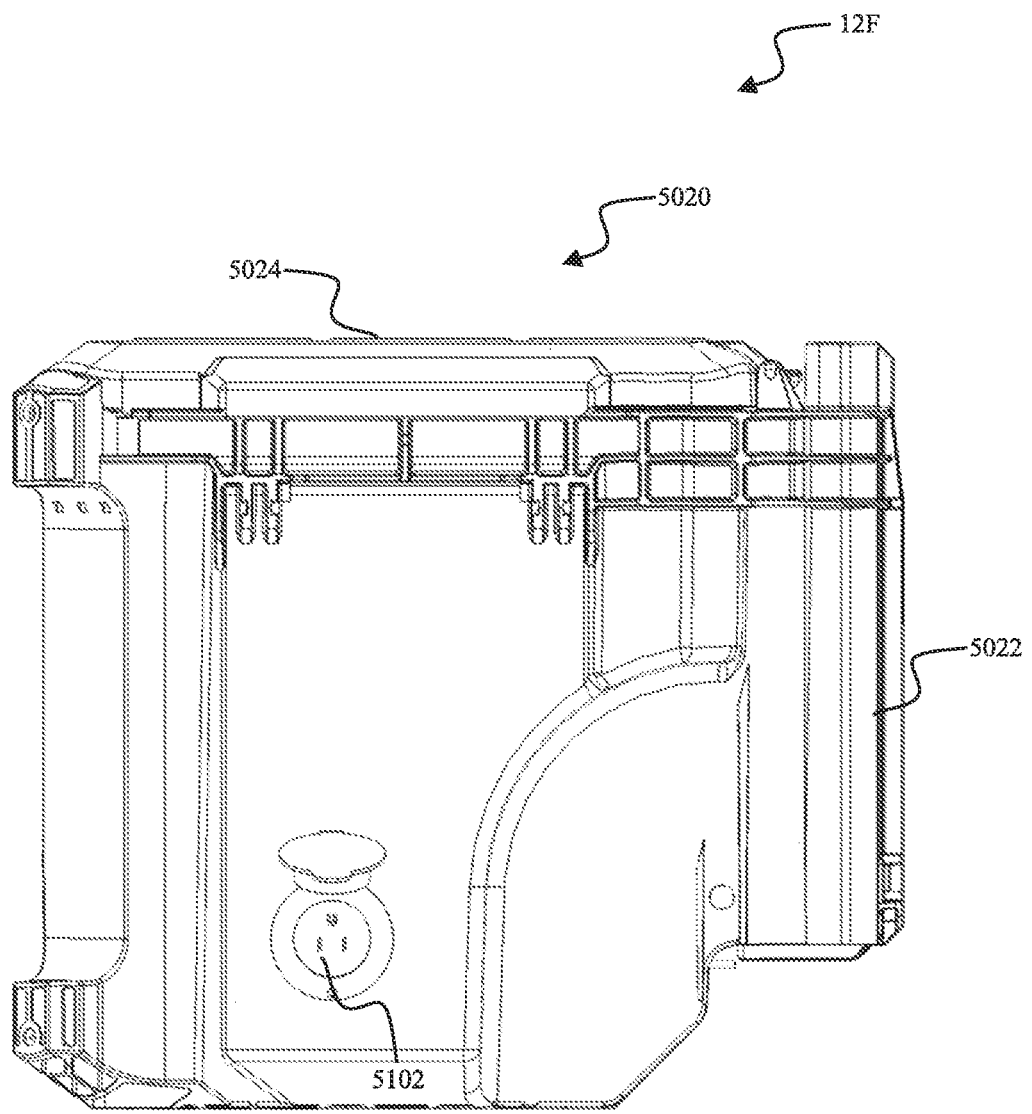
FIG. 46 is a second side view of the wireless charging device of FIG. 41.
Figure 47:
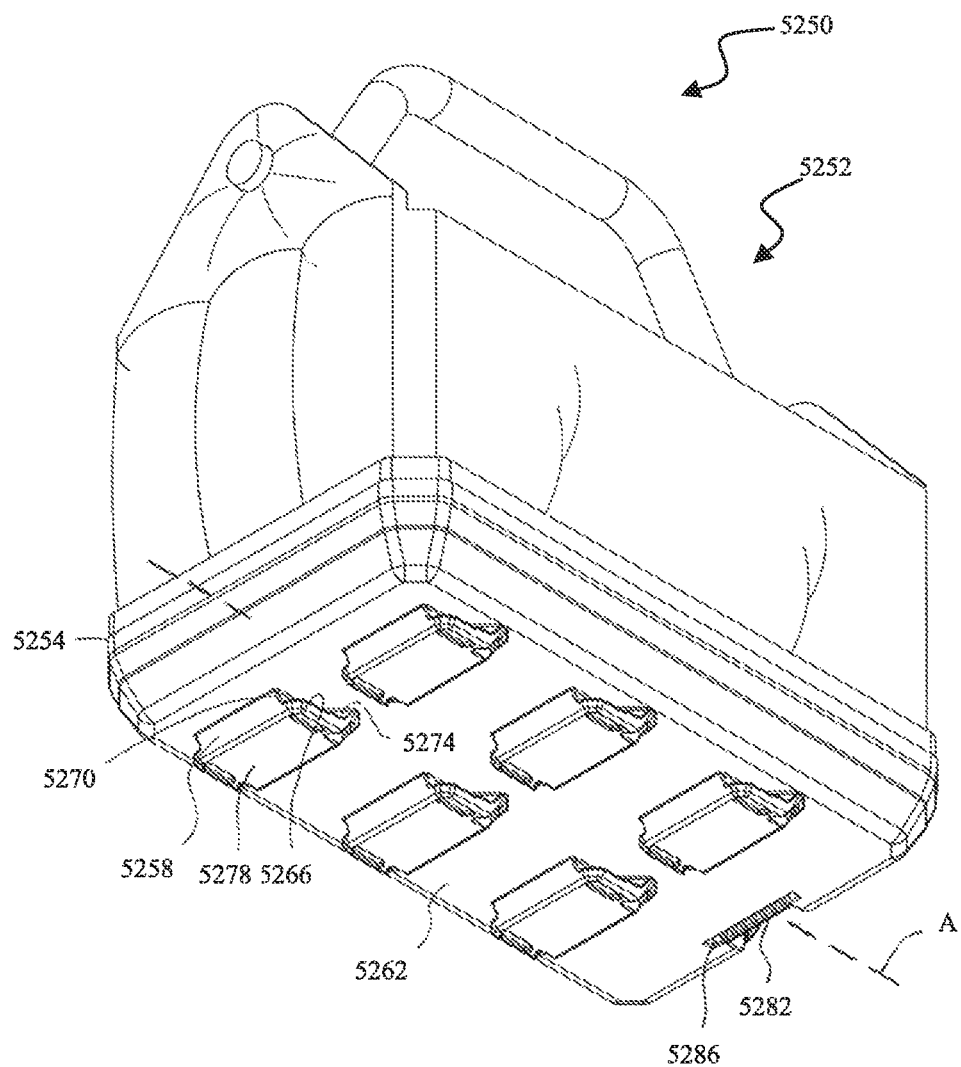
FIG. 47 is a perspective view of a device configured to be connected to the wireless charging device of FIG. 41.

With reference to FIG. 43, the interface 5230 of the upper housing portion 5024 includes a plurality of connection recesses 5234 that receive and cooperate with projections from a complementary interface (see FIG. 47). The connection recesses 5234 include two rows of two small recesses 5238 and one row of large recess 5242. In other embodiments, the upper housing portion 5024 can include different numbers or patterns of connection recesses 5234. An interference projection or wing 5246 extends into each connection recess 5234 on opposite sides of the connection recess 5234 from one end of the connection recess 5234. Each of the wings 5246 has a length that extends approximately half the connection recess 5234 to define a first portion of the connection recess 5234 and a second portion opposite the wings 5246, which remains open.

With reference to FIG. 47, a device 5250 (e.g., a component of a modular tool storage system) includes a top member 5252 and a bottom member 5254 coupled to the top member 5252. The illustrated top member 5252 is configured as a soft bag or other storage container. The bottom member 5254 has a plurality of projections 5258 extending therefrom. The second portion of each connection recess 5234 is sized to receive one of the projections 5258. When the projections 5258 are received in the connection recesses 5234, a bottom surface 5262 of the bottom member 5254 is arranged to contact and be supported by a top surface of the upper housing portion 5024. In the illustrated embodiment, each projection 5258 extends from the bottom surface 5262 of the bottom member 5254 and is configured to cooperate with one of the connection recesses 5234 and couple the device 5250 to the temperature controlled enclosure 5020. In the illustrated embodiment, each projection 5258 is formed integrally with the bottom member 5254. Each projection 5258 has a channel 5266 on each side of the projection 5258 extending parallel to a longitudinal axis A of the bottom member 5254. Each channel 5266 has a front, open end 5270 and a back, closed end 5274 along the axis A. Each projection 5258 has a planar surface 5278 with a generally rectangular shape. In other embodiments, the planar surface 5278 may be another shape (e.g., circular, triangular, etc.). In the illustrated embodiment, there are six projections 5258 arranged in three rows of two projections along the axis A. In other embodiments, the device 5250 includes more or fewer projections 5258, and/or the projections 5258 are arranged in different patterns. The projections 5258 are arranged such that the device 5250 can be supported on a surface by the projections 5258 through contact with the planar surfaces 5278. In some embodiments, the device 5250 includes a connection portion 5282 and a latch member 5286 for engaging a locking aperture of the temperature controlled enclosure 5020 and securing the device 5250 to the temperature controlled enclosure 5020.

Each of the wings 5246 of the connection recesses 5234 corresponds to and is configured to cooperate with a corresponding one of the channels 5266 of the projection 5258 received by the respective connection recess 5234. In the disconnected position, the projections 5258 are oriented within the connection recesses 5234 such that the open ends 5270 of the channels 5266 are nearer to the wings 5246 than the closed ends 5274. Once in the disconnected position, the bottom member 5254 may slide relative to the upper housing portion 5024 parallel to the longitudinal axis A in a first direction toward the wings 5246 such that the wings 5246 are received within the channels 5266 in a second, interfaced or connected position. The wings 5246 and the projections 5258 engage within the connection recesses 5234 to interface and connect the bottom member 5254 with the upper housing portion 5024 and prevent disconnection of the bottom member 5254 from the upper housing portion 5024, except in a second direction opposite the first direction and generally parallel to the longitudinal axis A. The wings 5246 and the channels 5266 engage one another perpendicular to the longitudinal axis A. In some embodiments, the upper housing portion 5024 includes a locking aperture for selectively inhibiting disconnection of the device 5250 from the temperature controlled enclosure 5020.

Figure 48:
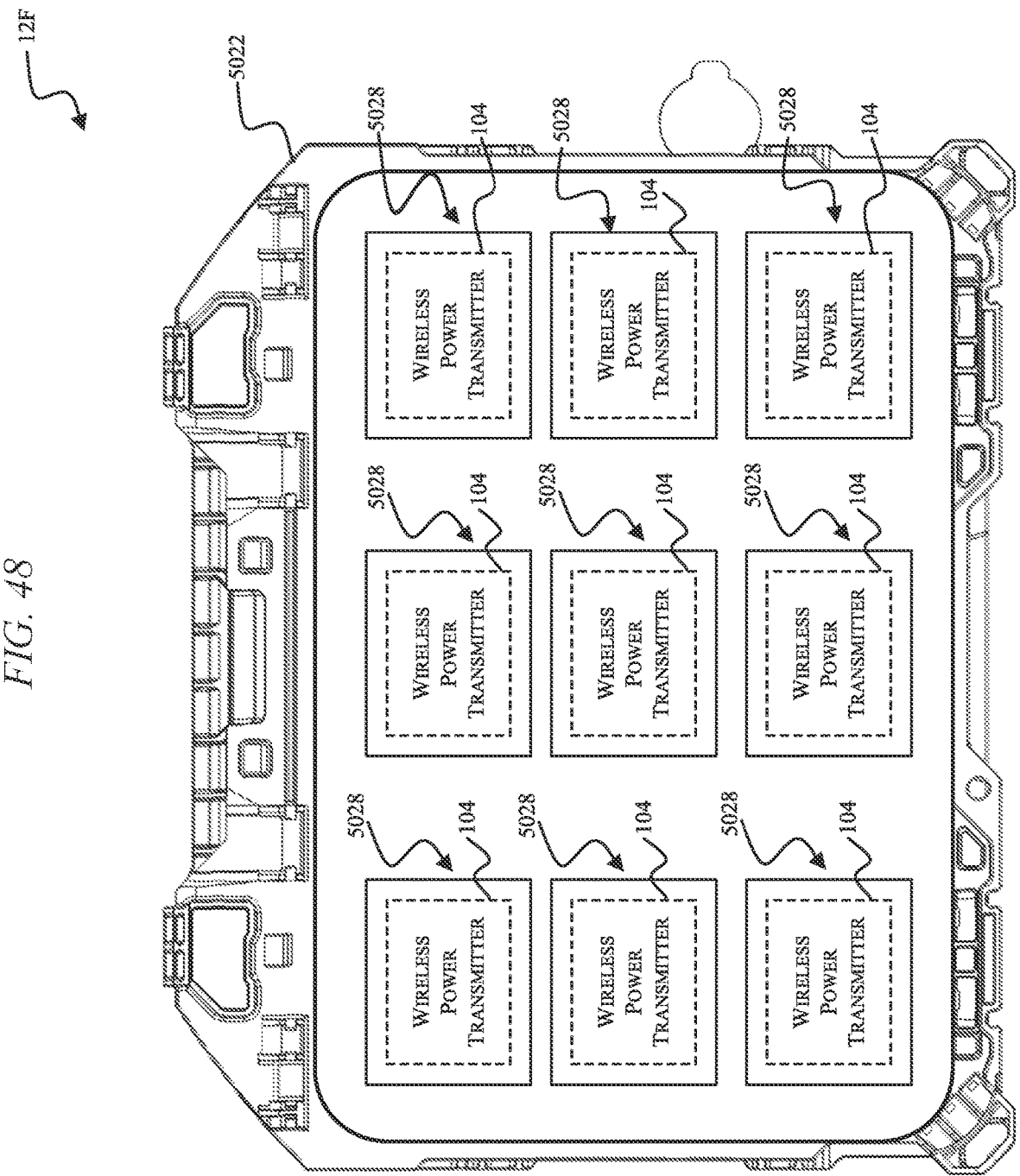
FIG. 48 is a plan view of the lower housing member of FIG. 41.

FIG. 48 illustrates the temperature controlled enclosure 5020 with the upper housing portion 5024 removed. As shown in FIG. 48, the temperature controlled enclosure 5020 includes an internal cavity or space 5034 and one or more charging stations 5028 (also referred to as battery pack interfaces or battery pack charging ports) carried in the internal cavity 5034. The charging stations 5028 can include the same or similar interface 1062 as the charging stations 1028A-1028C of FIG. 32 and, accordingly, the discussion of the interface 1062, including the guiding structure 1066, of the charging stations 1028A-1028C above similarly applies to the charging stations 5028 and is not re-stated. The internal cavity 5034 and/or also the enclosure 5020 (the lower housing 5022 and/or upper housing 5024) can also include one or more display/indicator(s) 100, one or more sensor(s) 102, etc., as described above, for providing a charging and/or temperature status of one or more battery packs connected to the charging stations 5028.

The wireless charging device 12F may further include additional structure (e.g., the projections and/or recesses as previously described) such that the wireless charging device 12F is configured to be modular in which multiple wireless charging device 12F and/or devices 5250 may be stacked or otherwise coupled together. Two or more of the wireless charging device 12F include the one or more charging stations 5028. In addition, the device 5250 may also include one or more charging stations 5028. The interface between the wireless charging device(s) 12F and/or the device(s) 5250 includes the mechanical components, but also electrical components configured to and operable for interfacing (e.g., electrically and communicatively connecting) the multiple wireless charging device(s) 12F/device(s) 5250 with each other. For example, as shown in FIG. 43, the interface may include one or more, power transmitter/receiver (e.g., wireless or electrical contacts), wireless communication device 74B, etc. positioned on, within, proximate, etc. the interface structure (e.g., recesses 5234, projections 5258). Accordingly, the wireless charging device 12F is connectable (mechanically, electrically, and/or communicatively) with other wireless charging devices 12F and/or devices 5250 within the stack. In particular, the wireless charging devices 12F/devices 5250 are mechanically coupled with adjacent wireless charging devices 12F/devices 5250, and the wireless charging devices 12F/devices 5250 are electrically/communicatively coupled with the remaining wireless charging devices 12F/devices within the stack via any of the intermediate wireless charging devices 12F/devices 5250.

In some embodiments, the wireless charging device 12F is connectable with enclosures of adjacent wireless charging devices 12F to sense one or more battery packs 13 within the interior cavity 5034 of adjacent wireless charging devices 12F and/or one or more battery packs 13 of devices 2520 within the stack. In further embodiments, the wireless charging device 12F remotely communicates with and/or charges one or more battery packs 13 within the interior cavity 5034 of adjacent wireless charging devices 12F and/or one or more battery packs 13 of devices 2520 within the stack.

In yet further embodiments, the wireless charging device 12F includes the display/indicator(s) 100 to identify one or more battery packs 13 within the interior cavity 5034 of adjacent wireless charging devices 12F and/or one or more battery packs 13 of devices 2520 within the stack. The wireless charging device 12F may further include the display/indicator(s) 100 for displaying information regarding the charging process for one or more battery packs 13 within the interior cavity 5034 of other wireless charging devices 12F and/or one or more battery packs 13 of devices 2520 within the stack.

In some embodiments, the wireless charging device 12F communicates information regarding the wireless charging processes to an adjacent wireless charging device 12F. The information exchanged may include the charging modality being used, the state of charge of the one or more battery packs 13 received in the interior cavity 5034, the time to complete charging of the one or more battery packs 13, and the like.

Figure 50:
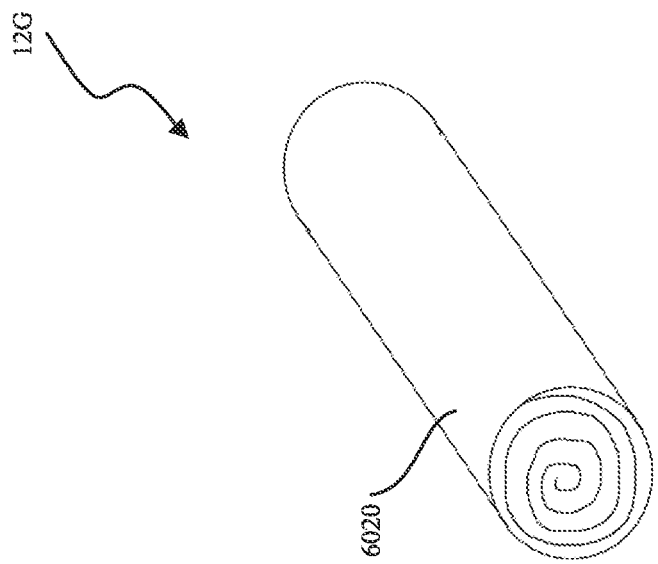
FIG. 50 is a perspective view of the wireless charging device of FIG. 49, illustrating the wireless charging device in a second, rolled-up state.
Figure 49:
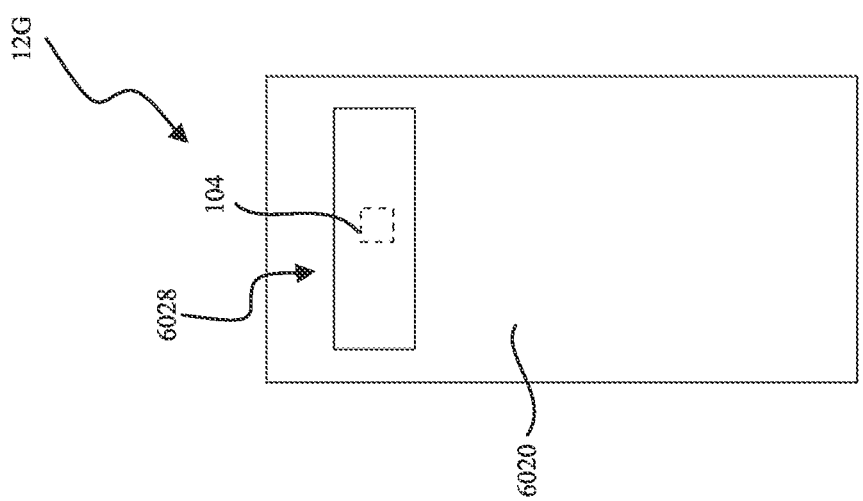
FIG. 49 is a plan view of yet another wireless charging device of the communication system of FIG. 1 according to one example embodiment, illustrating the wireless charging device in a first, flat state.

FIGS. 49-50 illustrate yet another example embodiment of a wireless charging device 12G. The wireless charging device 12G of FIGS. 49-50 is similar to the wireless charging device 12A of FIG. 5. The wireless charging device 12G includes a charger housing 6020, and a plurality of charging stations 6028. The wireless charging device 12G further includes a power source port (not shown, to connect to an AC plug, for example). The plurality of charging stations 6028 are configured to receive a battery pack 13.

The charging station(s) 6028 may be positioned or arranged in a pattern on the housing 6028.

In some embodiments, the wireless charging device 12G is integrated into a toolbox, rolling workbox storage unit, or the like (e.g., see wireless charging devices 12B-12F of FIG. 1). For example, the wireless charging device 12G may be integrated within a toolbox such that tool battery packs are wirelessly charged when placed within the toolbox.

The housing 6020 is formed by a flexible material such that the wireless charging device 12G is adjustable between a first state (FIG. 49) in which the housing 6020 is generally flat, and a second state (FIG. 50) in which the housing 6020 is rolled up. The housing 6020 may also be positioned in an intermediate state between the first state and the second state in which the housing 6020 is partially rolled up. Furthermore, in some embodiments, the intermediate state and/or the second state may include the housing 6020 being folded. When the housing 6020 is in the first state, the intermediate state, and/or the second state, the charging station(s) 6028 of the wireless charging device 12G is configured to connect to and charge the battery pack 13.

Figure 51:
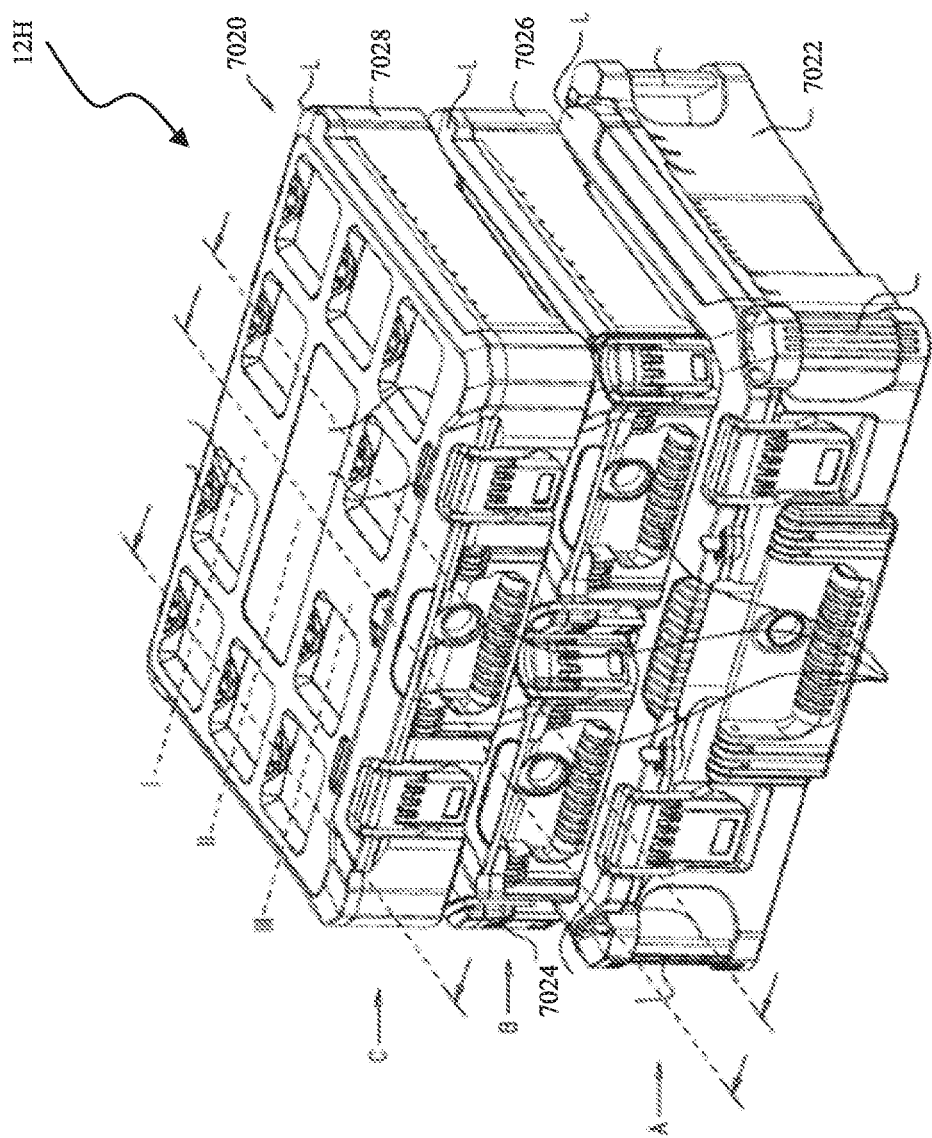
FIG. 51 is a perspective view yet still another wireless charging device of the communication system of FIG. 1 according to one example embodiment, illustrating a container assembly.
Figure 52:
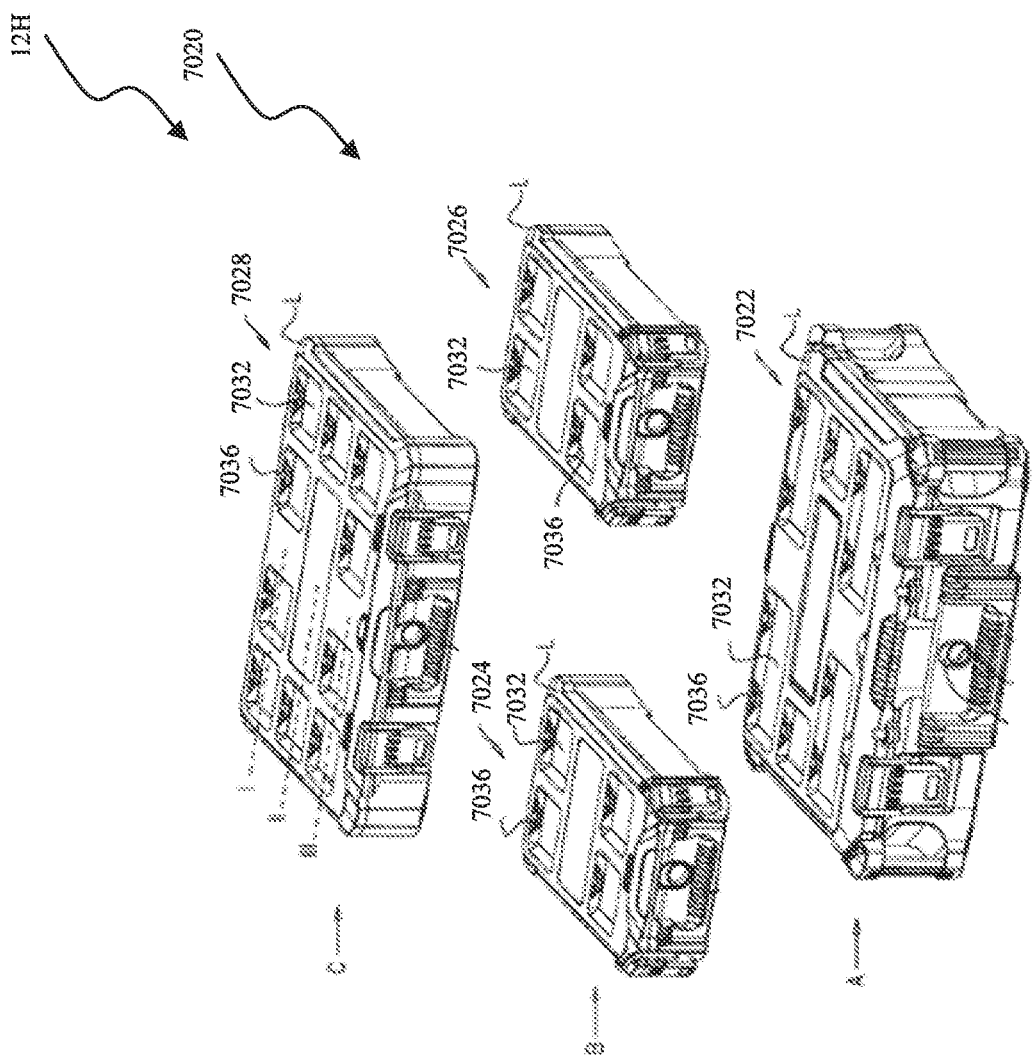
FIG. 52 is an exploded view of the wireless charging device of FIG. 51.
Figure 53:
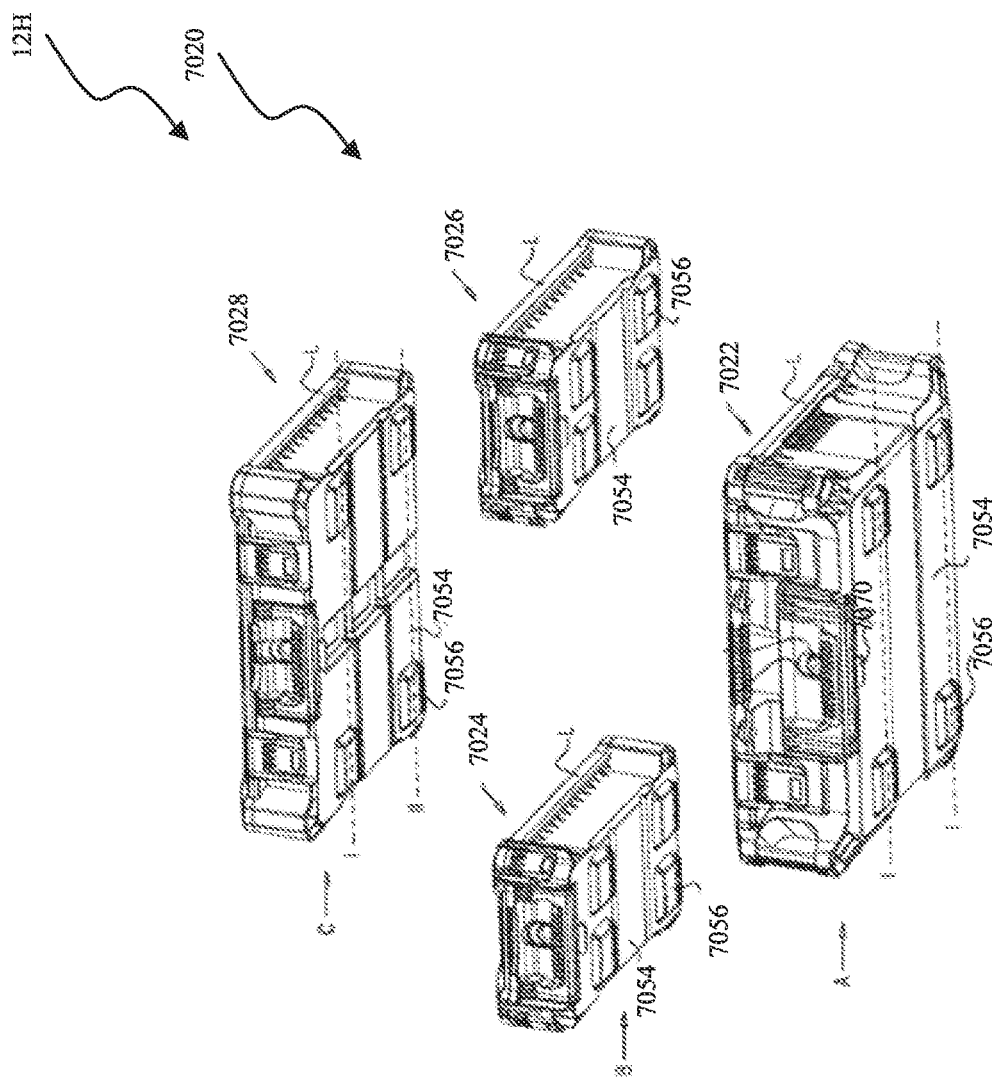
FIG. 53 is another exploded view of the wireless charging device of FIG. 51.

FIGS. 51-53 illustrate yet still another example embodiment of a wireless charging device 12H. The wireless charging device 12H includes a container assembly generally designated 7020, comprising four containers 7022, 7024, 7026 and 7028 disposed in a triple stage configuration, the stages designated A, B and C. In the illustrated example, containers 7024 and 7026 of the second stage are half-size and overlap the footprint of the first stage container 7022 and the third stage container 7028, wherein the first container 7022 is for example a hand tool container, and containers 7024 to 7028 are organizers or the like. In other embodiments, the wireless charging device 12H may include fewer or more containers 7022, 2024, 2026, 2028.

Each of the containers 7022, 7024, 7026, 7028 is configured with a lid L constituting a top face of the respective container 7022, 7024, 7026, 7028. Said lids L are pivotally attached and securely articulated to the respective container 7022, 7024, 7026, 7028 through a toggle locking latch. Each top face (see FIG. 52) is configured with several depressed locking locations 7032 and it is seen that the at least two depressed locking locations are disposed behind one another along imaginary lines I, II and III (though not necessarily aligned).

Each such depressed locking location 7032 is in turn configured with a laterally projecting locking rib 7036 extending from a rear portion of the depressed locking location 7032 towards a front face of the container 7022, 7024, 7026, 7028.

A bottom face 7054 of each container 7022, 7024, 7026, 7028 is configured with several projecting portions 7056, extending in register with the depressed locking locations 7032, and it is seen that the at least two projecting portions 7056 are disposed behind one another along the imaginary lines I, II and III (though not necessarily aligned). Each projecting portion 7056 includes locking surfaces complimenting with locking surfaces of locking rib 7036.

When it is required to detachably attach a second container (e.g., 7024, 7026, 7028) over a first container (e.g., 7022, 7024) the former is placed over the latter, placing the projecting portions 7056 within the depressed locking location 7032. A locking latch 7070 (FIG. 53) is provided for selectively locking the first and second containers together. A biasing member is provided for maintaining the first and second containers in a locked position.

At the locked position, the second container is attached over the top face of the first container, such that they can be moved as an integrated unit. Detaching of a second container from a first container is easily facilitated by unlocking, obtained by displacing the locking latch 7070 (i.e., against the biasing effect of the biasing member), whereby the second container can be displaced with respect to the first container and detached therefrom.

Figure 54:
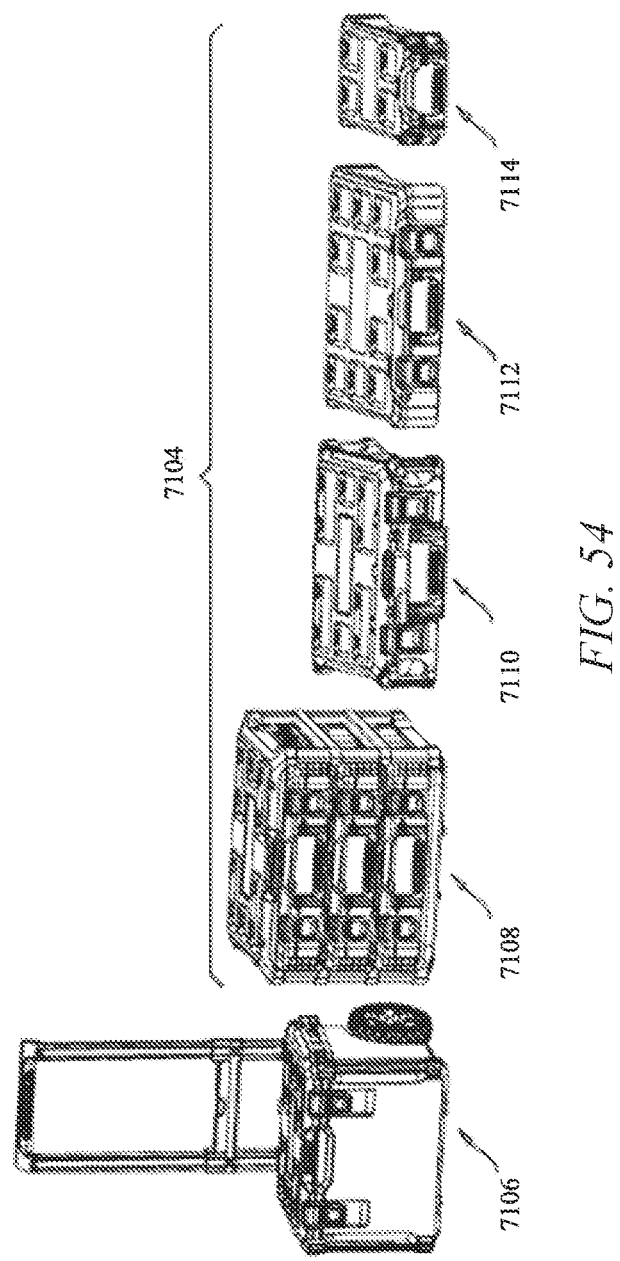
FIG. 54 illustrates a disassembled configuration of example containers of the container assembly of FIG. 51.

The containers 7022, 7024, 7026, 7028 may be configured as different types of containers. For example, FIG. 54 illustrates a disassembled container assembly collectively designated 7104 and comprising a base container 7106, a chest of drawers module 7108 comprising three drawers, a tool caddy module 7110, a compartmented storage module 7112 and a half-sized compartmented storage module 7114 (typically two of which). The containers 7106, 7108, 7110, 7112, 7114 may be arranged (or customized) in any desired order by a user. The containers 7106, 7108, 7110, 7112, 7114 may include the same or similar engagement structure as the containers 7022, 7024, 7026, 7028 of FIGS. 51-53.

Figure 55:
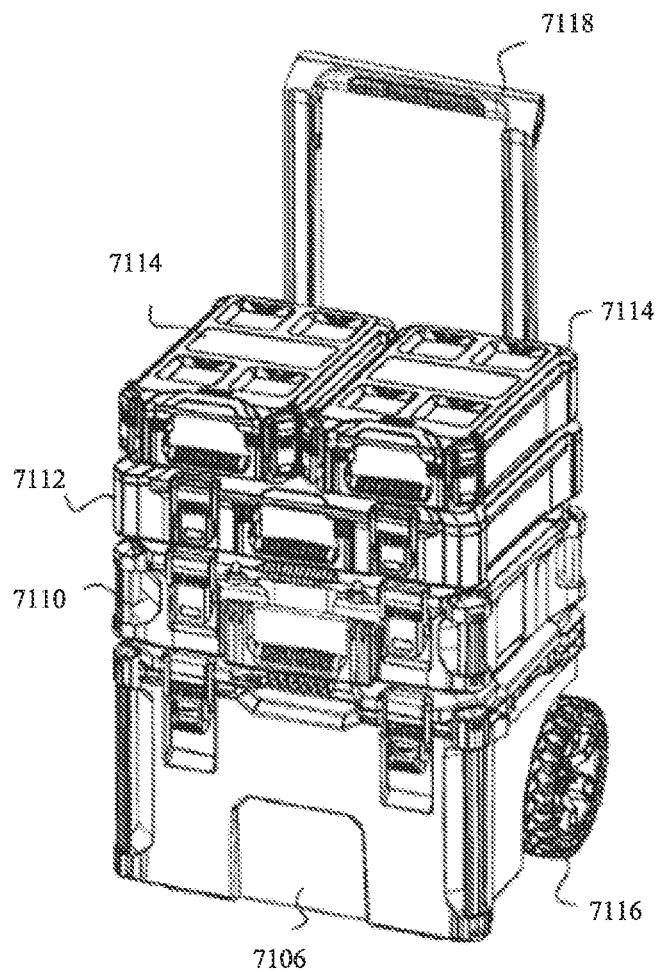
FIG. 55 is one example configuration of the containers of FIG. 54.

For example, FIG. 55 illustrates one example arrangement including the components of the container assembly 7104. In particular, the container assembly includes the base container 7106, the tool caddy module 7110, the compartmented storage module 7112, and two of the half-sized compartmented storage modules 7114 stacked together. The base container 7106 serves as the first container upon which the remaining containers 7110, 7112, and 7114 are stacked.

Figure 56:
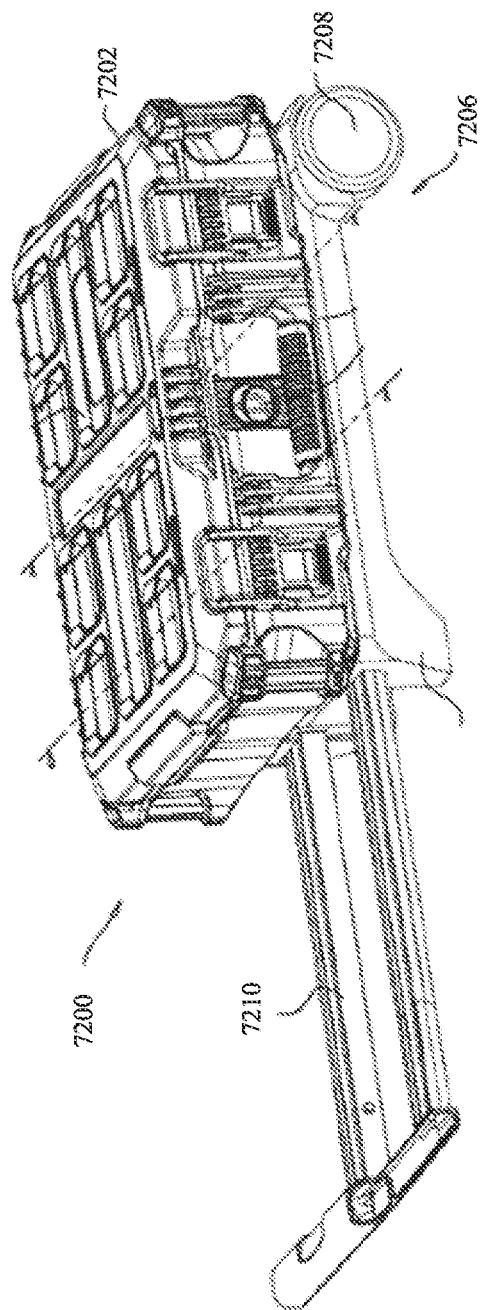
FIG. 56 is another example configuration of a container assembly including a separate carrier unit.

FIG. 56 illustrates another container carrier assembly generally designated 7200 comprising a container unit 7202 (utility module) mounted on top of a carrier unit 7206. The carrier unit 7206 is equipped with a telescopic manipulating handle 7210, a pair of rear wheels 7208 and a set of horizontally stabilizing support legs 7212 at a front portion of the carrier unit 7206. The carrier unit 7206 and the container unit 7202 are engaged in an interlocking engagement via their engagement surfaces.

In some embodiments, as shown in FIG. 55, the base container 7106 is configured for locomoting and comprises at a rear thereof wheels 7116 and a telescopic handle 7118. As such, the base container 7106 may be termed as a carrier unit. In other embodiments, as shown in FIG. 56, the base container 7202 is configured for detachably coupling with a separate carrier unit 7206.

One or more of the containers 7022, 7024, 7026, 7028, 7106, 7108, 7110, 7112, 7114, 7202 may include one or more of the charging stations 28, as discussed above, positioned interior or exterior of the respective container. The charging stations can include the same or similar interface 1062 as the charging stations 1028A-1028C of FIG. 32 and, accordingly, the discussion of the interface 1062, including the guiding structure 1066, of the charging stations 1028A-1028C above similarly applies to the wireless charging device 12H and is not re-stated.

More specifically, each container 7022, 7024, 7026, 7028, 7106, 7108, 7110, 7112, 7114, 7202 defines an internal cavity that may be divided into one or more bins, receptacles, drawers, or other suitable storage member for receiving one or more battery packs 13. One or more of the bins, receptacles, drawers, or other suitable storage member includes an interface for receiving one or more battery packs 13. In some embodiments, the internal cavity may include a bin configured to receive and charge battery packs 13 of different types and/or different sizes. In other embodiments, the internal cavity may include multiple bins in which each bin is configured to receive and charge a specific battery pack 13 (e.g., a specific type of battery pack, a specific size of battery pack, etc.) For example, a first bin of the container may be configured to receive and charge a battery pack of a first manufacturer, and a second bin of the container may be configured to receive and charge a battery pack of a second manufacturer. In another example, a first bin and a second bin may be configured to receive and charge battery packs having different nominal voltages (e.g., 12 V, 18 V).

When the container 7022, 7024, 7026, 7028, 7106, 7108, 7110, 7112, 7114, 7202 includes multiple bins, the bins may be electrically connected together such as by electrical contacts, wireless power transmitters/receivers, or any other suitable electrical connector(s).

The respective container 7022, 7024, 7026, 7028, 7106, 7108, 7110, 7112, 7114, 7202 may alternatively or additionally include one or more charging stations for receiving and charging one or more battery packs 13 while the battery pack 13 is coupled to a power tool or load device (e.g., lamp, level). In other words, as described above, a power tool or load device coupled to the battery pack 13 may be placed in/on the wireless charging station 12, and the battery pack 13 may still be wirelessly charged when coupled to the power tool or load device (via the wireless power receiver(s) 34 of the battery pack 13) (instead of placing the battery pack 13 by itself in/on the wireless charging device 12). As an example, the entire load device including the battery pack 13 may be placed on a charging pad or in a dock (e.g., a contour of a charging station 28A-28D of the wireless charging device 12 as shown in FIG. 5). In some embodiments, the power tool or load device to which the battery pack 13 is coupled may include a wireless power receiver 34 to receive wireless power from the wireless charging device 12 and provide charging current to the battery pack 13 via terminals/contacts connecting the battery pack 13 to the power tool or load device. The one or more charging stations may be configured to receive and charge battery packs of different types and/or different sizes.

In some embodiments, the charging pad and/or charging dock may be positioned exterior to the respective container(s) 7022, 7024, 7026, 7028, 7106, 7108, 7110, 7112, 7114, 7202, and/or may be positioned within one or more bins, receptacles, drawers, or other suitable storage member of the internal cavity of the respective container(s) 7022, 7024, 7026, 7028, 7106, 7108, 7110, 7112, 7114, 7202. For example, in some embodiments, one or more charging pads and/or charging docks may be positioned on the top face of the wireless charging device 12H (e.g., the lid L of the topmost container). In some embodiments, the charging pads and/or charging dock may be used to charge power tools or load devices between use by a user during the day.

The wireless charging device 12H also includes the same or similar power supply input as the power supply input of FIGS. 33-35, and, accordingly, the discussion of the power supply input above similarly applies to the wireless charging device 12H and is not re-stated. In some embodiments, the power supply input may be a battery receptacle supported by a carrier unit (e.g., cart 2106, 2206 of FIGS. 55 and 56, respectively). The battery receptacle is configured to receive a battery pack (e.g., 80 V battery pack) for supplying power to the wireless charging device 12H. For example, the power supply input may be a battery receptacle positioned within and/or supported by a bottom-most container, or bin of the bottom-most container. In another example, the power supply input may be a battery receptacle that is coupled or otherwise positioned on an exterior of the carrier unit.

Figure 57:
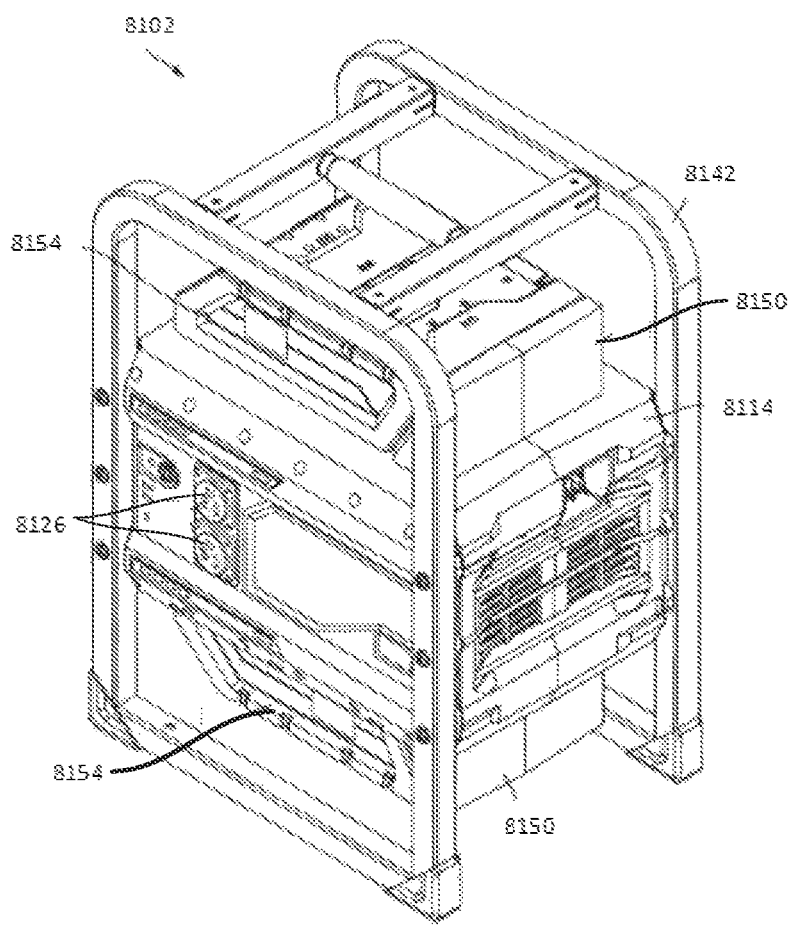
FIG. 57 is a perspective view of a portable power source.

In other embodiments, the wireless charging device 12H is powered by a portable power source 8102 as shown in FIG. 57. The illustrated portable power source 8102 includes a housing 8114, and one or more battery supports 8150 for supporting one or more battery packs 8154. In addition, the portable power source 8102 may also be configured to receive power from an external power source (e.g., AC source) via an external power source connection such as a cord that plugs into a wall outlet. In one example, the bottom-most container is the portable power source in which the remaining containers may be electrically connected to the portable power source, and/or the bottom-most container includes the portable power source.

A roll cage 8142 (for example, a frame) is fixed to the housing 8114 to, for example, provide protection for and enable handling of the portable power source 8102. The roll cage 8142 inhibits contact with the housing 8114 and the battery packs 8154, which may be similar to or the same as the battery pack 13B of FIG. 3B. The housing 8114 further supports AC outlets 8126 that are powered by the battery packs 8154 and/or the external power source).

The internal cavity, one or more of the containers 7022, 7024, 7026, 7028, 7106, 7108, 7110, 7112, 7114, 7202, and/or the carrier units 7106, 7206 may also include one or more display/indicator(s) 100, one or more sensor(s) 102, etc., as described above, for providing a charging and/or temperature status of one or more battery packs connected to the charging stations.

The wireless charging devices 12 above have been described as having engagement structure and/or electrical connectors configured to allow multiple wireless charging devices 12 to be coupled (mechanically, electrically, and/or communicatively) to one another for creating a modular system. Accordingly, each of the wireless charging devices 12 are configured as a module that can form one of the modules of the modular system. In some embodiments, a module can be configured to receive and charge a specific type of battery pack, and/or to accommodate the wireless adapter 176 of FIGS. 7A-7B. As such, a user can preselect and assemble modules of the modular system to customize the modular system to create a desired tool set. The modules of the modular system can communicate and transfer power to one another via both wireless and/or wired connections (including a universal serial bus (USB) connector), as described above. Furthermore, the modules may be specifically sized and configured to be received within a predefined storage member(s) (e.g., drawers, shelves, enclosures, containers, or any other suitable storage member).

In some embodiments, the portable power source 8102 of FIG. 57 alone functions as a wireless charging device 12. In other words, the portable power source 8102 may function as an integrated portable power supply and wireless charging device. For example, the housing 8114 of the portable power source 8102 may include one or more charging stations 1028 as described previously herein with respect to FIGS. 32-35.

Figure 60:
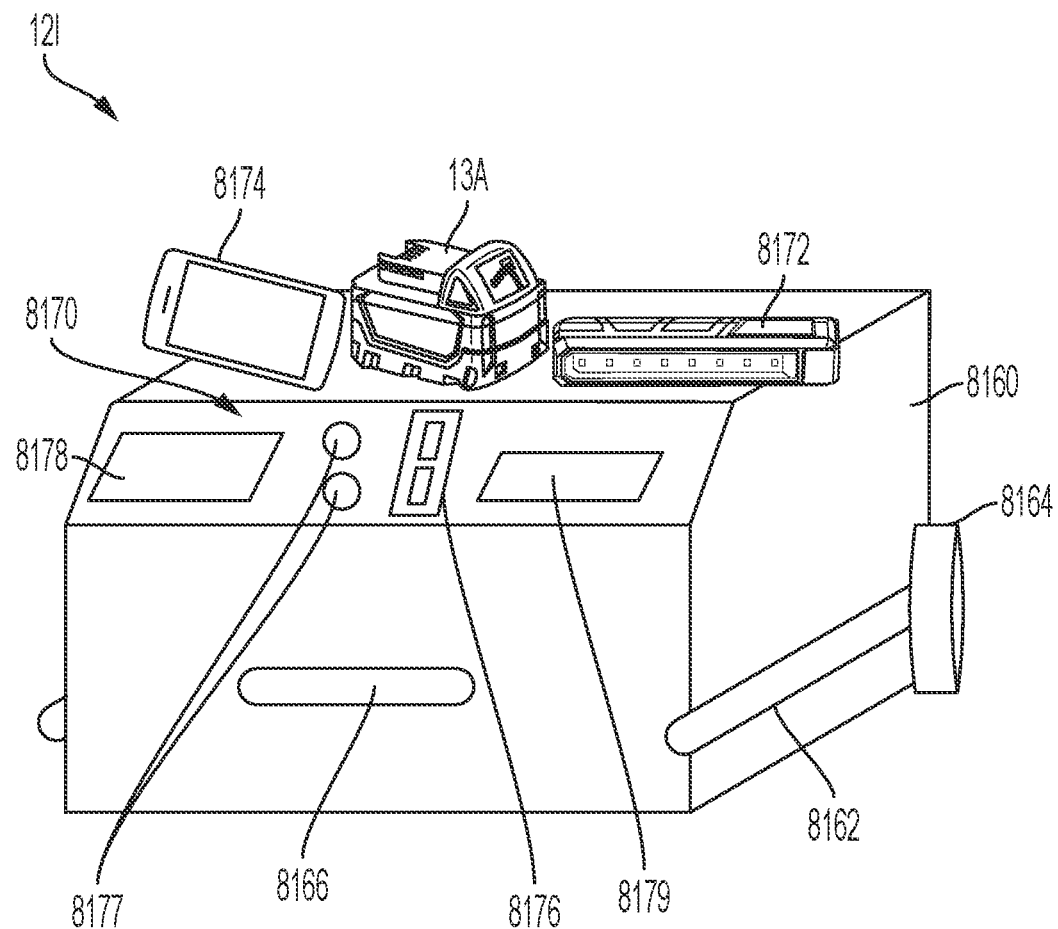
FIG. 60 illustrates a perspective view of another wireless charging device of the communication system of FIG. 1 according to one example embodiment, where the wireless charging device may function as an integrated portable power supply and wireless charging device.

FIG. 60 illustrates a wireless charging device 12I that may function as an integrated portable power supply and wireless charging device according to another example embodiment. The wireless charging device 12I may share one or more characteristics of the portable power source 8102 of FIG. 57 and one or more of the characteristics of the wireless charging devices 12B and 12C of FIGS. 32-35. Additionally, at least some characteristics of the wireless charging device 12I explained below may be included on the portable power source 8102 of FIG. 57, the wireless charging devices 12B and 12C of FIGS. 32-35, and/or other similar devices described herein.

In some embodiments, the wireless charging device 12I includes a housing 8160 that includes one or more internal batteries (not shown). For example, the one or more internal batteries may include the battery pack 13A, 13B/8154, 13C explained previously herein. In some embodiments, the one or more internal batteries (i.e., a plurality of battery cells) are configured to be permanently installed within the housing 8160 and may be referred to as an internal core battery. For example, the one or more internal batteries may be irremovable unless the housing 8160 is disassembled, for example, by service personnel at a service center. In addition, the wireless charging device 12I may also be configured to receive power from an external power source (e.g., AC source). In some embodiments, the external power source (when available) may be configured to charge the one or more internal batteries. In some embodiments, the wireless charging device 12I may be configured to wirelessly charge one or more battery packs or devices using power provided by the one or more internal batteries (for example, when the external power source is not available such as when the wireless charging device 12I is located at certain portions of a construction site), the external power source, or both.

In some embodiments, the wireless charging device 12I is configured to provide pass-through power to one or more charging stations 1028 to wirelessly charge a battery pack 13A, 13B/8154, 13C, external device 14, etc. placed on the one or more charging stations 1028. In some embodiments, pass-through power is provided by an AC power source when the wireless charging device 12I is plugged into the AC power source. In such embodiments, the AC power source may also provide power to the internal core battery of the wireless charging device 12I to charge the internal core battery. In some embodiments, the pass-through power may be provided by the internal core battery simultaneously while the internal core battery is being charged by the AC power source. In other words, the internal core battery may simultaneously (i) be charged by the AC power source and (ii) discharge power to one or more charging stations 128. In some embodiments, the wireless charging device 12I includes conditioning circuitry between the AC power source, the internal core battery, and the charging stations 128 as explained herein with respect to other embodiments of the wireless charging device 12.

The wireless charging device 12I may include a roll cage 8162 (for example, a frame) that is similar to the roll cage 8142 explained above with respect to FIG. 57. While FIG. 60 illustrates only a portion of a roll cage, the wireless charging device 12I may include other portions of a roll cage located on one or more sides of the housing 8160, for example, as shown in FIG. 57. One or more wheels 8164 may be coupled to the housing 8160 or roll cage 8162 to allow for easy transportation of the wireless charging device 12I, for example, to and/or through a construction site. A first handle 8166 and a second handle (not shown) may be coupled to the housing 8160 or the roll cage 8162. The second handle may be located on a rear side of the housing 8160 opposite a front side of the housing 8160 where the first handle 8166 is located. The second handle may be a retractable handle that is configured to retract into a retracted position when the wireless charging device 12I is not being transported. The second handle may be configured to extend upward into an extended position to allow a user to transport the wireless charging device 12I more easily.

In some embodiments, the housing 8160 includes a control panel 8170 that includes user interface elements, various types of power outlets, and/or the like. For example, the control panel 8170 includes one or more alternating current (AC) outlets that are powered by the internal batteries and/or the external power source. The AC outlets may be located under one or more covers 8179 as shown in FIG. 60. The control panel 8170 may additionally or alternatively include one or more universal serial bus (USB) ports (e.g., USB-A, USB-C PD, and/or the like). The control panel 8170 may additionally or alternatively include power buttons 8177 for the AC outlets and/or the USB ports that are configured to control whether power is provided to the AC outlets and/or the USB ports.

In some embodiments, the control panel 8170 includes a human-machine interface (HMI) screen 8178 that provides information to the user. For example, the screen 8178 may indicate which power outlets/ports are active. As another example, the screen 8178 may indicate whether any devices are currently being charged (e.g., wirelessly charged) by the wireless charging device 12I. In some embodiments, the screen 8178 may be a touchscreen that is also configured to receive user inputs. For example, the functionality of the power buttons 8177 may be implemented by soft buttons displayed on the screen 8178.

In some embodiments, the control panel 8170 includes one or more storage compartments for user devices such as smartphones, tablets, and/or the like. In some embodiments, the wireless charging device 12I may be configured to wirelessly charge an external device 14 when the external device 14 is placed in a storage compartment. The storage compartment may include a cover to protect the external device 14 from outside elements such as dust, water, etc.

In some embodiments, the control panel 8170 includes a compartment configured to receive an insertable wireless communication device that may perform the wireless communication functions described previously herein with respect to wireless communication device 74. For example, when inserted into the compartment of the control panel 8170, the wireless charging device 12I may be configured to communicate with external devices 14 as explained previously herein with respect to the wireless communication device 74. The wireless communication device 74 (and/or the control panel 8170) may include one or more light-emitting diodes (LEDs) that illuminate to provide information regarding itself (e.g., whether the wireless charging device 12I is currently paired with an external device 14 or otherwise transmitting or receiving information).

While the control panel 8170 is shown and described as including numerous components, the components on the control panel 8170 may be located on or in other areas of the housing 8160 in other embodiments. For example, a top surface of the housing 8160 may include one or more compartments for storing user devices. In some embodiments, the control panel 8170 and/or the housing may include additional components (e.g., an integrated work light as shown in one example embodiment in FIGS. 61A and 61B).

In some embodiments, the housing 8160 of the wireless charging device 12I includes one or more charging stations 1028 as described previously herein with respect to FIGS. 32-35. For example, a top side of the housing 8160 may include one or more charging stations 1028 that may be configured to receive a battery pack (e.g., battery pack 13A) as indicated in FIG. 60. Similar to other wireless charging devices 12 described herein, one or more charging stations 1028 may be located on any side of the wireless charging station 12I. The explanations of the charging stations 1028 and other wireless charging devices 12A-12H and 12J apply to the wireless charging device 12I and will not be repeated here in their entirety for the sake of brevity.

As indicated in FIG. 60, in addition to the battery pack 13A, the wireless charging device 12I may also be configured to wirelessly charge one or more external devices 14, such as a smart phone 8174. The wireless charging device 12I may also be configured to charge other devices with an integrated battery(ies), such as floodlight 8172, a flashlight, other lighting devices, adapters/converters with an integrated or removable battery(ies), etc. Additionally, although FIG. 60 shows battery pack 13A located on top of the wireless charging device 12I to be wirelessly charged, other types of battery packs may also be wirelessly charged by the wireless charging device 12I as explained herein with respect to other embodiments of the wireless charging device 12. For example, the wireless charging device 12I may be configured to charge battery packs of different sizes and/or electrical characteristics (e.g., battery pack 13B of FIG. 3B, battery pack 13C of FIG. 3C, or the like) and/or battery packs manufactured by different manufacturers. In some embodiments, different charging stations 1028 may be specifically configured to charge one or more different types of battery packs and/or devices as explained herein. In some embodiments, wireless charging of a battery pack 13 may occur while the battery pack 13 is coupled to or integrated within a tool or a device configured to receive power from the battery pack 13. In some embodiments, the tool or device may be configured to prevent operation during wireless charging of a battery pack 13 coupled to the tool or device.

Figure 61A:
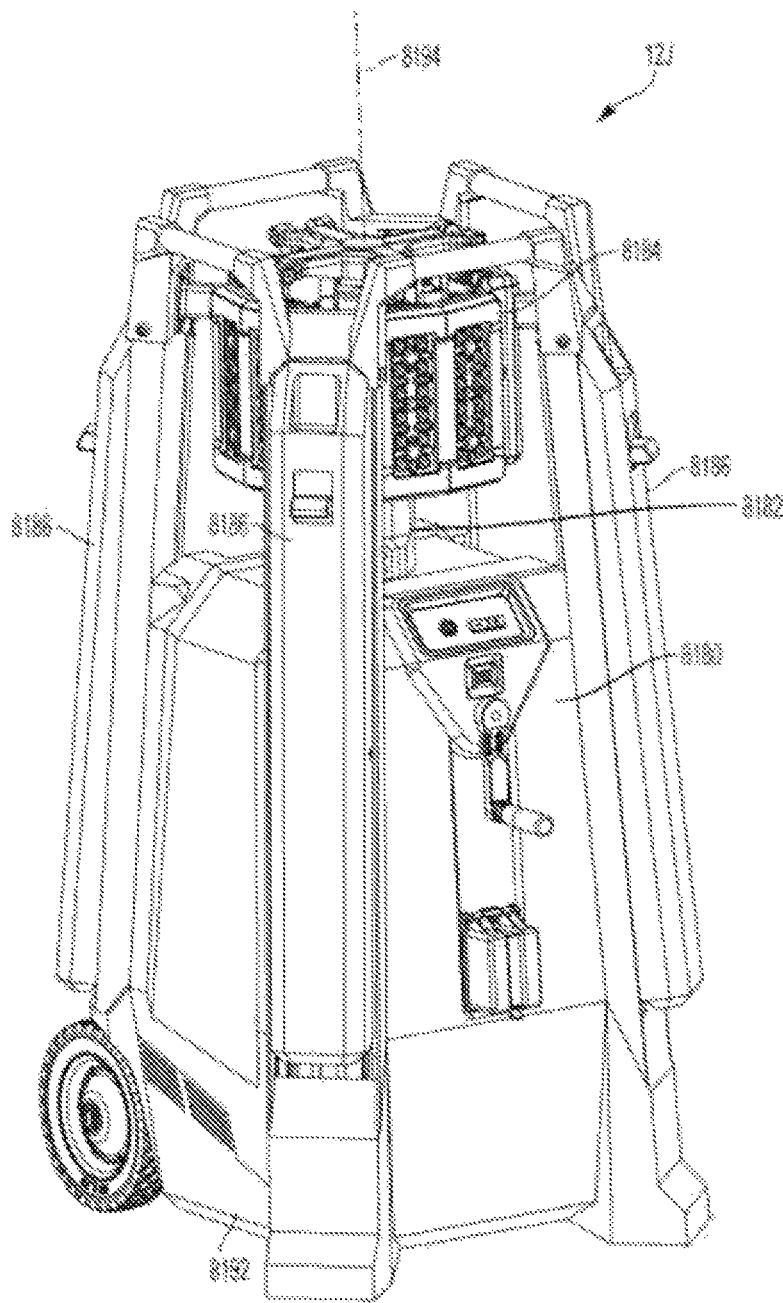
FIG. 61A illustrates a perspective view of another wireless charging device embodied as a portable lighting device for illuminating a jobsite, such as a construction site, or other large area, according to one example embodiment.
Figure 61B:
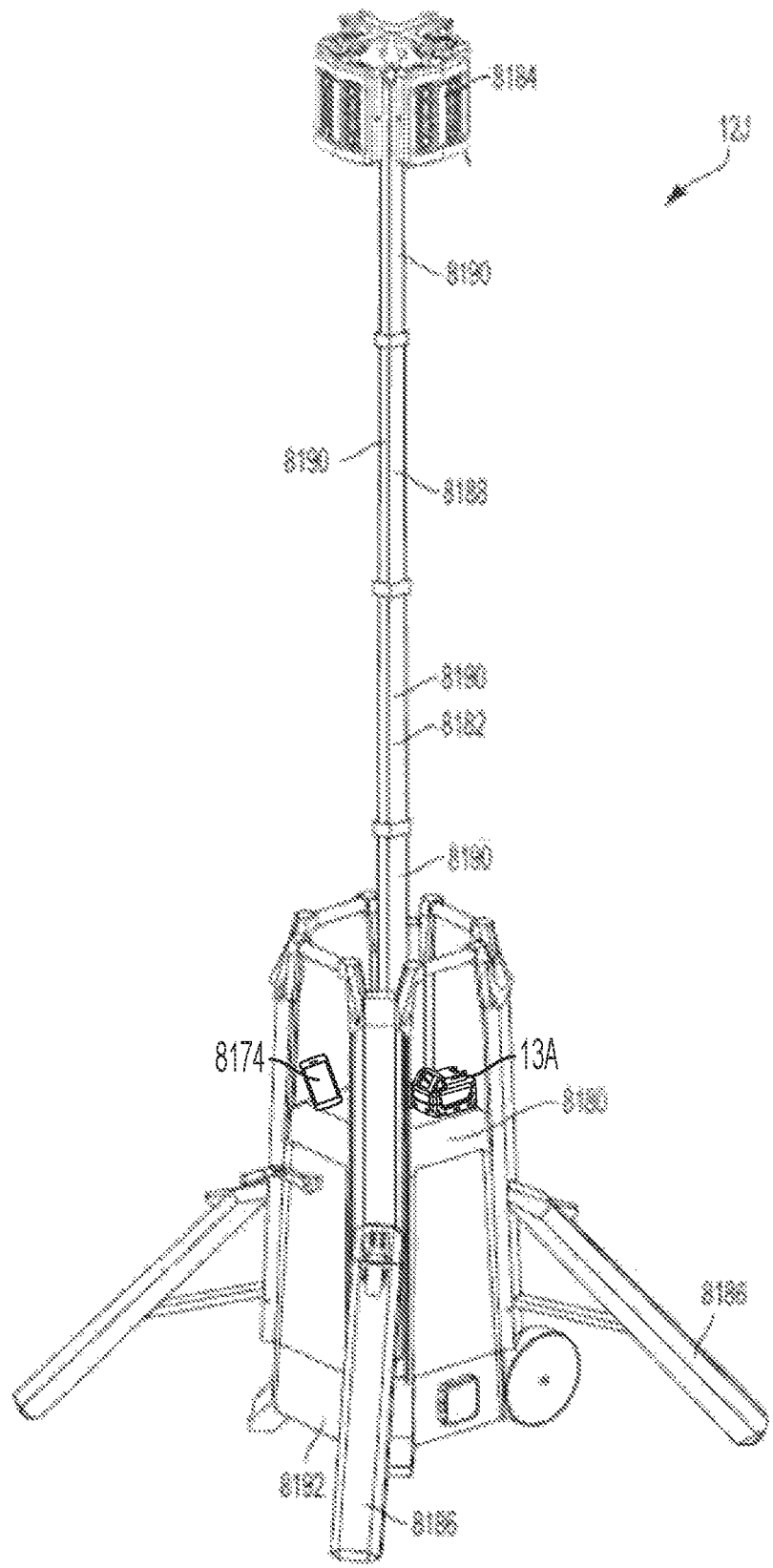
FIG. 61B is a perspective view of the wireless charging device of FIG. 61A in a form of deployment.

As indicated throughout this disclosure, the wireless charging device 12 may take on any one of numerous forms and may be integrated into any one of numerous devices/housings. Many of these devices/housings are portable, for example, such that they may be transported onto a construction site, which may reduce the amount of charging cables that are necessary to be transported to the construction to charge various battery packs 13, external devices 14, and/or other devices. Along these lines, FIGS. 61A and 61B illustrate another example wireless charging device 12J as a portable lighting device embodied as a site light for illuminating a jobsite, such as a construction site, or other large area. FIG. 61A is a perspective view of the wireless charging device/site light 12J according to one example embodiment. FIG. 61B is a perspective view of the site light 12J in a form of deployment.

In some embodiments, the site light 12J includes a body/housing 8180, a telescopic arm assembly 8182 supported by the body 8180, and a light assembly 8184 coupled to the telescopic arm assembly 8182 and movable relative to the body 8180. As shown in FIG. 61A, the body 8180 also includes one or more leg assemblies 8186 coupled thereto and configured to provide additional stability and support for the body 8180 during use.

As shown in FIG. 61B, an arm 8188 of the telescopic arm assembly 8182 includes the plurality of concentric tubes 8190 nested in order of decreasing width with sufficient clearance therebetween to allow each tube 8190 to move axially with respect to one another. Once assembled, the outermost tube 8190 (e.g., the tube 8190 with largest cross-sectional width) is fixedly mounted to a base 8192 of the body 8180 concentric with a vertical axis 8194 through a center of the base 8192. Furthermore, the innermost tube 8190 (e.g. the tube 8190 with the smallest cross-sectional width) is coupled to the light assembly 8184 for axial movement together therewith.

During use, the arm assembly 8182 is continuously adjustable between a retracted position (see FIG. 61A), where the arm 8188 produces a first arm length (e.g., when the ends of each tube 8190 are positioned adjacent one another), and an extended position (see FIG. 61B), where the arm 8188 produces a second arm length that is greater than the first arm length.

In addition to the above-described features of the site light 12J, in some embodiments, the site light 12J may include at least some of the features disclosed in any of the embodiments of U.S. patent application Ser. No. 15/795,486, filed Oct. 27, 2017, now U.S. Pat. No. 10,851,976, which is hereby incorporated by reference.

While FIGS. 61A and 61B show a site light with a telescopic arm assembly 8182, the wireless charging device/lighting device 12J may be any type of portable lighting device (e.g., a compact site light, a tower light, a lantern-type light, or the like) or other portable device.

In some embodiments, the wireless charging device 12J is similar to the wireless charging device 12I and includes similar components that perform similar functions as explained previously herein with respect to the wireless charging device 12I. The wireless charging device 12J may share one or more characteristics of the portable power source 8102 of FIG. 57 and one or more of the characteristics of the wireless charging devices 12B and 12C of FIGS. 32-35.

In some embodiments, the body/housing 8160 includes one or more internal batteries (not shown). For example, the one or more internal batteries may include the battery pack 13A, 13B/8154, 13C. In some embodiments, the body/housing 8160 includes one or more battery pack receptacles, each configured to removably receive a battery pack 13A, 13B/8154, 13C. In addition, the wireless charging device 12J may also be configured to receive power from an external power source (e.g., AC source). In some embodiments, the external power source (when available) may be configured to charge the one or more internal batteries and/or one or more removable battery packs 13A, 13B/8154, 13C coupled to the one or more battery pack receptacles. In some embodiments, the wireless charging device 12J may be configured to wirelessly charge one or more battery packs 13 or devices using power provided by the one or more internal batteries or the one or more removable battery packs 13A, 13B/8154, 13C (for example, when the external power source is not available such as when the wireless charging device 12J located at certain portions of a construction site), the external power source, or a combination thereof. In some embodiments where the wireless charging device 12J is configured to wirelessly charge one or more battery packs or devices using power provided by the one or more removable battery packs 13A, 13B/8154, 13C, the one or more removable battery packs 13A, 13B/8154, 13C may have a higher battery capacity, state of charge, etc. than the one or more battery packs or devices that are being charged by the one or more removable battery packs 13A, 13B/8154, 13C. For example, a large battery pack 13B/8154 may be used to charge one or more smaller battery packs 13A, 13C and/or devices with smaller batteries (e.g., a smart phone 8174). In some embodiments, the wireless charging device 12J may provide pass-through power to one or more charging stations 1028 of the wireless charging device 12J to charge one or more devices as explained previously herein with respect to the wireless charging device 12I.

Similar to the wireless charging device 12I, in some embodiments, the body/housing 8180 of the wireless charging device 12J includes one or more charging stations 1028 as described previously herein with respect to FIGS. 32-35. For example, a top side of the housing 8180 may include one or more charging stations 1028 that may be configured to receive a battery pack (e.g., battery pack 13A), an external device 14 (such as a smart phone 8174), and/or other devices with an integrated battery(ies) as indicated in FIG. 61B. Similar to other wireless charging devices described herein, one or more charging stations 1028 may be located on any side of the wireless charging station 12J. The previous explanations of the charging stations 1028 and other wireless charging devices 12A-12I apply to the wireless charging device 12J and will not be repeated in their entirety here for the sake of brevity. Although FIG. 61B shows a deployed site light 12J with the battery 13A and the smart phone 8174 located on the top side of the body/housing 8180 for wireless charging thereof, in some embodiments, the battery 13A, the smart phone 8174, and/or another device may also be wirelessly charged by the wireless charging device/site light 12J when the wireless charging device/site light 12J is in the retracted position shown in FIG. 61A.

Figure 62:
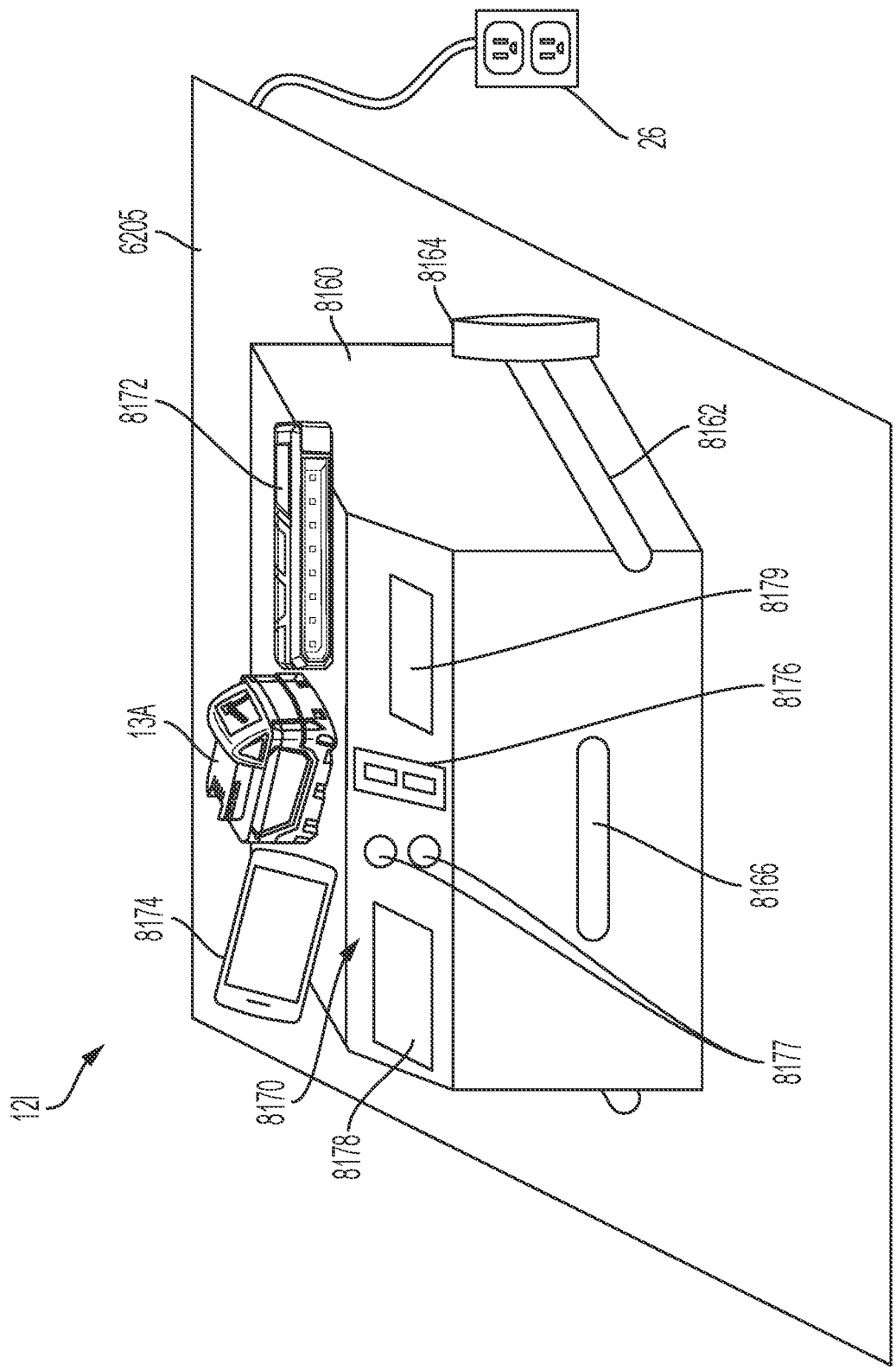
FIG. 62 illustrates a charging pad/mat configured to charge a power supply of an integrated portable power supply and wireless charging device according to one example embodiment.

FIG. 62 illustrates a charging pad/mat 6205 configured to charge a power supply of a wireless charging device 12 (e.g., an integrated portable power supply and wireless charging device) according to one example embodiment. The charging pad 6205 may be coupled to a power source 26 (e.g., an AC power source) as indicated in FIG. 62. In some embodiments, the charging pad 6205 is configured to charge an internal core battery of the wireless charging device 12I. In some embodiments, the charging pad 6205 is configured to wirelessly charge the power supply (e.g., an internal core battery) of the wireless charging device 12 using, for example, one or more of the wireless charging modalities described herein. For example, the charging pad 6205 may include one or more wireless power transmitters similar to the wireless power transmitter 104 of the wireless charging device 12 described previously herein.

In some embodiments, the charging pad 6205 may include contacts configured to engage with corresponding contacts on the wireless charging device 12 to charge the power supply of the wireless charging device 12 via a physical connection between the contacts of each device (i.e., wired charging). For example, in embodiments that allow for wired charging, the charging pad 6205 may include an arm (not shown) that includes contacts configured to engage with corresponding contacts on the wireless charging device 12. The arm may be stationary, or the arm may be movable, for example, to allow the user to more easily connect the contacts of the arm with the contacts of the wireless charging device 12. In some embodiments, the charging pad 6205 may be configured to physically and electrically connect to the wireless charging device 12 via the wheels 8164 of the wireless charging device 12 to provide charging current to the wireless charging device 12 via the wheels 8164.

As shown in FIG. 62, the charging pad 6205 may be placed on a horizontal surface (e.g., the ground or floor) such that the wireless charging device 12 may be placed on top of the charging pad 6205 to be charged. In some embodiments, the charging pad 6205 may be placed on a vertical surface (e.g., a wall) such that the wireless charging device 12 may be placed next to the charging pad 6205 to be charged. In some embodiments, the charging pad 6205 is configured to charge a wireless charging device 12 that is located underneath the charging pad 6205. For example, the charging pad 6205 may be located on a horizontal surface elevated off of the floor or ground to allow the wireless charging device 12 to be placed underneath the charging pad 6205.

In some embodiments, the charging pad 6205 may also be configured to charge other devices with their own power supplies, such as internal core batteries. For example, the charging pad 6205 may be configured to charge outdoor power equipment that has its own internal core battery such as lawn mowers (e.g., riding lawn mowers, walk-behind/push lawn mowers, etc.), material handling carts, and/or the like.

Thus, embodiments described herein provide, among other things, a universal wireless charging for power tool battery packs.

We claim:

1. A communication system comprising:
   a wireless charging device including
      a plurality of charging stations including
         a first charging station including a first type of wireless charging circuitry and a first battery pack detection sensor, and
         a second charging station including a second battery pack detection sensor and a second type of wireless charging circuitry different than the first type of wireless charging circuitry,
      a wireless communication device,
      a charger electronic processor coupled to the plurality of charging stations and to the wireless communication device, wherein the charger electronic processor is configured to
         communicate with a first battery pack via at least one of the wireless communication device and the first battery pack detection sensor,
         communicate with a second battery pack via at least one of the wireless communication device and the second battery pack detection sensor,
         determine, based on communicating with the first battery pack and the second battery pack, that the first battery pack was manufactured by a different manufacturer than the second battery pack, and
         communicate first status information of the first charging station and second status information of the second charging station to an external device via the wireless communication device, wherein the first status information includes a first manufacturer of the first battery pack and wherein the second status information includes a second manufacturer of the second battery pack that is different than the first manufacturer;
   the external device including
      a transceiver configured to wirelessly communicate with the wireless communication device of the wireless charging device,
      a display,
      an external device electronic processor coupled to the transceiver and the display, the external device electronic processor configured to
         receive the first status information and the second status information from the wireless charging device via the transceiver, and
         control the display to display the first status information and the second status information.

2. The communication system of claim 1, wherein the wireless communication device is configured to use a first wireless communication modality, and wherein at least one of the first battery pack detection sensor and the second battery pack detection sensor is configured to use a second communication modality different than the first communication modality.

3. The communication system of claim 1, wherein at least one of the charger electronic processor and a battery electronic processor of the first battery pack is configured to determine a received signal strength indication (RSSI) of at least one of (i) wireless charging of the first battery pack by the first type of wireless charging circuitry and (ii) communication between the first battery pack and the at least one of the wireless communication device and the first battery pack detection sensor;

wherein the first status information includes the RSSI; and
wherein the external device electronic processor controls the display to display the RSSI as an indication of an effectiveness of wireless power transfer from the first type of wireless charging circuitry of the first charging station to the first battery pack.

4. The communication system of claim 3, wherein at least one of the charger electronic processor, the battery electronic processor, and the external device electronic processor is configured to determine that the RSSI is below a threshold RSSI;
wherein in response to determining that the RSSI is below the threshold RSSI, the external device electronic processor is configured to control the display to provide an alert recommending that a user adjust a positioning of the first battery pack on the first charging station.

5. The communication system of claim 1, wherein the first status information indicates that the first charging station is wirelessly charging the first battery pack using the first type of wireless charging circuitry.

6. The communication system of claim 1, wherein the first status information indicates a plurality of available types of charging by the first charging station, the plurality of available types of charging including use of the first type of wireless charging circuitry and use of a third type of wireless charging circuitry different than the first type of charging circuitry.

7. The communication system of claim 1, wherein the first status information indicates one or more of a plurality of wireless charging modalities through which the first battery pack is configured to be wirelessly charged.

8. The communication system of claim 1, wherein the first status information includes at least one of a charge level of the first battery pack, a temperature of the first battery pack, a voltage of the first battery pack, and an energy output capacity of the first battery pack.

9. The communication system of claim 1, wherein the external device electronic processor is configured to control the display to display a charging type selection interface configured to allow a user to select between (i) serial charging of the first battery pack and the second battery pack and (ii) simultaneous charging of the first battery pack and the second battery pack;
wherein the external device electronic processor is configured to receive, via the display, a user input selecting an option from the charging type selection interface;
wherein the external device electronic processor is configured to transmit, via the transceiver, the selected option to the wireless charging device; and
wherein the charger electronic processor is configured to receive, via the wireless communication device, the selected option, and
control operation of the first charging station and the second charging station in accordance with the selected option.

10. The communication system of claim 1, wherein the external device electronic processor is configured to receive, via the display, a selection of one or more battery packs to be charged;
wherein the external device electronic processor is configured to transmit, via the transceiver, the selection of the one or more battery packs to be charged to the wireless charging device; and
wherein the charger electronic processor is configured to receive, via the wireless communication device, the selection of the one or more battery packs to be charged, and
control operation of the first charging station and the second charging station in accordance with the selection of the one or more battery packs to be charged.

11. The communication system of claim 10, wherein the selection of the one or more battery packs to be charged includes a selection of a plurality of battery packs to be charged and an order in which serial charging of each of the battery packs in the plurality of battery packs occurs.

12. The communication system of claim 1, wherein the external device electronic processor is configured to receive, via the display, a selection of a charging modality for the first charging station from among a plurality of charging modalities that are shared by the first charging station and the first battery pack;
wherein the external device electronic processor is configured to transmit, via the transceiver, the selection of the charging modality to the wireless charging device; and
wherein the charger electronic processor is configured to receive, via the wireless communication device, the selection of the charging modality, and
control operation of the first charging station to charge the first battery pack using the selected charging modality.

13. The communication system of claim 1, wherein the external device electronic processor is configured to receive, via the display, a selection of scheduled charging parameters that indicate (i) whether scheduled charging should occur, (ii) which charging stations should engage in the scheduled charging, and (iii) when the scheduled charging should occur;
wherein the external device electronic processor is configured to transmit, via the transceiver, the selection of the scheduled charging parameters to the wireless charging device; and
wherein the charger electronic processor is configured to receive, via the wireless communication device, the selection of the scheduled charging parameters, and
control operation of the first charging station and the second charging station in accordance with the selection of the scheduled charging parameters.

14. The communication system of claim 1, wherein the external device electronic processor is configured to receive, via the display, a selection of eco-mode charging;
wherein the external device electronic processor is configured to transmit, via the transceiver, the selection of the eco-mode charging to the wireless charging device; and
wherein the charger electronic processor is configured to receive, via the wireless communication device, the selection of the eco-mode charging, and
control operation of the first charging station and the second charging station in accordance with the selection of the eco-mode charging by
monitoring power consumption of a grid to which the wireless charging device is coupled,
determining that the power consumption has decreased below a threshold for a predetermined amount of time, and
in response to determining that the power consumption has decreased below the threshold for the predetermined amount of time, enabling operation of at least one of the first charging station and the second charging station.

15. The communication system of claim 1, wherein the wireless charging device is a portable power supply further comprising:

one or more internal batteries configured to provide power to the first type of wireless charging circuitry of the first charging station and to the second type of wireless charging circuitry of the second charging station.

16. A communication method comprising:
communicating, with a charger electronic processor of a wireless charging device via at least one of a wireless communication device of the wireless charging device and a first battery pack detection sensor of the wireless charging device, with a first battery pack located on a first charging station of the wireless charging device, the first charging station including the first battery pack detection sensor and a first type of wireless charging circuitry;
communicating, with the charger electronic processor via at least one of the wireless communication device and a second battery pack detection sensor of the wireless charging device, with a second battery pack located on the a second charging station of the wireless charging device, the second charging station including the second battery pack detection sensor and a second type of wireless charging circuitry;
determining, with the charger electronic processor and based on communicating with the first battery pack and the second battery pack, that the first battery pack was manufactured by a different manufacturer than the second battery pack;
communicating, with the charger electronic processor and via the wireless communication device, first status information of the first charging station and second status information of the second charging station to an external device, wherein the first status information includes a first manufacturer of the first battery pack and wherein the second status information includes a second manufacturer of the second battery pack that is different than the first manufacturer;
receiving, with an external device electronic processor of the external device via a transceiver of the external device, the first status information and the second status information from the wireless charging device; and
controlling, with the external device electronic processor, a display of the external device to display the first status information and the second status information.

17. The communication method of claim 16, wherein communicating via the wireless communication device of the wireless charging device includes communicating using a first wireless communication modality, and wherein communicating via at least one of the first battery pack detection sensor and the second battery pack detection sensor includes using a second communication modality different than the first communication modality.

18. The communication method of claim 16, further comprising:
determining, with at least one of the charger electronic processor and a battery electronic processor of the first battery pack, a received signal strength indication (RSSI) of at least one of (i) wireless charging of the first battery pack by the first type of wireless charging circuitry and (ii) communication between the first battery pack and the at least one of the wireless communication device and the first battery pack detection sensor;
wherein the first status information includes the RSSI; and
wherein controlling the display to display the first status information includes controlling, with the external device electronic processor, the display to display the RSSI as an indication of an effectiveness of wireless power transfer from the first type of wireless charging circuitry of the first charging station to the first battery pack.

19. A communication system comprising:
a wireless charging device including
a plurality of charging stations including
a first charging station including a first type of wireless charging circuitry and a first battery pack detection sensor, and
a second charging station including a second battery pack detection sensor and a second type of wireless charging circuitry different than the first type of wireless charging circuitry,
a wireless communication device,
a charger electronic processor coupled to the plurality of charging stations and to the wireless communication device, wherein the charger electronic processor is configured to
communicate with a first battery pack via at least one of the wireless communication device and the first battery pack detection sensor,
communicate with a second battery pack via at least one of the wireless communication device and the second battery pack detection sensor,
communicate first status information of the first charging station and second status information of the second charging station to an external device via the wireless communication device;
the external device including
a transceiver configured to wirelessly communicate with the wireless communication device of the wireless charging device,
a display,
an external device electronic processor coupled to the transceiver and the display, the external device electronic processor configured to
receive the first status information and the second status information from the wireless charging device via the transceiver, and
control the display to display the first status information and the second status information.

20. The communication system of claim 19, wherein at least one of the charger electronic processor and the external device electronic processor is configured to determine, based on communicating with the first battery pack and the second battery pack, that the first battery pack was manufactured by a different manufacturer than the second battery pack; and
wherein the external device electronic processor is configured to control the display to display a first manufacturer of the first battery pack and a second manufacturer of the second battery pack that is different than the first manufacturer.

* * * * *